US011947708B2

(12) United States Patent
Brannon et al.

(10) Patent No.: US 11,947,708 B2
(45) **Date of Patent: *Apr. 2, 2024**

(54) DATA PROCESSING SYSTEMS AND METHODS FOR AUTOMATICALLY PROTECTING SENSITIVE DATA WITHIN PRIVACY MANAGEMENT SYSTEMS

(71) Applicant: OneTrust, LLC, Atlanta, GA (US)

(72) Inventors: Jonathan Blake Brannon, Smyrna, GA (US); Kevin Jones, Atlanta, GA (US); Saravanan Pitchaimani, Atlanta, GA (US); Jeremy Turk, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,750

(22) Filed: Dec. 30, 2022

(65) Prior Publication Data

US 2023/0137172 A1 May 4, 2023

Related U.S. Application Data

(63) Continuation of application No. 17/499,595, filed on Oct. 12, 2021, now Pat. No. 11,544,409, which is a (Continued)

(51) Int. Cl.

*G06F 21/00* (2013.01)
*G06F 3/0482* (2013.01)
*G06F 21/62* (2013.01)

(52) U.S. Cl.

CPC ........ *G06F 21/6263* (2013.01); *G06F 3/0482* (2013.01)

(58) Field of Classification Search

CPC ........................... G06F 21/6263; G06F 3/0482
See application file for complete search history.

(56) References Cited

U.S. PATENT DOCUMENTS 4,536,866 A 8/1985 Jerome et al.
4,574,350 A 3/1986 Starr (Continued)

FOREIGN PATENT DOCUMENTS

CA 3056394 3/2021
CN 111496802 8/2020

(Continued)

OTHER PUBLICATIONS

Office Action, dated Jan. 12, 2023, from corresponding U.S. Appl. No. 17/872,084.

(Continued)

*Primary Examiner* — Ghazal B Shehni
(74) *Attorney, Agent, or Firm* — Brient IP Law, LLC

(57) ABSTRACT

In particular embodiments, a sensitive data management system is configured to remove sensitive data after a period of non-use. Credentials used to access remote systems and/or third-party systems are stored with metadata that is updated with each use of the credentials. After a period of non-use, determined based on credential metadata, the credentials are deleted. Personal data retrieved to process a consumer request is stored with metadata that is updated with each use of the personal data. After a period of non-use, determined based on personal data metadata, the personal data is deleted. The personal data is also deleted if the system determines that the process or system that caused the personal data to be retrieved is no longer in use. An encrypted version of personal data may be stored for later use in verifying proper consumer request fulfillment.

20 Claims, 70 Drawing Sheets

Related U.S. Application Data continuation-in-part of application No. 17/198,581, filed on Mar. 11, 2021, now Pat. No. 11,144,675, which is a continuation-in-part of application No. 17/068,557, filed on Oct. 12, 2020, now Pat. No. 10,963,591, which is a continuation of application No. 16/813,321, filed on Mar. 9, 2020, now Pat. No. 10,803,202, which is a continuation of application No. 16/563,735, filed on Sep. 6, 2019, now Pat. No. 10,586,075.

(60) Provisional application No. 62/988,445, filed on Mar. 12, 2020, provisional application No. 62/728,435, filed on Sep. 7, 2018.

(56) References Cited

U.S. PATENT DOCUMENTS

| | | | |
|---|---|---|---|
| 5,193,162 | A | 3/1993 | Bordsen et al. |
| 5,276,735 | A | 1/1994 | Boebert et al. |
| 5,329,447 | A | 7/1994 | Leedom, Jr. |
| 5,404,299 | A | 4/1995 | Tsurubayashi et al. |
| 5,535,393 | A | 7/1996 | Reeve et al. |
| 5,560,005 | A | 9/1996 | Hoover et al. |
| 5,668,986 | A | 9/1997 | Nilsen et al. |
| 5,710,917 | A | 1/1998 | Musa et al. |
| 5,761,529 | A | 6/1998 | Raji |
| 5,764,906 | A | 6/1998 | Edelstein et al. |
| 5,872,973 | A | 2/1999 | Mitchell et al. |
| 5,913,041 | A | 6/1999 | Ramanathan et al. |
| 5,913,214 | A | 6/1999 | Madnick et al. |
| 6,003,040 | A | 12/1999 | Mital et al. |
| 6,009,429 | A | 12/1999 | Greer et al. |
| 6,016,394 | A | 1/2000 | Walker |
| 6,122,627 | A | 9/2000 | Carey et al. |
| 6,148,297 | A | 11/2000 | Swor et al. |
| 6,148,342 | A | 11/2000 | Ho |
| 6,240,416 | B1 | 5/2001 | Immon et al. |
| 6,240,422 | B1 | 5/2001 | Atkins et al. |
| 6,243,816 | B1 | 6/2001 | Fang et al. |
| 6,253,203 | B1 | 6/2001 | Oflaherty et al. |
| 6,263,335 | B1 | 7/2001 | Paik et al. |
| 6,272,631 | B1 | 8/2001 | Thomlinson et al. |
| 6,275,824 | B1 | 8/2001 | Oflaherty et al. |
| 6,282,548 | B1 | 8/2001 | Burner et al. |
| 6,330,562 | B1 | 12/2001 | Boden et al. |
| 6,363,488 | B1 | 3/2002 | Ginter et al. |
| 6,374,237 | B1 | 4/2002 | Reese |
| 6,374,252 | B1 | 4/2002 | Althoff et al. |
| 6,408,336 | B1 | 6/2002 | Schneider et al. |
| 6,427,230 | B1 | 7/2002 | Goiffon et al. |
| 6,442,688 | B1 | 8/2002 | Moses et al. |
| 6,446,120 | B1 | 9/2002 | Dantressangle |
| 6,463,488 | B1 | 10/2002 | San Juan |
| 6,484,149 | B1 | 11/2002 | Jammes et al. |
| 6,484,180 | B1 | 11/2002 | Lyons et al. |
| 6,516,314 | B1 | 2/2003 | Birkler et al. |
| 6,516,337 | B1 | 2/2003 | Tripp et al. |
| 6,519,571 | B1 | 2/2003 | Guheen et al. |
| 6,519,763 | B1 | 2/2003 | Kaufer et al. |
| 6,574,631 | B1 | 6/2003 | Subramanian et al. |
| 6,591,272 | B1 | 7/2003 | Williams |
| 6,601,233 | B1 | 7/2003 | Underwood |
| 6,606,744 | B1 | 8/2003 | Mikurak |
| 6,611,812 | B2 | 8/2003 | Hurtado et al. |
| 6,625,602 | B1 | 9/2003 | Meredith et al. |
| 6,629,081 | B1 | 9/2003 | Cornelius et al. |
| 6,633,878 | B1 | 10/2003 | Underwood |
| 6,662,192 | B1 | 12/2003 | Rebane |
| 6,662,357 | B1 | 12/2003 | Bowman-Amuah |
| 6,697,824 | B1 | 2/2004 | Bowman-Amuah |
| 6,699,042 | B2 | 3/2004 | Smith et al. |
| 6,701,314 | B1 | 3/2004 | Conover et al. |
| 6,701,514 | B1 | 3/2004 | Haswell et al. |
| 6,721,713 | B1 | 4/2004 | Guheen et al. |
| 6,725,200 | B1 | 4/2004 | Rost |
| 6,732,109 | B2 | 5/2004 | Lindberg et al. |
| 6,754,665 | B1 | 6/2004 | Futagami et al. |
| 6,755,344 | B1 | 6/2004 | Mollett et al. |
| 6,757,685 | B2 | 6/2004 | Raffaele et al. |
| 6,757,888 | B1 | 6/2004 | Knutson et al. |
| 6,816,944 | B2 | 11/2004 | Peng |
| 6,826,693 | B1 | 11/2004 | Yoshida et al. |
| 6,850,252 | B1 | 2/2005 | Hoffberg |
| 6,886,101 | B2 | 4/2005 | Glazer et al. |
| 6,901,346 | B2 | 5/2005 | Tracy et al. |
| 6,904,417 | B2 | 6/2005 | Clayton et al. |
| 6,909,897 | B2 | 6/2005 | Kikuchi |
| 6,912,676 | B1 | 6/2005 | Gusler et al. |
| 6,925,443 | B1 | 8/2005 | Baggett, Jr. et al. |
| 6,938,041 | B1 | 8/2005 | Brandow et al. |
| 6,956,845 | B2 | 10/2005 | Baker et al. |
| 6,978,270 | B1 | 12/2005 | Carty et al. |
| 6,980,927 | B2 | 12/2005 | Tracy et al. |
| 6,980,987 | B2 | 12/2005 | Kaminer |
| 6,983,221 | B2 | 1/2006 | Tracy et al. |
| 6,985,887 | B1 | 1/2006 | Sunstein et al. |
| 6,990,454 | B2 | 1/2006 | McIntosh |
| 6,993,448 | B2 | 1/2006 | Tracy et al. |
| 6,993,495 | B2 | 1/2006 | Smith, Jr. et al. |
| 6,996,807 | B1 | 2/2006 | Vardi et al. |
| 7,003,560 | B1 | 2/2006 | Mullen et al. |
| 7,003,662 | B2 | 2/2006 | Genty et al. |
| 7,013,290 | B2 | 3/2006 | Ananian |
| 7,017,105 | B2 | 3/2006 | Flanagin et al. |
| 7,023,979 | B1 | 4/2006 | Wu et al. |
| 7,039,594 | B1 | 5/2006 | Gersting |
| 7,039,654 | B1 | 5/2006 | Eder |
| 7,047,517 | B1 | 5/2006 | Brown et al. |
| 7,051,036 | B2 | 5/2006 | Rosnow et al. |
| 7,051,038 | B1 | 5/2006 | Yeh et al. |
| 7,058,970 | B2 | 6/2006 | Shaw |
| 7,069,427 | B2 | 6/2006 | Adler et al. |
| 7,076,558 | B1 | 7/2006 | Dunn |
| 7,093,200 | B2 | 8/2006 | Schreiber et al. |
| 7,095,854 | B1 | 8/2006 | Ginter et al. |
| 7,100,195 | B1 | 8/2006 | Underwood |
| 7,120,800 | B2 | 10/2006 | Ginter et al. |
| 7,124,101 | B1 | 10/2006 | Mikurak |
| 7,124,107 | B1 | 10/2006 | Pishevar et al. |
| 7,127,705 | B2 | 10/2006 | Christfort et al. |
| 7,127,741 | B2 | 10/2006 | Bandini et al. |
| 7,133,845 | B1 | 11/2006 | Ginter et al. |
| 7,139,999 | B2 | 11/2006 | Bowman-Amuah |
| 7,143,091 | B2 | 11/2006 | Charnock et al. |
| 7,149,698 | B2 | 12/2006 | Guheen et al. |
| 7,165,041 | B1 | 1/2007 | Guheen et al. |
| 7,167,842 | B1 | 1/2007 | Josephson, II et al. |
| 7,167,844 | B1 | 1/2007 | Leong et al. |
| 7,171,379 | B2 | 1/2007 | Menninger et al. |
| 7,181,438 | B1 | 2/2007 | Szabo |
| 7,203,929 | B1 | 4/2007 | Vinodkrishnan et al. |
| 7,213,233 | B1 | 5/2007 | Vinodkrishnan et al. |
| 7,216,155 | B2 | 5/2007 | Stuckman et al. |
| 7,216,340 | B1 | 5/2007 | Vinodkrishnan et al. |
| 7,219,066 | B2 | 5/2007 | Parks et al. |
| 7,223,234 | B2 | 5/2007 | Stupp et al. |
| 7,225,460 | B2 | 5/2007 | Barzilai et al. |
| 7,234,065 | B2 | 6/2007 | Breslin et al. |
| 7,247,625 | B2 | 7/2007 | Zhang et al. |
| 7,251,624 | B1 | 7/2007 | Lee et al. |
| 7,260,830 | B2 | 8/2007 | Sugimoto |
| 7,266,566 | B1 | 9/2007 | Kennaley et al. |
| 7,272,818 | B2 | 9/2007 | Ishimitsu et al. |
| 7,275,063 | B2 | 9/2007 | Horn |
| 7,281,020 | B2 | 10/2007 | Fine |
| 7,284,232 | B1 | 10/2007 | Bates et al. |
| 7,284,271 | B2 | 10/2007 | Lucovsky et al. |
| 7,287,280 | B2 | 10/2007 | Young |
| 7,290,275 | B2 | 10/2007 | Baudoin et al. |
| 7,293,119 | B2 | 11/2007 | Beale |
| 7,299,299 | B2 | 11/2007 | Hollenbeck et al. |
| 7,302,569 | B2 | 11/2007 | Betz et al. |
| 7,313,575 | B2 | 12/2007 | Carr et al. |

(56) References Cited

U.S. PATENT DOCUMENTS

| | | | |
|---|---|---|---|
| 7,313,699 | B2 | 12/2007 | Koga |
| 7,313,825 | B2 | 12/2007 | Redlich et al. |
| 7,315,826 | B1 | 1/2008 | Guheen et al. |
| 7,315,849 | B2 | 1/2008 | Bakalash et al. |
| 7,322,047 | B2 | 1/2008 | Redlich et al. |
| 7,330,850 | B1 | 2/2008 | Seibel et al. |
| 7,340,447 | B2 | 3/2008 | Ghatare |
| 7,340,776 | B2 | 3/2008 | Zobel et al. |
| 7,343,434 | B2 | 3/2008 | Kapoor et al. |
| 7,346,518 | B1 | 3/2008 | Frank et al. |
| 7,349,913 | B2 | 3/2008 | Clark et al. |
| 7,353,204 | B2 | 4/2008 | Liu |
| 7,353,283 | B2 | 4/2008 | Henaff et al. |
| 7,356,559 | B1 | 4/2008 | Jacobs et al. |
| 7,367,014 | B2 | 4/2008 | Griffin |
| 7,370,025 | B1 | 5/2008 | Pandit |
| 7,376,835 | B2 | 5/2008 | Olkin et al. |
| 7,380,120 | B1 | 5/2008 | Garcia |
| 7,382,903 | B2 | 6/2008 | Ray |
| 7,383,570 | B2 | 6/2008 | Pinkas et al. |
| 7,391,854 | B2 | 6/2008 | Salonen et al. |
| 7,398,393 | B2 | 7/2008 | Mont et al. |
| 7,401,235 | B2 | 7/2008 | Mowers et al. |
| 7,403,942 | B1 | 7/2008 | Bayliss |
| 7,409,354 | B2 | 8/2008 | Putnam et al. |
| 7,412,402 | B2 | 8/2008 | Cooper |
| 7,424,680 | B2 | 9/2008 | Carpenter |
| 7,428,546 | B2 | 9/2008 | Nori et al. |
| 7,428,707 | B2 | 9/2008 | Quimby |
| 7,430,585 | B2 | 9/2008 | Sibert |
| 7,454,457 | B1 | 11/2008 | Lowery et al. |
| 7,454,508 | B2 | 11/2008 | Mathew et al. |
| 7,478,157 | B2 | 1/2009 | Bohrer et al. |
| 7,480,694 | B2 | 1/2009 | Blennerhassett et al. |
| 7,480,755 | B2 | 1/2009 | Herrell et al. |
| 7,487,170 | B2 | 2/2009 | Stevens |
| 7,493,282 | B2 | 2/2009 | Manly et al. |
| 7,500,607 | B2 | 3/2009 | Williams |
| 7,512,987 | B2 | 3/2009 | Williams |
| 7,516,882 | B2 | 4/2009 | Cucinotta |
| 7,523,053 | B2 | 4/2009 | Pudhukottai et al. |
| 7,529,836 | B1 | 5/2009 | Bolen |
| 7,548,968 | B1 | 6/2009 | Bura et al. |
| 7,552,480 | B1 | 6/2009 | Voss |
| 7,562,339 | B2 | 7/2009 | Racca et al. |
| 7,565,685 | B2 | 7/2009 | Ross et al. |
| 7,567,541 | B2 | 7/2009 | Karimi et al. |
| 7,584,505 | B2 | 9/2009 | Mondri et al. |
| 7,584,508 | B1 | 9/2009 | Kashchenko et al. |
| 7,587,749 | B2 | 9/2009 | Leser et al. |
| 7,590,705 | B2 | 9/2009 | Mathew et al. |
| 7,590,972 | B2 | 9/2009 | Axelrod et al. |
| 7,603,356 | B2 | 10/2009 | Schran et al. |
| 7,606,783 | B1 | 10/2009 | Carter |
| 7,606,790 | B2 | 10/2009 | Levy |
| 7,607,120 | B2 | 10/2009 | Sanyal et al. |
| 7,613,700 | B1 | 11/2009 | Lobo et al. |
| 7,617,136 | B1 | 11/2009 | Lessing et al. |
| 7,617,167 | B2 | 11/2009 | Griffis et al. |
| 7,620,644 | B2 | 11/2009 | Cote et al. |
| 7,627,666 | B1 | 12/2009 | DeGiulio et al. |
| 7,630,874 | B2 | 12/2009 | Fables et al. |
| 7,630,998 | B2 | 12/2009 | Zhou et al. |
| 7,636,742 | B1 | 12/2009 | Olavarrieta et al. |
| 7,640,322 | B2 | 12/2009 | Wendkos et al. |
| 7,650,497 | B2 | 1/2010 | Thornton et al. |
| 7,653,592 | B1 | 1/2010 | Flaxman et al. |
| 7,657,476 | B2 | 2/2010 | Barney |
| 7,657,694 | B2 | 2/2010 | Mansell et al. |
| 7,665,073 | B2 | 2/2010 | Meijer et al. |
| 7,665,125 | B2 | 2/2010 | Heard et al. |
| 7,668,947 | B2 | 2/2010 | Hutchinson et al. |
| 7,673,282 | B2 | 3/2010 | Amaru et al. |
| 7,676,034 | B1 | 3/2010 | Wu et al. |
| 7,681,034 | B1 | 3/2010 | Lee et al. |
| 7,681,140 | B2 | 3/2010 | Ebert |
| 7,685,561 | B2 | 3/2010 | Deem et al. |
| 7,685,577 | B2 | 3/2010 | Pace et al. |
| 7,693,593 | B2 | 4/2010 | Ishibashi et al. |
| 7,698,398 | B1 | 4/2010 | Lai |
| 7,702,639 | B2 | 4/2010 | Stanley et al. |
| 7,707,224 | B2 | 4/2010 | Chastagnol et al. |
| 7,712,029 | B2 | 5/2010 | Ferreira et al. |
| 7,716,242 | B2 | 5/2010 | Pae et al. |
| 7,725,474 | B2 | 5/2010 | Tamai et al. |
| 7,725,875 | B2 | 5/2010 | Waldrep |
| 7,729,940 | B2 | 6/2010 | Harvey et al. |
| 7,730,142 | B2 | 6/2010 | LeVasseur et al. |
| 7,752,124 | B2 | 7/2010 | Green et al. |
| 7,756,826 | B2 | 7/2010 | Bots et al. |
| 7,756,987 | B2 | 7/2010 | Wang et al. |
| 7,761,586 | B2 | 7/2010 | Olenick et al. |
| 7,774,745 | B2 | 8/2010 | Fildebrandt et al. |
| 7,788,212 | B2 | 8/2010 | Beckmann et al. |
| 7,788,222 | B2 | 8/2010 | Shah et al. |
| 7,788,632 | B2 | 8/2010 | Kuester et al. |
| 7,788,726 | B2 | 8/2010 | Teixeira |
| 7,797,726 | B2 | 9/2010 | Ashley et al. |
| 7,801,758 | B2 | 9/2010 | Gracie et al. |
| 7,801,826 | B2 | 9/2010 | Labrou et al. |
| 7,801,912 | B2 | 9/2010 | Ransil et al. |
| 7,802,305 | B1 | 9/2010 | Leeds |
| 7,805,349 | B2 | 9/2010 | Yu et al. |
| 7,805,451 | B2 | 9/2010 | Hosokawa |
| 7,813,947 | B2 | 10/2010 | DeAngelis et al. |
| 7,822,620 | B2 | 10/2010 | Dixon et al. |
| 7,827,523 | B2 | 11/2010 | Ahmed et al. |
| 7,836,078 | B2 | 11/2010 | Dettinger et al. |
| 7,844,640 | B2 | 11/2010 | Bender et al. |
| 7,849,143 | B2 | 12/2010 | Vuong |
| 7,853,468 | B2 | 12/2010 | Callahan et al. |
| 7,853,470 | B2 | 12/2010 | Sonnleithner et al. |
| 7,853,925 | B2 | 12/2010 | Kemmler |
| 7,860,816 | B2 | 12/2010 | Fokoue-Nkoutche et al. |
| 7,870,540 | B2 | 1/2011 | Zare et al. |
| 7,870,608 | B2 | 1/2011 | Shraim et al. |
| 7,873,541 | B1 | 1/2011 | Klar et al. |
| 7,877,327 | B2 | 1/2011 | Gwiazda et al. |
| 7,877,812 | B2 | 1/2011 | Koved et al. |
| 7,885,841 | B2 | 2/2011 | King |
| 7,890,461 | B2 | 2/2011 | Oeda et al. |
| 7,895,260 | B2 | 2/2011 | Archer et al. |
| 7,904,478 | B2 | 3/2011 | Yu et al. |
| 7,904,487 | B2 | 3/2011 | Ghatare |
| 7,917,888 | B2 | 3/2011 | Chong et al. |
| 7,917,963 | B2 | 3/2011 | Goyal et al. |
| 7,921,152 | B2 | 4/2011 | Ashley et al. |
| 7,930,197 | B2 | 4/2011 | Ozzie et al. |
| 7,930,753 | B2 | 4/2011 | Mellinger et al. |
| 7,953,725 | B2 | 5/2011 | Burris et al. |
| 7,954,150 | B2 | 5/2011 | Croft et al. |
| 7,958,087 | B2 | 6/2011 | Blumenau |
| 7,958,494 | B2 | 6/2011 | Chaar et al. |
| 7,962,900 | B2 | 6/2011 | Barraclough et al. |
| 7,966,310 | B2 | 6/2011 | Sullivan et al. |
| 7,966,599 | B1 | 6/2011 | Malasky et al. |
| 7,966,663 | B2 | 6/2011 | Strickland et al. |
| 7,974,992 | B2 | 7/2011 | Fastabend et al. |
| 7,975,000 | B2 | 7/2011 | Dixon et al. |
| 7,991,559 | B2 | 8/2011 | Dzekunov et al. |
| 7,991,747 | B1 | 8/2011 | Upadhyay et al. |
| 7,996,372 | B2 | 8/2011 | Rubel, Jr. |
| 8,005,891 | B2 | 8/2011 | Knowles et al. |
| 8,010,612 | B2 | 8/2011 | Costea et al. |
| 8,010,720 | B2 | 8/2011 | Iwaoka et al. |
| 8,019,881 | B2 | 9/2011 | Sandhu et al. |
| 8,020,206 | B2 | 9/2011 | Hubbard et al. |
| 8,024,384 | B2 | 9/2011 | Prabhakar et al. |
| 8,032,721 | B2 | 10/2011 | Murai |
| 8,036,374 | B2 | 10/2011 | Noble, Jr. |
| 8,037,409 | B2 | 10/2011 | Jacob et al. |
| 8,041,749 | B2 | 10/2011 | Beck |
| 8,041,763 | B2 | 10/2011 | Kordun et al. |
| 8,041,913 | B2 | 10/2011 | Wang |

(56) References Cited

U.S. PATENT DOCUMENTS 8,069,161 B2 11/2011 Bugir et al.
8,069,471 B2 11/2011 Boren
8,082,539 B1 12/2011 Schelkogonov et al.
8,090,754 B2 1/2012 Schmidt et al.
8,095,923 B2 1/2012 Harvey et al.
8,099,709 B2 1/2012 Baikov et al.
8,099,765 B2 1/2012 Parkinson
8,103,962 B2 1/2012 Embley et al.
8,117,441 B2 2/2012 Kurien et al.
8,126,926 B2 2/2012 Atre et al.
8,135,815 B2 3/2012 Mayer
8,146,054 B2 3/2012 Baker et al.
8,146,074 B2 3/2012 Ito et al.
8,150,717 B2 4/2012 Whitmore
8,156,105 B2 4/2012 Altounian et al.
8,156,158 B2 4/2012 Rolls et al.
8,156,159 B2 4/2012 Ebrahimi et al.
8,166,406 B1 4/2012 Goldfeder et al.
8,176,061 B2 5/2012 Swanbeck et al.
8,176,177 B2 5/2012 Sussman et al.
8,176,334 B2 5/2012 Vainstein
8,176,470 B2 5/2012 Klumpp et al.
8,180,759 B2 5/2012 Hamzy
8,181,151 B2 5/2012 Sedukhin et al.
8,185,409 B2 5/2012 Putnam et al.
8,196,176 B2 6/2012 Berteau et al.
8,205,093 B2 6/2012 Argott
8,205,140 B2 6/2012 Hafeez et al.
8,214,362 B1 7/2012 Djabarov
8,214,803 B2 7/2012 Horii et al.
8,225,061 B2 7/2012 Greenebaum
8,234,377 B2 7/2012 Cohn
8,239,244 B2 8/2012 Ginsberg et al.
8,250,051 B2 8/2012 Bugir et al.
8,255,468 B2 8/2012 Vitaldevara et al.
8,260,262 B2 9/2012 Ben Ayed
8,261,362 B2 9/2012 Goodwin et al.
8,266,231 B1 9/2012 Golovin et al.
8,275,632 B2 9/2012 Awaraji et al.
8,275,793 B2 9/2012 Ahmad et al.
8,286,239 B1 10/2012 Sutton
8,312,549 B2 11/2012 Goldberg et al.
8,316,237 B1 11/2012 Felsher et al.
8,332,908 B2 12/2012 Hatakeyama et al.
8,340,999 B2 12/2012 Kumaran et al.
8,341,405 B2 12/2012 Meijer et al.
8,346,929 B1 1/2013 Lai
8,364,713 B2 1/2013 Pollard
8,370,224 B2 2/2013 Grewal
8,370,233 B2 2/2013 Kaisermayr et al.
8,370,794 B2 2/2013 Moosmann et al.
8,380,630 B2 2/2013 Felsher
8,380,743 B2 2/2013 Convertino et al.
8,381,180 B2 2/2013 Rostoker
8,381,297 B2 2/2013 Touboul
8,386,314 B2 2/2013 Kirkby et al.
8,392,982 B2 3/2013 Harris et al.
8,418,226 B2 4/2013 Gardner
8,423,954 B2 4/2013 Ronen et al.
8,429,179 B1 4/2013 Mirhaji
8,429,597 B2 4/2013 Prigge
8,429,630 B2 4/2013 Nickolov et al.
8,429,758 B2 4/2013 Chen et al.
8,438,644 B2 5/2013 Watters et al.
8,452,693 B2 5/2013 Shah et al.
8,463,247 B2 6/2013 Misiag
8,464,311 B2 6/2013 Ashley et al.
8,468,244 B2 6/2013 Redlich et al.
8,473,324 B2 6/2013 Alvarez et al.
8,474,012 B2 6/2013 Ahmed et al.
8,494,894 B2 7/2013 Jaster et al.
8,504,481 B2 8/2013 Motahari et al.
8,510,199 B1 8/2013 Erlanger
8,515,988 B2 8/2013 Jones et al.
8,516,076 B2 8/2013 Thomas
8,527,337 B1 9/2013 Lim et al.
8,533,746 B2 9/2013 Nolan et al.
8,533,844 B2 9/2013 Mahaffey et al.
8,538,817 B2 9/2013 Wilson
8,539,359 B2 9/2013 Rapaport et al.
8,539,437 B2 9/2013 Finlayson et al.
8,560,645 B2 10/2013 Linden et al.
8,560,841 B2 10/2013 Chin et al.
8,560,956 B2 10/2013 Curtis et al.
8,561,100 B2 10/2013 Hu et al.
8,561,153 B2 10/2013 Grason et al.
8,565,729 B2 10/2013 Moseler et al.
8,566,726 B2 10/2013 Dixon et al.
8,566,938 B1 10/2013 Prakash et al.
8,571,909 B2 10/2013 Miller et al.
8,572,717 B2 10/2013 Narayanaswamy
8,578,036 B1 11/2013 Holfelder et al.
8,578,166 B2 11/2013 De Monseignat et al.
8,578,481 B2 11/2013 Rowley
8,578,501 B1 11/2013 Ogilvie
8,583,694 B2 11/2013 Siegel et al.
8,583,766 B2 11/2013 Dixon et al.
8,589,183 B2 11/2013 Awaraji et al.
8,601,467 B2 12/2013 Hofhansl et al.
8,601,490 B2 12/2013 Sureshan et al.
8,601,591 B2 12/2013 Krishnamurthy et al.
8,606,746 B2 12/2013 Yeap et al.
8,612,420 B2 12/2013 Sun et al.
8,612,993 B2 12/2013 Grant et al.
8,615,549 B2 12/2013 Knowles et al.
8,615,731 B2 12/2013 Doshi
8,620,952 B2 12/2013 Bennett et al.
8,621,637 B2 12/2013 Al-Harbi et al.
8,626,671 B2 1/2014 Federgreen
8,627,114 B2 1/2014 Resch et al.
8,630,961 B2 1/2014 Beilby et al.
8,631,048 B1 1/2014 Davis et al.
8,636,625 B2 1/2014 Johnson
8,640,110 B2 1/2014 Kopp et al.
8,646,072 B1 2/2014 Savant
8,650,399 B2 2/2014 Le Bihan et al.
8,655,939 B2 2/2014 Redlich et al.
8,656,265 B1 2/2014 Paulin et al.
8,656,456 B2 2/2014 Maxson et al.
8,661,036 B2 2/2014 Turski et al.
8,667,074 B1 3/2014 Farkas
8,667,487 B1 3/2014 Boodman et al.
8,677,472 B1 3/2014 Dotan et al.
8,681,984 B2 3/2014 Lee et al.
8,682,698 B2 3/2014 Cashman et al.
8,683,201 B2 3/2014 Shaty
8,683,502 B2 3/2014 Shkedi et al.
8,688,601 B2 4/2014 Jaiswal
8,689,292 B2 4/2014 Williams et al.
8,693,689 B2 4/2014 Belenkiy et al.
8,700,524 B2 4/2014 Williams et al.
8,700,699 B2 4/2014 Shen et al.
8,706,742 B1 4/2014 Ravid et al.
8,707,451 B2 4/2014 Ture et al.
8,712,813 B2 4/2014 King
8,713,098 B1 4/2014 Adya et al.
8,713,638 B2 4/2014 Hu et al.
8,719,366 B2 5/2014 Mathew et al.
8,732,839 B2 5/2014 Hohl
8,744,894 B2 6/2014 Christiansen et al.
8,751,285 B2 6/2014 Deb et al.
8,762,406 B2 6/2014 Ho et al.
8,762,413 B2 6/2014 Graham, Jr. et al.
8,763,071 B2 6/2014 Sinha et al.
8,763,082 B2 6/2014 Huber et al.
8,763,131 B2 6/2014 Archer et al.
8,767,947 B1 7/2014 Ristock et al.
8,769,242 B2 7/2014 Tkac et al.
8,769,412 B2 7/2014 Gill et al.
8,769,671 B2 7/2014 Shraim et al.
8,776,241 B2 7/2014 Zaitsev
8,788,935 B1 7/2014 Hirsch et al.
8,793,614 B2 7/2014 Wilson et al.
8,793,650 B2 7/2014 Hilerio et al.

(56) References Cited

U.S. PATENT DOCUMENTS 8,793,781 B2 7/2014 Grossi et al.
8,793,809 B2 7/2014 Falkenburg et al.
8,799,984 B2 8/2014 Ahn
8,805,707 B2 8/2014 Schumann, Jr. et al.
8,805,806 B2 8/2014 Amarendran et al.
8,805,925 B2 8/2014 Price et al.
8,812,342 B2 8/2014 Barcelo et al.
8,812,752 B1 8/2014 Shih et al.
8,812,766 B2 8/2014 Kranendonk et al.
8,813,028 B2 8/2014 Farooqi
8,813,177 B2 8/2014 Srour et al.
8,813,214 B1 8/2014 McNair et al.
8,819,253 B2 8/2014 Simeloff et al.
8,819,617 B1 8/2014 Koenig et al.
8,819,800 B2 8/2014 Gao et al.
8,826,446 B1 9/2014 Liu et al.
8,832,649 B2 9/2014 Bishop et al.
8,832,854 B1 9/2014 Staddon et al.
8,839,232 B2 9/2014 Taylor et al.
8,843,487 B2 9/2014 McGraw et al.
8,843,745 B2 9/2014 Roberts, Jr.
8,849,757 B2 9/2014 Kruglick
8,856,534 B2 10/2014 Khosravi et al.
8,856,936 B2 10/2014 Datta Ray et al.
8,862,507 B2 10/2014 Sandhu et al.
8,863,261 B2 10/2014 Yang
8,875,232 B2 10/2014 Blom et al.
8,887,047 B2 11/2014 Digiantomasso et al.
8,893,078 B2 11/2014 Schaude et al.
8,893,286 B1 11/2014 Oliver
8,893,297 B2 11/2014 Eversoll et al.
8,904,494 B2 12/2014 Kindler et al.
8,914,263 B2 12/2014 Shimada et al.
8,914,299 B2 12/2014 Pesci-Anderson et al.
8,914,342 B2 12/2014 Kalaboukis et al.
8,914,902 B2 12/2014 Moritz et al.
8,918,306 B2 12/2014 Cashman et al.
8,918,392 B1 12/2014 Brooker et al.
8,918,632 B1 12/2014 Sartor
8,924,388 B2 12/2014 Elliot et al.
8,930,896 B1 1/2015 Wiggins
8,930,897 B2 1/2015 Nassar
8,935,198 B1 1/2015 Phillips et al.
8,935,266 B2 1/2015 Wu
8,935,342 B2 1/2015 Patel
8,935,804 B1 1/2015 Clark et al.
8,938,221 B2 1/2015 Brazier et al.
8,943,076 B2 1/2015 Stewart et al.
8,943,548 B2 1/2015 Drokov et al.
8,943,602 B2 1/2015 Roy et al.
8,949,137 B2 2/2015 Crapo et al.
8,955,038 B2 2/2015 Nicodemus et al.
8,959,568 B2 2/2015 Hudis et al.
8,959,584 B2 2/2015 Piliouras
8,966,575 B2 2/2015 McQuay et al.
8,966,597 B1 2/2015 Saylor et al.
8,973,108 B1 3/2015 Roth et al.
8,977,234 B2 3/2015 Chava
8,977,643 B2 3/2015 Schindlauer et al.
8,978,158 B2 3/2015 Rajkumar et al.
8,983,972 B2 3/2015 Kriebel et al.
8,984,031 B1 3/2015 Todd
8,990,933 B1 3/2015 Magdalin
8,996,417 B1 3/2015 Channakeshava
8,996,480 B2 3/2015 Agarwala et al.
8,997,213 B2 3/2015 Papakipos et al.
9,001,673 B2 4/2015 Birdsall et al.
9,003,295 B2 4/2015 Baschy
9,003,552 B2 4/2015 Goodwin et al.
9,009,851 B2 4/2015 Droste et al.
9,014,661 B2 4/2015 Decharms
9,015,796 B1 4/2015 Fujioka
9,021,469 B2 4/2015 Hilerio et al.
9,026,526 B1 5/2015 Bau et al.
9,030,987 B2 5/2015 Bianchetti et al.
9,032,067 B2 5/2015 Prasad et al.
9,043,217 B2 5/2015 Cashman et al.
9,043,480 B2 5/2015 Barton et al.
9,047,463 B2 6/2015 Porras
9,047,582 B2 6/2015 Hutchinson et al.
9,047,583 B2 6/2015 Patton et al.
9,047,639 B1 6/2015 Quintiliani et al.
9,049,244 B2 6/2015 Prince et al.
9,049,314 B2 6/2015 Pugh et al.
9,055,071 B1 6/2015 Gates et al.
9,058,590 B2 6/2015 Criddle et al.
9,064,033 B2 6/2015 Jin et al.
9,069,940 B2 6/2015 Hars
9,076,231 B1 7/2015 Hill et al.
9,077,736 B2 7/2015 Werth et al.
9,081,952 B2 7/2015 Sagi et al.
9,087,090 B1 7/2015 Cormier et al.
9,092,478 B2 7/2015 Vaitheeswaran et al.
9,092,796 B2 7/2015 Eversoll et al.
9,094,434 B2 7/2015 Williams et al.
9,098,515 B2 8/2015 Richter et al.
9,100,337 B1 8/2015 Battré et al.
9,100,778 B2 8/2015 Stogaitis et al.
9,106,691 B1 8/2015 Burger et al.
9,106,710 B1 8/2015 Feimster
9,110,918 B1 8/2015 Rajaa et al.
9,111,105 B2 8/2015 Barton et al.
9,111,295 B2 8/2015 Tietzen et al.
9,123,330 B1 9/2015 Sharifi et al.
9,123,339 B1 9/2015 Shaw et al.
9,129,311 B2 9/2015 Schoen et al.
9,135,261 B2 9/2015 Maunder et al.
9,135,444 B2 9/2015 Carter et al.
9,141,823 B2 9/2015 Dawson
9,141,911 B2 9/2015 Zhao et al.
9,152,818 B1 10/2015 Hathaway et al.
9,152,820 B1 10/2015 Pauley, Jr. et al.
9,154,514 B1 10/2015 Prakash
9,154,556 B1 10/2015 Dotan et al.
9,158,655 B2 10/2015 Wadhwani et al.
9,165,036 B2 10/2015 Mehra
9,170,996 B2 10/2015 Lovric et al.
9,172,706 B2 10/2015 Krishnamurthy et al.
9,177,293 B1 11/2015 Gagnon et al.
9,178,901 B2 11/2015 Xue et al.
9,183,100 B2 11/2015 Gventer et al.
9,189,642 B2 11/2015 Perlman
9,201,572 B2 12/2015 Lyon et al.
9,201,770 B1 12/2015 Duerk
9,202,026 B1 12/2015 Reeves
9,202,085 B2 12/2015 Mawdsley et al.
9,215,076 B1 12/2015 Roth et al.
9,215,252 B2 12/2015 Smith et al.
9,218,596 B2 12/2015 Ronca et al.
9,224,009 B1 12/2015 Liu et al.
9,230,036 B2 1/2016 Davis
9,231,935 B1 1/2016 Bridge et al.
9,232,040 B2 1/2016 Barash et al.
9,235,476 B2 1/2016 McHugh et al.
9,240,987 B2 1/2016 Barrett-Bowen et al.
9,241,259 B2 1/2016 Daniela et al.
9,245,126 B2 1/2016 Christodorescu et al.
9,245,266 B2 1/2016 Hardt
9,253,609 B2 2/2016 Hosier, Jr.
9,264,443 B2 2/2016 Weisman
9,274,858 B2 3/2016 Milliron et al.
9,280,581 B1 3/2016 Grimes et al.
9,286,149 B2 3/2016 Sampson et al.
9,286,282 B2 3/2016 Ling, III et al.
9,288,118 B1 3/2016 Pattan
9,288,556 B2 3/2016 Kim et al.
9,294,498 B1 3/2016 Yampolskiy et al.
9,299,050 B2 3/2016 Stiffler et al.
9,306,939 B2 4/2016 Chan et al.
9,317,697 B2 4/2016 Maier et al.
9,317,715 B2 4/2016 Schuette et al.
9,325,731 B2 4/2016 McGeehan
9,336,184 B2 5/2016 Mital et al.
9,336,220 B2 5/2016 Li et al.

(56) References Cited

U.S. PATENT DOCUMENTS

| | | | |
|---|---|---|---|
| 9,336,324 | B2 | 5/2016 | Lomme et al. |
| 9,336,332 | B2 | 5/2016 | Davis et al. |
| 9,336,400 | B2 | 5/2016 | Milman et al. |
| 9,338,188 | B1 | 5/2016 | Ahn |
| 9,342,623 | B2 | 5/2016 | Narayanan et al. |
| 9,342,706 | B2 | 5/2016 | Chawla et al. |
| 9,344,297 | B2 | 5/2016 | Shah et al. |
| 9,344,424 | B2 | 5/2016 | Tenenboym et al. |
| 9,344,484 | B2 | 5/2016 | Ferris |
| 9,348,802 | B2 | 5/2016 | Massand |
| 9,348,862 | B2 | 5/2016 | Kawecki, III |
| 9,348,929 | B2 | 5/2016 | Eberlein |
| 9,349,016 | B1 | 5/2016 | Brisebois et al. |
| 9,350,718 | B2 | 5/2016 | Sondhi et al. |
| 9,355,157 | B2 | 5/2016 | Mohammed et al. |
| 9,356,961 | B1 | 5/2016 | Todd et al. |
| 9,361,446 | B1 | 6/2016 | Demirjian et al. |
| 9,369,488 | B2 | 6/2016 | Woods et al. |
| 9,372,869 | B2 | 6/2016 | Joseph et al. |
| 9,374,693 | B1 | 6/2016 | Olincy et al. |
| 9,384,199 | B2 | 7/2016 | Thereska et al. |
| 9,384,357 | B2 | 7/2016 | Patil et al. |
| 9,386,078 | B2 | 7/2016 | Reno et al. |
| 9,386,104 | B2 | 7/2016 | Adams et al. |
| 9,395,959 | B2 | 7/2016 | Hatfield et al. |
| 9,396,332 | B2 | 7/2016 | Abrams et al. |
| 9,401,900 | B2 | 7/2016 | Levasseur et al. |
| 9,411,967 | B2 | 8/2016 | Parecki et al. |
| 9,411,982 | B1 | 8/2016 | Dippenaar et al. |
| 9,417,859 | B2 | 8/2016 | Gounares et al. |
| 9,418,221 | B2 | 8/2016 | Turgeman |
| 9,424,021 | B2 | 8/2016 | Zamir |
| 9,424,414 | B1 | 8/2016 | Demirjian et al. |
| 9,426,177 | B2 | 8/2016 | Wang et al. |
| 9,450,940 | B2 | 9/2016 | Belov et al. |
| 9,460,136 | B1 | 10/2016 | Todd et al. |
| 9,460,171 | B2 | 10/2016 | Marrelli et al. |
| 9,460,307 | B2 | 10/2016 | Breslau et al. |
| 9,461,876 | B2 | 10/2016 | Van Dusen et al. |
| 9,462,009 | B1 | 10/2016 | Kolman et al. |
| 9,465,702 | B2 | 10/2016 | Gventer et al. |
| 9,465,800 | B2 | 10/2016 | Lacey |
| 9,473,446 | B2 | 10/2016 | Vijay et al. |
| 9,473,505 | B1 | 10/2016 | Asano et al. |
| 9,473,535 | B2 | 10/2016 | Sartor |
| 9,477,523 | B1 | 10/2016 | Warman et al. |
| 9,477,660 | B2 | 10/2016 | Scott et al. |
| 9,477,685 | B1 | 10/2016 | Leung et al. |
| 9,477,942 | B2 | 10/2016 | Adachi et al. |
| 9,483,659 | B2 | 11/2016 | Bao et al. |
| 9,489,366 | B2 | 11/2016 | Scott et al. |
| 9,495,547 | B1 | 11/2016 | Schepis et al. |
| 9,501,523 | B2 | 11/2016 | Hyatt et al. |
| 9,507,960 | B2 | 11/2016 | Bell et al. |
| 9,509,674 | B1 | 11/2016 | Nasserbakht et al. |
| 9,509,702 | B2 | 11/2016 | Grigg et al. |
| 9,514,231 | B2 | 12/2016 | Eden |
| 9,516,012 | B2 | 12/2016 | Chochois et al. |
| 9,521,166 | B2 | 12/2016 | Wilson |
| 9,524,500 | B2 | 12/2016 | Dave et al. |
| 9,529,989 | B2 | 12/2016 | Kling et al. |
| 9,536,108 | B2 | 1/2017 | Powell et al. |
| 9,537,546 | B2 | 1/2017 | Cordeiro et al. |
| 9,542,568 | B2 | 1/2017 | Francis et al. |
| 9,549,047 | B1 | 1/2017 | Fredinburg et al. |
| 9,552,395 | B2 | 1/2017 | Bayer et al. |
| 9,552,470 | B2 | 1/2017 | Turgeman et al. |
| 9,553,918 | B1 | 1/2017 | Manion et al. |
| 9,558,497 | B2 | 1/2017 | Carvalho |
| 9,569,752 | B2 | 2/2017 | Deering et al. |
| 9,571,506 | B2 | 2/2017 | Boss et al. |
| 9,571,509 | B1 | 2/2017 | Satish et al. |
| 9,571,526 | B2 | 2/2017 | Sartor |
| 9,571,559 | B2 | 2/2017 | Raleigh et al. |
| 9,571,991 | B1 | 2/2017 | Brizendine et al. |
| 9,576,289 | B2 | 2/2017 | Henderson et al. |
| 9,578,060 | B1 | 2/2017 | Brisebois et al. |
| 9,578,173 | B2 | 2/2017 | Sanghavi et al. |
| 9,582,681 | B2 | 2/2017 | Mishra |
| 9,584,964 | B2 | 2/2017 | Pelkey |
| 9,589,110 | B2 | 3/2017 | Carey et al. |
| 9,600,181 | B2 | 3/2017 | Patel et al. |
| 9,602,529 | B2 | 3/2017 | Jones et al. |
| 9,606,971 | B2 | 3/2017 | Seolas et al. |
| 9,607,041 | B2 | 3/2017 | Himmelstein |
| 9,619,652 | B2 | 4/2017 | Slater |
| 9,619,661 | B1 | 4/2017 | Finkelstein |
| 9,621,357 | B2 | 4/2017 | Williams et al. |
| 9,621,566 | B2 | 4/2017 | Gupta et al. |
| 9,626,124 | B2 | 4/2017 | Lipinski et al. |
| 9,626,680 | B1 | 4/2017 | Ryan et al. |
| 9,629,064 | B2 | 4/2017 | Graves et al. |
| 9,642,008 | B2 | 5/2017 | Wyatt et al. |
| 9,646,095 | B1 | 5/2017 | Gottlieb et al. |
| 9,647,949 | B2 | 5/2017 | Varki et al. |
| 9,648,036 | B2 | 5/2017 | Seiver et al. |
| 9,652,314 | B2 | 5/2017 | Mahiddini |
| 9,654,506 | B2 | 5/2017 | Barrett |
| 9,654,541 | B1 | 5/2017 | Kapczynski et al. |
| 9,665,722 | B2 | 5/2017 | Nagasundaram et al. |
| 9,665,733 | B1 | 5/2017 | Sills et al. |
| 9,665,883 | B2 | 5/2017 | Roullier et al. |
| 9,672,053 | B2 | 6/2017 | Tang et al. |
| 9,672,355 | B2 | 6/2017 | Titonis et al. |
| 9,678,794 | B1 | 6/2017 | Barrett et al. |
| 9,691,090 | B1 | 6/2017 | Barday |
| 9,697,368 | B2 | 7/2017 | Dharawat |
| 9,699,209 | B2 | 7/2017 | Ng et al. |
| 9,703,549 | B2 | 7/2017 | Dufresne |
| 9,704,103 | B2 | 7/2017 | Suskind et al. |
| 9,705,840 | B2 | 7/2017 | Pujare et al. |
| 9,705,880 | B2 | 7/2017 | Siris |
| 9,721,078 | B2 | 8/2017 | Cornick et al. |
| 9,721,108 | B2 | 8/2017 | Krishnamurthy et al. |
| 9,727,751 | B2 | 8/2017 | Oliver et al. |
| 9,729,583 | B1 | 8/2017 | Barday |
| 9,734,148 | B2 | 8/2017 | Bendersky et al. |
| 9,734,255 | B2 | 8/2017 | Jiang |
| 9,736,004 | B2 | 8/2017 | Jung et al. |
| 9,740,985 | B2 | 8/2017 | Byron et al. |
| 9,740,987 | B2 | 8/2017 | Dolan |
| 9,749,408 | B2 | 8/2017 | Subramani et al. |
| 9,753,703 | B2 | 9/2017 | Jemiolo |
| 9,753,796 | B2 | 9/2017 | Mahaffey et al. |
| 9,754,091 | B2 | 9/2017 | Kode et al. |
| 9,756,059 | B2 | 9/2017 | Demirjian et al. |
| 9,760,620 | B2 | 9/2017 | Nachnani et al. |
| 9,760,635 | B2 | 9/2017 | Bliss et al. |
| 9,760,697 | B1 | 9/2017 | Walker |
| 9,760,849 | B2 | 9/2017 | Vinnakota et al. |
| 9,762,553 | B2 | 9/2017 | Ford et al. |
| 9,767,202 | B2 | 9/2017 | Darby et al. |
| 9,767,309 | B1 | 9/2017 | Patel et al. |
| 9,769,124 | B2 | 9/2017 | Yan |
| 9,773,269 | B1 | 9/2017 | Lazarus |
| 9,785,795 | B2 | 10/2017 | Grondin et al. |
| 9,787,671 | B1 | 10/2017 | Bogrett |
| 9,798,749 | B2 | 10/2017 | Saner |
| 9,798,826 | B2 | 10/2017 | Wilson et al. |
| 9,798,896 | B2 | 10/2017 | Jakobsson |
| 9,800,605 | B2 | 10/2017 | Baikalov et al. |
| 9,800,606 | B1 | 10/2017 | Yumer |
| 9,804,649 | B2 | 10/2017 | Cohen et al. |
| 9,804,928 | B2 | 10/2017 | Davis et al. |
| 9,805,381 | B2 | 10/2017 | Frank et al. |
| 9,811,532 | B2 | 11/2017 | Parkison et al. |
| 9,817,850 | B2 | 11/2017 | Dubbels et al. |
| 9,817,978 | B2 | 11/2017 | Marsh et al. |
| 9,819,684 | B2 | 11/2017 | Cernoch et al. |
| 9,825,928 | B2 | 11/2017 | Lelcuk et al. |
| 9,830,563 | B2 | 11/2017 | Paknad |
| 9,832,633 | B2 | 11/2017 | Gerber, Jr. et al. |
| 9,836,598 | B2 | 12/2017 | Iyer et al. |
| 9,838,407 | B1 | 12/2017 | Oprea et al. |

(56) References Cited

U.S. PATENT DOCUMENTS 9,838,839 B2 12/2017 Vudali et al.
9,841,969 B2 12/2017 Seibert, Jr. et al.
9,842,042 B2 12/2017 Chhatwal et al.
9,842,349 B2 12/2017 Sawczuk et al.
9,848,005 B2 12/2017 Ardeli et al.
9,848,061 B1 12/2017 Jain et al.
9,852,150 B2 12/2017 Sharpe et al.
9,853,959 B1 12/2017 Kapczynski et al.
9,860,226 B2 1/2018 Thormaehlen
9,864,735 B1 1/2018 Lamprecht
9,876,825 B2 1/2018 Amar et al.
9,877,138 B1 1/2018 Franklin
9,880,157 B2 1/2018 Levak et al.
9,882,935 B2 1/2018 Barday
9,887,965 B2 2/2018 Kay et al.
9,888,377 B1 2/2018 McCorkendale et al.
9,892,441 B2 2/2018 Barday
9,892,442 B2 2/2018 Barday
9,892,443 B2 2/2018 Barday
9,892,444 B2 2/2018 Barday
9,894,076 B2 2/2018 Li et al.
9,898,613 B1 2/2018 Swerdlow et al.
9,898,739 B2 2/2018 Monastyrsky et al.
9,898,769 B2 2/2018 Barday
9,912,625 B2 3/2018 Mutha et al.
9,912,677 B2 3/2018 Chien
9,912,810 B2 3/2018 Segre et al.
9,916,703 B2 3/2018 Levinson et al.
9,922,124 B2 3/2018 Rathod
9,923,927 B1 3/2018 McClintock et al.
9,928,379 B1 3/2018 Hoffer
9,934,406 B2 4/2018 Khan et al.
9,934,493 B2 4/2018 Castinado et al.
9,934,544 B1 4/2018 Whitfield et al.
9,936,127 B2 4/2018 Todasco
9,942,214 B1 4/2018 Burciu et al.
9,942,244 B2 4/2018 Lahoz et al.
9,942,276 B2 4/2018 Sartor
9,946,897 B2 4/2018 Lovin
9,948,652 B2 4/2018 Yu et al.
9,948,663 B1 4/2018 Wang et al.
9,953,189 B2 4/2018 Cook et al.
9,954,879 B1 4/2018 Sadaghiani et al.
9,954,883 B2 4/2018 Ahuja et al.
9,959,551 B1 5/2018 Schermerhorn et al.
9,959,582 B2 5/2018 Sukman et al.
9,961,070 B2 5/2018 Tang
9,973,518 B2 5/2018 Lee et al.
9,973,585 B2 5/2018 Ruback et al.
9,977,904 B2 5/2018 Khan et al.
9,977,920 B2 5/2018 Danielson et al.
9,983,936 B2 5/2018 Dornemann et al.
9,984,252 B2 5/2018 Pollard
9,990,499 B2 6/2018 Chan et al.
9,992,213 B2 6/2018 Sinnema
10,001,975 B2 6/2018 Bharthulwar
10,002,064 B2 6/2018 Muske
10,007,895 B2 6/2018 Vanasco
10,013,577 B1 7/2018 Beaumont et al.
10,015,164 B2 7/2018 Hamburg et al.
10,019,339 B2 7/2018 Von Hanxleden et al.
10,019,588 B2 7/2018 Garcia et al.
10,019,591 B1 7/2018 Beguin
10,019,741 B2 7/2018 Hesselink
10,021,143 B2 7/2018 Cabrera et al.
10,025,804 B2 7/2018 Vranyes et al.
10,025,836 B2 7/2018 Batchu et al.
10,028,226 B2 7/2018 Ayyagari et al.
10,032,172 B2 7/2018 Barday
10,044,761 B2 8/2018 Ducatel et al.
10,055,426 B2 8/2018 Arasan et al.
10,055,869 B2 8/2018 Borrelli et al.
10,061,847 B2 8/2018 Mohammed et al.
10,069,858 B2 9/2018 Robinson et al.
10,069,914 B1 9/2018 Smith
10,073,924 B2 9/2018 Karp et al.
10,075,437 B1 9/2018 Costigan et al.
10,075,451 B1 9/2018 Hall et al.
10,084,817 B2 9/2018 Saher et al.
10,091,214 B2 10/2018 Godlewski et al.
10,091,312 B1 10/2018 Khanwalkar et al.
10,097,551 B2 10/2018 Chan et al.
10,102,533 B2 10/2018 Barday
10,108,409 B2 10/2018 Pirzadeh et al.
10,122,663 B2 11/2018 Hu et al.
10,122,760 B2 11/2018 Terrill et al.
10,127,403 B2 11/2018 Kong et al.
10,129,211 B2 11/2018 Heath
10,140,666 B1 11/2018 Wang et al.
10,142,113 B2 11/2018 Zaidi et al.
10,152,560 B2 12/2018 Potiagalov et al.
10,158,676 B2 12/2018 Barday
10,165,011 B2 12/2018 Barday
10,169,762 B2 1/2019 Ogawa
10,176,503 B2 1/2019 Barday et al.
10,181,043 B1 1/2019 Pauley, Jr. et al.
10,181,051 B2 1/2019 Barday et al.
10,187,363 B2 1/2019 Smirnoff et al.
10,187,394 B2 1/2019 Bar et al.
10,188,950 B2 1/2019 Biswas et al.
10,204,154 B2 2/2019 Barday et al.
10,205,994 B2 2/2019 Splaine et al.
10,212,134 B2 2/2019 Rai
10,212,175 B2 2/2019 Seul et al.
10,223,533 B2 3/2019 Dawson
10,230,571 B2 3/2019 Rangasamy et al.
10,230,711 B2 3/2019 Kohli
10,242,228 B2 3/2019 Barday et al.
10,250,594 B2 4/2019 Chathoth et al.
10,255,602 B2 4/2019 Wang
10,257,127 B2 4/2019 Dotan-Cohen et al.
10,257,181 B1 4/2019 Sherif et al.
10,268,838 B2 4/2019 Yadgiri et al.
10,275,221 B2 4/2019 Thattai et al.
10,275,614 B2 4/2019 Barday et al.
10,282,370 B1 5/2019 Barday et al.
10,282,559 B2 5/2019 Barday et al.
10,284,604 B2 5/2019 Barday et al.
10,289,584 B2 5/2019 Chiba
10,289,857 B1 5/2019 Brinskelle
10,289,866 B2 5/2019 Barday et al.
10,289,867 B2 5/2019 Barday et al.
10,289,870 B2 5/2019 Barday et al.
10,291,731 B2 5/2019 Huang
10,296,504 B2 5/2019 Hock et al.
10,304,442 B1 5/2019 Rudden et al.
10,310,723 B2 6/2019 Rathod
10,311,042 B1 6/2019 Kumar
10,311,249 B2 6/2019 Sharifi et al.
10,311,475 B2 6/2019 Yuasa
10,311,492 B2 6/2019 Gelfenbeyn et al.
10,318,761 B2 6/2019 Barday et al.
10,320,940 B1 6/2019 Brennan et al.
10,324,960 B1 6/2019 Skvortsov et al.
10,326,768 B2 6/2019 Verweyst et al.
10,326,798 B2 6/2019 Lambert
10,326,841 B2 6/2019 Bradley et al.
10,327,100 B1 6/2019 Davis et al.
10,331,689 B2 6/2019 Sorrentino et al.
10,331,904 B2 6/2019 Sher-Jan et al.
10,333,975 B2 6/2019 Soman et al.
10,339,470 B1 7/2019 Dutta et al.
10,346,186 B2 7/2019 Kalyanpur
10,346,635 B2 7/2019 Kumar et al.
10,346,637 B2 7/2019 Barday et al.
10,346,638 B2 7/2019 Barday et al.
10,346,849 B2 7/2019 Ionescu et al.
10,348,726 B2 7/2019 Caluwaert
10,348,775 B2 7/2019 Barday
10,353,673 B2 7/2019 Barday et al.
10,361,857 B2 7/2019 Woo
10,366,241 B2 7/2019 Sartor
10,373,119 B2 8/2019 Driscoll et al.
10,373,409 B2 8/2019 White et al.

(56) References Cited

U.S. PATENT DOCUMENTS

| | | | |
|---|---|---|---|
| 10,375,115 | B2 | 8/2019 | Mallya |
| 10,387,559 | B1 | 8/2019 | Wendt et al. |
| 10,387,577 | B2 | 8/2019 | Hill et al. |
| 10,387,657 | B2 | 8/2019 | Belfiore, Jr. et al. |
| 10,387,952 | B1 | 8/2019 | Sandhu et al. |
| 10,395,201 | B2 | 8/2019 | Vescio |
| 10,402,545 | B2 | 9/2019 | Gorfein et al. |
| 10,404,729 | B2 | 9/2019 | Turgeman |
| 10,417,401 | B2 | 9/2019 | Votaw et al. |
| 10,417,445 | B2 | 9/2019 | Wouhaybi et al. |
| 10,417,621 | B2 | 9/2019 | Cassel et al. |
| 10,419,476 | B2 | 9/2019 | Parekh |
| 10,423,985 | B1 | 9/2019 | Dutta et al. |
| 10,425,492 | B2 | 9/2019 | Comstock |
| 10,430,608 | B2 | 10/2019 | Peri et al. |
| 10,435,350 | B2 | 10/2019 | Ito et al. |
| 10,437,412 | B2 | 10/2019 | Barday et al. |
| 10,437,860 | B2 | 10/2019 | Barday et al. |
| 10,438,016 | B2 | 10/2019 | Barday et al. |
| 10,438,273 | B2 | 10/2019 | Burns et al. |
| 10,440,062 | B2 | 10/2019 | Barday et al. |
| 10,445,508 | B2 | 10/2019 | Sher-Jan et al. |
| 10,445,526 | B2 | 10/2019 | Barday et al. |
| 10,452,864 | B2 | 10/2019 | Barday et al. |
| 10,452,866 | B2 | 10/2019 | Barday et al. |
| 10,453,076 | B2 | 10/2019 | Parekh et al. |
| 10,453,092 | B1 | 10/2019 | Wang et al. |
| 10,454,934 | B2 | 10/2019 | Parimi et al. |
| 10,460,322 | B2 | 10/2019 | Williamson et al. |
| 10,481,763 | B2 | 11/2019 | Bartkiewicz et al. |
| 10,489,454 | B1 | 11/2019 | Chen |
| 10,503,926 | B2 | 12/2019 | Barday et al. |
| 10,509,644 | B2 | 12/2019 | Shoavi et al. |
| 10,510,031 | B2 | 12/2019 | Barday et al. |
| 10,521,623 | B2 | 12/2019 | Rodriguez et al. |
| 10,534,851 | B1 | 1/2020 | Chan et al. |
| 10,535,081 | B2 | 1/2020 | Ferreira et al. |
| 10,536,475 | B1 | 1/2020 | McCorkle, Jr. et al. |
| 10,536,478 | B2 | 1/2020 | Kirti et al. |
| 10,540,212 | B2 | 1/2020 | Feng et al. |
| 10,541,938 | B1 | 1/2020 | Timmerman et al. |
| 10,546,135 | B1 | 1/2020 | Kassoumeh et al. |
| 10,552,462 | B1 | 2/2020 | Hart |
| 10,558,809 | B1 | 2/2020 | Joyce et al. |
| 10,558,821 | B2 | 2/2020 | Barday et al. |
| 10,564,815 | B2 | 2/2020 | Soon-Shiong |
| 10,564,935 | B2 | 2/2020 | Barday et al. |
| 10,564,936 | B2 | 2/2020 | Barday et al. |
| 10,565,161 | B2 | 2/2020 | Barday et al. |
| 10,565,236 | B1 | 2/2020 | Barday et al. |
| 10,567,439 | B2 | 2/2020 | Barday |
| 10,567,517 | B2 | 2/2020 | Weinig et al. |
| 10,572,684 | B2 | 2/2020 | Lafever et al. |
| 10,572,686 | B2 | 2/2020 | Barday et al. |
| 10,574,705 | B2 | 2/2020 | Barday et al. |
| 10,581,825 | B2 | 3/2020 | Poschel et al. |
| 10,592,648 | B2 | 3/2020 | Barday et al. |
| 10,592,692 | B2 | 3/2020 | Brannon et al. |
| 10,599,456 | B2 | 3/2020 | Lissack |
| 10,606,916 | B2 | 3/2020 | Brannon et al. |
| 10,613,971 | B1 | 4/2020 | Vasikarla |
| 10,614,365 | B2 | 4/2020 | Sathish et al. |
| 10,628,553 | B1 | 4/2020 | Murrish et al. |
| 10,645,102 | B2 | 5/2020 | Hamdi |
| 10,645,548 | B2 | 5/2020 | Reynolds et al. |
| 10,649,630 | B1 | 5/2020 | Vora et al. |
| 10,650,408 | B1 | 5/2020 | Andersen et al. |
| 10,657,469 | B2 | 5/2020 | Bade et al. |
| 10,657,504 | B1 | 5/2020 | Zimmerman et al. |
| 10,659,566 | B1 | 5/2020 | Luah et al. |
| 10,671,749 | B2 | 6/2020 | Felice-Steele et al. |
| 10,671,760 | B2 | 6/2020 | Esmailzadeh et al. |
| 10,678,945 | B2 | 6/2020 | Barday et al. |
| 10,685,140 | B2 | 6/2020 | Barday et al. |
| 10,706,176 | B2 | 7/2020 | Brannon et al. |
| 10,706,226 | B2 | 7/2020 | Byun et al. |
| 10,708,305 | B2 | 7/2020 | Barday et al. |
| 10,713,387 | B2 | 7/2020 | Brannon et al. |
| 10,726,145 | B2 | 7/2020 | Duminy et al. |
| 10,726,153 | B2 | 7/2020 | Nerurkar et al. |
| 10,726,158 | B2 | 7/2020 | Brannon et al. |
| 10,732,865 | B2 | 8/2020 | Jain et al. |
| 10,735,388 | B2 | 8/2020 | Rose et al. |
| 10,740,487 | B2 | 8/2020 | Barday et al. |
| 10,747,893 | B2 | 8/2020 | Kiriyama et al. |
| 10,747,897 | B2 | 8/2020 | Cook |
| 10,749,870 | B2 | 8/2020 | Brouillette et al. |
| 10,762,213 | B2 | 9/2020 | Rudek et al. |
| 10,762,230 | B2 | 9/2020 | Ancin et al. |
| 10,762,236 | B2 | 9/2020 | Brannon et al. |
| 10,769,302 | B2 | 9/2020 | Barday et al. |
| 10,769,303 | B2 | 9/2020 | Brannon et al. |
| 10,776,510 | B2 | 9/2020 | Antonelli et al. |
| 10,776,518 | B2 | 9/2020 | Barday et al. |
| 10,778,792 | B1 | 9/2020 | Handy Bosma et al. |
| 10,783,256 | B2 | 9/2020 | Brannon et al. |
| 10,785,173 | B2 | 9/2020 | Willett et al. |
| 10,785,299 | B2 | 9/2020 | Gupta et al. |
| 10,789,594 | B2 | 9/2020 | Moshir et al. |
| 10,791,150 | B2 | 9/2020 | Barday et al. |
| 10,795,527 | B1 | 10/2020 | Legge et al. |
| 10,796,020 | B2 | 10/2020 | Barday et al. |
| 10,796,260 | B2 | 10/2020 | Brannon et al. |
| 10,798,133 | B2 | 10/2020 | Barday et al. |
| 10,803,196 | B2 | 10/2020 | Bodegas Martinez et al. |
| 10,805,331 | B2 | 10/2020 | Boyer et al. |
| 10,831,831 | B2 | 11/2020 | Greene |
| 10,834,590 | B2 | 11/2020 | Turgeman et al. |
| 10,839,100 | B2 | 11/2020 | Hollinger et al. |
| 10,846,433 | B2 | 11/2020 | Brannon et al. |
| 10,853,356 | B1 | 12/2020 | McPherson et al. |
| 10,853,501 | B2 | 12/2020 | Brannon |
| 10,860,721 | B1 | 12/2020 | Gentile |
| 10,860,742 | B2 | 12/2020 | Joseph et al. |
| 10,860,979 | B2 | 12/2020 | Geffen et al. |
| 10,878,127 | B2 | 12/2020 | Brannon et al. |
| 10,885,485 | B2 | 1/2021 | Brannon et al. |
| 10,891,393 | B2 | 1/2021 | Currier et al. |
| 10,893,074 | B2 | 1/2021 | Sartor |
| 10,896,394 | B2 | 1/2021 | Brannon et al. |
| 10,902,490 | B2 | 1/2021 | He et al. |
| 10,909,488 | B2 | 2/2021 | Hecht et al. |
| 10,924,514 | B1 | 2/2021 | Altman et al. |
| 10,929,557 | B2 | 2/2021 | Chavez |
| 10,949,555 | B2 | 3/2021 | Rattan et al. |
| 10,949,565 | B2 | 3/2021 | Barday et al. |
| 10,956,213 | B1 | 3/2021 | Chambers et al. |
| 10,957,326 | B2 | 3/2021 | Bhaya et al. |
| 10,963,571 | B2 | 3/2021 | Bar Joseph et al. |
| 10,963,572 | B2 | 3/2021 | Belfiore, Jr. et al. |
| 10,965,547 | B1 | 3/2021 | Esposito et al. |
| 10,970,418 | B2 | 4/2021 | Durvasula et al. |
| 10,972,509 | B2 | 4/2021 | Barday et al. |
| 10,976,950 | B1 | 4/2021 | Trezzo et al. |
| 10,983,963 | B1 | 4/2021 | Venkatasubramanian et al. |
| 10,984,458 | B1 | 4/2021 | Gutierrez |
| 10,997,318 | B2 | 5/2021 | Barday et al. |
| 11,003,748 | B2 | 5/2021 | Oliker et al. |
| 11,012,475 | B2 | 5/2021 | Patnala et al. |
| 11,019,062 | B2 | 5/2021 | Chittampally |
| 11,023,528 | B1 | 6/2021 | Lee et al. |
| 11,023,921 | B2 | 6/2021 | Wang et al. |
| 11,037,168 | B1 | 6/2021 | Lee et al. |
| 11,057,356 | B2 | 7/2021 | Malhotra et al. |
| 11,057,427 | B2 | 7/2021 | Wright et al. |
| 11,062,051 | B2 | 7/2021 | Barday et al. |
| 11,068,318 | B2 | 7/2021 | Kuesel et al. |
| 11,068,584 | B2 | 7/2021 | Burriesci et al. |
| 11,068,618 | B2 | 7/2021 | Brannon et al. |
| 11,068,797 | B2 | 7/2021 | Bhide et al. |
| 11,068,847 | B2 | 7/2021 | Boutros et al. |
| 11,093,643 | B2 | 8/2021 | Hennebert |
| 11,093,950 | B2 | 8/2021 | Hersh et al. |
| 11,138,299 | B2 | 10/2021 | Brannon et al. |

(56) References Cited

U.S. PATENT DOCUMENTS

| | | | |
|---|---|---|---|
| 11,144,622 | B2 | 10/2021 | Brannon et al. |
| 11,144,678 | B2 | 10/2021 | Dondini et al. |
| 11,144,862 | B1 | 10/2021 | Jackson et al. |
| 11,195,134 | B2 | 12/2021 | Brannon et al. |
| 11,201,929 | B2 | 12/2021 | Dudmesh et al. |
| 11,210,420 | B2 | 12/2021 | Brannon et al. |
| 11,222,139 | B2 | 1/2022 | Jones et al. |
| 11,238,390 | B2 | 2/2022 | Brannon et al. |
| 11,240,273 | B2 | 2/2022 | Barday et al. |
| 11,245,951 | B2 | 2/2022 | Lim et al. |
| 11,246,520 | B2 | 2/2022 | Clifford et al. |
| 11,252,159 | B2 | 2/2022 | Kannan et al. |
| 11,256,777 | B2 | 2/2022 | Brannon et al. |
| 11,263,262 | B2 | 3/2022 | Chen |
| 11,327,996 | B2 | 5/2022 | Reynolds et al. |
| 11,443,062 | B2 | 9/2022 | Latka et al. |
| 2002/0004736 | A1 | 1/2002 | Roundtree et al. |
| 2002/0049907 | A1 | 4/2002 | Woods et al. |
| 2002/0055932 | A1 | 5/2002 | Wheeler et al. |
| 2002/0077941 | A1 | 6/2002 | Halligan et al. |
| 2002/0103854 | A1 | 8/2002 | Okita |
| 2002/0129216 | A1 | 9/2002 | Collins |
| 2002/0161594 | A1 | 10/2002 | Bryan et al. |
| 2002/0161733 | A1 | 10/2002 | Grainger |
| 2003/0041250 | A1 | 2/2003 | Proudler |
| 2003/0065641 | A1 | 4/2003 | Chaloux |
| 2003/0093680 | A1 | 5/2003 | Astley et al. |
| 2003/0097451 | A1 | 5/2003 | Bjorksten et al. |
| 2003/0097661 | A1 | 5/2003 | Li et al. |
| 2003/0115142 | A1 | 6/2003 | Brickell et al. |
| 2003/0130893 | A1 | 7/2003 | Farmer |
| 2003/0131001 | A1 | 7/2003 | Matsuo |
| 2003/0131093 | A1 | 7/2003 | Aschen et al. |
| 2003/0140150 | A1 | 7/2003 | Kemp et al. |
| 2003/0167216 | A1 | 9/2003 | Brown et al. |
| 2003/0212604 | A1 | 11/2003 | Cullen |
| 2004/0002818 | A1 | 1/2004 | Kulp et al. |
| 2004/0025053 | A1 | 2/2004 | Hayward |
| 2004/0088235 | A1 | 5/2004 | Ziekle et al. |
| 2004/0098366 | A1 | 5/2004 | Sinclair et al. |
| 2004/0098493 | A1 | 5/2004 | Rees |
| 2004/0111359 | A1 | 6/2004 | Hudock |
| 2004/0128508 | A1 | 7/2004 | Wheeler et al. |
| 2004/0186912 | A1 | 9/2004 | Harlow et al. |
| 2004/0193907 | A1 | 9/2004 | Patanella |
| 2005/0022198 | A1 | 1/2005 | Olapurath et al. |
| 2005/0033616 | A1 | 2/2005 | Vavul et al. |
| 2005/0076294 | A1 | 4/2005 | Dehamer et al. |
| 2005/0114343 | A1 | 5/2005 | Wesinger et al. |
| 2005/0144066 | A1 | 6/2005 | Cope et al. |
| 2005/0197884 | A1 | 9/2005 | Mullen |
| 2005/0198177 | A1 | 9/2005 | Black |
| 2005/0198646 | A1 | 9/2005 | Kortela |
| 2005/0246292 | A1 | 11/2005 | Sarcanin |
| 2005/0278538 | A1 | 12/2005 | Fowler |
| 2006/0031078 | A1 | 2/2006 | Pizzinger et al. |
| 2006/0035204 | A1 | 2/2006 | Lamarche et al. |
| 2006/0041507 | A1 | 2/2006 | Novack et al. |
| 2006/0075122 | A1 | 4/2006 | Lindskog et al. |
| 2006/0149730 | A1 | 7/2006 | Curtis |
| 2006/0156052 | A1 | 7/2006 | Bodnar et al. |
| 2006/0190280 | A1 | 8/2006 | Hoebel et al. |
| 2006/0206375 | A1 | 9/2006 | Scott et al. |
| 2006/0224422 | A1 | 10/2006 | Cohen |
| 2006/0253597 | A1 | 11/2006 | Mujica |
| 2006/0259416 | A1 | 11/2006 | Johnson |
| 2007/0011058 | A1 | 1/2007 | Dev |
| 2007/0027715 | A1 | 2/2007 | Gropper et al. |
| 2007/0061125 | A1 | 3/2007 | Bhatt et al. |
| 2007/0061393 | A1 | 3/2007 | Moore |
| 2007/0130101 | A1 | 6/2007 | Anderson et al. |
| 2007/0130323 | A1 | 6/2007 | Landsman et al. |
| 2007/0157311 | A1 | 7/2007 | Meier et al. |
| 2007/0173355 | A1 | 7/2007 | Klein |
| 2007/0179793 | A1 | 8/2007 | Bagchi et al. |
| 2007/0180490 | A1 | 8/2007 | Renzi et al. |
| 2007/0192438 | A1 | 8/2007 | Goei |
| 2007/0266420 | A1 | 11/2007 | Hawkins et al. |
| 2007/0283171 | A1 | 12/2007 | Breslin et al. |
| 2008/0005194 | A1 | 1/2008 | Smolen et al. |
| 2008/0015927 | A1 | 1/2008 | Ramirez |
| 2008/0028065 | A1 | 1/2008 | Caso et al. |
| 2008/0028435 | A1 | 1/2008 | Strickland et al. |
| 2008/0047016 | A1 | 2/2008 | Spoonamore |
| 2008/0120699 | A1 | 5/2008 | Spear |
| 2008/0140696 | A1 | 6/2008 | Mathuria |
| 2008/0189306 | A1 | 8/2008 | Hewett et al. |
| 2008/0195436 | A1 | 8/2008 | Whyte |
| 2008/0222271 | A1 | 9/2008 | Spires |
| 2008/0235177 | A1 | 9/2008 | Kim et al. |
| 2008/0270203 | A1 | 10/2008 | Holmes et al. |
| 2008/0270351 | A1 | 10/2008 | Thomsen |
| 2008/0270381 | A1 | 10/2008 | Thomsen |
| 2008/0270382 | A1 | 10/2008 | Thomsen et al. |
| 2008/0270451 | A1 | 10/2008 | Thomsen et al. |
| 2008/0270462 | A1 | 10/2008 | Thomsen |
| 2008/0281649 | A1 | 11/2008 | Morris |
| 2008/0282320 | A1 | 11/2008 | Denovo et al. |
| 2008/0288271 | A1 | 11/2008 | Faust |
| 2008/0288299 | A1 | 11/2008 | Schultz |
| 2009/0012896 | A1 | 1/2009 | Arnold |
| 2009/0022301 | A1 | 1/2009 | Mudaliar |
| 2009/0037975 | A1 | 2/2009 | Ishikawa et al. |
| 2009/0119500 | A1 | 5/2009 | Roth et al. |
| 2009/0132419 | A1 | 5/2009 | Grammer et al. |
| 2009/0138276 | A1 | 5/2009 | Hayashida et al. |
| 2009/0140035 | A1 | 6/2009 | Miller |
| 2009/0144702 | A1 | 6/2009 | Atkin et al. |
| 2009/0158249 | A1 | 6/2009 | Tomkins et al. |
| 2009/0172705 | A1 | 7/2009 | Cheong |
| 2009/0182818 | A1 | 7/2009 | Krywaniuk |
| 2009/0187764 | A1 | 7/2009 | Astakhov et al. |
| 2009/0204452 | A1 | 8/2009 | Iskandar et al. |
| 2009/0204820 | A1 | 8/2009 | Brandenburg et al. |
| 2009/0210347 | A1 | 8/2009 | Sarcanin |
| 2009/0216610 | A1 | 8/2009 | Chorny |
| 2009/0249076 | A1 | 10/2009 | Reed et al. |
| 2009/0303237 | A1 | 12/2009 | Liu et al. |
| 2010/0010912 | A1 | 1/2010 | Jones et al. |
| 2010/0010968 | A1 | 1/2010 | Redlich et al. |
| 2010/0077484 | A1 | 3/2010 | Paretti et al. |
| 2010/0082533 | A1 | 4/2010 | Nakamura et al. |
| 2010/0094650 | A1 | 4/2010 | Tran et al. |
| 2010/0100398 | A1 | 4/2010 | Auker et al. |
| 2010/0121773 | A1 | 5/2010 | Currier et al. |
| 2010/0192201 | A1 | 7/2010 | Shimoni et al. |
| 2010/0205057 | A1 | 8/2010 | Hook et al. |
| 2010/0223349 | A1 | 9/2010 | Thorson |
| 2010/0228786 | A1 | 9/2010 | Török |
| 2010/0234987 | A1 | 9/2010 | Benschop et al. |
| 2010/0235297 | A1 | 9/2010 | Mamorsky |
| 2010/0235915 | A1 | 9/2010 | Memon et al. |
| 2010/0262624 | A1 | 10/2010 | Pullikottil |
| 2010/0268628 | A1 | 10/2010 | Pitkow et al. |
| 2010/0268932 | A1 | 10/2010 | Bhattacharjee |
| 2010/0281313 | A1 | 11/2010 | White et al. |
| 2010/0287114 | A1 | 11/2010 | Bartko et al. |
| 2010/0333012 | A1 | 12/2010 | Adachi et al. |
| 2011/0006996 | A1 | 1/2011 | Smith et al. |
| 2011/0010202 | A1 | 1/2011 | Neale |
| 2011/0082794 | A1 | 4/2011 | Blechman |
| 2011/0137696 | A1 | 6/2011 | Meyer et al. |
| 2011/0145154 | A1 | 6/2011 | Rivers et al. |
| 2011/0153396 | A1 | 6/2011 | Marcuvitz et al. |
| 2011/0191664 | A1 | 8/2011 | Sheleheda et al. |
| 2011/0208850 | A1 | 8/2011 | Sheleheda et al. |
| 2011/0209067 | A1 | 8/2011 | Bogess et al. |
| 2011/0231896 | A1 | 9/2011 | Tovar |
| 2011/0238573 | A1 | 9/2011 | Varadarajan |
| 2011/0252456 | A1 | 10/2011 | Hatakeyama |
| 2011/0302643 | A1 | 12/2011 | Pichna et al. |
| 2012/0041939 | A1 | 2/2012 | Amsterdamski |
| 2012/0084151 | A1 | 4/2012 | Kozak et al. |
| 2012/0084349 | A1 | 4/2012 | Lee et al. |

(56) References Cited

U.S. PATENT DOCUMENTS

2012/0102411 A1 4/2012 Sathish
2012/0102543 A1 4/2012 Kohli et al.
2012/0109830 A1 5/2012 Vogel
2012/0110674 A1 5/2012 Belani et al.
2012/0116923 A1 5/2012 Irving et al.
2012/0131438 A1 5/2012 Li et al.
2012/0143650 A1 6/2012 Crowley et al.
2012/0144499 A1 6/2012 Tan et al.
2012/0191596 A1 7/2012 Kremen et al.
2012/0226621 A1 9/2012 Petran et al.
2012/0239557 A1 9/2012 Weinflash et al.
2012/0254320 A1 10/2012 Dove et al.
2012/0259752 A1 10/2012 Agee
2012/0323700 A1 12/2012 Aleksandrovich et al.
2012/0330769 A1 12/2012 Arceo
2012/0330869 A1 12/2012 Durham
2013/0004933 A1 1/2013 Bhaskaran
2013/0018954 A1 1/2013 Cheng
2013/0085801 A1 4/2013 Sharpe et al.
2013/0091156 A1 4/2013 Raiche et al.
2013/0103485 A1 4/2013 Postrel
2013/0111323 A1 5/2013 Taghaddos et al.
2013/0124257 A1 5/2013 Schubert
2013/0159351 A1 6/2013 Hamann et al.
2013/0171968 A1 7/2013 Wang
2013/0179982 A1 7/2013 Bridges et al.
2013/0179988 A1 7/2013 Bekker et al.
2013/0185806 A1 7/2013 Hatakeyama
2013/0211872 A1 8/2013 Cherry et al.
2013/0218829 A1 8/2013 Martinez
2013/0219459 A1 8/2013 Bradley
2013/0254139 A1 9/2013 Lei
2013/0254649 A1 9/2013 ONeill
2013/0254699 A1 9/2013 Bashir et al.
2013/0262328 A1 10/2013 Federgreen
2013/0282438 A1 10/2013 Hunter et al.
2013/0282466 A1 10/2013 Hampton
2013/0290169 A1 10/2013 Bathula et al.
2013/0298071 A1 11/2013 Wine
2013/0311224 A1 11/2013 Heroux et al.
2013/0318207 A1 11/2013 Dotter
2013/0326112 A1 12/2013 Park et al.
2013/0332362 A1 12/2013 Ciurea
2013/0340086 A1 12/2013 Blom
2014/0006355 A1 1/2014 Kirihata
2014/0006616 A1 1/2014 Aad et al.
2014/0012833 A1 1/2014 Humprecht
2014/0019561 A1 1/2014 Belity et al.
2014/0032259 A1 1/2014 Lafever et al.
2014/0032265 A1 1/2014 Paprocki
2014/0040134 A1 2/2014 Ciurea
2014/0040161 A1 2/2014 Berlin
2014/0040979 A1 2/2014 Barton et al.
2014/0041048 A1 2/2014 Goodwin et al.
2014/0047551 A1 2/2014 Nagasundaram et al.
2014/0052463 A1 2/2014 Cashman et al.
2014/0067973 A1 3/2014 Eden
2014/0074550 A1 3/2014 Chourey
2014/0074645 A1 3/2014 Ingram
2014/0075493 A1 3/2014 Krishnan et al.
2014/0089027 A1 3/2014 Brown
2014/0089039 A1 3/2014 McClellan
2014/0108173 A1 4/2014 Cooper et al.
2014/0108968 A1 4/2014 Vishria
2014/0137257 A1 5/2014 Martinez et al.
2014/0142988 A1 5/2014 Grosso et al.
2014/0143011 A1 5/2014 Mudugu et al.
2014/0143844 A1 5/2014 Goertzen
2014/0164476 A1 6/2014 Thomson
2014/0188956 A1 7/2014 Subba et al.
2014/0196143 A1 7/2014 Fliderman et al.
2014/0208418 A1 7/2014 Libin
2014/0222468 A1 8/2014 Araya et al.
2014/0244309 A1 8/2014 Francois
2014/0244325 A1 8/2014 Cartwright
2014/0244375 A1 8/2014 Kim
2014/0244399 A1 8/2014 Orduna et al.
2014/0257917 A1 9/2014 Spencer et al.
2014/0258093 A1 9/2014 Gardiner et al.
2014/0278539 A1 9/2014 Edwards
2014/0278663 A1 9/2014 Samuel et al.
2014/0278730 A1 9/2014 Muhart et al.
2014/0278802 A1 9/2014 MacPherson
2014/0283027 A1 9/2014 Orona et al.
2014/0283106 A1 9/2014 Stahura et al.
2014/0288971 A1 9/2014 Whibbs, III
2014/0289681 A1 9/2014 Wielgosz
2014/0289862 A1 9/2014 Gorfein et al.
2014/0317171 A1 10/2014 Fox et al.
2014/0324480 A1 10/2014 Dufel et al.
2014/0337041 A1 11/2014 Madden et al.
2014/0337466 A1 11/2014 Li et al.
2014/0344015 A1 11/2014 Puértolas-Montañés et al.
2015/0006514 A1 1/2015 Hung
2015/0012363 A1 1/2015 Grant et al.
2015/0019530 A1 1/2015 Felch
2015/0026056 A1 1/2015 Calman et al.
2015/0026260 A1 1/2015 Worthley
2015/0033112 A1 1/2015 Norwood et al.
2015/0066577 A1 3/2015 Christiansen et al.
2015/0066865 A1 3/2015 Yara et al.
2015/0088598 A1 3/2015 Acharyya et al.
2015/0088635 A1 3/2015 Maycotte et al.
2015/0089585 A1 3/2015 Novack
2015/0106260 A1 4/2015 Andrews et al.
2015/0106264 A1 4/2015 Johnson
2015/0106867 A1 4/2015 Liang
2015/0106948 A1 4/2015 Holman et al.
2015/0106949 A1 4/2015 Holman et al.
2015/0121462 A1 4/2015 Courage et al.
2015/0143258 A1 5/2015 Carolan et al.
2015/0149362 A1 5/2015 Baum et al.
2015/0154520 A1 6/2015 Federgreen et al.
2015/0169318 A1 6/2015 Nash
2015/0172296 A1 6/2015 Fujioka
2015/0178740 A1 6/2015 Borawski et al.
2015/0199534 A1 7/2015 Francis et al.
2015/0199541 A1 7/2015 Koch et al.
2015/0199702 A1 7/2015 Singh
2015/0229664 A1 8/2015 Hawthorn et al.
2015/0235049 A1 8/2015 Cohen et al.
2015/0235050 A1 8/2015 Wouhaybi et al.
2015/0235283 A1 8/2015 Nishikawa
2015/0242638 A1 8/2015 Bitran et al.
2015/0242778 A1 8/2015 Wilcox et al.
2015/0242858 A1 8/2015 Smith et al.
2015/0248391 A1 9/2015 Watanabe
2015/0254597 A1 9/2015 Jahagirdar
2015/0261887 A1 9/2015 Joukov
2015/0262189 A1 9/2015 Vergeer
2015/0264417 A1 9/2015 Spitz et al.
2015/0269384 A1 9/2015 Holman et al.
2015/0271167 A1 9/2015 Kalai
2015/0288715 A1 10/2015 Hotchkiss
2015/0309813 A1 10/2015 Patel
2015/0310227 A1 10/2015 Ishida et al.
2015/0310575 A1 10/2015 Shelton
2015/0347421 A1 12/2015 Steiner et al.
2015/0348200 A1 12/2015 Fair et al.
2015/0350186 A1* 12/2015 Chan .................. H04L 63/0815
726/9
2015/0356362 A1 12/2015 Demos
2015/0379430 A1 12/2015 Dirac et al.
2016/0006760 A1 1/2016 Lala et al.
2016/0012465 A1 1/2016 Sharp
2016/0026394 A1 1/2016 Goto
2016/0034918 A1 2/2016 Bjelajac et al.
2016/0048700 A1 2/2016 Stransky-Heilkron
2016/0050213 A1 2/2016 Storr
2016/0063523 A1 3/2016 Nistor et al.
2016/0063567 A1 3/2016 Srivastava
2016/0071112 A1 3/2016 Unser
2016/0080405 A1 3/2016 Schler et al.
2016/0087957 A1 3/2016 Shah et al.

(56) References Cited

U.S. PATENT DOCUMENTS

2016/0099963 A1 4/2016 Mahaffey et al.
2016/0103963 A1 4/2016 Mishra
2016/0104259 A1 4/2016 Menrad
2016/0125550 A1 5/2016 Joao et al.
2016/0125749 A1 5/2016 Delacroix et al.
2016/0125751 A1 5/2016 Barker et al.
2016/0140466 A1 5/2016 Sidebottom et al.
2016/0143570 A1 5/2016 Valacich et al.
2016/0148143 A1 5/2016 Anderson et al.
2016/0148259 A1 5/2016 Baek et al.
2016/0162269 A1 6/2016 Pogorelik et al.
2016/0164915 A1 6/2016 Cook
2016/0180386 A1 6/2016 Konig
2016/0188450 A1 6/2016 Appusamy et al.
2016/0189156 A1 6/2016 Kim et al.
2016/0196189 A1 7/2016 Miyagi et al.
2016/0225000 A1 8/2016 Glasgow
2016/0232465 A1 8/2016 Kurtz et al.
2016/0232534 A1 8/2016 Lacey et al.
2016/0234319 A1 8/2016 Griffin
2016/0253497 A1 9/2016 Christodorescu et al.
2016/0255139 A1 9/2016 Rathod
2016/0261631 A1 9/2016 Vissamsetty et al.
2016/0262163 A1 9/2016 Gonzalez Garrido et al.
2016/0292453 A1 10/2016 Patterson et al.
2016/0292621 A1 10/2016 Ciccone et al.
2016/0321582 A1 11/2016 Broudou et al.
2016/0321748 A1 11/2016 Mahatma et al.
2016/0330237 A1 11/2016 Edlabadkar
2016/0335531 A1 11/2016 Mullen et al.
2016/0342811 A1 11/2016 Whitcomb et al.
2016/0359861 A1* 12/2016 Manov .................. G06F 21/335
2016/0364736 A1 12/2016 Maugans, III
2016/0370954 A1 12/2016 Burningham et al.
2016/0378762 A1 12/2016 Rohter
2016/0381064 A1 12/2016 Chan et al.
2016/0381560 A1 12/2016 Margaliot
2017/0004055 A1 1/2017 Horan et al.
2017/0032395 A1 2/2017 Kaufman et al.
2017/0032408 A1 2/2017 Kumar et al.
2017/0034101 A1 2/2017 Kumar et al.
2017/0041324 A1 2/2017 Ionutescu et al.
2017/0046399 A1 2/2017 Sankaranarasimhan et al.
2017/0046753 A1 2/2017 Deupree, IV
2017/0061501 A1 3/2017 Horwich
2017/0068785 A1 3/2017 Experton et al.
2017/0070495 A1 3/2017 Cherry et al.
2017/0075513 A1 3/2017 Watson et al.
2017/0093917 A1 3/2017 Chandra et al.
2017/0115864 A1 4/2017 Thomas et al.
2017/0124570 A1 5/2017 Nidamanuri et al.
2017/0140174 A1 5/2017 Lacey et al.
2017/0140467 A1 5/2017 Neag et al.
2017/0142158 A1 5/2017 Laoutaris et al.
2017/0142177 A1 5/2017 Hu
2017/0154188 A1 6/2017 Meier et al.
2017/0161520 A1 6/2017 Lockhart, III et al.
2017/0171235 A1 6/2017 Mulchandani et al.
2017/0171325 A1 6/2017 Perez
2017/0177324 A1 6/2017 Frank et al.
2017/0180378 A1 6/2017 Tyler et al.
2017/0180505 A1 6/2017 Shaw et al.
2017/0193017 A1 7/2017 Migliori
2017/0193624 A1 7/2017 Tsai
2017/0201518 A1 7/2017 Holmqvist et al.
2017/0206707 A1 7/2017 Guay et al.
2017/0208084 A1 7/2017 Steelman et al.
2017/0213206 A1 7/2017 Shearer
2017/0220685 A1 8/2017 Yan et al.
2017/0220964 A1 8/2017 Datta Ray
2017/0228454 A1 8/2017 Bose et al.
2017/0249394 A1 8/2017 Loeb et al.
2017/0249710 A1 8/2017 Guillama et al.
2017/0269791 A1 9/2017 Meyerzon et al.
2017/0270318 A1 9/2017 Ritchie
2017/0278004 A1 9/2017 McElhinney et al.
2017/0278117 A1 9/2017 Wallace et al.
2017/0286719 A1 10/2017 Krishnamurthy et al.
2017/0287031 A1 10/2017 Barday
2017/0289199 A1 10/2017 Barday
2017/0308875 A1 10/2017 O'Regan et al.
2017/0316400 A1 11/2017 Venkatakrishnan et al.
2017/0330197 A1 11/2017 DiMaggio et al.
2017/0353404 A1 12/2017 Hodge
2018/0032757 A1 2/2018 Michael
2018/0039975 A1 2/2018 Hefetz
2018/0041498 A1 2/2018 Kikuchi
2018/0046753 A1 2/2018 Shelton
2018/0046939 A1 2/2018 Meron et al.
2018/0063174 A1 3/2018 Grill et al.
2018/0063190 A1 3/2018 Wright et al.
2018/0082024 A1 3/2018 Curbera et al.
2018/0082368 A1 3/2018 Weinflash et al.
2018/0083843 A1 3/2018 Sambandam
2018/0091476 A1 3/2018 Jakobsson et al.
2018/0131574 A1 5/2018 Jacobs et al.
2018/0131658 A1 5/2018 Bhagwan et al.
2018/0165637 A1 6/2018 Romero et al.
2018/0198614 A1 7/2018 Neumann
2018/0204281 A1 7/2018 Painter et al.
2018/0219917 A1 8/2018 Chiang
2018/0239500 A1 8/2018 Allen et al.
2018/0248914 A1 8/2018 Sartor
2018/0285887 A1 10/2018 Maung
2018/0301222 A1 10/2018 Dew, Sr. et al.
2018/0307859 A1 10/2018 Lafever et al.
2018/0336509 A1 11/2018 Guttmann
2018/0343215 A1 11/2018 Ganapathi et al.
2018/0349583 A1 12/2018 Turgeman et al.
2018/0351888 A1 12/2018 Howard
2018/0352003 A1 12/2018 Winn et al.
2018/0357243 A1 12/2018 Yoon
2018/0365720 A1 12/2018 Goldman et al.
2018/0374030 A1 12/2018 Barday et al.
2018/0375814 A1 12/2018 Hart
2019/0005210 A1 1/2019 Wiederspohn et al.
2019/0012211 A1 1/2019 Selvaraj
2019/0012672 A1 1/2019 Francesco
2019/0019184 A1 1/2019 Lacey et al.
2019/0050547 A1 2/2019 Welsh et al.
2019/0087570 A1 3/2019 Sloane
2019/0096020 A1 3/2019 Barday et al.
2019/0108353 A1 4/2019 Sadeh et al.
2019/0130132 A1 5/2019 Barbas et al.
2019/0132350 A1 5/2019 Smith et al.
2019/0138496 A1 5/2019 Yamaguchi
2019/0139087 A1 5/2019 Dabbs et al.
2019/0148003 A1 5/2019 Van Hoe
2019/0156053 A1 5/2019 Vogel et al.
2019/0156058 A1 5/2019 Van Dyne et al.
2019/0171801 A1 6/2019 Barday et al.
2019/0179652 A1 6/2019 Hesener et al.
2019/0180051 A1 6/2019 Barday et al.
2019/0182294 A1 6/2019 Rieke et al.
2019/0188402 A1 6/2019 Wang et al.
2019/0266200 A1 8/2019 Francolla
2019/0266201 A1 8/2019 Barday et al.
2019/0266350 A1 8/2019 Barday et al.
2019/0268343 A1 8/2019 Barday et al.
2019/0268344 A1 8/2019 Barday et al.
2019/0272492 A1 9/2019 Elledge et al.
2019/0294818 A1 9/2019 Barday et al.
2019/0332802 A1 10/2019 Barday et al.
2019/0332807 A1 10/2019 Lafever et al.
2019/0333118 A1 10/2019 Crimmins et al.
2019/0354709 A1 11/2019 Brinskelle
2019/0356684 A1 11/2019 Sinha et al.
2019/0362169 A1 11/2019 Lin et al.
2019/0362268 A1 11/2019 Fogarty et al.
2019/0377901 A1 12/2019 Balzer et al.
2019/0378073 A1 12/2019 Lopez et al.
2019/0384934 A1 12/2019 Kim
2019/0392162 A1 12/2019 Stern et al.
2019/0392170 A1 12/2019 Barday et al.

(56) References Cited

U.S. PATENT DOCUMENTS

| | | | |
|---|---|---|---|
| 2019/0392171 A1 | 12/2019 | Barday et al. | |
| 2020/0004938 A1 | 1/2020 | Brannon et al. | |
| 2020/0020454 A1 | 1/2020 | McGarvey et al. | |
| 2020/0050966 A1* | 2/2020 | Enuka | G06Q 10/10 |
| 2020/0051117 A1 | 2/2020 | Mitchell | |
| 2020/0057781 A1 | 2/2020 | McCormick | |
| 2020/0074471 A1 | 3/2020 | Adjaoute | |
| 2020/0081865 A1 | 3/2020 | Farrar et al. | |
| 2020/0082270 A1 | 3/2020 | Gu et al. | |
| 2020/0090197 A1 | 3/2020 | Rodriguez et al. | |
| 2020/0092179 A1 | 3/2020 | Chieu et al. | |
| 2020/0110589 A1 | 4/2020 | Bequet et al. | |
| 2020/0110904 A1 | 4/2020 | Shinde et al. | |
| 2020/0117737 A1 | 4/2020 | Gopalakrishnan et al. | |
| 2020/0137097 A1 | 4/2020 | Zimmermann et al. | |
| 2020/0143301 A1 | 5/2020 | Bowers | |
| 2020/0143797 A1 | 5/2020 | Manoharan et al. | |
| 2020/0159952 A1 | 5/2020 | Dain et al. | |
| 2020/0159955 A1 | 5/2020 | Barlik et al. | |
| 2020/0167653 A1 | 5/2020 | Manjunath et al. | |
| 2020/0175424 A1 | 6/2020 | Kursun | |
| 2020/0183655 A1 | 6/2020 | Barday et al. | |
| 2020/0186355 A1 | 6/2020 | Davies | |
| 2020/0193018 A1 | 6/2020 | Van Dyke | |
| 2020/0193022 A1 | 6/2020 | Lunsford et al. | |
| 2020/0210558 A1 | 7/2020 | Barday et al. | |
| 2020/0210620 A1 | 7/2020 | Haletky | |
| 2020/0211002 A1 | 7/2020 | Steinberg | |
| 2020/0220901 A1 | 7/2020 | Barday et al. | |
| 2020/0226156 A1 | 7/2020 | Borra et al. | |
| 2020/0226196 A1 | 7/2020 | Brannon et al. | |
| 2020/0242259 A1 | 7/2020 | Chirravuri et al. | |
| 2020/0242719 A1 | 7/2020 | Lee | |
| 2020/0250342 A1 | 8/2020 | Miller et al. | |
| 2020/0252413 A1 | 8/2020 | Buzbee et al. | |
| 2020/0252817 A1 | 8/2020 | Brouillette et al. | |
| 2020/0272764 A1 | 8/2020 | Brannon et al. | |
| 2020/0285755 A1 | 9/2020 | Kassoumeh et al. | |
| 2020/0293679 A1 | 9/2020 | Handy Bosma et al. | |
| 2020/0296171 A1 | 9/2020 | Mocanu et al. | |
| 2020/0302089 A1 | 9/2020 | Barday et al. | |
| 2020/0310917 A1 | 10/2020 | Tkachev et al. | |
| 2020/0311310 A1 | 10/2020 | Barday et al. | |
| 2020/0344243 A1 | 10/2020 | Brannon et al. | |
| 2020/0356695 A1 | 11/2020 | Brannon et al. | |
| 2020/0364369 A1 | 11/2020 | Brannon et al. | |
| 2020/0372178 A1 | 11/2020 | Barday et al. | |
| 2020/0394327 A1 | 12/2020 | Childress et al. | |
| 2020/0401380 A1 | 12/2020 | Jacobs et al. | |
| 2020/0401962 A1 | 12/2020 | Gottemukkala et al. | |
| 2020/0410117 A1 | 12/2020 | Barday et al. | |
| 2020/0410131 A1 | 12/2020 | Barday et al. | |
| 2020/0410132 A1 | 12/2020 | Brannon et al. | |
| 2021/0012341 A1 | 1/2021 | Garg et al. | |
| 2021/0056569 A1 | 2/2021 | Silberman et al. | |
| 2021/0075775 A1 | 3/2021 | Cheng et al. | |
| 2021/0081567 A1 | 3/2021 | Park et al. | |
| 2021/0099449 A1 | 4/2021 | Frederick et al. | |
| 2021/0110047 A1 | 4/2021 | Victor | |
| 2021/0125089 A1 | 4/2021 | Nickl et al. | |
| 2021/0136065 A1 | 5/2021 | Liokumovich et al. | |
| 2021/0152496 A1 | 5/2021 | Kim et al. | |
| 2021/0182940 A1 | 6/2021 | Gupta et al. | |
| 2021/0224402 A1 | 7/2021 | Sher-Jan et al. | |
| 2021/0233157 A1 | 7/2021 | Crutchfield, Jr. | |
| 2021/0243595 A1 | 8/2021 | Buck et al. | |
| 2021/0248247 A1 | 8/2021 | Poothokaran et al. | |
| 2021/0256163 A1 | 8/2021 | Fleming et al. | |
| 2021/0279360 A1 | 9/2021 | Gimenez Palop et al. | |
| 2021/0288995 A1 | 9/2021 | Attar et al. | |
| 2021/0297441 A1 | 9/2021 | Olalere | |
| 2021/0303828 A1 | 9/2021 | Lafreniere et al. | |
| 2021/0312061 A1 | 10/2021 | Schroeder et al. | |
| 2021/0314328 A1 | 10/2021 | Simons | |
| 2021/0326786 A1 | 10/2021 | Sun et al. | |
| 2021/0328969 A1 | 10/2021 | Gaddam et al. | |
| 2021/0382949 A1 | 12/2021 | Yastrebenetsky et al. | |
| 2021/0397735 A1 | 12/2021 | Samatov et al. | |
| 2021/0400018 A1 | 12/2021 | Vettaikaran et al. | |
| 2021/0406712 A1 | 12/2021 | Bhide et al. | |
| 2022/0137850 A1 | 5/2022 | Boddu et al. | |
| 2022/0171759 A1 | 6/2022 | Jindal et al. | |
| 2022/0217045 A1 | 7/2022 | Blau et al. | |
| 2022/0414255 A1 | 12/2022 | Wang et al. | |

FOREIGN PATENT DOCUMENTS

| | | |
|---|---|---|
| CN | 112115859 | 12/2020 |
| EP | 1394698 | 3/2004 |
| EP | 2031540 | 3/2009 |
| KR | 20130024345 | 3/2013 |
| KR | 20130062500 | 6/2013 |
| KR | 20210030622 | 3/2021 |
| WO | 2001033430 | 5/2001 |
| WO | 20020067158 | 8/2002 |
| WO | 20030050773 | 6/2003 |
| WO | 2005008411 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |
| WO | 2022006421 | 1/2022 |

OTHER PUBLICATIONS

Office Action, dated Jan. 14, 2022, from corresponding U.S. Appl. No. 17/499,595.

Office Action, dated Jan. 18, 2019, from corresponding U.S. Appl. No. 16/055,984.

Office Action, dated Jan. 19, 2023, from corresponding U.S. Appl. No. 17/205,165.

Office Action, dated Jan. 21, 2022, from corresponding U.S. Appl. No. 17/499,624.

Office Action, dated Jan. 22, 2021, from corresponding U.S. Appl. No. 17/099,270.

Office Action, dated Jan. 24, 2020, from corresponding U.S. Appl. No. 16/505,426.

Office Action, dated Jan. 24, 2020, from corresponding U.S. Appl. No. 16/700,049.

Office Action, dated Jan. 25, 2022, from corresponding U.S. Appl. No. 17/494,220.

Office Action, dated Jan. 27, 2020, from corresponding U.S. Appl. No. 16/656,895.

Office Action, dated Jan. 28, 2020, from corresponding U.S. Appl. No. 16/712,104.

Office Action, dated Jan. 29, 2021, from corresponding U.S. Appl. No. 17/101,106.

Office Action, dated Jan. 31, 2022, from corresponding U.S. Appl. No. 17/493,290.

Office Action, dated Jan. 31, 2023, from corresponding U.S. Appl. No. 17/836,872.

Office Action, dated Jan. 4, 2019, from corresponding U.S. Appl. No. 16/159,566.

Office Action, dated Jan. 4, 2019, from corresponding U.S. Appl. No. 16/159,628.

Office Action, dated Jan. 4, 2021, from corresponding U.S. Appl. No. 17/013,756.

Office Action, dated Jan. 4, 2022, from corresponding U.S. Appl. No. 17/480,377.

Office Action, dated Jan. 7, 2020, from corresponding U.S. Appl. No. 16/572,182.

Office Action, dated Jan. 7, 2022, from corresponding U.S. Appl. No. 17/387,421.

Office Action, dated Jul. 13, 2021, from corresponding U.S. Appl. No. 17/306,496.

Office Action, dated Jul. 15, 2021, from corresponding U.S. Appl. No. 17/020,275.

(56) References Cited

OTHER PUBLICATIONS

Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jul. 27, 2022, from corresponding U.S. Appl. No. 17/831,713.
Office Action, dated Jul. 28, 2022, from corresponding U.S. Appl. No. 16/925,550.
Office Action, dated Jul. 7, 2022, from corresponding U.S. Appl. No. 17/370,650.
Office Action, dated Jun. 1, 2020, from corresponding U.S. Appl. No. 16/862,952.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 1, 2022, from corresponding U.S. Appl. No. 17/119,080.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 2, 2022, from corresponding U.S. Appl. No. 17/020,275.
Office Action, dated Mar. 2, 2022, from corresponding U.S. Appl. No. 17/161,159.
He et al, "A Crowdsourcing Framework for Detecting of Cross-Browser Issues in Web Application," ACM, pp. 1-4, Nov. 6, 2015 (Year: 2015).
Heil et al, "Downsizing and Rightsizing," https://web.archive.org/web/20130523153311/https://www.referenceforbusiness.com/management/De-Ele/Downsizing-and-Rightsizing.html (Year: 2013).
Hernandez, et al, "Data Exchange with Data-Metadata Translations," ACM, pp. 260-273 (Year: 2008).
Hinde, "A Model to Assess Organisational Information Privacy Maturity Against the Protection of Personal Information Act" Dissertation University of Cape Town 2014, pp. 1-121 (Year: 2014).
Hodge, et al, "Managing Virtual Data Marts with Metapointer Tables," pp. 1-7 (Year: 2002).
Horrall et al, "Evaluating Risk: IBM's Country Financial Risk and Treasury Risk Scorecards," Jul. 21, 2014, IBM, vol. 58, issue 4, pp. 2:1-2:9 (Year: 2014).
Hu, et al, "Attribute Considerations for Access Control Systems," NIST Special Publication 800-205, Jun. 2019, pp. 1-42 (Year: 2019).
Hiu, et al, "Guide to Attribute Based Access Control (ABAC) Definition and Considerations (Draft)," NIST Special Publication 800-162, pp. 1-54 (Year: 2013).
Huang, et al, "A Study on Information Security Management with Personal Data Protection," IEEE, Dec. 9, 2011, pp. 624-630 (Year: 2011).
Huettner, "Digital Risk Management: Protecting Your Privacy, Improving Security, and Preparing for Emergencies," IEEE, pp. 136-138 (Year: 2006).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al, "A Cloud Storage Architecture Model for Data-Intensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).
Iordanou et al, "Tracing Cross Border Web Tracking," Oct. 31, 2018, pp. 329-342, ACM (Year: 2018).
Islam, et al, "Mixture Model Based Label Association Techniques for Web Accessibility," ACM, pp. 67-76 (Year: 2010).
Jayasinghe et al, "Matching Facial Images Using Age Related Morphing Changes," ISSRI, 2009, pp. 2901-2907 (Year: 2009).
Jensen, et al, "Temporal Data Management," IEEE Transactions on Knowledge and Data Engineering, vol. 11, No. 1, Jan./Feb. 1999, pp. 36-44 (Year: 1999).
Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Jones et al, "AI and the Ethics of Automating Consent," IEEE, pp. 64-72, May 2018 (Year: 2018).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al, "Scalable Multi-Access Flash Store for Big Data Analytics," ACM, pp. 55-64 (Year: 2014).
Khan et al, "Wrinkles Energy Based Age Estimation Using Discrete Cosine Transform," IEEE, 2015, pp. 1-4 (Year: 2015).
Kirkham, et al, "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Kristian et al, "Human Facial Age Classification Using Active Shape Module, Geometrical Feature, and Support Vendor Machine on Early Growth Stage," ISICO, 2015, pp. 1-8 (Year: 2015).
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).

(56) References Cited

OTHER PUBLICATIONS

Lasierra et al, "Data Management in Home Scenarios Using an Autonomic Ontology-Based Approach," IEEE, pp. 94-99 (Year: 2012).
Leadbetter, et al, "Where Big Data Meets Linked Data: Applying Standard Data Models to Environmental Data Streams," IEEE, pp. 2929-2937 (Year: 2016).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Lenzerini et al, "Ontology-based Data Management," ACM, pp. 5-6 (Year: 2011).
Lewis, James et al, "Microservices," Mar. 25, 2014 (Mar. 25, 2014), XP055907494, Retrieved from the Internet: https://martinfowler.com/articles/micr oservices.html. [retrieved on Mar. 31, 2022].
Li, Ninghui, et al, t-Closeness: Privacy Beyond k-Anonymity and I-Diversity, IEEE, 2014, p. 106-115.
Liu et al, "A Novel Approach for Detecting Browser-based Silent Miner," IEEE, pp. 490-497 (Year: 2018).
Liu et al, "Cross-Geography Scientific Data Transferring Trends and Behavior," ACM, pp. 267-278 (Year: 2018).
Liu et al, "Overview on Ontology Mapping and Approach," IEEE, pp. 592-595 (Year: 2011).
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Lu et al, "An HTTP Flooding Detection Method Based on Browser Behavior," IEEE, pp. 1151-1154 (Year: 2006).
Lu, "How Machine Learning Mitigates Racial Bias in the US Housing Market," Available as SSRN 3489519, pp. 1-73, Nov. 2019 (Year: 2019).
Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Ma Ziang, et al, "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col., par. 1-3; figure 3 (Year: 2016).
Mandal, et al, "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al, "Multimedia Information Interchange: Web Forms Meet Data Servers", IEEE, pp. 499-505 (Year: 1999).
Martin, et al, "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).
Office Action, dated Mar. 2, 2022, from corresponding U.S. Appl. No. 17/200,698.
Office Action, dated Mar. 20, 2020, from corresponding U.S. Appl. No. 16/778,709.
Office Action, dated Mar. 21, 2022, from corresponding U.S. Appl. No. 17/571,871.
Office Action, dated Mar. 22, 2022, from corresponding U.S. Appl. No. 17/187,329.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 12, 2022, from corresponding U.S. Appl. No. 17/509,974.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 16, 2022, from corresponding U.S. Appl. No. 17/679,750.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 24, 2022, from corresponding U.S. Appl. No. 17/674,187.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated May 9, 2022, from corresponding U.S. Appl. No. 16/840,943.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 10, 2022, from corresponding U.S. Appl. No. 17/670,341.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 15, 2022, from corresponding U.S. Appl. No. 17/200,698.

(56) References Cited

OTHER PUBLICATIONS

Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 18, 2022, from corresponding U.S. Appl. No. 17/836,454.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Notice of Allowance, dated Jan. 25, 2021, from corresponding U.S. Appl. No. 16/410,336.
Notice of Allowance, dated Jan. 25, 2023, from corresponding U.S. Appl. No. 17/675,760.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 31, 2022, from corresponding U.S. Appl. No. 17/472,948.
Notice of Allowance, dated Jan. 31, 2023, from corresponding U.S. Appl. No. 17/499,624.
Notice of Allowance, dated Jan. 5, 2022, from corresponding U.S. Appl. No. 17/475,241.
Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 20, 2022, from corresponding U.S. Appl. No. 16/938,509.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 27, 2022, from corresponding U.S. Appl. No. 17/679,750.
Notice of Allowance, dated Jul. 29, 2022, from corresponding U.S. Appl. No. 17/670,341.
Notice of Allowance, dated Jul. 31, 2019, from corresponding U.S. Appl. No. 16/221,153.
Notice of Allowance, dated Jul. 7, 2022, from corresponding U.S. Appl. No. 17/571,871.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 14, 2022, from corresponding U.S. Appl. No. 17/679,734.
Notice of Allowance, dated Jun. 16, 2020, from corresponding U.S. Appl. No. 16/798,818.
Notice of Allowance, dated Jun. 16, 2022, from corresponding U.S. Appl. No. 17/119,080.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 2, 2022, from corresponding U.S. Appl. No. 17/493,290.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Final Office Action, dated Nov. 8, 2022, from corresponding U.S. Appl. No. 17/151,334.
Final Office Action, dated Oct. 26, 2021, from corresponding U.S. Appl. No. 17/306,496.
Final Office Action, dated Oct. 27, 2022, from corresponding U.S. Appl. No. 17/346,586.
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.
Final Office Action, dated Sep. 19, 2022, from corresponding U.S. Appl. No. 17/306,496.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.

(56) References Cited

OTHER PUBLICATIONS

Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 12, 2022, from corresponding U.S. Appl. No. 17/670,341.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 18, 2022, from corresponding U.S. Appl. No. 17/670,349.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Apr. 8, 2022, from corresponding U.S. Appl. No. 16/938,509.
Office Action, dated Aug. 12, 2022, from corresponding U.S. Appl. No. 17/679,734.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 17, 2022, from corresponding U.S. Appl. No. 17/373,444.
Office Action, dated Aug. 17, 2022, from corresponding U.S. Appl. No. 17/836,430.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 19, 2022, from corresponding U.S. Appl. No. 17/584,187.
Office Action, dated Aug. 2, 2022, from corresponding U.S. Appl. No. 17/670,354.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Final Office Action, dated Apr. 1, 2022, from corresponding U.S. Appl. No. 17/370,650.
Final Office Action, dated Apr. 23, 2020, from corresponding U.S. Appl. No. 16/572,347.
Final Office Action, dated Apr. 25, 2022, from corresponding U.S. Appl. No. 17/149,421.
Final Office Action, dated Apr. 27, 2021, from corresponding U.S. Appl. No. 17/068,454.
Final Office Action, dated Apr. 28, 2022, from corresponding U.S. Appl. No. 16/925,550.
Final Office Action, dated Apr. 5, 2022, from corresponding U.S. Appl. No. 17/013,756.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 23, 2023, from corresponding U.S. Appl. No. 17/370,650.
Final Office Action, dated Feb. 25, 2022, from corresponding U.S. Appl. No. 17/346,586.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.

(56) References Cited

OTHER PUBLICATIONS

Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 1, 2022, from corresponding U.S. Appl. No. 17/187,329.
Final Office Action, dated Jul. 21, 2021, from corresponding U.S. Appl. No. 17/151,334.
Final Office Action, dated Jul. 6, 2022, from corresponding U.S. Appl. No. 17/200,698.
Final Office Action, dated Jul. 7, 2021, from corresponding U.S. Appl. No. 17/149,421.
Final Office Action, dated Jun. 10, 2022, from corresponding U.S. Appl. No. 17/161,159.
Final Office Action, dated Jun. 29, 2022, from corresponding U.S. Appl. No. 17/020,275.
Final Office Action, dated Jun. 9, 2022, from corresponding U.S. Appl. No. 17/494,220.
Final Office Action, dated Mar. 21, 2022, from corresponding U.S. Appl. No. 17/373,444.
Final Office Action, dated Mar. 22, 2022, from corresponding U.S. Appl. No. 17/380,485.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 12, 2022, from corresponding U.S. Appl. No. 17/499,624.
Final Office Action, dated May 14, 2021, from corresponding U.S. Appl. No. 17/013,756.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
Final Office Action, dated Nov. 29, 2017, from corresponding U.S. Appl. No. 15/619,237.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 18, 2022, from corresponding International Application No. PCT/US2022/013733.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
International Search Report, dated Nov. 12, 2021, from corresponding International Application No. PCT/US2021/043481.
International Search Report, dated Nov. 19, 2018, from corresponding International Application No. PCT/US2018/046939.
International Search Report, dated Nov. 3, 2021, from corresponding International Application No. PCT/US2021/040893.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Written Opinion of the International Searching Authority, dated Jun. 6, 2017, from corresponding International Application No. PCT/US2017/025611.
Written Opinion of the International Searching Authority, dated Apr. 12, 2022, from corresponding International Application No. PCT/US2022/016735.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Dec. 27, 2022, from corresponding International Application No. PCT/US2022/044574.
Written Opinion of the International Searching Authority, dated Feb. 11, 2022, from corresponding International Application No. PCT/US2021/053518.
Written Opinion of the International Searching Authority, dated Feb. 14, 2022, from corresponding International Application No. PCT/US2021/058274.

(56) References Cited

OTHER PUBLICATIONS

Written Opinion of the International Searching Authority, dated Jan. 14, 2019, from corresponding International Application No. PCT/US2018/046949.
Written Opinion of the International Searching Authority, dated Jan. 27, 2023, from corresponding International Application No. PCT/US2022/045520.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 1, 2022, from corresponding International Application No. PCT/US2022/016930.
Written Opinion of the International Searching Authority, dated Jun. 21, 2017, from corresponding International Application No. PCT/US2017/025600.
Written Opinion of the International Searching Authority, dated Jun. 22, 2022, from corresponding International Application No. PCT/US2022/019358.
Written Opinion of the International Searching Authority, dated Jun. 24, 2022, from corresponding International Application No. PCT/US2022/019882.
Matte et al, "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).
McGarth et al, "Digital Library Technology for Locating and Accessing Scientific Data", ACM, pp. 188-194 (Year: 1999).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Milic et al, "Comparative Analysis of Metadata Models on e-Government Open Data Platforms," IEEE, pp. 119-130 (Year: 2021).
Moiso et al, "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Moscoso-Zea et al, "Datawarehouse Design for Educational Data Mining," IEEE, pp. 1-6 (Year: 2016).
Mudepalli et al, "An efficient data retrieval approach using blowfish encryption on cloud CipherText Retrieval in Cloud Computing" IEEE, pp. 267-271 (Year: 2017).
Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).
Nemec et al, "Assessment of Query Execution Performance Using Selected Business Intelligence Tools and Experimental Agile Oriented Data Modeling Approach," Sep. 16, 2015, IEEE, pp. 1327-1333. (Year: 2015).
Newman et al, "High Speed Scientific Data Transfers using Software Defined Networking," ACM, pp. 1-9 (Year: 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Niu, et al, "Achieving Data Truthfulness and Privacy Preservation in Data Markets", IEEE Transactions on Knowledge and Data Engineering, IEEE Service Centre, Los Alamitos, CA, US, vol. 31, No. 1, Jan. 1, 2019, pp. 105-119 (Year 2019).
Notice of Filing Date for Petition for Post-Grant Review of related U.S. Pat. No. 9,691,090 dated Apr. 12, 2018.
Nouwens et al, "Dark Patterns after the GDPR: Scraping Consent Pop-ups and Demonstrating their Influence," ACM, pp. 1-13, Apr. 25, 2020 (Year: 2020).
O'Keefe et al, "Privacy-Preserving Data Linkage Protocols," Proceedings of the 2004 ACM Workshop on Privacy in the Electronic Society, 2004, pp. 94-102 (Year: 2004).
Olenski, Steve, For Consumers, Data Is A Matter Of Trust, CMO Network, Apr. 18, 2016, https://www.forbes.com/sites/steveolenski/2016/04/18/for-consumers-data-is-a-matter-of-trust/#2e48496278b3.
Ozdikis et al, "Tool Support for Transformation from an OWL Ontology to an HLA Object Model," ACM, pp. 1-6 (Year: 2010).
Paes, "Student Research Abstract: Automatic Detection of Cross-Browser Incompatibilities using Machine Learning and Screenshot Similarity," ACM, pp. 697-698, Apr. 3, 2017 (Year: 2017).
Pearson, et al, "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al, "Process Mining Online Assessment Data," Educational Data Mining, pp. 279-288 (Year: 2009).
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al, "Attributing Users Based on Web Browser History," 2017 IEEE Conference on Application, Information and Network Security (AINS), 2017, pp. 69-74 (Year: 2017).
Preuveneers et al, "Access Control with Delegated Authorization Policy Evaluation for Data-Driven Microservice Workflows," Future Internet 2017, MDPI, pp. 1-21 (Year: 2017).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Qu et al, "Metadata Type System: Integrate Presentation, Data Models and Extraction to Enable Exploratory Browsing Interfaces," ACM, pp. 107-116 (Year: 2014).
Radu, et al, "Analyzing Risk Evaluation Frameworks and Risk Assessment Methods," IEEE, Dec. 12, 2020, pp. 1-6 (Year. 2020).
Rakers, "Managing Professional and Personal Sensitive Information," ACM, pp. 9-13, Oct. 24-27, 2010 (Year: 2010).
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download;isessionid=450713515DC7F19F8ED09AE961D4B60E. (Year: 2012).
Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Roesner et al, "Detecting and Defending Against Third-Party Tracking on the Web," 9th USENIX Symposium on Networked Systems Design and Implementation, Apr. 11, 2013, pp. 1-14, ACM (Year: 2013).

(56) References Cited

OTHER PUBLICATIONS

Rozepz, "What is Google Privacy Checkup? Everything You Need to Know," Tom's Guide web post, Apr. 26, 2018, pp. 1-11 (Year: 2018).
Sachinopoulou et al, "Ontology-Based Approach for Managing Personal Health and Wellness Information," IEEE, pp. 1802-1805 (Year: 2007).
Salim et al, "Data Retrieval and Security using Lightweight Directory Access Protocol", IEEE, pp. 685-688 (Year: 2009).
Sanchez-Rola et al, "Can I Opt Out Yet?: GDPR and the Global Illusion of Cookie Control," Proceedings of the 2019 ACM Asia Conference on Computer and Communications Security, 2019, pp. 340-351 (Year: 2019).
Santhisree, et al, "Web Usage Data Clustering Using Dbscan Algorithm and Set Similarities," IEEE, pp. 220-224 (Year: 2010).
Sanzo et al, "Analytical Modeling of Lock-Based Concurrency Control with Arbitrary Transaction Data Access Patterns," ACM, pp. 69-78 (Year: 2010).
Sarkar et al, "Towards Enforcement of the EU GDPR: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Sedinic et al, "Security Risk Management in Complex Organization," May 29, 2015, IEEE, pp. 1331-1337 (Year: 2015).
Shahriar et al, "A Model-Based Detection of Vulnerable and Malicious Browser Extensions," IEEE, pp. 198-207 (Year: 2013).
Shankar et al, "Doppleganger: Better Browser Privacy Without the Bother," Proceedings of the 13th ACM Conference on Computer and Communications Security; [ACM Conference on Computer and Communications Security], New York, NY : ACM, US, Oct. 30, 2006, pp. 154-167 (Year: 2006).
Shulz et al, "Generative Data Models for Validation and Evaluation of Visualization Techniques," ACM, pp. 1-13 (Year: 2016).
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 4, 2022, from corresponding U.S. Appl. No. 17/828,953.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 21, 2022, from corresponding U.S. Appl. No. 17/013,756.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 15, 2023, from corresponding U.S. Appl. No. 17/499,582.
Office Action, dated Feb. 16, 2022, from corresponding U.S. Appl. No. 16/872,031.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 2, 2023, from corresponding U.S. Appl. No. 17/510,001.
Office Action, dated Feb. 2, 2023, from corresponding U.S. Appl. No. 17/872,266.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Feb. 9, 2022, from corresponding U.S. Appl. No. 17/543,546.
Singh, et al, "A Metadata Catalog Service for Data Intensive Applications," ACM, pp. 1-17 (Year: 2003).

(56) References Cited

OTHER PUBLICATIONS

Sjosten et al, "Discovering Browser Extensions via Web Accessible Resources," ACM, pp. 329-336, Mar. 22, 2017 (Year: 2017).
Slezak, et al, "Brighthouse: An Analytic Data Warehouse for Ad-hoc Queries," ACM, pp. 1337-1345 (Year: 2008).
Soceanu, et al, "Managing the Privacy and Security of eHealth Data," May 29, 2015, IEEE, pp. 1-8 (Year: 2015).
Srinivasan et al, "Descriptive Data Analysis of File Transfer Data," ACM, pp. 1-8 (Year: 2014).
Srivastava, Agrima, et al, Measuring Privacy Leaks in Online Social Networks, International Conference on Advances in Computing, Communications and Informatics (ICACCI), 2013.
Stack Overflow, "Is there a way to force a user to scroll to the bottom of a div?," Stack Overflow, pp. 1-11, Nov. 2013. [Online]. Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al, "Review on Modern Data Preprocessing Techniques in Web Usage Mining (WUM)," IEEE, 2016, pp. 64-69 (Year: 2016).
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al, "Advanced Data Preprocessing for Intersites Web Usage Mining," IEEE, Mar. 2004, pp. 59-65 (Year: 2004).
Tanwar, et al, "Live Forensics Analysis: Violations of Business Security Policy," 2014 International Conference on Contemporary Computing and Informatics (IC31), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thomas et al, "MooM—A Prototype Framework for Management of Ontology Mappings," IEEE, pp. 548-555 (Year: 2011).
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, 20150304.
Tsai et al, "Determinants of Intangible Assets Value: The Data Mining Approach," Knowledge Based System, pp. 67-77 http://www.elsevier.com/locate/knosys (Year: 2012).
Tuomas Aura et al, Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year. 2006).
Van Eijk et al, "The Impact of User Location on Cookie Notices (Inside and Outside of the European Union," IEEE Security & Privacy Workshop on Technology and Consumer Protection (CONPRO '19), Jan. 1, 2019 (Year: 2019).
Vukovic et al, "Managing Enterprise IT Systems Using Online Communities," Jul. 9, 2011, IEEE, pp. 552-559. (Year: 2011).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Wong et al, "Ontology Mapping for the Interoperability Problem in Network Management," IEEE, pp. 2058-2068 (Year: 2005).
Wu et al, "Data Mining with Big Data," IEEE, Jan. 2014, pp. 97-107, vol. 26, No. 1, (Year: 2014).
www.truste.com (1), 200150207, Internet Archive Wayback Machine, www.archive.org,2_7_2015.
Xu, et al, "GatorShare: A File System Framework for High-Throughput Data Management," ACM, pp. 776-786 (Year: 2010).
Yang et al, "DAC-MACS: Effective Data Access Control for Multiauthority Cloud Storage Systems," IEEE, pp. 1790-1801 (Year: 2013).
Yang et al, "Mining Web Access Sequence with Improved Apriori Algorithm," IEEE, 2017, pp. 780-784 (Year: 2017).
Ye et al, "An Evolution-Based Cache Scheme for Scalable Mobile Data Access," ACM, pp. 1-7 (Year: 2007).
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al, "Performance and Fairness Issues in Big Data Transfers," ACM, pp. 9-11 (Year: 2014).
Yue et al, "An Automatic HTTP Cookie Management System," Computer Networks, Elsevier, Amsterdam, NL, vol. 54, No. 13, Sep. 15, 2010, pp. 2182-2198 (Year: 2010).
Zannone, et al, "Maintaining Privacy on Derived Objects," ACM, pp. 10-19 (Year. 2005).
Zhang et al, "Data Transfer Performance Issues for a Web Services Interface to Synchrotron Experiments", ACM, pp. 69-65 (Year: 2007).
Zhang et al, "Dynamic Topic Modeling for Monitoring Market Competition from Online Text and Image Data", ACM, pp. 1425-1434 (Year: 2015).
Zheng, et al, "Methodologies for Cross-Domain Data Fusion: An Overview," IEEE, pp. 16-34 (Year: 2015).
Zheng, et al, "Toward Assured Data Deletion in Cloud Storage," IEEE, vol. 34, No. 3, pp. 101-107 May/Jun. 2020 (Year: 2020).
Zhu, et al, "Dynamic Data Integration Using Web Services," IEEE, pp. 1-8 (Year: 2004).
Notice of Allowance, dated Sep. 12, 2019, from corresponding U.S. Appl. No. 16/512,011.
Notice of Allowance, dated Sep. 12, 2022, from corresponding U.S. Appl. No. 17/674,187.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 2, 2022, from corresponding U.S. Appl. No. 17/380,485.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.

(56) References Cited

OTHER PUBLICATIONS

Notice of Allowance, dated Sep. 28, 2022, from corresponding U.S. Appl. No. 17/509,974.
Notice of Allowance, dated Sep. 28, 2022, from corresponding U.S. Appl. No. 17/689,683.
Notice of Allowance, dated Sep. 29, 2021, from corresponding U.S. Appl. No. 17/316,179.
Notice of Allowance, dated Sep. 30, 2022, from corresponding U.S. Appl. No. 17/867,068.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
International Search Report, dated Apr. 12, 2022, from corresponding International Application No. PCT/US2022/016735.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Dec. 22, 2021, from corresponding International Application No. PCT/US2021/051217.
International Search Report, dated Dec. 27, 2022, from corresponding International Application No. PCT/US2022/044574.
International Search Report, dated Feb. 11, 2022, from corresponding International Application No. PCT/US2021/053518.
International Search Report, dated Feb. 14, 2022, from corresponding International Application No. PCT/US2021/058274.
International Search Report, dated Jan. 14, 2019, from corresponding International Application No. PCT/US2018/046949.
International Search Report, dated Jan. 27, 2023, from corresponding International Application No. PCT/US2022/045520.
International Search Report, dated Jan. 5, 2022, from corresponding International Application No. PCT/US2021/050497.
International Search Report, dated Jan. 7, 2019, from corresponding International Application No. PCT/US2018/055772.
International Search Report, dated Jun. 1, 2022, from corresponding International Application No. PCT/US2022/016930.
International Search Report, dated Jun. 21, 2017, from corresponding International Application No. PCT/US2017/025600.
International Search Report, dated Jun. 22, 2022, from corresponding International Application No. PCT/US2022/019358.
International Search Report, dated Jun. 24, 2022, from corresponding International Application No. PCT/US2022/019882.
International Search Report, dated Jun. 6, 2017, from corresponding International Application No. PCT/US2017/025605.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Abdullah et al, "The Mapping Process of Unstructured Data to the Structured Data", ACM, pp. 151-155 (Year: 2013).
Acar, Gunes, et al, The Web Never Forgets, Computer and Communications Security, ACM, Nov. 3, 2014, pp. 674-689.
Aghasian, Erfan, et al, Scoring Users' Privacy Disclosure Across Multiple Online Social Networks, IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework" EEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Ali et al, "Age Estimation from Facial Images Using Biometric Ratios and Wrinkle Analysis," IEEE, 2015, pp. 1-5 (Year: 2015).
Alkalha et al, "Investigating the Effects of Human Resource Policies on Organizational Performance: An Empirical Study on Commercial Banks Operating in Jordan," European Journal of Economics, Finance and Administrative Science, pp. 1-22 (Year: 2012).
Aman et al, "Detecting Data Tampering Attacks in Synchrophasor Networks using Time Hopping," IEEE, pp. 1-6 (Year: 2016).
Amar et al, "Privacy-Aware Infrastructure for Managing Personal Data," ACM, pp. 571-572, Aug. 22-26, 2016 (Year: 2016).
Antunes et al, "Preserving Digital Data in Heterogeneous Environments", ACM, pp. 345-348, 2009 (Year: 2009).
Ardagna, et al, "A Privacy-Aware Access Control System," Journal of Computer Security, 16:4, pp. 369-397 (Year: 2008).
Avepoint, AvePoint Privacy Impact Assessment 1: User Guide, Cumulative Update 2, Revision E, Feb. 2015, AvePoint, Inc.
Ball, et al, "Aspects of the Computer-Based Patient Record," Computers in Healthcare, Springer-Verlag New York Inc., pp. 1-23 (Year: 1992).
Banerjee et al, "Link Before You Share: Managing Privacy Policies through Blockchain," IEEE, pp. 4438-4447 (Year: 2017).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Bansal et al, "Integrating Big Data: A Semantic Extract-Transform-Load Framework," IEEE, pp. 42-50 (Year: 2015).
Bao et al, "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).

(56) References Cited

OTHER PUBLICATIONS

Bertino et al, "Towards Mechanisms for Detection and Prevention of Data Exfiltration by Insiders," Mar. 22, 2011, ACM, pp. 10-19 (Year: 2011).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Bieker, et al, "Privacy-Preserving Authentication Solutions—Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Bindschaedler et al, "Privacy Through Fake Yet Semantically Real Traces," arxiv.org, Cornell University Library, 201 Olin Library Cornell University Ithaca, NY 14853, May 27, 2015 (Year: 2015).
Binns, et al, "Data Havens, or Privacy Sans Frontières? A Study of International Personal Data Transfers," ACM, pp. 273-274 (Year: 2002).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Bujlow et al, "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CoolCheck," Proceedings of the 2016 ACM on Workshop on Privacy in the Electronic Society, 2016, pp. 135-138 (Year: 2016).
Castro et al, "Creating Lightweight Ontologies for Dataset Description," IEEE, pp. 1-4 (Year: 2014).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Cha et al, "A Data-Driven Security Risk Assessment Scheme for Personal Data Protection," IEEE, pp. 50510-50517 (Year: 2018).
Cha, et al, "Process-Oriented Approach for Validating Asset Value for Evaluating Information Security Risk," IEEE, Aug. 31, 2009, pp. 379-385 (Year: 2009).
Chang et al, "A Ranking Approach for Human Age Estimation Based on Face Images," IEEE, 2010, pp. 3396-3399 (Year: 2010).
Chapados et al, "Scoring Models for Insurance Risk Sharing Pool Optimization," 2008, IEEE, pp. 97-105 (Year: 2008).
Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).
Choi et al, "A Survey on Ontology Mapping," ACM, pp. 34-41 (Year. 2006).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Chowdhury et al, "Managing Data Transfers in Computer Clusters with Orchestra," ACM, pp. 98-109 (Year: 2011).
Civili et al, "Mastro Studio: Managing Ontology-Based Data Access Applications," ACM, pp. 1314-1317, Aug. 26-30, 2013 (Year: 2013).
Cruz et al, "Interactive User Feedback in Ontology Matching Using Signature Vectors," IEEE, pp. 1321-1324 (Year: 2012).
Cudre-Mauroux, "ESWC 2008 Ph.D. Symposium," The ESWC 2008 Ph.D. Symposium is sponsored by the Okkam project (http://fp7.okkam.org/), MIT, pp. 1-92 (Year: 2008).
Cui et al, "Domain Ontology Management Environment," IEEE, pp. 1-9 (Year: 2000).
Czeskis et al, "Lightweight Server Support for Browser-based CSRF Protection," Proceedings of the 22nd International Conference on World Wide Web, 2013, pp. 273-284 (Year: 2013).
Decision Regarding Institution of Post-Grant Review in Case PGR2018-00056 for U.S. Pat. No. 9,691,090 B1, Oct. 11, 2018.
Degeling et al, "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).
Dowling, "Auditing Global HR Compliance," published May 23, 2014, retrieved from https://www.shrm.org/resourcesandtools/hr-topics/ global-hr/pages/auditing-global-hr-compliance.aspx Jul. 2, 2022 (Year: 2014).
Dunkel et al, "Data Organization and Access for Efficient Data Mining", IEEE, pp. 522-529 (Year: 1999).
Edinger et al, "Age and Gender Estimation of Unfiltered Faces," IEEE, 2014, pp. 2170-2179 (Year: 2014).
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Everypixel Team, "A New Age Recognition API Detects the Age of People on Photos," May 20, 2019, pp. 1-5 (Year: 2019).
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Falbo et al, "An Ontological Approach to Domain Engineering," ACM, pp. 351-358 (Year: 2002).
Fan et al, "Intrusion Investigations with Data-hiding for Computer Log-file Forensics," IEEE, pp. 1-6 (Year: 2010).
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition.
Friedman et al, "Data Mining with Differential Privacy," ACM, Jul. 2010, pp. 493-502 (Year: 2010).
Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year: 2010).
Gajare et al, "Improved Automatic Feature Selection Approach for Health Risk Prediction," Feb. 16, 2018, IEEE, pp. 816-819 (Year: 2018).
Geko et al, "An Ontology Capturing the Interdependence of the General Data Protection Regulation (GDPR) and Information Security," ACM, pp. 1-6, Nov. 15-16, 2018 (Year: 2018).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

(56) References Cited

OTHER PUBLICATIONS

Gilda, et al, "Blockchain for Student Data Privacy and Consent," 2018 International Conference on Computer Communication and Informatics, Jan. 4-6, 2018, IEEE, pp. 1-5 (Year: 2018).
Golab, et al, "Issues in Data Stream Management," ACM, SIGMOD Record, vol. 32, No. 2, Jun. 2003, pp. 5-14 (Year: 2003).
Golfarelli et al, "Beyond Data Warehousing: What's Next in Business Intelligence?," ACM, pp. 1-6 (Year: 2004).
Gonçalves et al, "The XML Log Standard for Digital Libraries: Analysis, Evolution, and Deployment," IEEE, pp. 312-314 (Year: 2003).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al, "RDF Metadata for XML Access Control," ACM, pp. 31-48 (Year: 2003).
Grolinger, et al, "Data Management in Cloud Environments: NoSQL and NewSQL Data Stores," Journal of Cloud Computing: Advances, Systems and Applications, pp. 1-24 (Year: 2013).
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year: 2013).
Hacigümüs, Hakan, et al, Executing SQL over Encrypted Data in the Database-Service-Provider Model, ACM, Jun. 4, 2002, pp. 216-227.
Halevy, et al, "Schema Mediation in Peer Data Management Systems," IEEE, Proceedings of the 19th International Conference on Data Engineering, 2003, pp. 505-516 (Year: 2003).
Han et al, "Demographic Estimation from Face Images: Human vs. Machine Performance," IEEE, 2015, pp. 1148-1161 (Year: 2015).
Hauch, et al, "Information Intelligence: Metadata for Information Discovery, Access, and Integration," ACM, pp. 793-798 (Year: 2005).
Notice of Allowance, dated Apr. 28, 2022, from corresponding U.S. Appl. No. 17/670,352.
Notice of Allowance, dated Apr. 29, 2020, from corresponding U.S. Appl. No. 16/700,049.
Notice of Allowance, dated Apr. 29, 2022, from corresponding U.S. Appl. No. 17/387,421.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 22, 2022, from corresponding U.S. Appl. No. 17/499,595.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 3, 2022, from corresponding U.S. Appl. No. 17/668,714.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 4, 2022, from corresponding U.S. Appl. No. 17/670,349.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Aug. 9, 2022, from corresponding U.S. Appl. No. 17/832,313.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated May 25, 2022, from corresponding U.S. Appl. No. 16/872,031.
Notice of Allowance, dated May 26, 2021, from corresponding U.S. Appl. No. 16/808,493.

(56) References Cited

OTHER PUBLICATIONS

Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 27, 2022, from corresponding U.S. Appl. No. 17/543,546.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 31, 2022, from corresponding U.S. Appl. No. 17/679,715.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 6, 2022, from corresponding U.S. Appl. No. 17/666,886.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 16, 2022, from corresponding U.S. Appl. No. 17/860,255.
Notice of Allowance, dated Nov. 2, 2018, from corresponding U.S. Appl. No. 16/054,762.
Notice of Allowance, dated Nov. 21, 2022, from corresponding U.S. Appl. No. 17/831,713.
Notice of Allowance, dated Nov. 22, 2021, from corresponding U.S. Appl. No. 17/383,889.
Notice of Allowance, dated Nov. 22, 2022, from corresponding U.S. Appl. No. 17/828,953.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Nov. 9, 2022, from corresponding U.S. Appl. No. 17/187,329.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 18, 2022, from corresponding U.S. Appl. No. 16/840,943.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 25, 2022, from corresponding U.S. Appl. No. 17/711,331.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 1, 2022, from corresponding U.S. Appl. No. 17/480,377.
Notice of Allowance, dated Jun. 23, 2022, from corresponding U.S. Appl. No. 17/588,645.
Notice of Allowance, dated Jun. 27, 2018, from corresponding U.S. Appl. No. 15/882,989.
Notice of Allowance, dated Jun. 29, 2022, from corresponding U.S. Appl. No. 17/675,118.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Jun. 8, 2022, from corresponding U.S. Appl. No. 17/722,551.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 16, 2022, from corresponding U.S. Appl. No. 17/486,350.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.

(56) References Cited

OTHER PUBLICATIONS

Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 28, 2022, from corresponding U.S. Appl. No. 17/499,609.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated Mar. 31, 2022, from corresponding U.S. Appl. No. 17/476,209.
Notice of Allowance, dated Mar. 4, 2022, from corresponding U.S. Appl. No. 17/409,999.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 11, 2022, from corresponding U.S. Appl. No. 17/395,759.
Notice of Allowance, dated May 13, 2021, from corresponding U.S. Appl. No. 17/101,915.
Notice of Allowance, dated May 18, 2022, from corresponding U.S. Appl. No. 17/670,354.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Final Office Action, dated Apr. 13, 2023, from corresponding U.S. Appl. No. 16/925,550.
Final Office Action, dated Mar. 3, 2023, from corresponding U.S. Appl. No. 17/306,438.
Notice of Allowance, dated Mar. 8, 2023, from corresponding U.S. Appl. No. 17/530,201.
Office Action, dated Mar. 9, 2023, from corresponding U.S. Appl. No. 17/306,496.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 1, 2022, from corresponding U.S. Appl. No. 17/346,509.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 14, 2022, from corresponding U.S. Appl. No. 16/623,157.
Notice of Allowance, dated Feb. 14, 2023, from corresponding U.S. Appl. No. 17/373,444.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 2, 2023, from corresponding U.S. Appl. No. 17/850,244.
Notice of Allowance, dated Feb. 22, 2022, from corresponding U.S. Appl. No. 17/535,065.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Feb. 8, 2023, from corresponding U.S. Appl. No. 17/584,187.

(56) References Cited

OTHER PUBLICATIONS

Notice of Allowance, dated Feb. 8, 2023, from corresponding U.S. Appl. No. 17/831,700.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 24, 2022, from corresponding U.S. Appl. No. 17/340,699.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 29, 2022, from corresponding U.S. Appl. No. 17/838,939.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 25, 2022, from corresponding U.S. Appl. No. 17/836,865.
Office Action, dated Oct. 26, 2018, from corresponding U.S. Appl. No. 16/041,468.
Office Action, dated Oct. 27, 2022, from corresponding U.S. Appl. No. 17/161,159.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 16, 2022, from corresponding U.S. Appl. No. 17/306,438.
Office Action, dated Sep. 19, 2017, from corresponding U.S. Appl. No. 15/671,073.
Office Action, dated Sep. 2, 2022, from corresponding U.S. Appl. No. 17/499,624.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Office Action, dated Sep. 8, 2022, from corresponding U.S. Appl. No. 17/850,244.
Ex Parte Quayle Action, dated May 10, 2022, from corresponding U.S. Appl. No. 17/668,714.
Notice of Allowance, dated Apr. 12, 2017, from corresponding U.S. Appl. No. 15/256,419.
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 20, 2022, from corresponding U.S. Appl. No. 17/573,808.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 27, 2022, from corresponding U.S. Appl. No. 17/573,999.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 28, 2022, from corresponding U.S. Appl. No. 17/592,922.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 18, 2022, from corresponding International Application No. PCT/US2022/013733.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.

(56) References Cited

OTHER PUBLICATIONS

Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Restriction Requirement, dated Apr. 10, 2019, from corresponding U.S. Appl. No. 16/277,715.
Restriction Requirement, dated Apr. 12, 2022, from corresponding U.S. Appl. No. 17/584,187.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 14, 2022, from corresponding U.S. Appl. No. 17/836,872.
Abiteboul, et al, "A Rule-based Language for Web Data Management," ACM, pp. 293-304 (Year: 2011).
Bellini, et al, "A Distributed Environment for Automatic Multimedia Content Production based on Grid," IEEE, pp. 1-9 (Year: 2005).
Hammer, Eran et al., "The OAuth 2.0 Authorization Framework; draft-ietf-oauth-v2-26," Internet Engineering Task Force, IETF; StandardWorkingDraft, Internet Society (ISOC) 4, Rue Des Falaises CH—1205 Geneva, Switzerland, Jun. 8, 2012 (Jun. 8, 2012), pp. 1-71, XP015083227, [retrieved on Jun. 8, 2012] the whole document.
Invitation to Pay Additional Fees, dated May 2, 2023, from corresponding International Application No. PCT/US2023/011446.
Office Action, dated Jun. 27, 2023, from corresponding U.S. Appl. No. 17/738,448.
Van Kleek, et al, "Carpe Data: Supporting Serendipitous Data Integration in Personal Information Management", ACM, pp. 2339-2348 (Year: 2013).
International Search Report, dated Aug. 9, 2023, from corresponding International Application No. PCT/US2023/011446.
Written Opinion of the International Searching Authority, dated Aug. 9, 2023, from corresponding International Application No. PCT/US2023/011446.

* cited by examiner

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

ACME CORPORATION

Data Response

Dear Allison,

The request submitted cannot be collected as no data regarding the Data Subject is maintained by *mycompany* any longer Here are the details of your request:

Request ID: 5
Date Submitted: 2/21/2017 10:35AM EST
I am a(n): Employee
My request involves: Restrict
**First Name*:** Allison
**Last Name*:** Smith
**Email Address*:** asmith123456789@gmail.com
Telephone: XXXXXXXXX
Addr Line 1: XXXXXXXXXX
Addr Line 2: XXXXXXXXXX
City: XXXXXXXXXX
**Count of Residence*:** XXXXXXXXXX
Details of my request:
Restrict my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 24

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

ACME CORPORATION

Data Response

Dear Allison,

Due to the complexity of this request, the response has been delayed

If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 28

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is Completed*

ACME CORPORATION

Data Response

Dear Joe,

Your privacy-related request has been completed. In order to access the data you requested, please click the secure link below.

http://www.securelink.onetrust.com/1124ahawlu091284

If you have any questions regarding your submission, please contact *Amelia Davis* via email or phone:
adavis09876@ACME.com
+00 123 123 9980

Here are the details of your request:

Request ID: 5
Date Submitted: 2/21/2017 10:35AM EST
I am a(n): Customer
My request involves: Opting Out
**First Name*:** Joe
**Last Name*:** Lopez
**Email Address*:** Jlopez123456789@gmail.com
Telephone: XXXXXXXXX
Addr Line 1: XXXXXXXXXX
Addr Line 2: XXXXXXXXXX
City: XXXXXXXXXX
**Count of Residence*:** XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 35

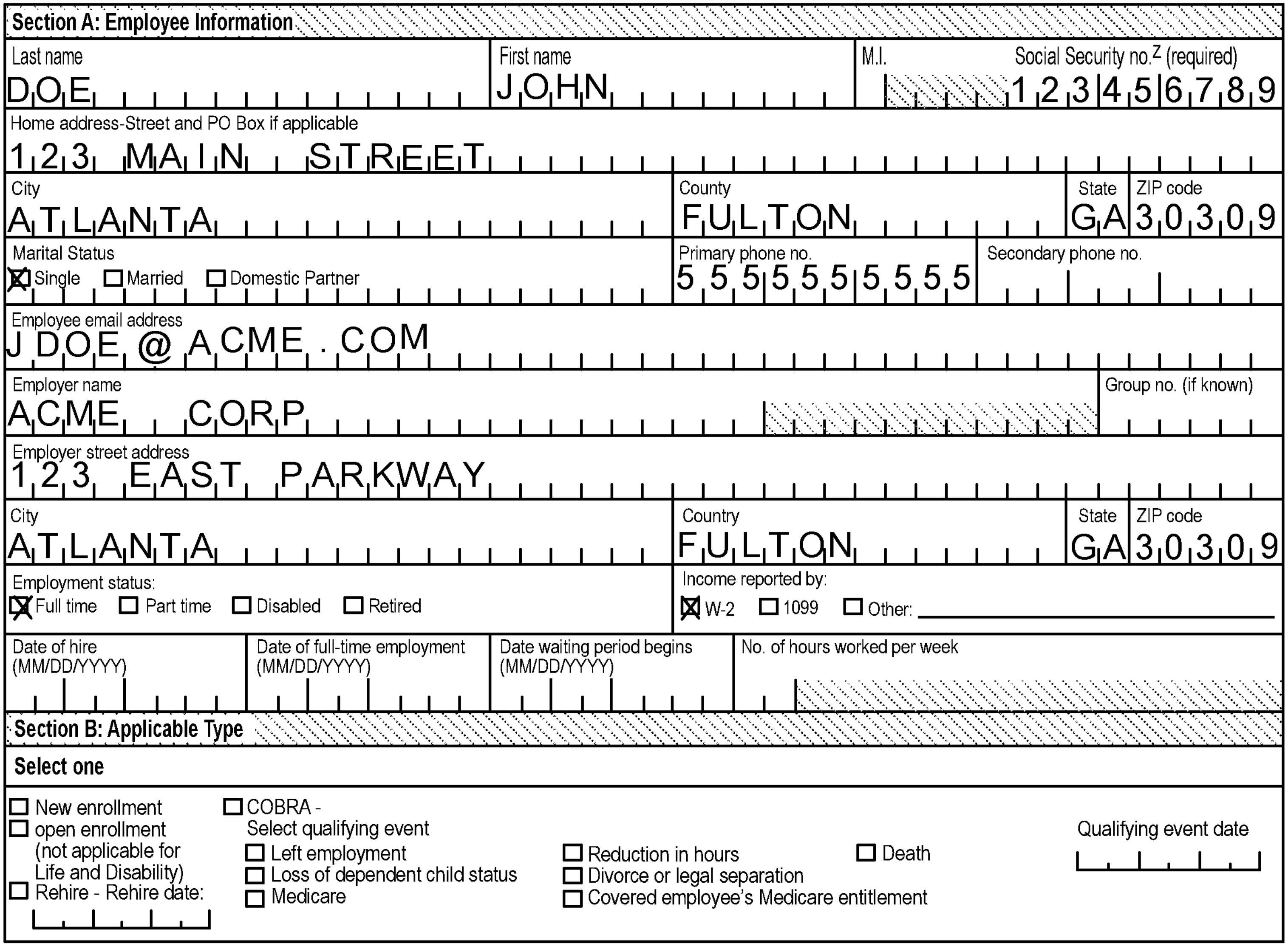

Section A: Employee Information

| | | | |
|---|---|---|---|
| Last name: DOE | First name: JOHN | M.I. | Social Security no.[2] (required): 123 45 6789 |
| Home address-Street and PO Box if applicable: 123 MAIN STREET | | | |
| City: ATLANTA | County: FULTON | State: GA | ZIP code: 30309 |
| Marital Status: ☒ Single ☐ Married ☐ Domestic Partner | Primary phone no.: 555 555 5555 | Secondary phone no. | |
| Employee email address: JDOE@ACME.COM | | | |
| Employer name: ACME CORP | Group no. (if known) | | |
| Employer street address: 123 EAST PARKWAY | | | |
| City: ATLANTA | Country: FULTON | State: GA | ZIP code: 30309 |
| Employment status: ☒ Full time ☐ Part time ☐ Disabled ☐ Retired | Income reported by: ☒ W-2 ☐ 1099 ☐ Other: | | |
| Date of hire (MM/DD/YYYY) | Date of full-time employment (MM/DD/YYYY) | Date waiting period begins (MM/DD/YYYY) | No. of hours worked per week |

Section B: Applicable Type

Select one

☐ New enrollment
☐ open enrollment (not applicable for Life and Disability)
☐ Rehire - Rehire date:

☐ COBRA - Select qualifying event
☐ Left employment
☐ Loss of dependent child status
☐ Medicare
☐ Reduction in hours
☐ Divorce or legal separation
☐ Covered employee's Medicare entitlement
☐ Death Qualifying event date 1 A small group must have at least one eligible employee, in addition to the bussiness owner. A spouse cannot be the only eligible employee.
2 Blue Cross and Blue Shield of Georga ist required by the Internal Revenue Service to collect this information.

FIG. 56

Scenario #1: User Uploads PDF

- The system completes the categorization and classification

Scenario #1: User Uplods PDF

- The system maps values to the now defined structure.

| Value | Object |
|---|---|
| John | First Name |
| Doe | Last Name |
| 123456789 | Social Security No. |
| 123 Main Street | Address |
| Atlanta | City |
| Fulton | County |
| GA | State |
| 30309 | Zip Code |
| Single | Marital Status |
| 5555555555 | Primary Phone Number |
| Jdoe@acme.com | Employee Email Address |
| Acme Corp | Employer Name |
| 123 East Parkway | Employer Street Address |
| Atlanta | City |
| Fulton | County |
| GA | State |
| 30309 | Zip Code |
| Full Time | Employment Status |
| W-2 | Employment Reported by |

FIG. 61

- The system created groupings are added

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employer Email Address | Employee Information |
| Acme Corp | Employer Name | Employer |
| 123 East Parkway | Employee Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

- Additional potential mappings are also included

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

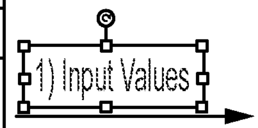

FIG. 62

| Data Element | Data Category | Classification |
|---|---|---|
| Contact details | Contact Information | PII |
| Home Address | Contact Information | PII |
| Phone Numbers | Contact Information | PII |
| Details / description of role | Employment Information | PII |
| Employer Identification Number | Employment Information | Sensitive Personal Data |
| 1-9 Forms | Employment Information | Sensitive Personal Data |
| Job status - full time / part time | Employment Information | PII |
| Office location | Employment Information | PII |
| Salary / wage | Employment Information | |
| Start date | Employment Information | |
| Tax Identification Number | Government Identifiers | Sensitive Personal Data |
| Health insurance details | Personal Health Information | Sensitive Personal Data |
| Health Plan Account Number | Personal Health Information | Sensitive Personal Data |
| Date of Birth | Personal Identification | PII |
| First Name | Personal Identification | Partial PII |
| Full Name | Personal Identification | PII |
| Last Name | Personal Identification | PII |
| Gender | Personal Identification | Partial PII |
| Marital Status | Personal Identification | Personal Data |
| Account Number | User Account Information | Sensitive Personal Data |

2) Database of Personal Data classification

FIG. 62 CONT.

3) Mapping Results

| Value | Object | Context | Category | Classification | Confidence | Score |
|---|---|---|---|---|---|---|
| Employee Information | Context | | | | | |
| John | First Name | Employee Information | Personal Identification | Partial PII | 70% | 2 |
| Doe | Last Name | Employee Information | Personal Identification | Partial PII | 70% | 2 |
| John Doe | Full Name | Employee Information | Personal Identification | PII | 80% | 6 |
| 123456789 | Social Security No | Employee Information | Personal Identification | Sensitive PII | 90% | 9 |
| 123456789 | Tax Identification Number | Employee Information | Personal Identification | Sensitive PII | 30% | 9 |
| 123456789 | Account Number | Employee Information | Personal Identification | Sensitive PII | 30% | 9 |
| 123 Main Street | Address | Employee Information | Location | Partial PII | 80% | 2 |
| Atlanta | City | Employee Information | Location | Partial PII | 80% | 2 |
| Fulton | County | Employee Information | Location | Partial PII | 80% | 2 |
| GA | State | Employee Information | Location | Partial PII | 80% | 2 |
| 30309 | Zip Code | Employee Information | Location | Partial PII | 80% | 2 |
| Single | Marital Status | Employee Information | Marital Status | Sensitive PII | 90% | 6 |
| 5555555555 | Primary Phone Number | Employee Information | Contact | PII | 60% | 5 |
| Jdoe@acme.com | Employer Email Address | Employee Information | Contact | Partial PII | 90% | 1 |
| Acme Corp | Employer Name | Employer | Entity Name | Partial PII | 90% | 1 |
| 123 East Parkway | Employee Street Address | Employer | Location | Non-PII | 90% | 0 |
| Atlanta | City | Employer | Location | Non-PII | 80% | 0 |
| Fulton | County | Employer | Location | Non-PII | 80% | 0 |
| GA | State | Employer | Location | Non-PII | 80% | 0 |
| 30309 | Zip Code | Employer | Location | Non-PII | 80% | 0 |
| Full Time | Employment Status | Employment | Employment Status | Sensitive PII | 90% | 7 |

4) Finalized Document Results
Document Score = 45
Document Category = Sensitive

FIG. 62 CONT.

DATA PROCESSING SYSTEMS AND METHODS FOR AUTOMATICALLY PROTECTING SENSITIVE DATA WITHIN PRIVACY MANAGEMENT SYSTEMS

CROSS REFERENCE TO RELATED APPLICATIONS

This application is a continuation of U.S. patent application Ser. No. 17/499,595, filed Oct. 12, 2021, which is a continuation-in-part of U.S. patent application Ser. No. 17/198,581, filed Mar. 11, 2021, now U.S. Pat. No. 11,144,675, which claims priority from U.S. Provisional Patent Application Ser. No. 62/988,445, filed Mar. 12, 2020, and is also a continuation-in-part of U.S. patent application Ser. No. 17/068,557, filed Oct. 12, 2020, now U.S. Pat. No. 10,963,591, issued Mar. 30, 2021, which is a continuation of U.S. patent application Ser. No. 16/813,321, filed Mar. 9, 2020, now U.S. Pat. No. 10,803,202, issued Oct. 13, 2020, which is a continuation of U.S. patent application Ser. No. 16/563,735, filed Sep. 6, 2019, now U.S. Pat. No. 10,586,075, issued Mar. 10, 2020, which claims priority from U.S. Provisional Patent Application Ser. No. 62/728,435, filed Sep. 7, 2018. The disclosures of all of the above patent applications are hereby incorporated herein by reference in their entirety.

BACKGROUND

Computing tools for managing sensitive data, such as data storage systems and their associated applications for modifying or accessing stored data, are often used to automatically process requests regarding how that particular data is handled. For instance, processing such requests may require these computing tools to search multiple data assets that use a variety of different data structures, storage formats, or software architectures in order to identify and action requests to access personal data, delete or otherwise modify personal data, receive information about the handling, storage, and/or processing of personal data, etc. The efficiency of processing such requests using these computing tools can be challenging when also maintaining the security of the data sources and data that is the subject of such requests. Devoting resources to processing such data without maintaining security of the data can risk exposure of sensitive data to breach or loss.

SUMMARY

In various aspects, a method is provided that comprises: receiving, by computing hardware associated with an entity, a data subject access request associated with a data subject; responsive to receiving the data subject access request, determining, by the computing hardware and based on the data subject access request, a data source from which data associated with the data subject is to be acquired, wherein the data source is not operated by the entity; retrieving, by the computing hardware using metadata, a credential used for accessing the data source from data storage associated with the entity, wherein the metadata maps the credential to the data source; acquiring, by the computing hardware using the credential, the data associated with the data subject from the data storage; processing, by the computing hardware, the data subject access request using the data associated with the data subject from the data storage; and subsequent to processing the data subject access request: identifying, by the computing hardware, that the credential is invalid; and responsive to determining that the credential is invalid, deleting, by the computing hardware, the credential from the data storage and the metadata mapping the credential to the data source to prevent the computing hardware from acquiring further data from the data source.

In some aspects, the method further comprises, after deleting the credential and the metadata: submitting, by the computing hardware, a notification requesting a second credential to access the data source; receiving, by the computing hardware and based on the notification, the second credential; and responsive to receiving the second credential: generating, by the computing hardware, second metadata mapping the second credential to the data source; and storing the second credential in the data storage so that the computing hardware can use the second credential to acquire the further data from the data source. In some aspects, the method further comprises determining, by the computing hardware and based on a data map, an availability of the credential, wherein the data map defines the availability of the credential for the data source. In some aspects, the method further comprises determining, by the computing hardware, that the credential is valid prior to acquiring the data associated with the data subject from the data storage.

In some aspects, determining the data source from which the data associated with the data subject is to be acquired is based on criteria associated with the data subject access request that identifies at least one of a type for the data subject, a type for the data subject access request, or a type for the data. In some aspects, the credential employs at least one of a username and password combination, a public/private key system, or multi-factor authentication in accessing the data source. In some aspects, the data comprises personal data of the data subject.

According to various aspects, a system is provided that comprises a non-transitory computer-readable medium storing instructions and a processing device communicatively coupled to the non-transitory computer-readable medium, wherein the system is associated with an entity. The processing device is configured to execute the instructions and thereby perform operations comprising: receiving a data subject access request associated with a data subject; responsive to receiving the data subject access request, determining, based on the data subject access request, a data source from which data associated with the data subject is to be acquired, wherein the data source is not operated by the entity; retrieving, using metadata, a credential used for accessing the data source from data storage associated with the entity, wherein the metadata maps the credential to the data source; acquiring, using the credential, the data associated with the data subject from the data storage; processing the data subject access request using the data associated with the data subject from the data storage; and subsequent to processing the data subject access request: identifying that the credential is invalid; and responsive to determining that the credential is invalid, preventing further use of the credential to acquire further data from the data source.

In some aspects, preventing further use of the credential comprises deleting the credential from the data storage and the metadata mapping the credential to the data source. In some aspects, preventing further use of the credential comprises modifying a validity status of the credential to indicate the credential is invalid.

In some aspects, the operations further comprise, after preventing further use of the credential: submitting a notification requesting a second credential to access the data source; receiving, based on the notification, the second credential; and responsive to receiving the second credential: generating second metadata mapping the second credential to the data source; and storing the second credential in the data storage so that the system can use the second credential to acquire the further data from the data source. In some aspects, the operations further comprise determining, based on a data map, an availability of the credential, the data map defining the availability of the credential for the data source. In some aspects, the operations further comprise determining that the credential is valid prior to acquiring the data associated with the data subject from the data storage. In some aspects, determining the data source from which the data associated with the data subject is to be acquired is based on criteria associated with the data subject access request that identifies at least one of a type for the data subject, a type for the data subject access request, or a type for the data.

According to various aspects, a non-transitory computer-readable medium having program code that is stored thereon is provided. The program code is executable by one or more processing devices for performing operations comprising: determining, based on a processing activity to be performed by an entity, a data source from which data associated with the processing activity is to be acquired, wherein the data source is not operated by the entity; retrieving, using metadata, a credential used for accessing the data source from data storage associated with the entity, wherein the metadata maps the credential to the data source; acquiring, using the credential, the data from the data storage; performing the processing activity using the data from the data storage; and subsequent to performing the processing activity: identifying that the credential is invalid; and responsive to determining that the credential is invalid, preventing further use of the credential to acquire further data from the data source.

In some aspects, preventing further use of the credential comprises deleting the credential from the data storage and the metadata mapping the credential to the data source. In some aspects, preventing further use of the credential comprises modifying a validity status of the credential to indicate the credential is invalid.

In some aspects, the operations further comprise, after preventing further use of the credential: submitting a notification requesting a second credential to access the data source; receiving, based on the notification, the second credential; and responsive to receiving the second credential: generating second metadata mapping the second credential to the data source; and storing the second credential in the data storage so that the second credential can be used to acquire the further data from the data source. In some aspects, the operations further comprise determining, based on a data map, an availability of the credential, the data map defining the availability of the credential for the data source. In some aspects, the operations further comprise determining that the credential is valid prior to acquiring the data from the data storage.

BRIEF DESCRIPTION OF THE DRAWINGS

Various embodiments of a data subject access request fulfillment system are described below. In the course of this description, reference will be made to the accompanying drawings, which are not necessarily drawn to scale, and wherein:

FIGS. 3-43 are computer screen shots that demonstrate the operation of various embodiments.

FIG. 56 is a screenshot of a document from which the system described herein may be configured to automatically classify personal information.

FIG. 61 depicts a visual representation of the system mapping values into an object structure according to the classification and categorization created as shown in FIGS. 57-59.

FIG. 62 depicts a visual representation of the mapped results of an automatic classification of personal information in a document described herein.

DETAILED DESCRIPTION

Figure 1:
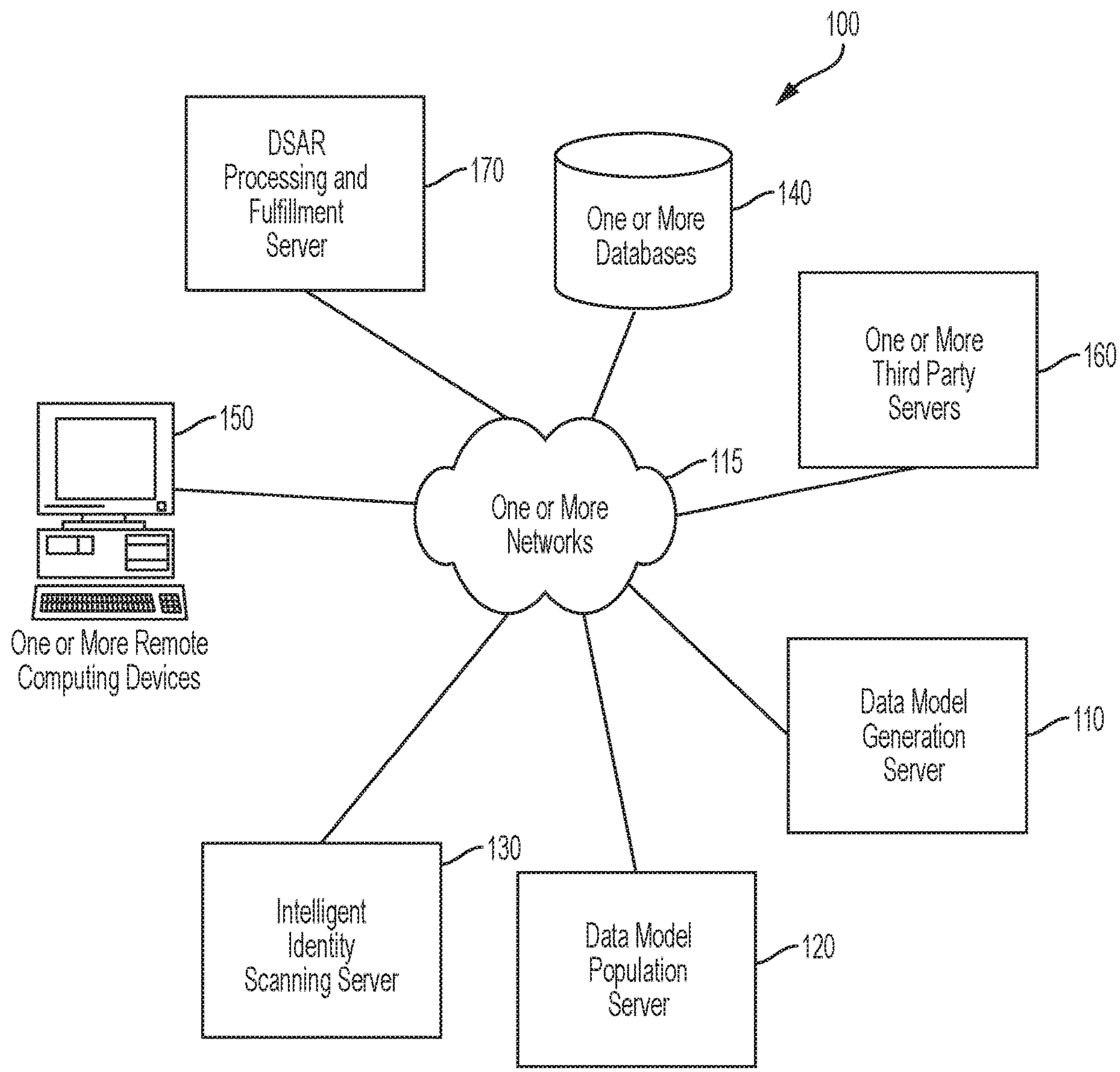
FIG. 1 depicts a data subject request processing and fulfillment system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Ticket management systems, according to various embodiments, are adapted to receive data subject access requests (DSAR's) from particular data subjects, and to facilitate the timely processing of valid DSAR's by an appropriate respondent. In particular embodiments, the ticket management system receives DSAR's via one or more webforms that each may, for example, respectively be accessed via an appropriate link/button on a respective web page. In other embodiments, the system may receive DSAR's through any other suitable mechanism, such as via a computer software application (e.g., a messaging application such as Slack, Twitter), via a chat bot, via generic API input from another system, or through entry by a representative who may receive the information, for example, via suitable paper forms or over the phone.

The ticket management system may include a webform creation tool that is adapted to allow a user to create customized webforms for receiving DSAR's from various different data subject types and for routing the requests to appropriate individuals for processing. The webform creation tool may, for example, allow the user to specify the language that the form will be displayed in, what particular information is to be requested from the data subject and/or provided by the data subject, who any DSAR's that are received via the webform will be routed to, etc. In particular embodiments, after the user completes their design of the webform, the webform creation tool generates code for the webform that may be cut and then pasted into a particular web page.

The system may be further adapted to facilitate processing of DSAR's that are received via the webforms, or any other suitable mechanism. For example, the ticket management system may be adapted to execute one or more of the following steps for each particular DSAR received via the webforms (or other suitable mechanism) described above: (1) before processing the DSAR, confirm that the DSAR was actually submitted by the particular data subject of the DSAR (or, for example, by an individual authorized to make the DSAR on the data subject's behalf, such as a parent, guardian, power-of-attorney holder, etc.)—any suitable method may be used to confirm the identity of the entity/individual submitting the DSAR—for example, if the system receives the DSAR via a third-party computer system, the system may validate authentication via API secret, or by requiring a copy of one or more particular legal documents (e.g., a particular contract between two particular entities)—the system may validate the identity of an individual by, for example, requiring the individual (e.g., data subject) to provide particular account credentials, by requiring the individual to provide particular out-of-wallet information, through biometric scanning of the individual (e.g., finger or retinal scan), or via any other suitable identity verification technique; (2) if the DSAR was not submitted by the particular data subject, deny the request; (3) if the DSAR was submitted by the particular data subject, advance the processing of the DSAR; (4) route the DSAR to the correct individual(s) or groups internally for handling; (5) facilitate the assignment of the DSAR to one or more other individuals for handling of one or more portions of the DSAR; (6) facilitate the suspension of processing of the data subject's data by the organization; and/or (7) change the policy according to which the data subject's personal data is retained and/or processed by the system. In particular embodiments, the system may perform any one or more of the above steps automatically. The system then generates a receipt for the DSAR request that the user can use as a transactional record of their submitted request.

In particular embodiments, the ticket management system may be adapted to generate a graphical user interface (e.g., a DSAR request-processing dashboard) that is adapted to allow a user (e.g., a privacy officer of an organization that is receiving the DSAR) to monitor the progress of any of the DSAR requests. The GUI interface may display, for each DSAR, for example, an indication of how much time is left (e.g., quantified in days and/or hours) before a legal and/or internal deadline to fulfill the request. The system may also display, for each DSAR, a respective user-selectable indicium that, when selected, may facilitate one or more of the following: (1) verification of the request; (2) assignment of the request to another individual; (3) requesting an extension to fulfill the request; (4) rejection of the request; or (5) suspension of the request.

As noted immediately above, and elsewhere in this application, in particular embodiments, any one or more of the above steps may be executed by the system automatically. As a particular example, the system may be adapted to automatically verify the identity of the DSAR requestor and then automatically fulfill the DSAR request by, for example, obtaining the requested information via a suitable data model and communicating the information to the requestor. As another particular example, the system may be configured to automatically route the DSAR to the correct individual for handling based at least in part on one or more pieces of information provided (e.g., in the webform).

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request; (2) the location from which the request is being made; (3) the country of residency of the data subject and, for example, that county's tolerance for enforcing DSAR violations; (4) current sensitivities to world events; (5) a status of the requestor (e.g., especially loyal customer); or (6) any other suitable metadata.

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, the organization or entity may not have or may no longer have a legal basis to continue to store the data. As such, organizations and entities may require improved systems and methods to identify such orphaned data, and take corrective action, if necessary (e.g., to ensure that the organization may not be in violation of one or more legal or industry regulations).

In various embodiments, an orphaned personal data identification system may be configured to generate a data model (e.g., one or more data models) that maps one or more relationships between and/or among a plurality of data assets utilized by a corporation or other entity (e.g., individual, organization, etc.) in the context, for example, of one or more business processes or processing activities. In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities.

In various embodiments, the system may analyze the data model to identify personal data that has been collected and stored using one or more computer systems operated and/or utilized by a particular organization where the personal data is not currently being used as part of any privacy campaigns, processing activities, etc. undertaken by the particular organization. This data may be described as orphaned data. In some circumstances, the particular organization may be exposed to an increased risk that the data may be accessed by a third party (e.g., cybercrime) or that the particular organization may not be in compliance with one or more legal or industry requirements related to the collection, storage, and/or processing of this orphaned data.

Additionally, in some implementations, in response to the termination of a particular privacy campaign, processing activity, (e.g., manually or automatically), the system may be configured to analyze the data model to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.).

In additional implementations in response to determining that a particular privacy campaign, processing activity, etc. has not been utilized for a period of time (e.g., a day, month, year), the system may be configured to terminate the particular privacy campaign, processing activity, etc. or prompt one or more individuals associated with the particular organization to indicate whether the particular privacy campaign, processing activity, etc. should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

When the particular privacy campaign, processing activity, etc. is terminated or otherwise discontinued, the system may use the data model to determine if any of the associated personal data that has been collected and stored by the particular organization is now orphaned data.

In various embodiments, the system may be configured to identify orphaned data of a particular organization and automatically delete the data. In some implementations, in response to identifying the orphaned data, the system may present the data to one or more individuals associated with the particular organization (e.g., a privacy officer) and prompt the one or more individuals to indicate why the orphaned data is being stored by the particular organization. The system may then enable the individual to provide one or more valid reasons for the data's continued storage or enable the one or more individuals to delete the particular orphaned data. In some embodiments, the system may automatically delete the orphaned data if, for example: (1) in response to determining that a reason provided by the individual is not a sufficient basis for the continued storage of the personal data; (2) the individual does not respond to the request to provide one or more valid reasons in a timely manner; (3) etc. In some embodiments, one or more other individuals may review the response provided indicating why the orphaned data is being stored, and in some embodiments, the one or more other individuals can delete the particular orphaned data.

In various embodiments, the system may be configured to review the data collection policy (e.g., how data is acquired, security of data storage, who can access the data, etc.) for the particular organization as well as one or more data retention metrics for the organization. For example, the one or more data retention metrics may include how much personal data is being collected, how long the data is held, how many privacy campaigns or other processes are using the personal data, etc. Additionally, the system may compare the particular organization's data collection policy and data retention metrics to the industry standards (e.g., in a particular field, based on a company size, etc.). In various embodiments, the system may be configured to generate a report that includes the comparison and provide the report to the particular organization (e.g., in electronic format).

In particular embodiments, the system may be configured advise the particular organization to delete data and identify particular data that should be deleted. In some embodiments, the system may automatically delete particular data (e.g., orphaned data). Further, the system may be configured to calculate and provide a risk score for particular data or the organization's data collection policy overall. In particular embodiments, the system may be configured to calculate the risk score based on the combinations of personal data elements in the data inventory of the organization (e.g., where an individual's phone number is stored in one location and their mailing address is stored in another location), and as such the risk may be increased because the additional pieces of personal information can make the stored data more sensitive.

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, such data may not have or may no longer have a legal basis for the organization or entity to continue to store the data. As such, organizations and entities may require improved systems and methods to maintain an inventory of data assets utilized to process and/or store personal data for which a data subject has provided consent for such storage and/or processing.

In various embodiments, the system is configured to provide a third-party data repository system to facilitate the receipt and centralized storage of personal data for each of a plurality of respective data subjects, as described herein. Additionally, the third-party data repository system is configured to interface with a centralized consent receipt management system.

In particular embodiments, the system may be configured to use one or more website scanning tools to, for example, identify a form (e.g., a webform) and locate a data asset where the input data is transmitted (e.g., Salesforce). Additionally, the system may be configured to add the data asset to the third-party data repository (e.g., and/or data map/data inventory) with a link to the form. In response to a user inputting form data (e.g., name, address, credit card information, etc.) of the form and submitting the form, the system may, based on the link to the form, create a unique subject identifier to submit to the third-party data repository and, along with the form data, to the data asset. Further, the system may use the unique subject identifier of a user to access and update each of the data assets of the particular organization. For example, in response to a user submitting a data subject access request to delete the user's personal data that the particular organization has stored, the system may use the unique subject identifier of the user to access and delete the user's personal data stored in all of the data assets (e.g., Salesforce, Eloqua, Marketo, etc.) utilized by the particular organization.

The system may, for example: (1) generate, for each of a plurality of data subjects, a respective unique subject identifier in response to submission, by each data subject, of a particular form; (2) maintain a database of each respective unique subject identifier; and (3) electronically link each respective unique subject identifier to each of: (A) a form initially submitted by the user; and (B) one or more data assets that utilize data received from the data subject via the form.

In various embodiments, the system may be configured to, for example: (1) identify a form used to collect one or more pieces of personal data, (2) determine a data asset of a plurality of data assets of the organization where input data of the form is transmitted, (3) add the data asset to the third-party data repository with an electronic link to the form, (4) in response to a user submitting the form, create a unique subject identifier to submit to the third-party data repository and, along with the form data provided by the user in the form, to the data asset, (5) submit the unique subject identifier and the form data provided by the user in the form to the third-party data repository and the data asset, and (6) digitally store the unique subject identifier and the form data provided by the user in the form in the third-party data repository and the data asset.

In some embodiments, the system may be further configured to, for example: (1) receive a data subject access request from the user (e.g., a data subject rights' request, a data subject deletion request, etc.), (2) access the third-party data repository to identify the unique subject identifier of the user, (3) determine which data assets of the plurality of data assets of the organization include the unique subject identifier, (4) access personal data of the user stored in each of the data assets of the plurality of data assets of the organization that include the unique subject identifier, and (5) take one or more actions based on the data subject access request (e.g., delete the accessed personal data in response to a data subject deletion request).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an entity. In particular, under various privacy and security policies, a data subject may be entitled to a right to erasure of any personal data associated with that data subject that has been at least temporarily stored by the entity (e.g., a right to be forgotten). In various embodiments, under the right to erasure, an entity (e.g., a data controller on behalf of another organization) may be obligated to erase personal data without undue delay under one or more of the following conditions: (1) the personal data is no longer necessary in relation to a purpose for which the data was originally collected or otherwise processed; (2) the data subject has withdrawn consent on which the processing of the personal data is based (e.g., and there is no other legal grounds for such processing); (3) the personal data has been unlawfully processed; (4) the data subject has objected to the processing and there is no overriding legitimate grounds for the processing of the data by the entity; and/or (5) for any other suitable reason or under any other suitable conditions.

In particular embodiments, a personal data deletion system may be configured to: (1) at least partially automatically identify and delete personal data that an entity is required to erase under one or more of the conditions discussed above; and (2) perform one or more data tests after the deletion to confirm that the system has, in fact, deleted any personal data associated with the data subject.

In particular embodiments, in response to a data subject submitting a request to delete their personal data from an entity's systems, the system may, for example: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., deleting a directory entry associated with the data); and/or (3) using any other suitable technique for deleting the personal data. In particular embodiments, as part of this process, the system may use any suitable data modelling technique to efficiently determine where all of the data subject's personal data is stored.

In various embodiments, the system may be configured to store (e.g., in memory) an indication that the data subject has requested to delete any of their personal data stored by the entity has been processed. Under various legal and industry policies/standards, the entity may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving of an indication that the deletion request for the data subject's personal data has been processed or the certain period of time (described above) has passed, the system may be configured to perform a data test to confirm the deletion of the data subject's personal data.

In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not provide any contact data. In response to submitting the interaction request (e.g., submitting the webform), the system may be configured to determine whether the one or more computers systems have generated and/or transmitted a response to the data subject. The system may be configured to determine whether the one or more computers systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

In response to determining that the one or more computer systems has generated and/or transmitted the response to the data subject, the system may be configured to determine that the one or more computer systems has not complied with the data subject's request for deletion of their personal data from the one or more computers systems associated with the entity. In response, the system may generate an indication that the one or more computer systems has not complied with the data subject's request for deletion of their personal data from the one or more computers systems have, and store the indication in computer memory.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computer systems (e.g., automatically). In response to determining that the data subject has been contacted following submission of the form, the system may determine that the one or more computer systems have not fully deleted the data subject's personal data (e.g., because the one or more computer systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion, by the entity, of any personal data associated with a particular test data subject. In response to requesting the deletion of data for the particular test data subject, the system may then take one or more actions using the test profile data associated with the particular test data subjects in order to confirm that the one or more computers systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

In response to determining that the one or more computer systems have not fully deleted a data subject's (or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag for follow-up the data subject, personal data, initial request to be forgotten, etc.

The system may, for example, be configured to test to ensure the data has been deleted by: (1) submitting a unique token of data through a form to a system (e.g., mark to); (2) in response to passage of an expected data retention time, test the system by calling into the system after the passage of the data retention time to search for the unique token. In response to finding the unique token, the system may be configured to determine that the data has not been properly deleted.

In various embodiments, a system may be configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In some embodiments, when a change or update is made to one or more processing activities and/or data assets (e.g., a database associated with a particular organization), the system may use data modeling techniques to update the risk remediation data for use in facilitating an automatic assessment of and/or response to future identified risk triggers. In various embodiments, when a privacy campaign, processing activity, etc. of the particular organization is modified (e.g., add, remove, or update particular information), then the system may use the risk remediation data for use in facilitating an automatic assessment of and/or response to future identified risk triggers.

In particular embodiments, the system may, for example, be configured to: (1) access risk remediation data for an entity that identifies one or more suitable actions to remediate a risk in response to identifying one or more data assets of the entity that may be affected by one or more potential risk triggers; (2) receive an indication of an update to the one or more data assets; (3) identify one or more potential updated risk triggers for an entity; (4) assess and analyze the one or more potential updated risk triggers to determine a relevance of a risk posed to the entity by the one or more potential updated risk triggers; (5) use one or more data modeling techniques to identify one or more data assets associated with the entity that may be affected by the risk; and (6) update the risk remediation data to include the one or more actions to remediate the risk in response to identifying the one or more potential updated risk triggers.

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special-purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a data subject access request processing and fulfillment system 100 according to a particular embodiment. In various embodiments, the data subject access request processing and fulfillment system is part of a privacy compliance system (also referred to as a privacy management system), or other system, which may, for example, be associated with a particular organization and be configured to aid in compliance with one or more legal or industry regulations related to the collection and storage of personal data.

As may be understood from FIG. 1, the data subject access request processing and fulfillment system 100 includes one or more computer networks 115, a Data Model Generation Server 110, a Data Model Population Server 120, an Intelligent Identity Scanning Server 130 (which may automatically validate a DSAR requestor's identity), One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning/Verification Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160, and DSAR Processing and Fulfillment Server 170 are shown as separate servers, it should be understood that in other embodiments, the functionality of one or more of these servers and/or computing devices may, in different embodiments, be executed by a larger or smaller number of local servers, one or more cloud-based servers, or any other suitable configuration of computers.

The one or more computer networks 115 may include any of a variety of types of wired or wireless computer networks such as the Internet, a private intranet, a public switch telephone network (PSTN), or any other type of network. The communication link between the DSAR Processing and Fulfillment Server 170 and the One or More Remote Computing Devices 150 may be, for example, implemented via a Local Area Network (LAN) or via the Internet. In other embodiments, the One or More Databases 140 may be stored either fully or partially on any suitable server or combination of servers described herein.

Figure 2A:
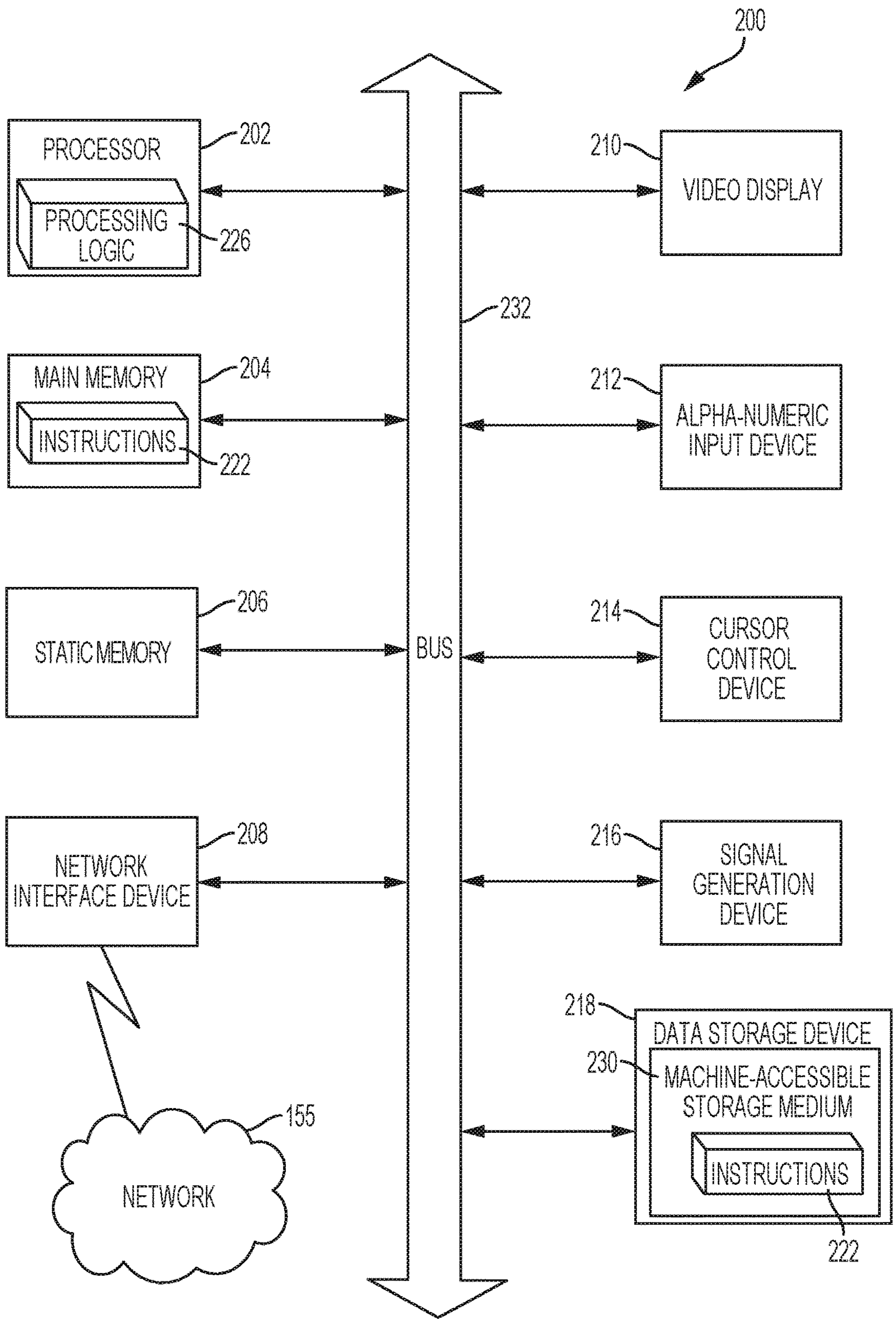
FIG. 2A is a schematic diagram of a computer (such as the data model generation server 110, or data model population server 120 of FIG. 1) that is suitable for use in various embodiments of the data subject request processing and fulfillment system shown in FIG. 1.

FIG. 2A illustrates a diagrammatic representation of a computer 200 that can be used within the data subject access request processing and fulfillment system 100, for example, as a client computer (e.g., one or more remote computing devices 150 shown in FIG. 1), or as a server computer (e.g., Data Model Generation Server 110 shown in FIG. 1). In particular embodiments, the computer 200 may be suitable for use as a computer within the context of the data subject access request processing and fulfillment system 100 that is configured for routing and/or processing DSAR requests and/or generating one or more data models used in automatically fulfilling those requests.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random-access memory (DRAM) such as synchronous DRAM (SDRAM) or Rambus DRAM (RDRAM), etc.), static memory 206 (e.g., flash memory, static random-access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The terms "computer-accessible storage medium", "computer-readable medium", and like terms should also be understood to include any medium that is capable of storing, encoding, or carrying a set of instructions for execution by the computer and that cause the computer to perform any one or more of the methodologies of the present invention. These terms should accordingly be understood to include, but not be limited to, solid-state memories, optical and magnetic media, etc.

Systems for Managing Data Subject Access Requests

In various embodiments, the system may include a ticket management system and/or other systems for managing data subject access requests. In operation, the system may use one or more computer processors, which are operatively coupled to memory, to execute one or more software modules (which may be included in the Instructions 222 referenced above) such as: (1) a DSAR Request Routing Module 1000; and (4) a DSAR Prioritization Module. An overview of the functionality and operation of each of these modules is provided below.

Data Subject Access Request Routing Module 1000

Figure 2B:
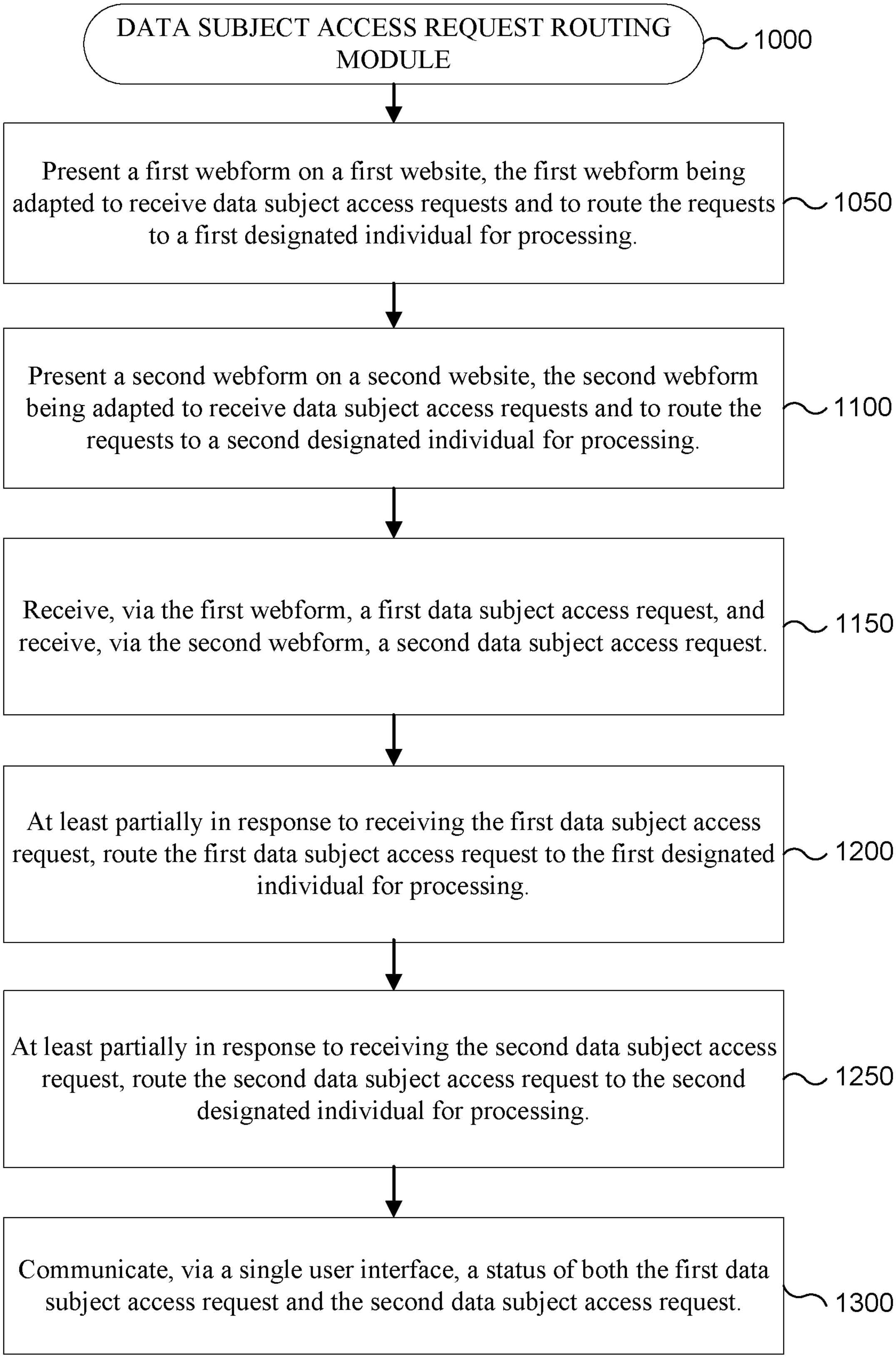
FIG. 2B is a flow chart depicting exemplary steps executed by a Data Subject Access Request Routing Module according to a particular embodiment.

As shown in FIG. 2B, a Data Subject Access Request Routing Module 1000, according to particular embodiments, is adapted for executing the steps of: (1) at Step 1050, presenting, by at least one computer processor, a first webform on a first website, the first webform being adapted to receive data subject access requests and to route the requests to a first designated individual (e.g., an individual who is associated with a first sub-organization of a particular organization—e.g., an employee of the first sub-organization) for processing (in various embodiments, "presenting a webform on a website" may comprise, for example: (A) providing a button, link, or other selectable indicium on the website that, when selected, causes the system to display the webform, or (B) displaying the webform directly on the website); (2) at Step 1100 presenting, by at least one computer processor, a second webform on a second website, the second webform being adapted to receive data subject access requests and to route the requests to a second designated individual (e.g., an individual who is associated with a second sub-organization of a particular organization—e.g., an employee of the second sub-organization) for processing; (3) at Step 1150, receiving, by at least one computer processor, via the first webform, a first data subject access request; (4) at Step 1200, at least partially in response to the receiving the first data subject access request, automatically routing the first data subject access request to the first designated individual for handling; (5) at Step 1250, at least partially in response to the receiving the second data subject access request, automatically routing the second data subject access request to the second designated individual for handling; and (6) at Step 1300, communicating, via a single user interface, a status of both the first data subject access request and the second data subject access request.

In particular embodiments: (1) the first website is a website of a first sub-organization of a particular parent organization; (2) the second website is a website of a second sub-organization of the particular parent organization; and (3) the computer-implemented method further comprises communicating, by at least one computer processor, via a single user interface, a status of each of said first data subject access request and said second data subject access request (e.g., to an employee of—e.g., privacy officer of—the parent organization). As discussed in more detail below, this single user interface may display an indication, for each respective one of the first and second data subject access requests, of a number of days remaining until a deadline for fulfilling the respective data subject access request.

In certain embodiments, the single user interface is adapted to facilitate the deletion or assignment of multiple data subject access requests to a particular individual for handling in response to a single command from a user (e.g., in response to a user first selecting multiple data subject access requests from the single user interface and then executing an assign command to assign each of the multiple requests to a particular individual for handling).

In particular embodiments, the system running the Data Subject Access Request Routing Module 1000, according to particular embodiments, may be adapted for, in response to receiving each data subject access request, generating an ID number (e.g., a transaction ID or suitable Authentication Token) for the first data subject access request, which may be used later, by the DSAR requestor, to access information related to the DSAR, such as personal information requested via the DSAR, the status of the DSAR request, etc. To facilitate this, the system may be adapted for receiving the ID number from an individual and, at least partially in response to receiving the ID number from the individual, providing the individual with information regarding status of the data subject access request and/or information previously requested via the data subject access request.

In particular embodiments, the system may be adapted to facilitate the processing of multiple different types of data subject access requests. For example, the system may be adapted to facilitate processing: (1) requests for all personal data that an organization is processing for the data subject (a copy of the personal data in a commonly used, machine-readable format); (2) requests for all such personal data to be deleted; (3) requests to update personal data that the organization is storing for the data subject; (4) requests to opt out of having the organization use the individual's personal information in one or more particular ways (e.g., per the organization's standard business practices), or otherwise change the way that the organization uses the individual's personal information; and/or (5) the filing of complaints.

In particular embodiments, the system may execute one or more steps (e.g., any suitable step or steps discussed herein) automatically. For example, the system may be adapted for: (1) receiving, from the first designated individual, a request to extend a deadline for satisfying the first data subject access request; (2) at least partially in response to receiving the extension request, automatically determining, by at least one processor, whether the requested extension complies with one or more applicable laws or internal policies; and (3) at least partially in response to determining that the requested extension complies with the one or more applicable laws or internal policies, automatically modifying the deadline, in memory, to extend the deadline according to the extension request. The system may be further adapted for, at least partially in response to determining that the requested extension does not comply with the one or more applicable laws or internal policies, automatically rejecting the extension request. In various embodiments, the system may also, or alternatively, be adapted for: (1) at least partially in response to determining that the requested extension does not comply with the one or more applicable laws or internal policies, automatically modifying the length of the requested extension to comply with the one or more applicable laws or internal policies; and (2) automatically modifying the deadline, in memory, to extend the deadline according to the extension request.

In various embodiments, the system may be adapted for: (1) automatically verifying an identity of a particular data subject access requestor placing the first data subject access request; (2) at least partially in response to verifying the identity of the particular data subject access requestor, automatically obtaining, from a particular data model, at least a portion of information requested in the first data subject access request; and (3) after obtaining the at least a portion of the requested information, displaying the obtained information to a user as part of a fulfillment of the first data subject access request. The information requested in the first data subject access request may, for example, comprise at least substantially all (e.g., most or all) of the information regarding the first data subject that is stored within the data model.

In various embodiments, the system is adapted for: (1) automatically verifying, by at least one computer processor, an identity of a particular data subject access requestor placing the first data subject access request; and (2) at least partially in response to verifying the identity of the particular data subject access requestor, automatically facilitating an update of personal data that an organization associated with the first webform is processing regarding the particular data subject access requestor.

Similarly, in particular embodiments, the system may be adapted for: (1) automatically verifying, by at least one computer processor, an identity of a particular data subject access requestor placing the first data subject access request; and (2) at least partially in response to verifying the identity of the particular data subject access requestor, automatically processing a request, made by the particular data subject access requestor, to opt out of having the organization use the particular data subject access requestor's personal information in one or more particular ways.

The system may, in various embodiments, be adapted for: (1) providing, by at least one computer processor, a webform creation tool that is adapted for receiving webform creation criteria from a particular user, the webform creation criteria comprising at least one criterion from a group consisting of: (A) a language that the form will be displayed in; (B) what information is to be requested from data subjects who use the webform to initiate a data subject access request; and (C) who any data subject access requests that are received via the webform will be routed to; and (2) executing the webform creation tool to create both the first webform and the second webform.

In light of the discussion above, although the Data Subject Access Request Routing Module 1000 is described as being adapted to, in various embodiments, route data subject access requests to particular individuals for handling, it should be understood that, in particular embodiments, this module may be adapted to process at least part of, or all of, particular data subject access requests automatically (e.g., without input from a human user). In such cases, the system may or may not route such automatically-processed requests to a designated individual for additional handling or monitoring. In particular embodiments, the system may automatically fulfill all or a portion of a particular DSAR request, automatically assign a transaction ID and/or authentication token to the automatically fulfilled transaction, and then display the completed DSAR transaction for display on a system dashboard associated with a particular responsible individual that would otherwise have been responsible for processing the DSAR request (e.g., an individual to whom the a webform receiving the DSAR would otherwise route DSAR requests). This may be helpful in allowing the human user to later track, and answer any questions about, the automatically-fulfilled DSAR request.

It should also be understood that, although the system is described, in various embodiments, as receiving DSAR requests via multiple webforms, each of which is located on a different website, the system may, in other embodiments, receive requests via only a single webform, or through any other suitable input mechanism other than a webform (e.g., through any suitable software application, request via SMS message, request via email, data transfer via a suitable API, etc.)

In various embodiments, the system may be adapted to access information needed to satisfy DSAR requests via one or more suitable data models. Such data models include those that are described in greater detail in U.S. patent application Ser. No. 15/996,208, filed Jun. 1, 2018, which, as noted above, is incorporated herein by reference. In various embodiments, the system is adapted to build and access such data models as described in this earlier-filed U.S. patent application.

As an example, in fulfilling a request to produce, modify, or delete, any of a data subject's personal information that is stored by a particular entity, the system may be adapted to access a suitable data model to identify any personal data of the data subject that is currently being stored in one or more computer systems associated with the particular entity. After using the data model to identify the data, the system may automatically process the data accordingly (e.g., by modifying or deleting it, and/or sharing it with the DSAR requestor).

DSAR Prioritization Module

A DSAR Prioritization Module, according to various embodiments, is adapted for (1) executing the steps of receiving a data subject access request; (2) at least partially in response to receiving the data subject access request, obtaining metadata regarding a data subject of the data subject access request; (3) using the metadata to determine whether a priority of the DSAR should be adjusted based on the obtained metadata; and (4) in response to determining that the priority of the DSAR should be adjusted based on the obtained metadata, adjusting the priority of the DSAR.

The operation of various embodiments of the various software modules above is described in greater detail below. It should be understood that the various steps described herein may be executed, by the system, in any suitable order and that various steps may be omitted, or other steps may be added in various embodiments.

Operation of Example Implementation

Figure 3:
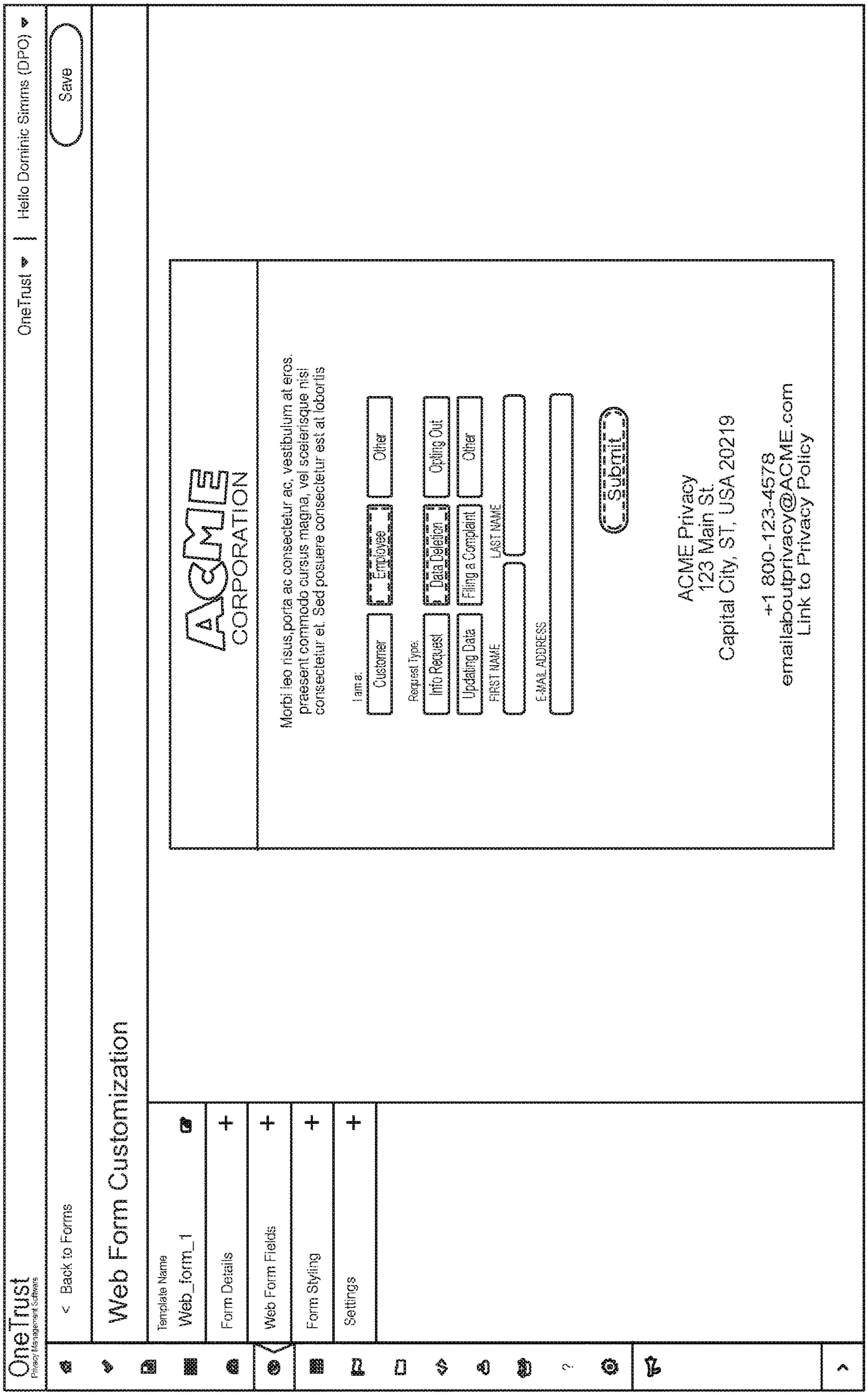
Figure 4:
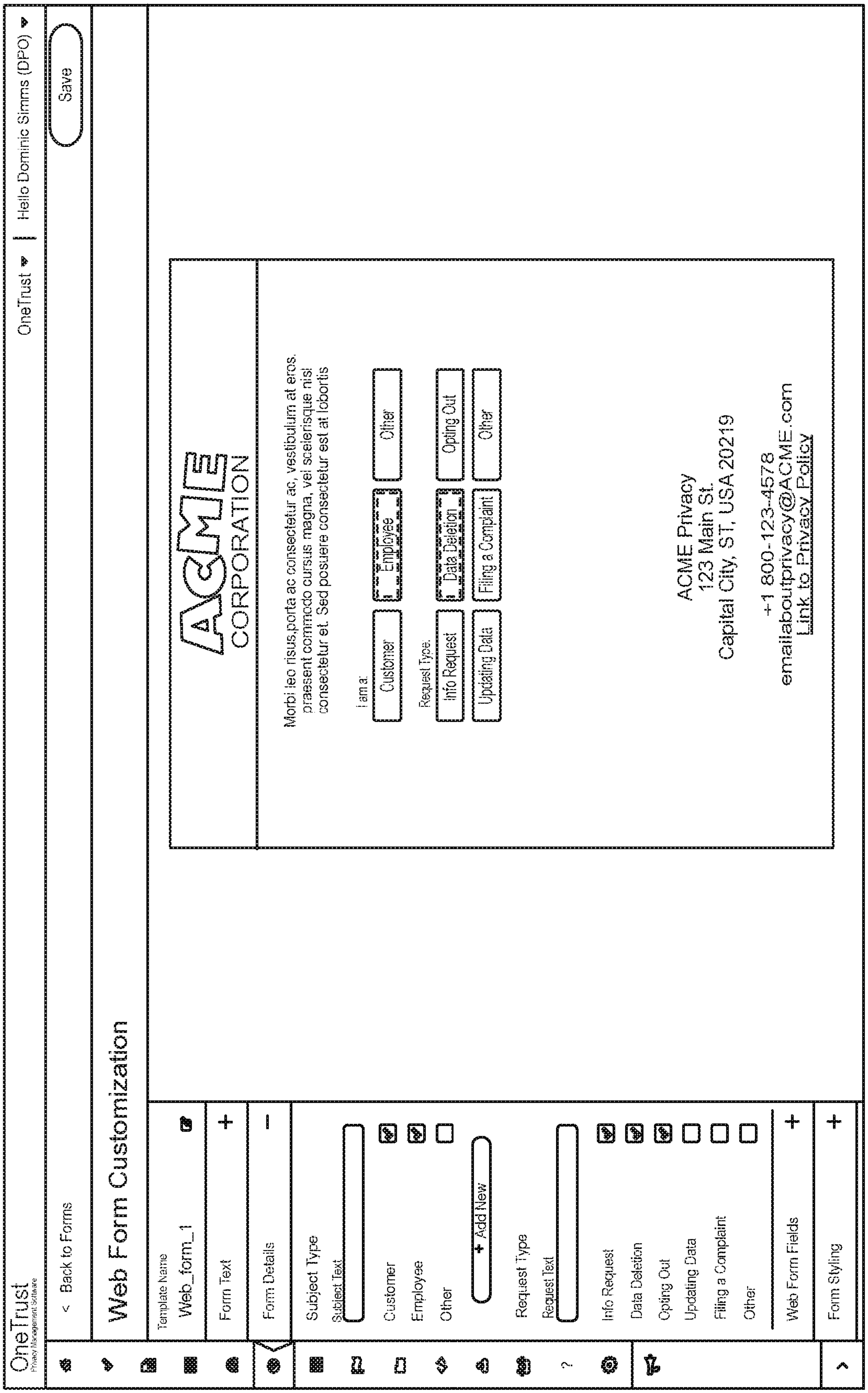
Figure 5:
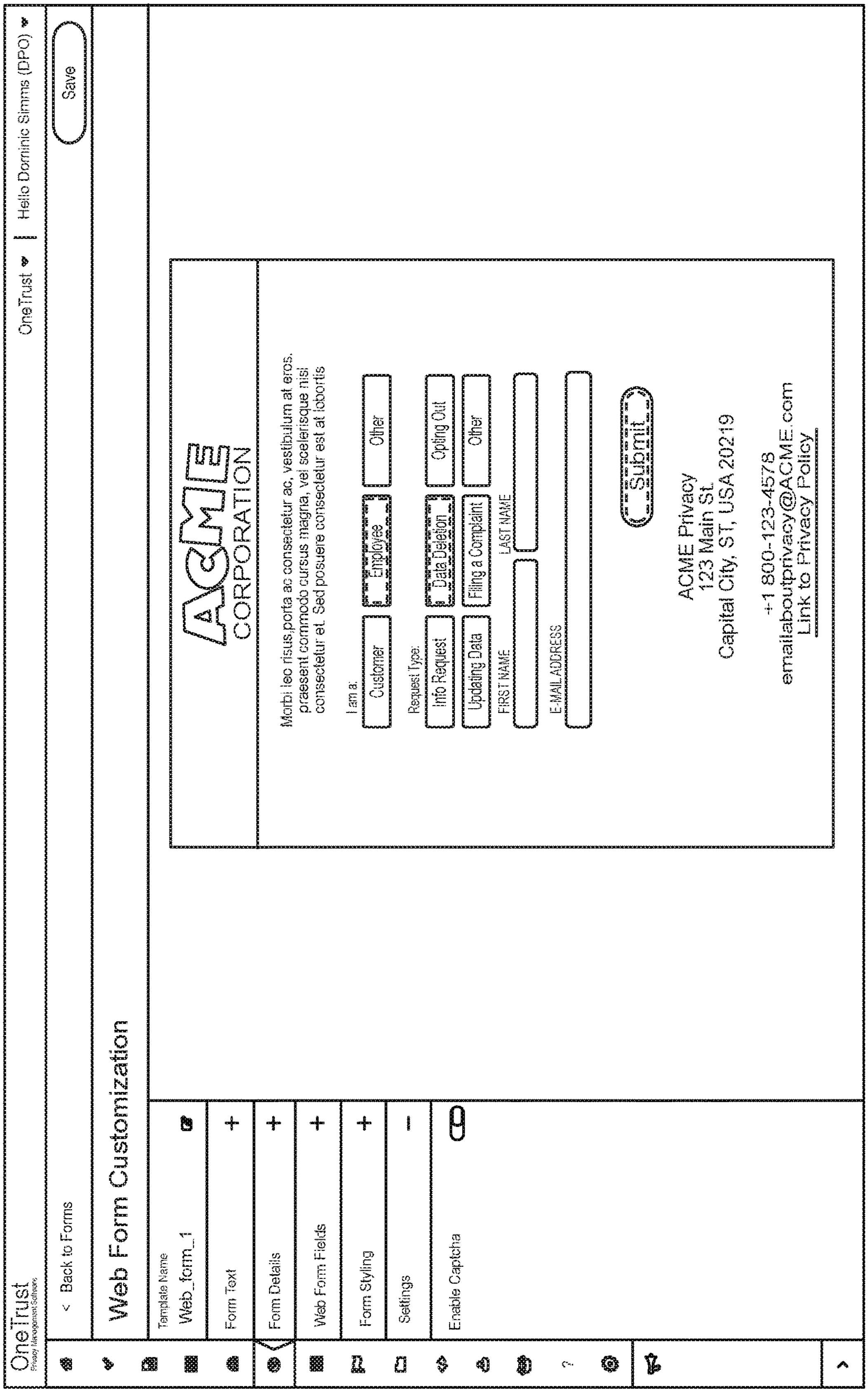
Figure 6:
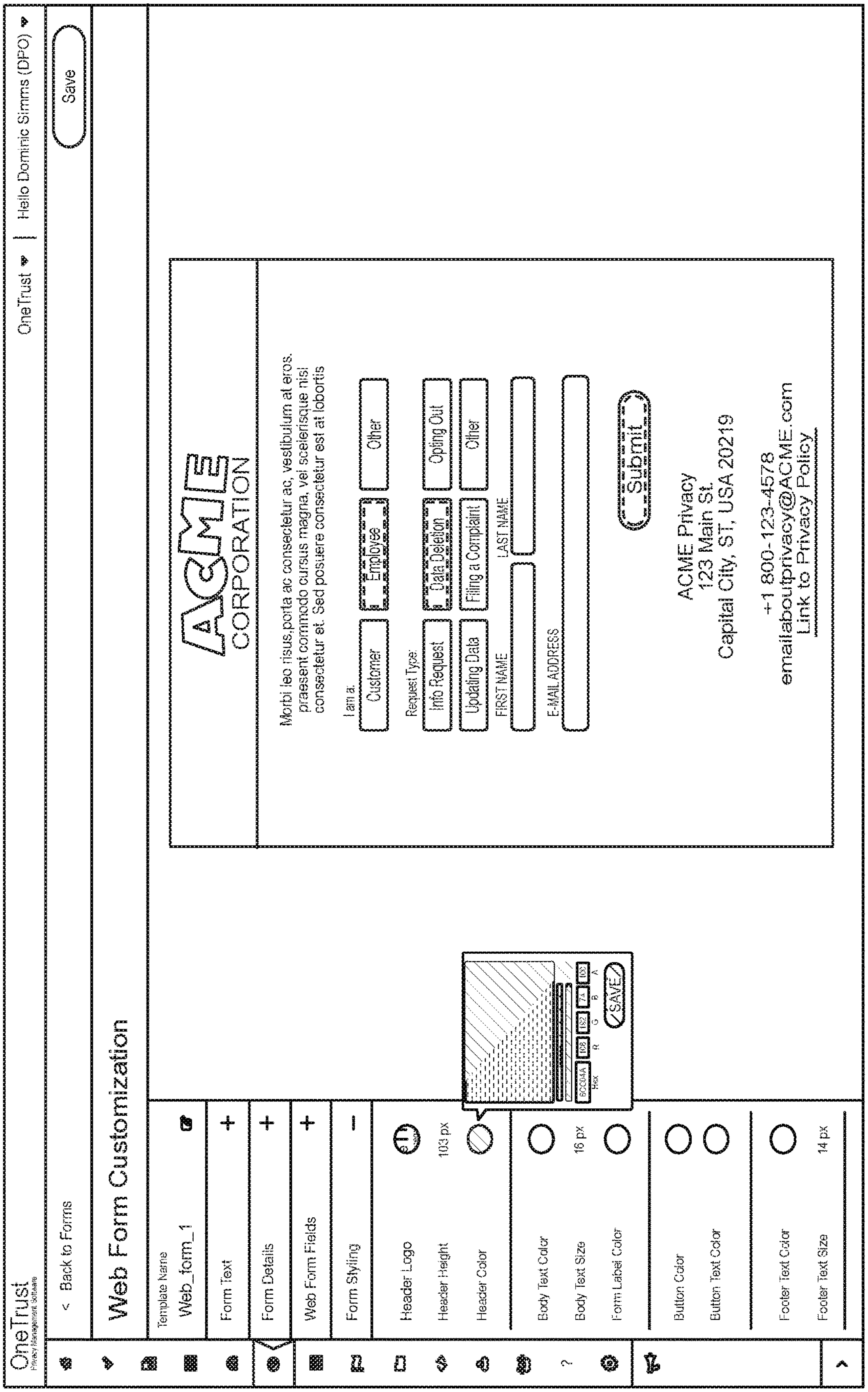

FIGS. 3-43 are screen shots that demonstrate the operation of a particular embodiment. FIGS. 3-6 show a graphical user interface (GUI) of an example webform construction tool. FIG. 3 shows a user working to design a webform called "Web_form_1". As may be understood from the vertical menu shown on the left-hand side of the screen, the webform construction tool allows users to design a webform by: (1) specifying the details of the form (via the "Form Details" tab); (2) defining the fields that will be displayed on the webform (via the "Webform Fields" tab); (3) defining the styling of the webform (via the "Form Styling" tab); and (4) defining various settings associated with the webform (via the "Settings" tab). As shown in FIGS. 4-6, the user may also specify text to be displayed on the webform (e.g., via a "Form Text" tab).

FIG. 4 shows that, by selecting the "Form Details" tab, the user may define which answers a requestor will be able to specify on the webform in response to prompts for information regarding what type of individual they are (customer, employee, etc.) and what type of request they are making via the webform. Example request types include: (1) a request for all personal data that an organization is processing for the data subject (a copy of the personal data in a commonly used, machine-readable format); (2) a request for all such personal data to be deleted; (3) a request to update personal data that the organization is storing for the data subject; (4) a request to opt out of having the organization use the individual's personal information in one or more particular ways (e.g., per the organization's standard business practices); (5) file a complaint; and/or (6) other.

FIG. 5 shows that, by selecting the "Settings" tab, the user may specify various system settings, such as whether Captcha will be used to verify that information is being entered by a human, rather than a computer.

FIG. 6 shows that, by selecting the Form Styling tab, the user may specify the styling of the webform. The styling may include, for example: (1) a header logo; (2) header height; (3) header color; (4) body text color; (5) body text size; (6) form label color; (7) button color; (8) button text color; (9) footer text color; (10) footer text size; and/or any other suitable styling related to the webform.

In other embodiments, the system is configured to enable a user to specify, when configuring a new webform, what individual at a particular organization (e.g., company) will be responsible for responding to requests made via the webform. The system may, for example, enable the user to define a specific default sub-organization (e.g., within the organization) responsible for responding to DSAR's submitted via the new webform. As such, the system may be configured to automatically route a new DSAR made via the new webform to the appropriate sub-organization for processing and fulfillment. In various embodiments, the system is configured to route one or more various portions of the DSAR to one or more different sub-organizations within the organization for handling.

In particular embodiments, the system may include any suitable logic for determining how the webform routes data subject access requests. For example, the system may be adapted to determine which organization or individual to route a particular data subject access request to based, at least in part, on one or more factors selected from a group consisting of: (1) the data subject's current location; (2) the data subject's country of residence; (3) the type of request being made; (4) the type of systems that contain (e.g., store and/or process) the user's personal data (e.g., in ADP, Salesforce, etc.); or any other suitable factor.

In particular embodiments, the system is configured to enable a user generating webforms to assign multiple webforms to multiple different respective suborganizations within an organization. For example, an organization called ACME, Inc. may have a website for each of a plurality of different brands (e.g., sub-organizations) under which ACME sells products (e.g., UNICORN Brand T-shirts, GRIPP Brand Jeans, etc.). As may be understood in light of this disclosure, each website for each of the particular brands may include an associated webform for submitting DSAR's (either a webform directly on the website, or one that is accessible via a link on the website). Each respective webform may be configured to route a DSAR made via its associated brand website to a particular sub-organization and/or individuals within ACME for handling DSAR's related to the brand.

As noted above, after the user uses the webform construction tool to design a particular webform for use on a particular web page, the webform construction tool generates code (e.g., HTML code) that may be pasted into the particular web page to run the designed webform page. In particular embodiment, when pasted into the particular web page, the code generates a selectable button on the web page that, when selected, causes the system to display a suitable DSAR request webform.

Figure 7:
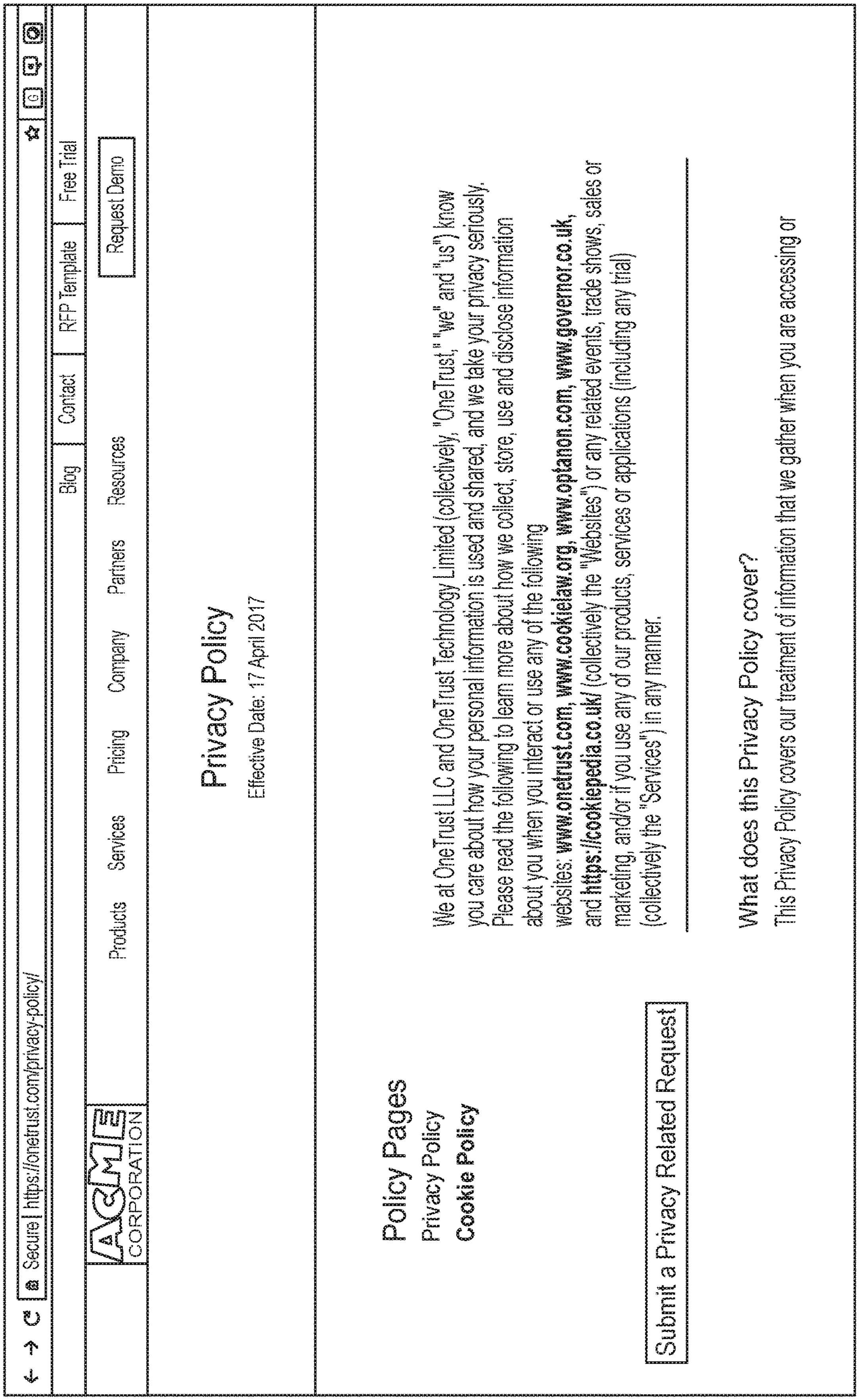

FIG. 7 shows the privacy webpage of a company (e.g., the ACME corporation). As shown in this figure, a requestor may submit a DSAR by selecting a "Submit a Privacy Related Request" button on the web page.

Figure 8:
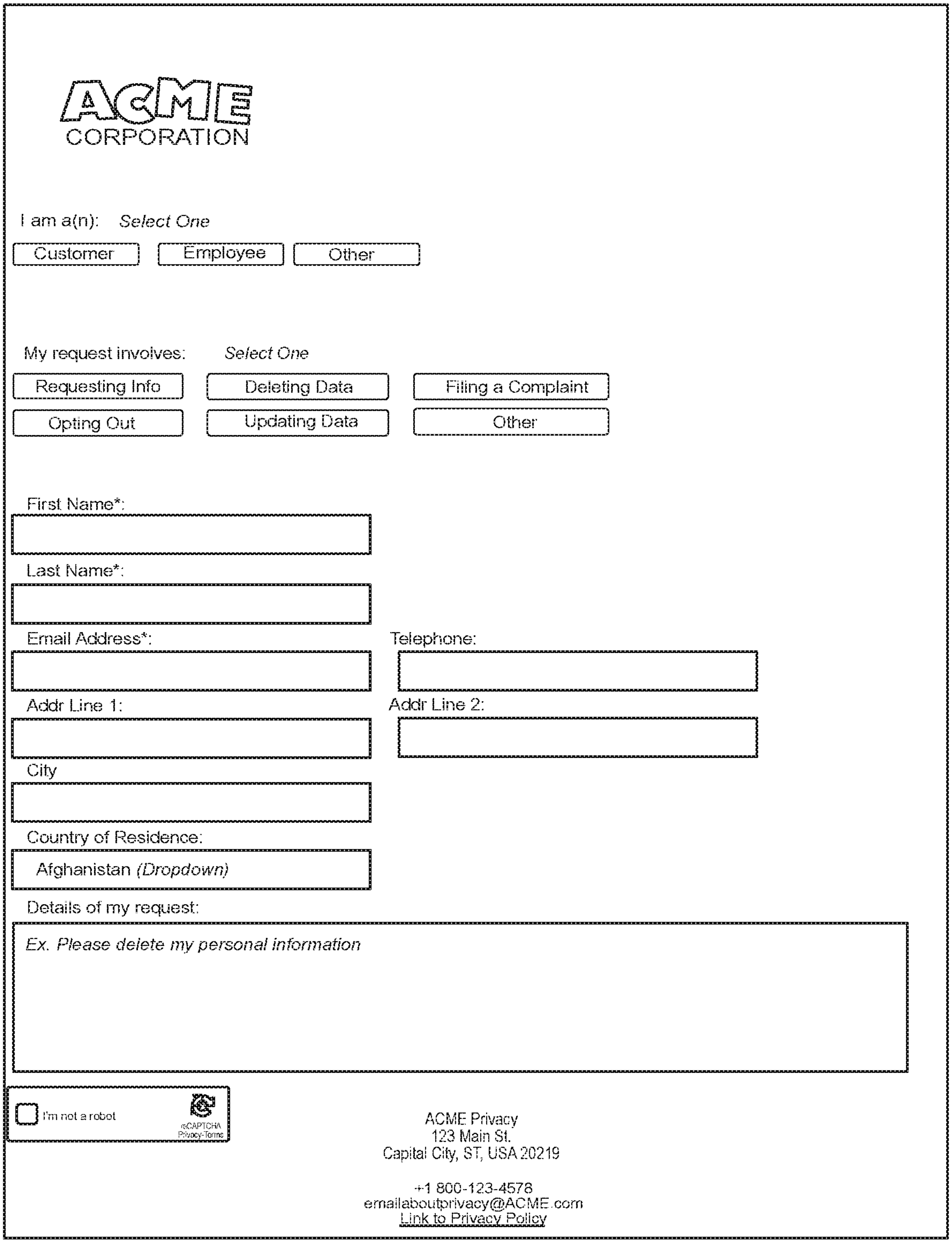
Figure 9:
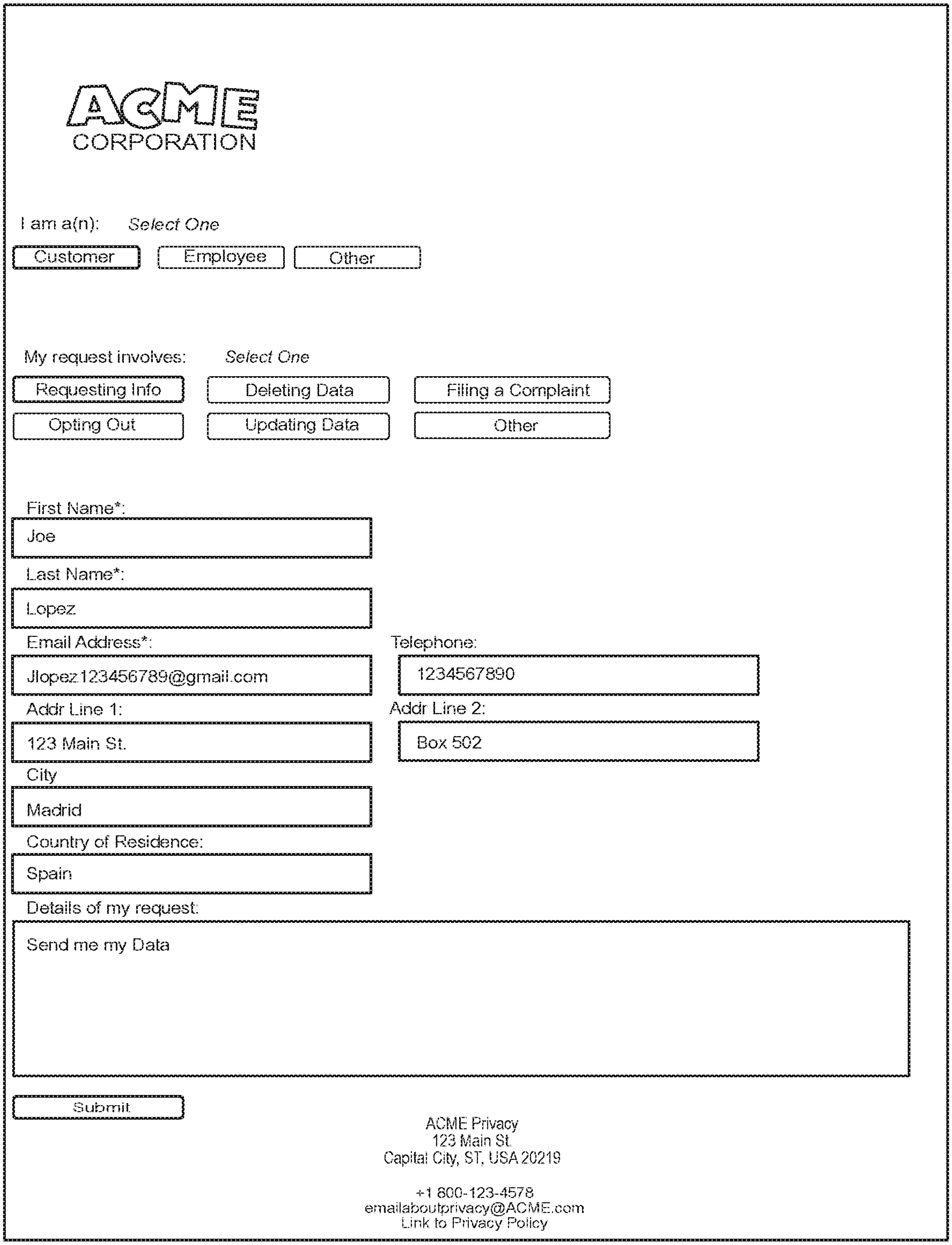

FIG. 8 shows a webform that is displayed after a requestor selects the "Submit a Privacy Related Request" button on the privacy webpage of FIG. 7. As may be understood from this figure, the requestor may complete the webform by specifying which type of user they are, and what type of request they are making. The webform also asks the requestor to provide enough personal information to confirm their identity (e.g., and fulfill the request). As shown in this figure, the system may prompt a user submitting a DSAR to provide information for the user such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. FIG. 9 shows an example populated version of the webform.

Figure 10:
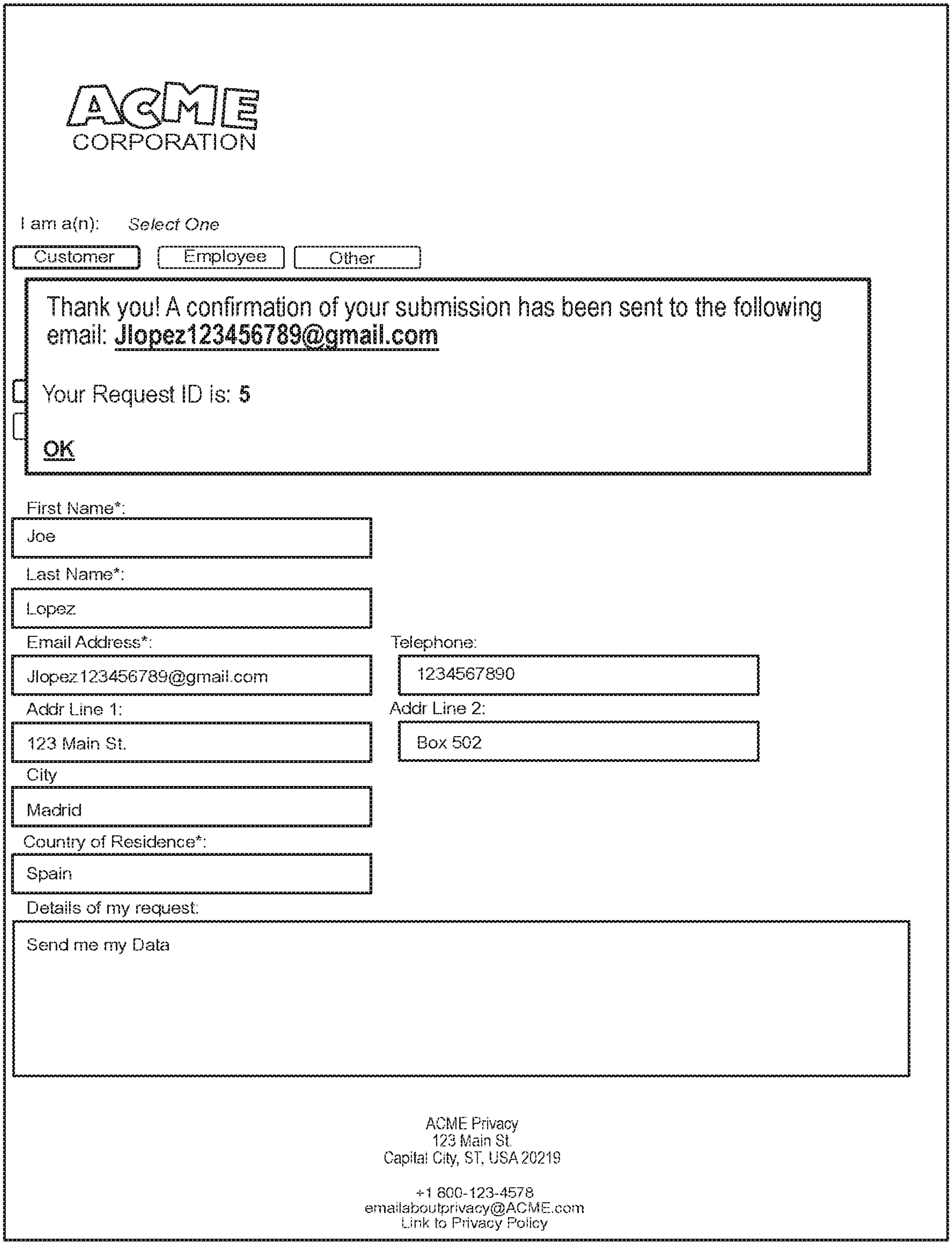
Figure 11:
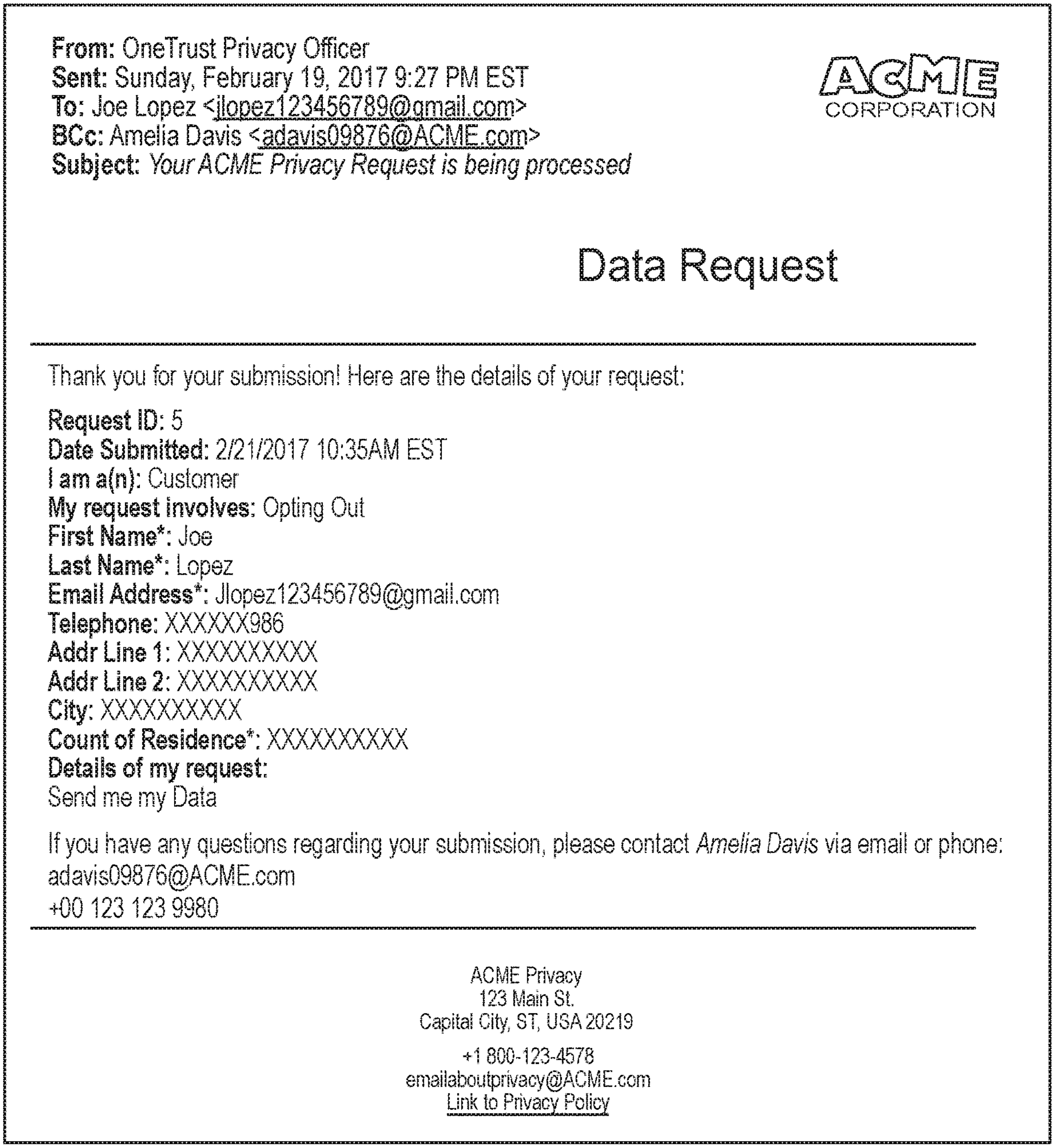

As shown in FIG. 10, after a requestor completes the webform and selects a "submit" indicia, the system displays a message to the requestor indicating that their DSAR has been successfully submitted. The system also displays a Request ID associated with the request. In response to the requestor successfully submitting the request, the system may also send an email (or other suitable communication) to the requestor confirming the request. An example of a suitable confirmation email is shown in FIG. 11.

In various embodiments, the system includes a dashboard that may be used by various individuals within an organization (e.g., one or more privacy officers of an organization) to manage multiple DSAR requests. As discussed above, the dashboard may display DSAR's submitted, respectively, to a single organization, any of multiple different sub-organizations (divisions, departments, subsidiaries etc.) of a particular organization, and/or any of multiple independent organizations. For example, the dashboard may display a listing of DSAR's that were submitted from a parent organization and from the parent organization's U.S. and European subsidiaries. This may be advantageous, for example, because it may allow an organization to manage all DSAR requests of all of its sub-organizations (and/or other related organizations) centrally.

Figure 12:
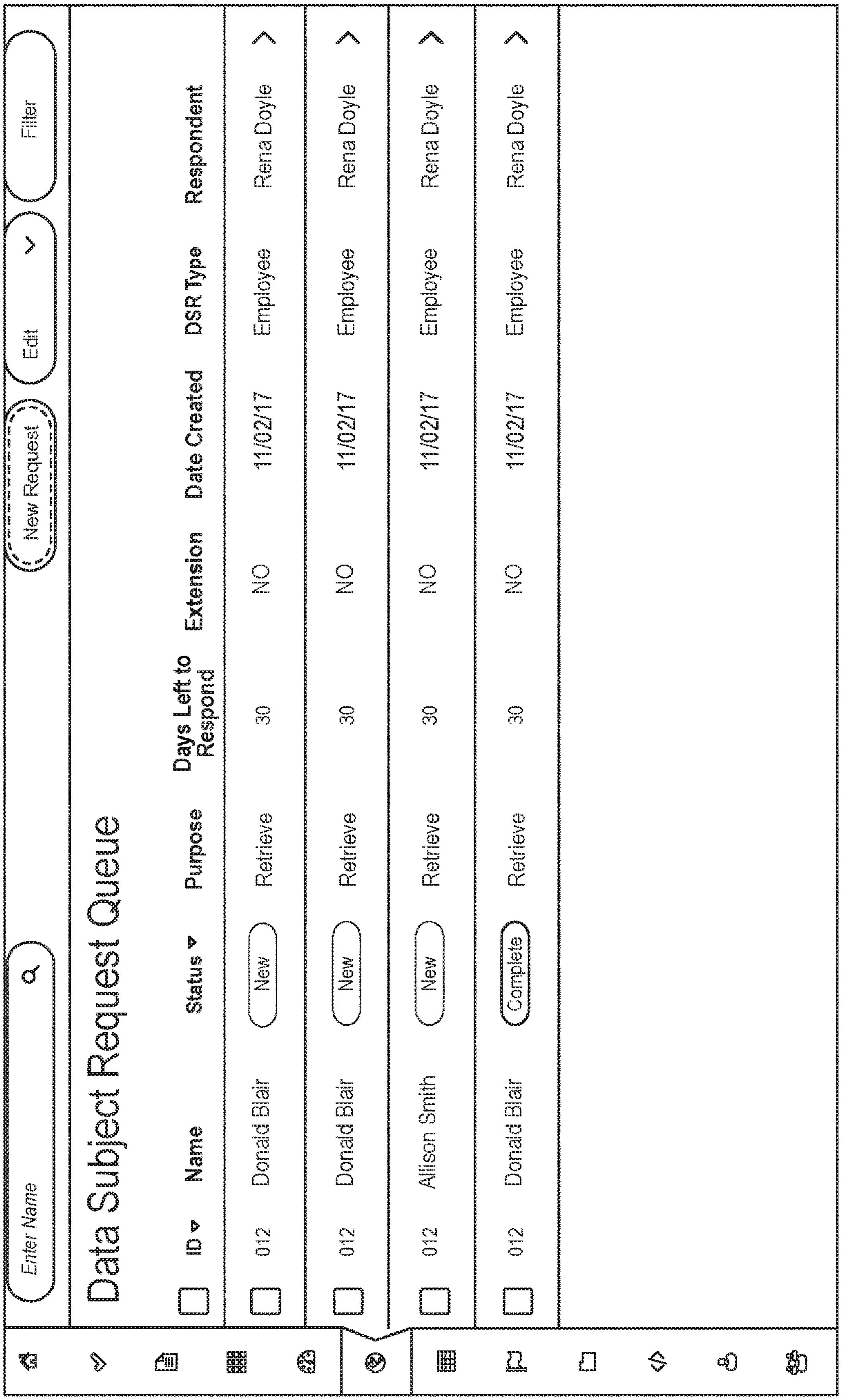

FIGS. 12-23, 25-27, 29-34, and 41-43 depict various example user-interface screens of a DSAR request-management dashboard. As may be understood from FIG. 12, after an appropriate user (e.g., a privacy officer associated with a particular organization) logs into the system, the system may display a Data Subject Request Queue that may, for example, display a listing of all data subject access requests that the appropriate individual has been designated to process. As shown in FIG. 12, each data subject access request may be represented by a respective row of information that includes: (1) an ID number for the request; (2) the name of the data subject who has submitted the request; (3) the status of the request; (4) the number of days that are left to respond to the request (e.g., according to applicable laws and/or internal procedures); (5) an indication as to whether the deadline to respond to the request has been extended; (6) a creation date of the request; (7) an indication of the type of requestor that submitted the request (customer, employee, etc.); (8) the name of the individual who has been assigned to process the request (e.g., the respondent). This screen may also include selectable "Edit" and "Filter" buttons that respectively facilitate acting on and filtering the various requests displayed on the page.

Figure 13:
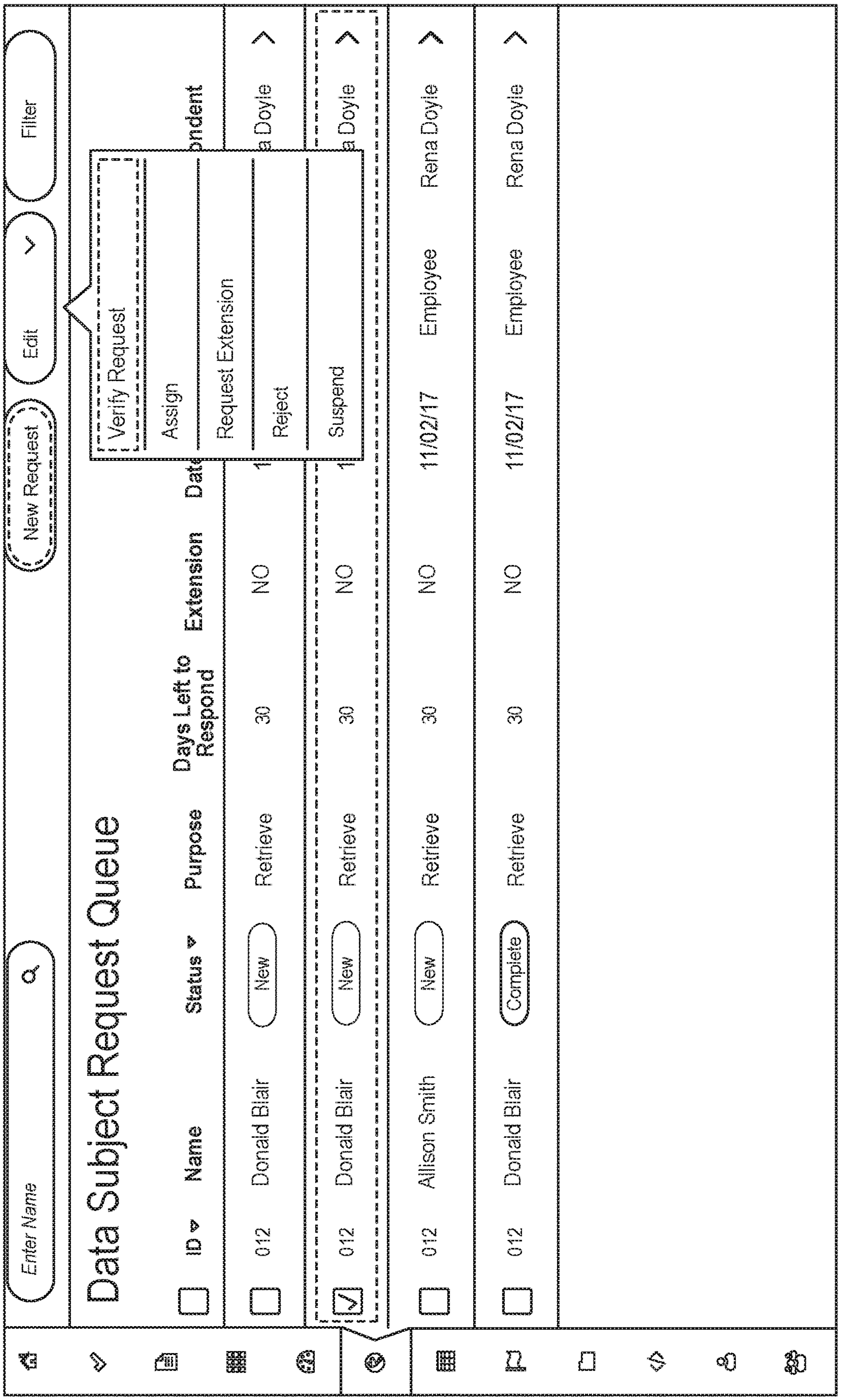

As shown in FIG. 13, in response to a respondent selecting the edit button while a particular DSAR is highlighted, the system displays a dropdown menu allowing the respondent to select between taking the following actions: (1) verify the request; (2) assign the request to another individual; (3) request an extension; (4) reject the request; or (5) suspend the request.

Figure 14:
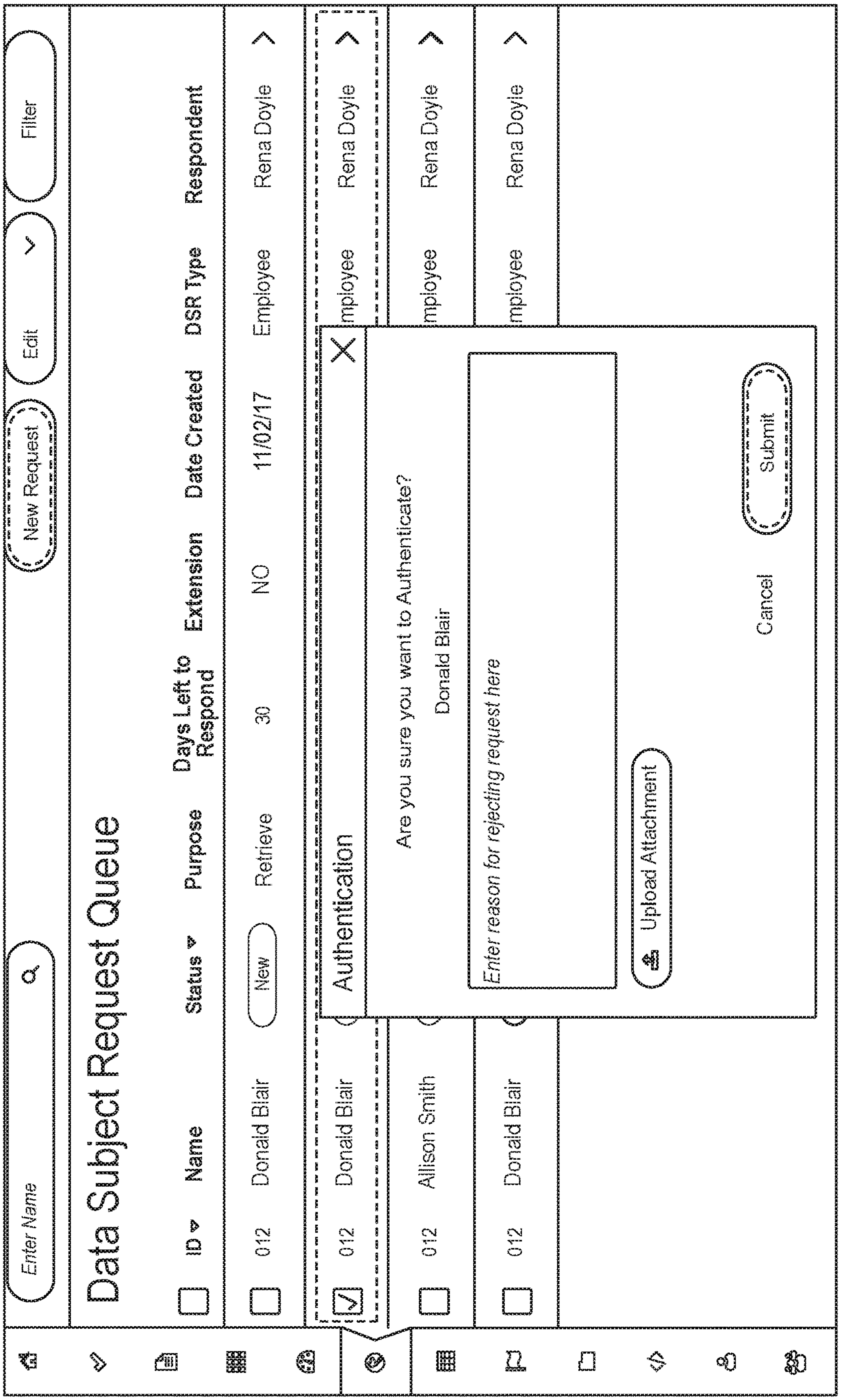
Figure 15:
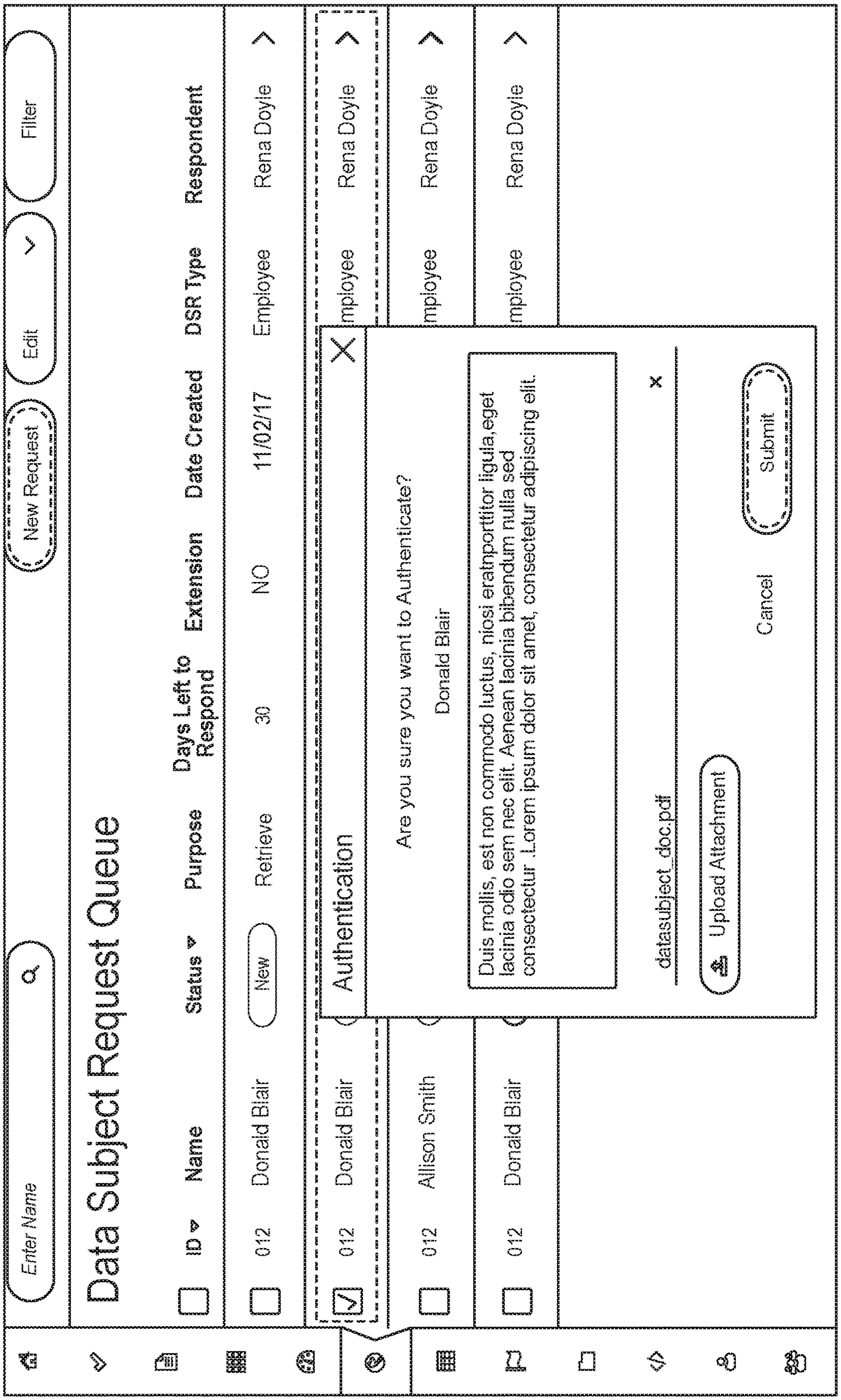

FIGS. 14 and 15 show a message that the system displays to the respondent in response to the respondent selecting the "verify" option. As shown in this figure, the system prompts the respondent to indicate whether they are sure that they wish to authenticate the request. The system also presents an input field where the respondent can enter text to be displayed to the requestor along with a request for the requestor to provide information verifying that they are the data subject associated with the request. After the respondent populates the input field, they may submit the request by selecting a "Submit" button.

In particular embodiments, the input field may enable the respondent to provide one or more supporting reasons for a decision, by the respondent, to authenticate the request. The respondent may also upload one or more supporting documents (such as an attachment). The supporting documents or information may include, for example, one or more documents utilized in confirming the requestor's identity, etc.

Figure 16:
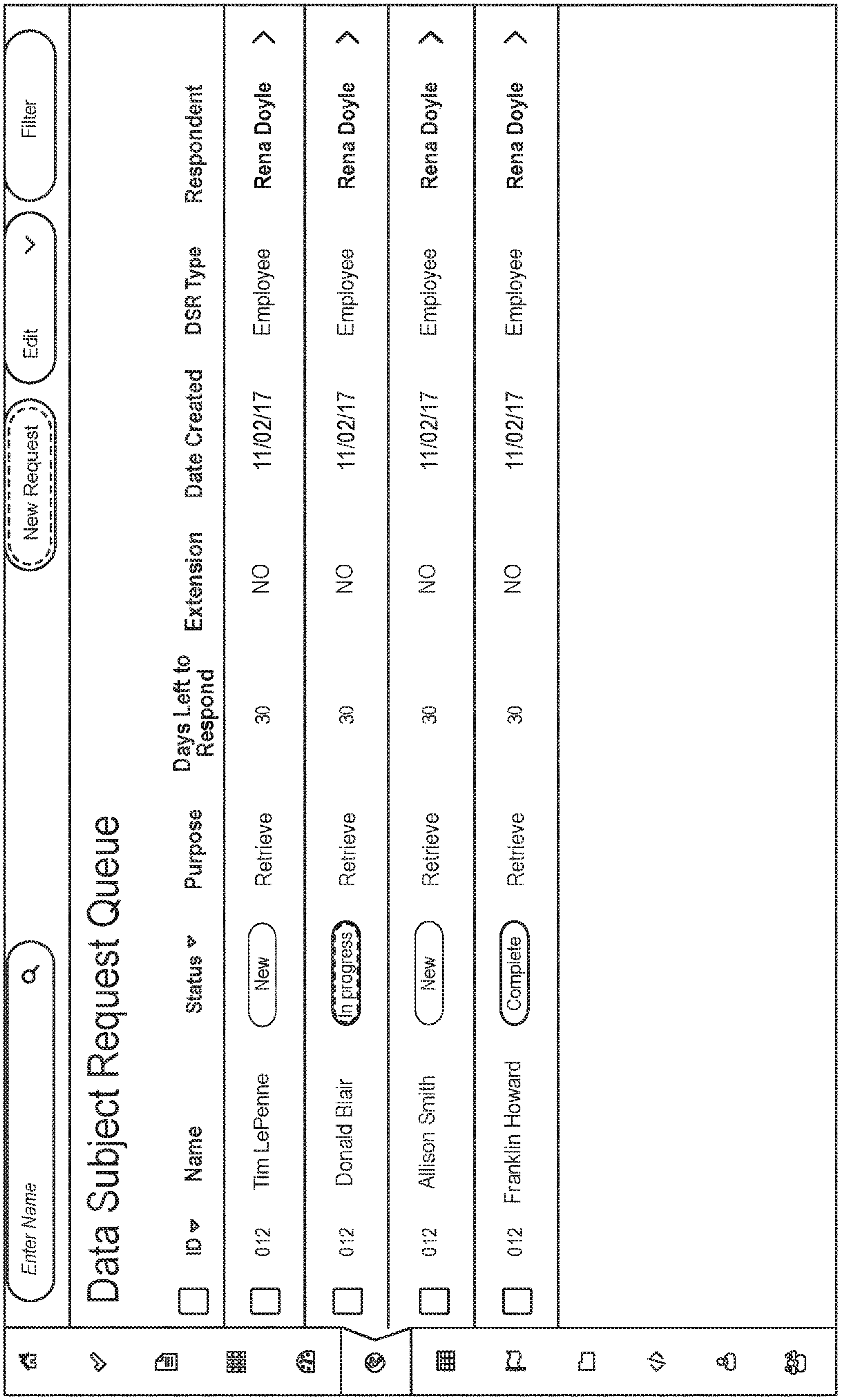

In response to the respondent selecting the Submit button, the system changes the status of the request to "In Progress" and also changes the color of the request's status from orange to blue (or from any other suitable color to any different suitable color)—see FIG. 16. The system also generates and sends a message (e.g., an electronic or paper message) to the requestor asking them to submit information verifying the request. The message may include the text that the respondent entered in the text box of FIG. 14.

Figure 17:
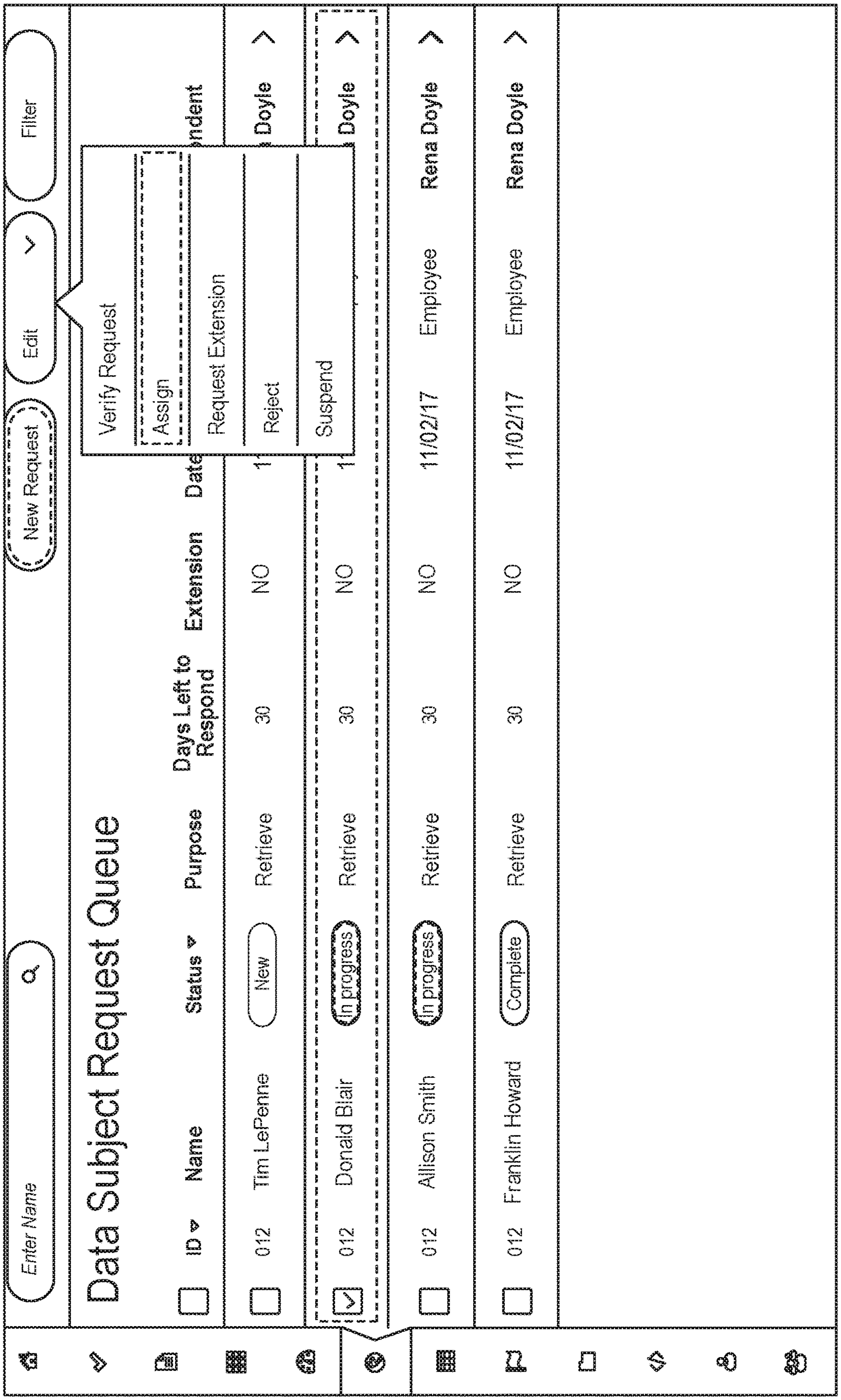
Figure 18:
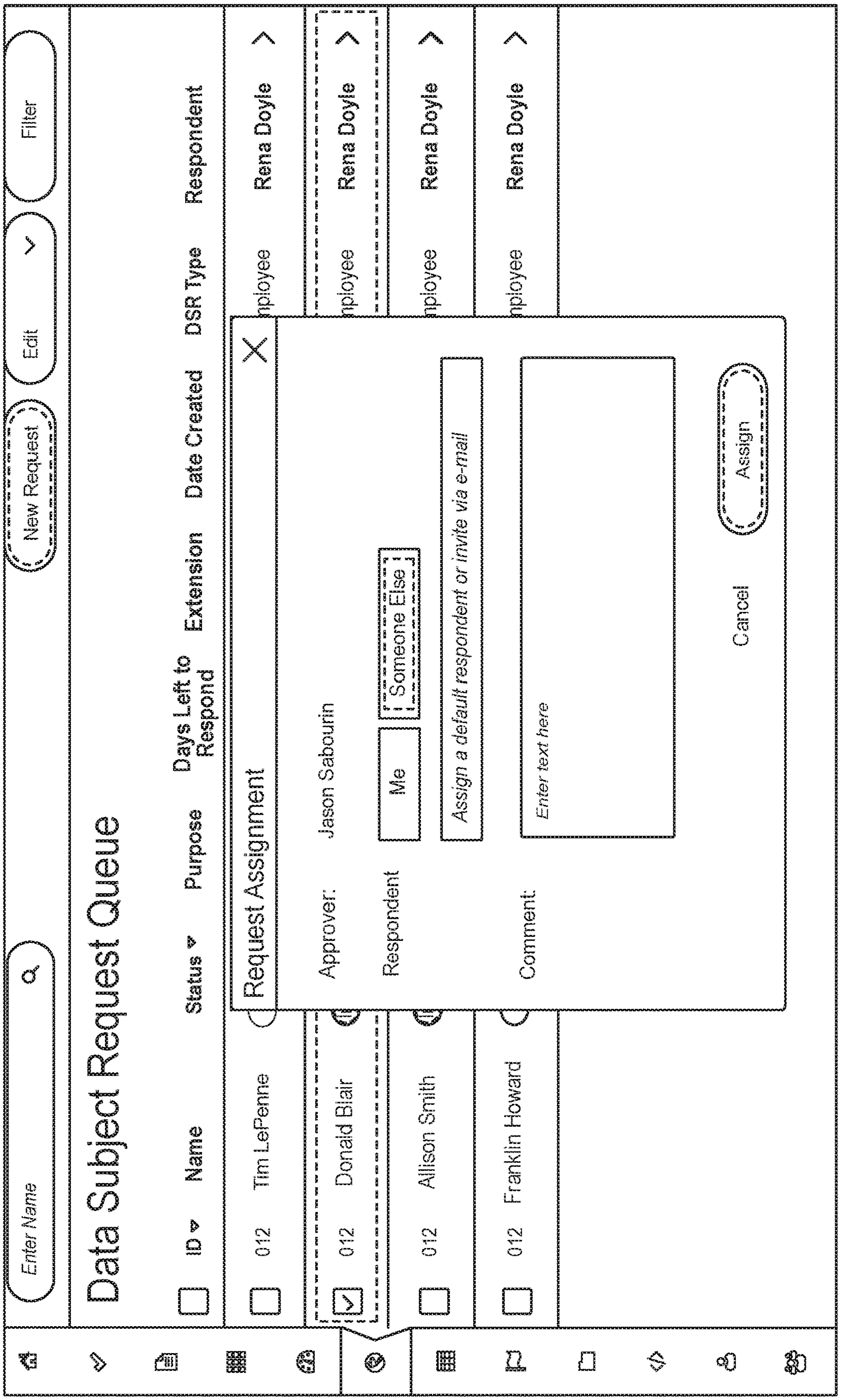
Figure 19:
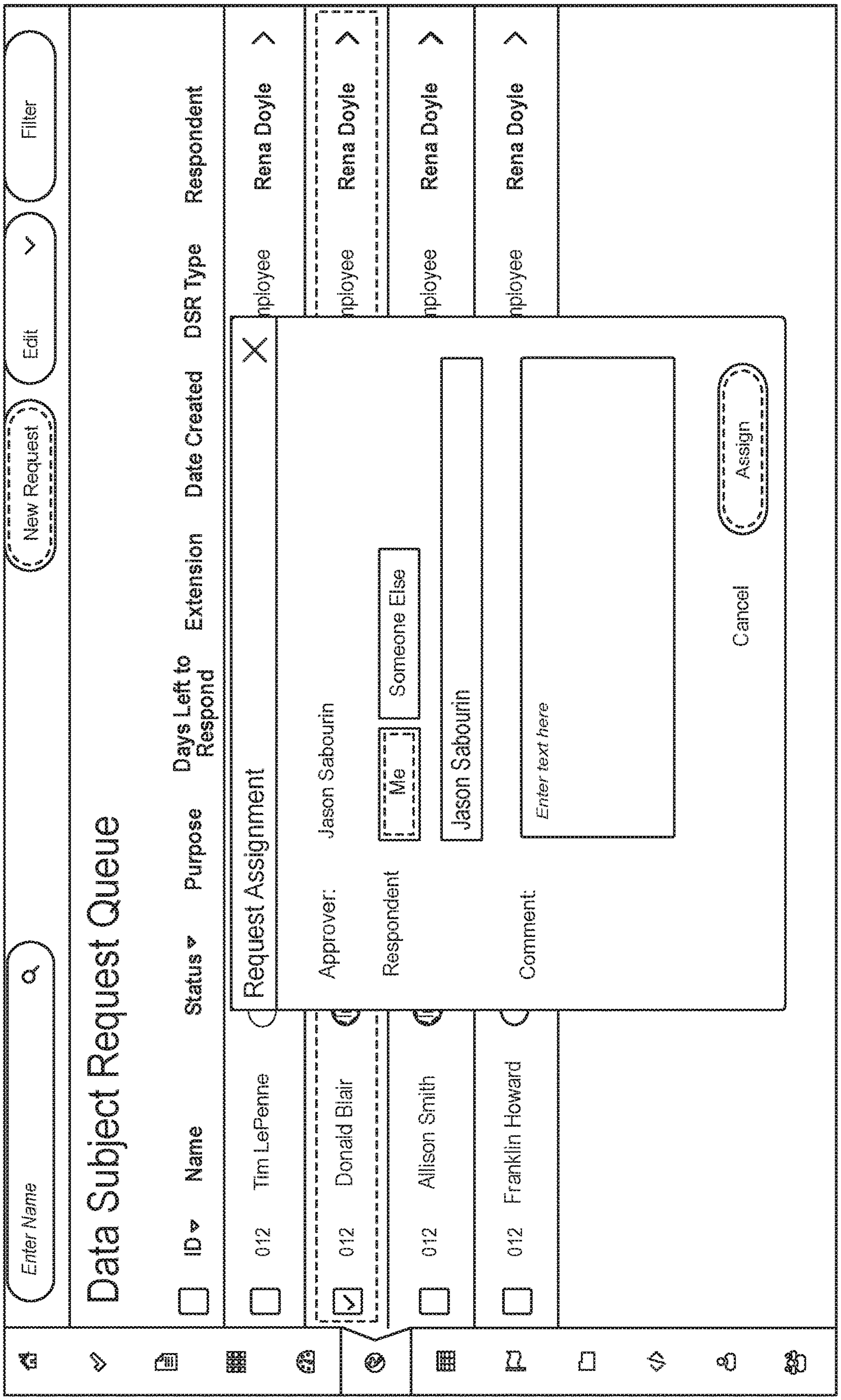

As shown in FIGS. 17-19, in response to a respondent selecting the "Edit" button and then selecting the "Assign" indicia from the displayed dropdown menu, the system displays a Request Assignment interface that allows a respondent to indicate who the request should be assigned to. For example, the respondent may indicate that they will be handling the request, or assign the request to another suitable individual, who may, for example, then be designated as the respondent for the request. If the respondent assigns the request to another individual for handling, the respondent may also provide an email address or other correspondence information for the individual. The Request Assignment interface includes a comment box for allowing a respondent to add a message to the individual that the assignment will be assigned to regarding the assignment. In response to the respondent selecting the "Assign" button, the system assigns the request to the designated individual for handling. If the request has been assigned to another, designated individual, the system automatically generates and sends a message (e.g., an electronic message such as an email or SMS message) to the designated individual informing them of the assignment.

Figure 20:
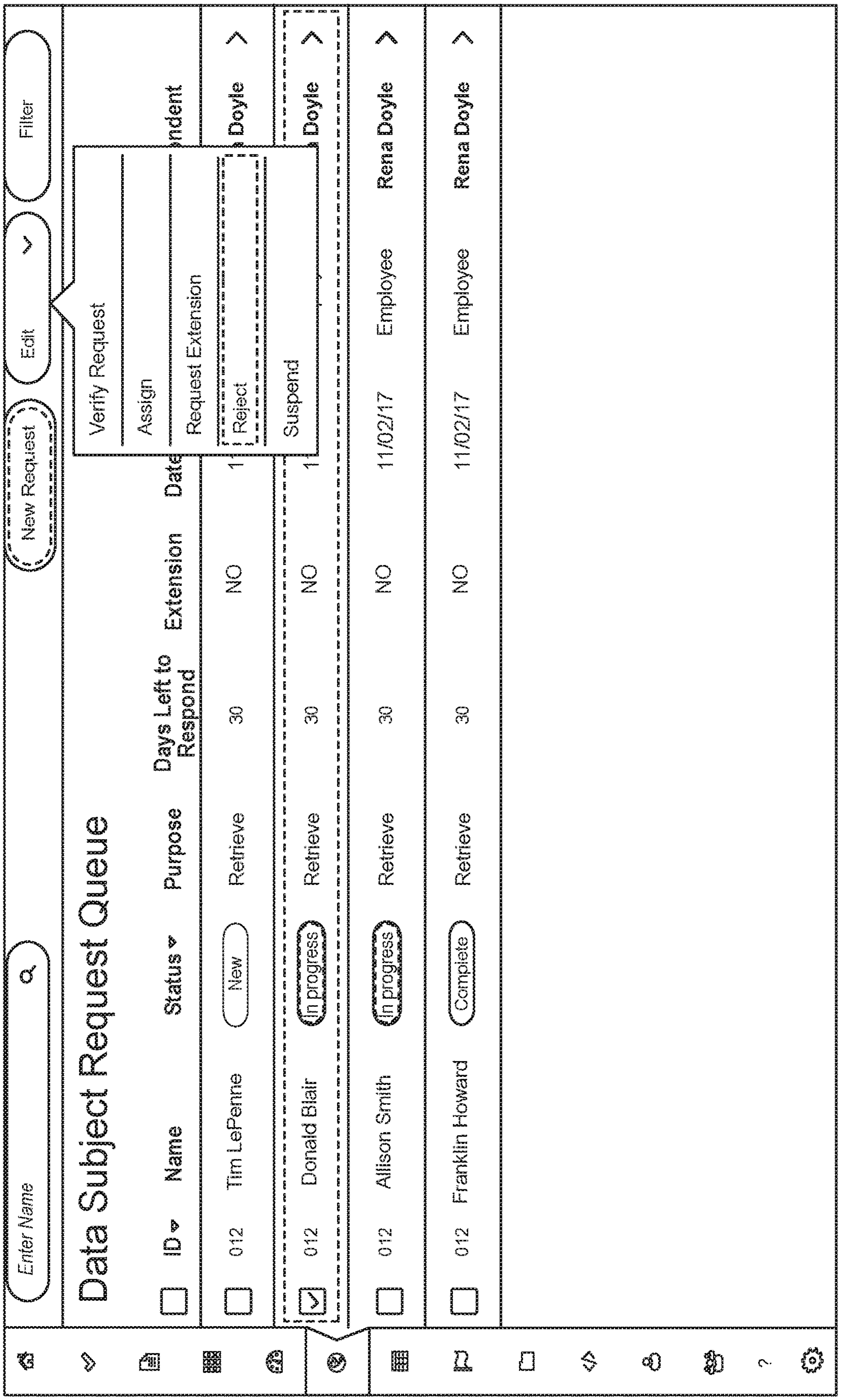
Figure 21:
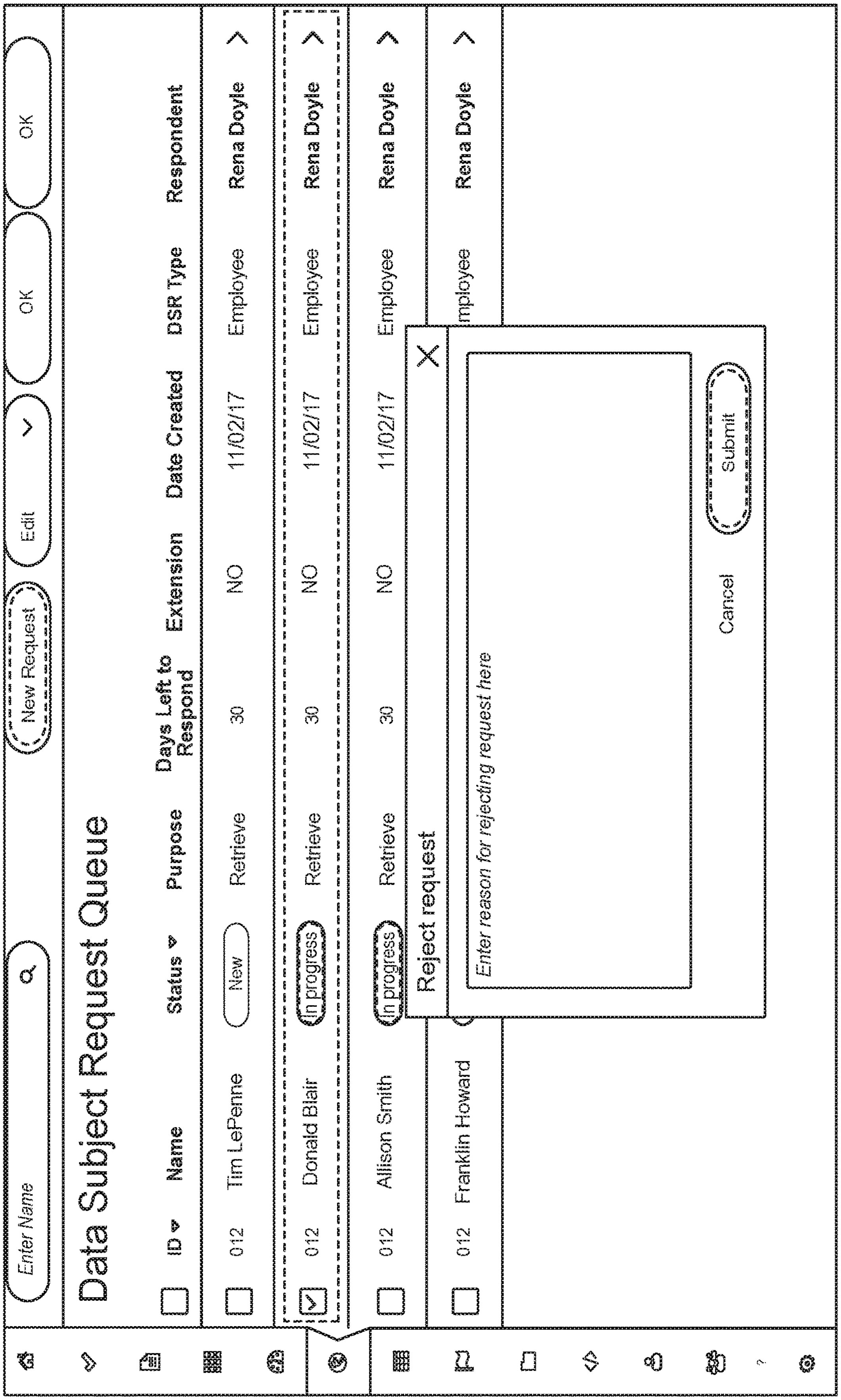
Figure 22:
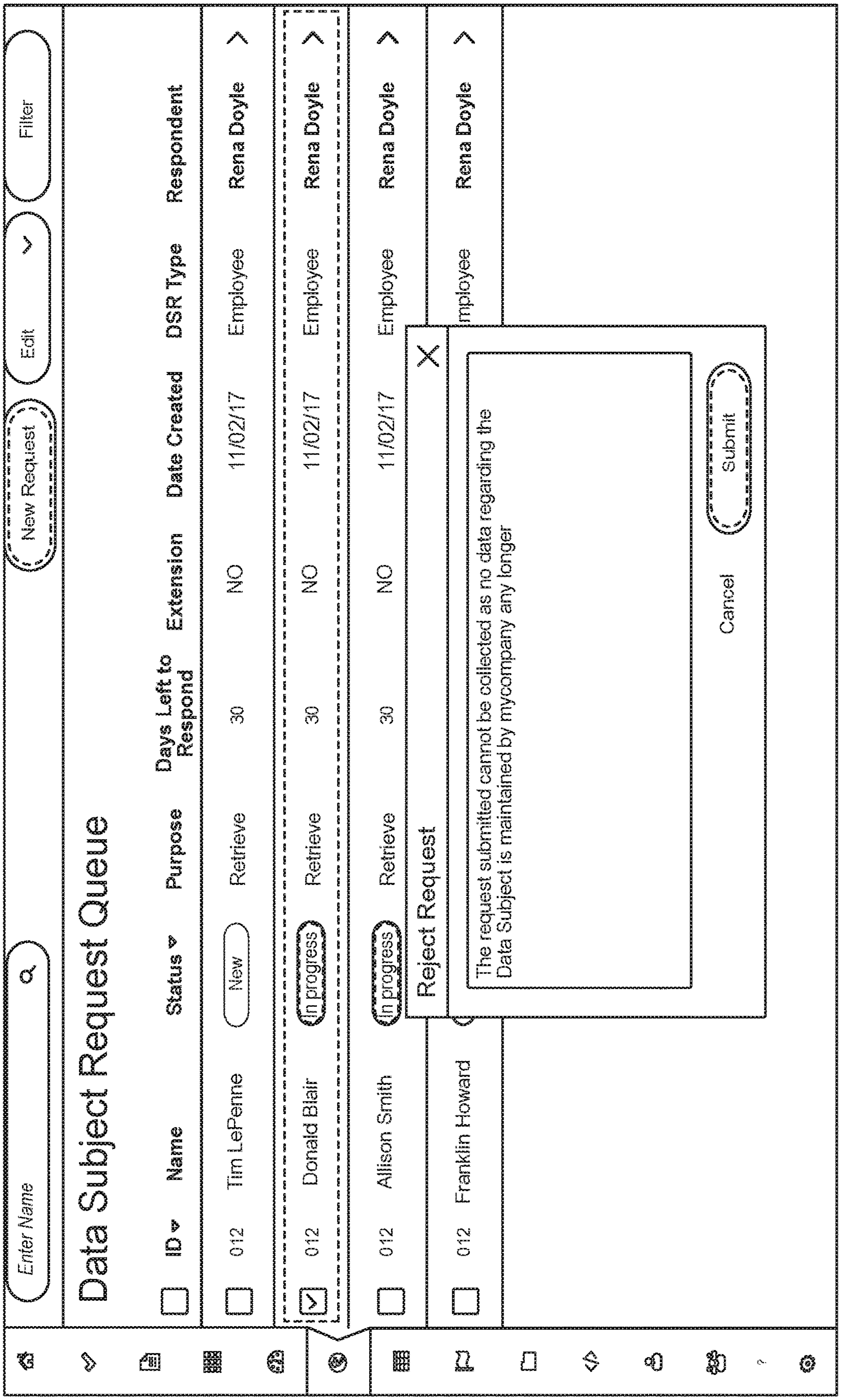
Figure 23:
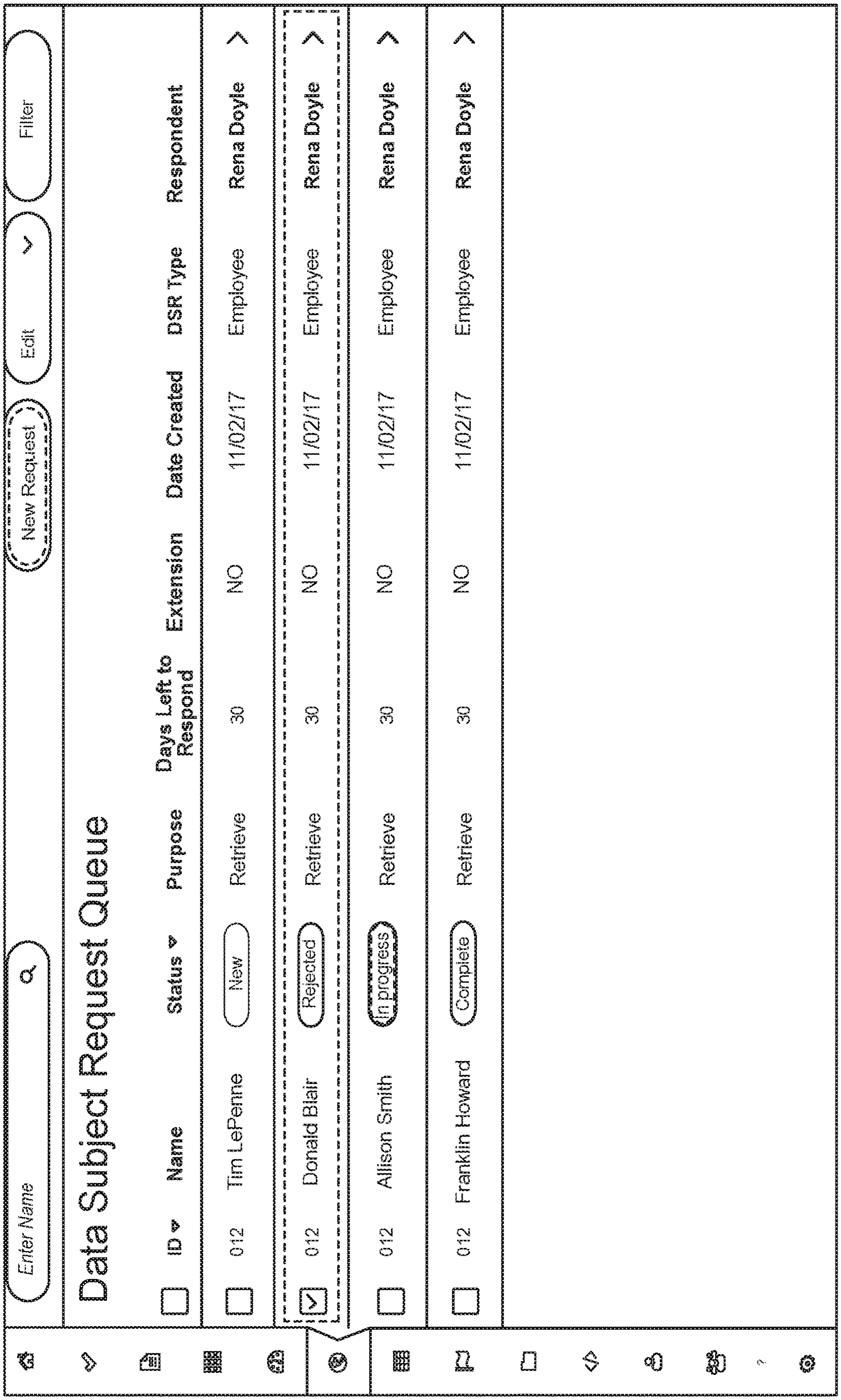

As shown in FIGS. 20-22, in response to a respondent selecting the "Edit" button and then selecting the "Reject" indicia from the displayed dropdown menu, the system displays a Reject Request interface. This interface includes a comment box for allowing a respondent to add a message to the requestor as to why the request was rejected. In response to the respondent selecting the "Submit" button, the system changes the status of the request to "Rejected" and changes the color of the request's status indicator to red (See FIG. 23). The system may also automatically generate a message (e.g., an electronic or paper message) to the requestor notifying them that their request has been rejected and displaying the text that the respondent entered into the Reject Request interface of FIG. 22. An example of such a message is shown in FIG. 24.

Figure 25:
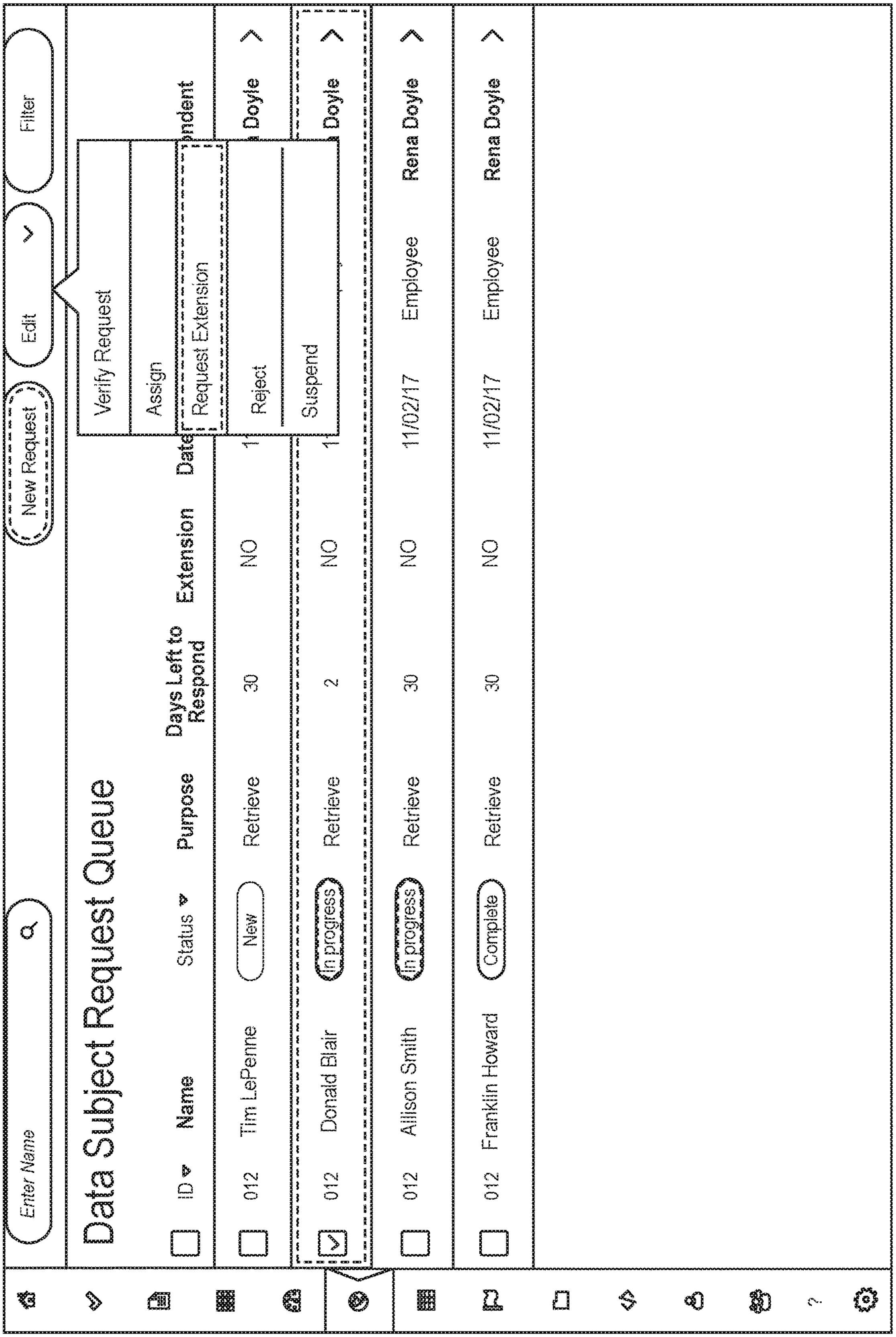
Figure 26:
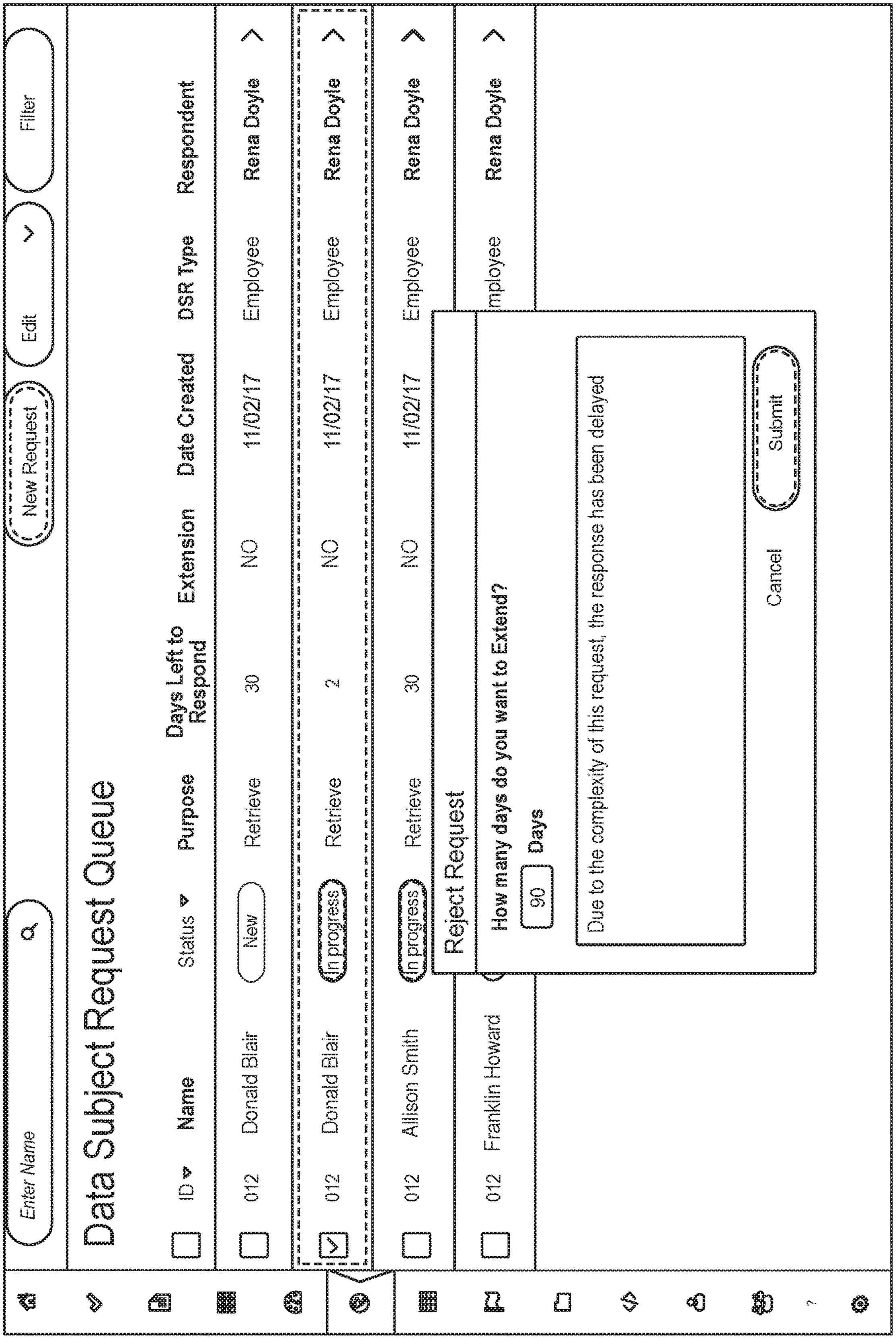
Figure 27:
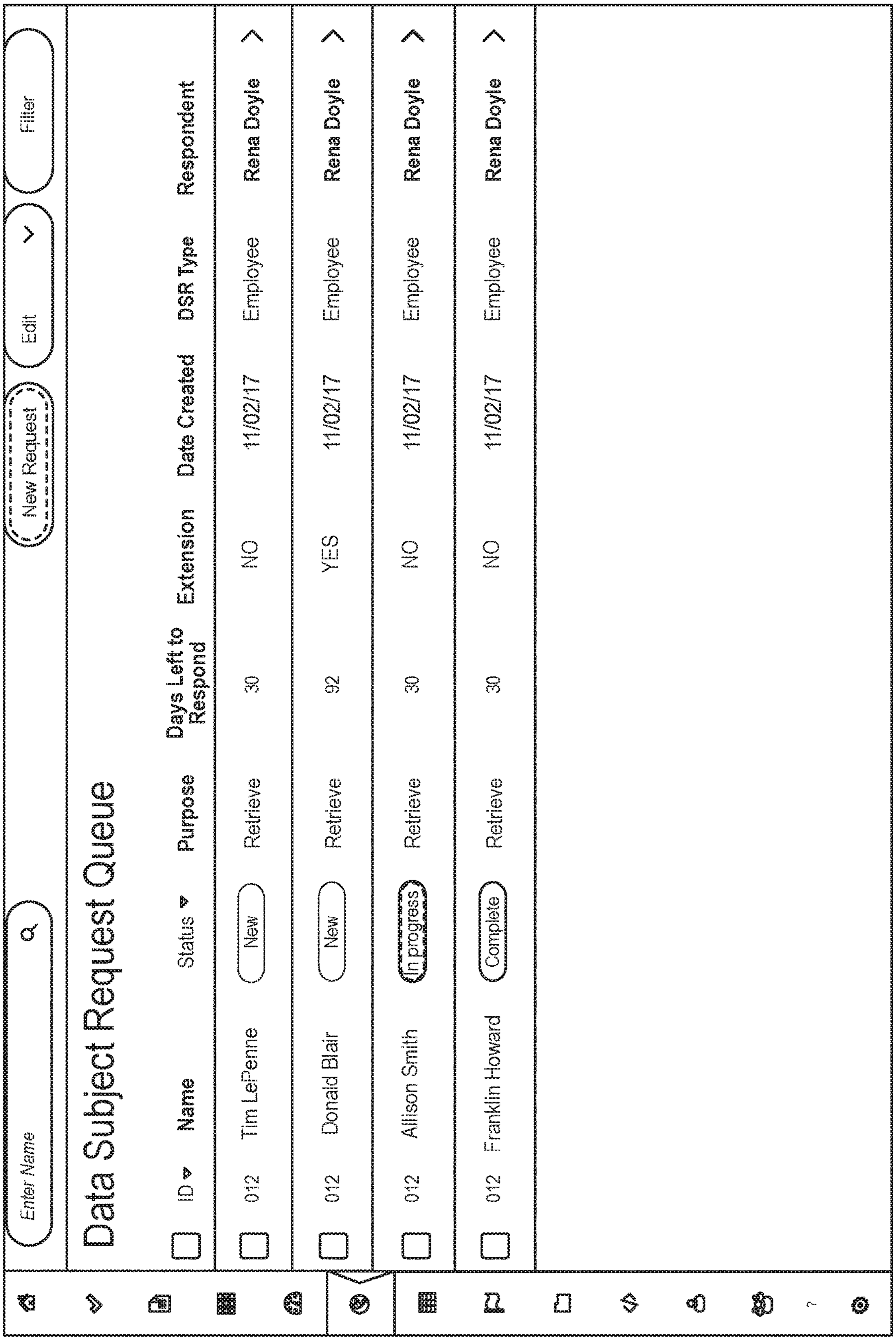
Figure 29:
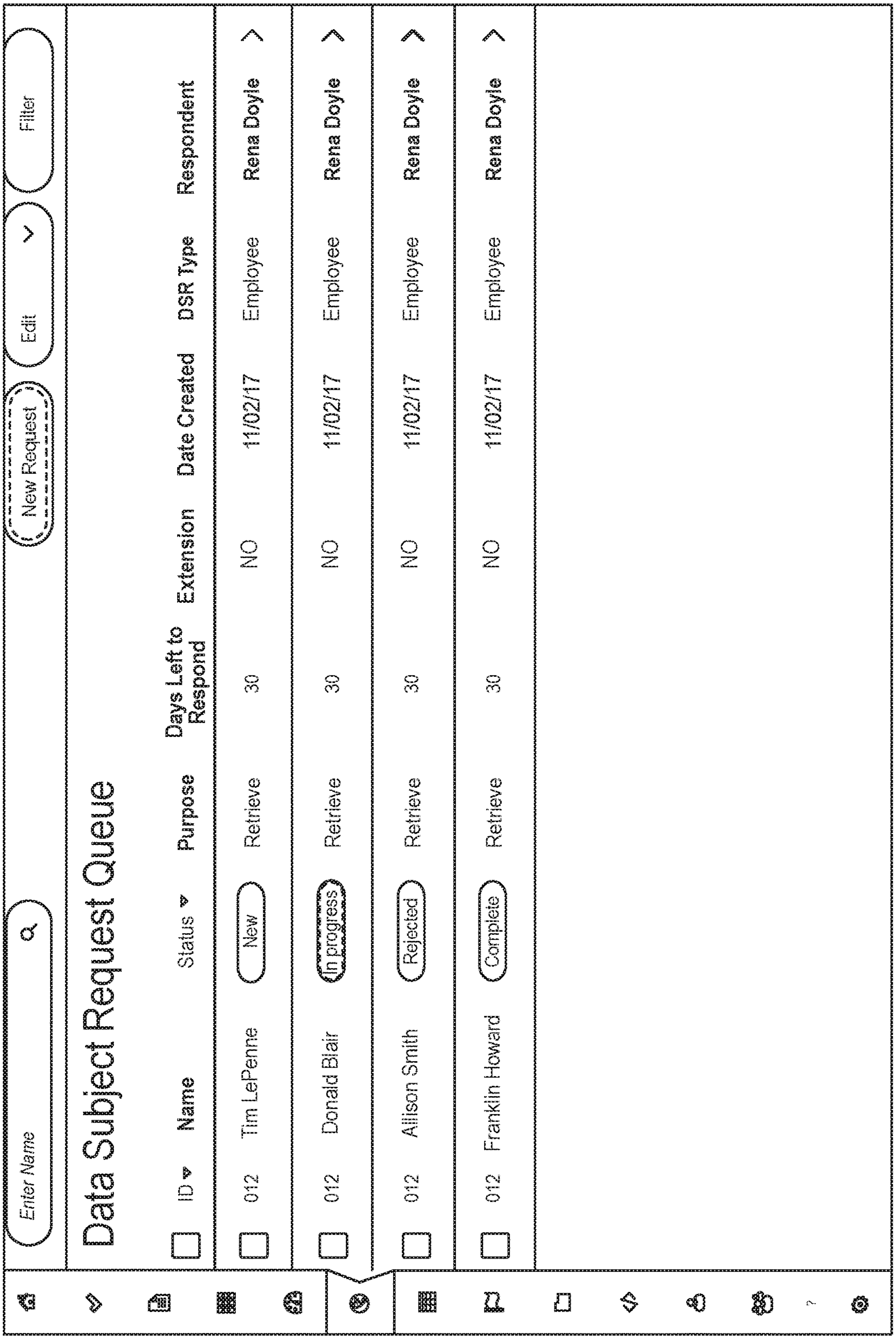

As shown in FIGS. 25-26, in response to a respondent selecting the "Edit" button and then selecting the "Request Extension" indicia from the displayed dropdown menu, the system displays a Request Extension interface. This includes a text box for allowing a user to indicate the number of days for which they would like to extend the current deadline for responding to the request. For example, the dialog box of FIG. 26 shows the respondent requesting that the current deadline be extended by 90 days. In response to the respondent entering a desired extension duration and selecting the "Submit" button, the system updates the deadline in the system's memory (e.g., in an appropriate data structure) to reflect the extension. For instance, in the example of FIG. 26, the system extends the deadline to be 90 days later than the current deadline. As shown in FIG. 27, the system also updates the "Days Left to Respond" field within the Data Subject Request Queue to reflect the extension (e.g., from 2 days from the current date to 92 days from the current date). As shown in FIG. 28, the system may also generate an appropriate message (e.g., an electronic, such as an email, or a paper message) to the requestor indicating that the request has been delayed. This message may provide a reason for the delay and/or an anticipated updated completion date for the request.

In particular embodiments, the system may include logic for automatically determining whether a requested extension complies with one or more applicable laws or internal policies and, in response, either automatically grant or reject the requested extension. For example, if the maximum allowable time for replying to a particular request is 90 days under the controlling laws and the respondent requests an extension that would result in the fulfillment of the request 91 or more days from the date that the request was submitted, the system may automatically reject the extension request. In various embodiments, the system may also communicate, to the respondent (e.g., via a suitable electronic message or text display on a system user interface) an explanation as to why the extension request was denied, and/or a maximum amount of time (e.g., a maximum number of days) that the deadline may be extended under the applicable laws or policies. In various embodiments, if the system determines that the requested extension is permissible under the applicable laws and/or policies, the system may automatically grant the extension.

In other embodiments, the system may be configured to automatically modify a length of the requested extension to conform with one or more applicable laws and/or policies. For example, if the request was for a 90-day extension, but only a 60-day extension is available under the applicable laws or regulations, the system may automatically grant a 60-day extension rather than a 90-day extension. The system may be adapted to also automatically generate and transmit a suitable message (e.g., a suitable electronic or paper communication) notifying them of the fact that the extension was granted for a shorter, specified period of time than requested.

Figure 30:
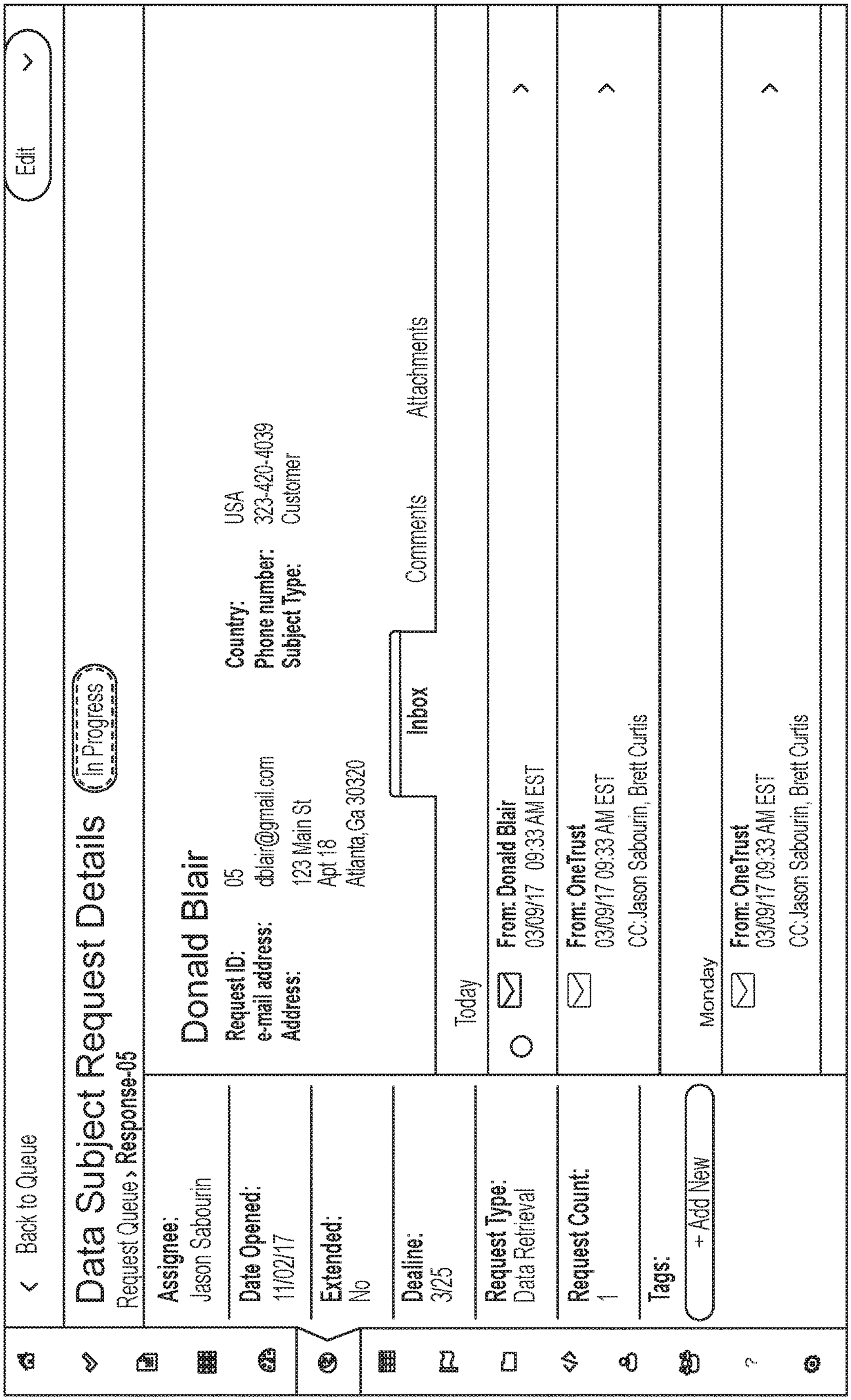
Figure 31:
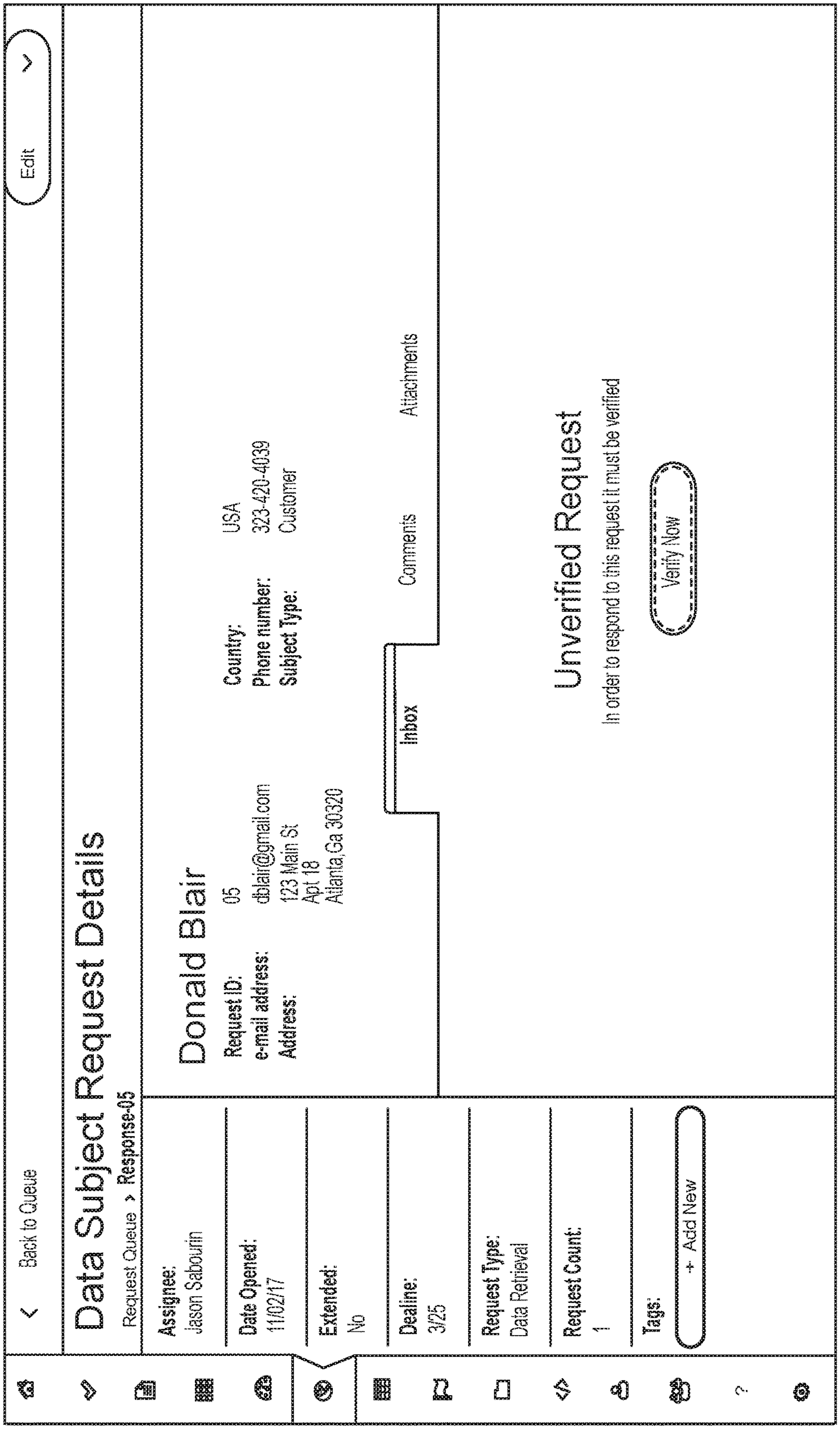

As shown in FIGS. 29-34, a respondent may obtain additional details regarding a particular request by selecting (e.g., clicking on) the request on the Data Subject Request Queue screen. For example, FIG. 30 shows a Data Subject Request Details screen that the system displays in response to a respondent selecting the "Donald Blair" request on the user interface screen of FIG. 35. As shown in FIG. 30, the Data Subject Request Details screen shows all correspondence between the organization and the requesting individual regarding the selected data subject access request. As may be understood from FIG. 31, when a respondent selects a particular correspondence (e.g., email), the system displays the correspondence to the respondent for review or other processing.

Figure 32:
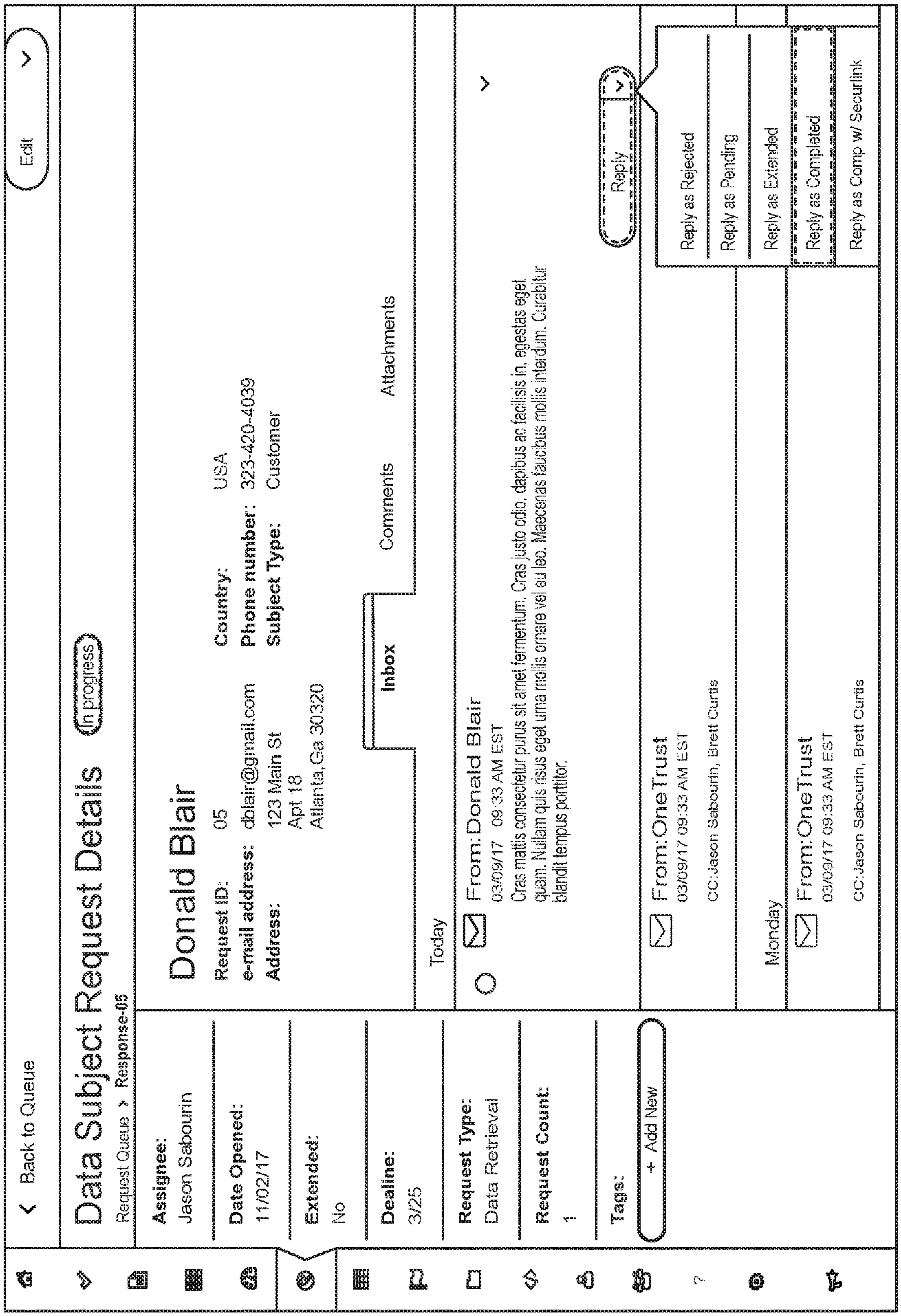

As shown in FIG. 32, in various embodiments, the system may provide a selectable "Reply" indicia that allows the respondent to reply to particular correspondence from an individual. As may be understood from this figure, in response to the respondent selecting the "Reply" indicia, the system may display a dropdown menu of various standard replies. For example, the dropdown menu may provide the option of generating a reply to the requestor indicating that the request has been rejected, is pending, has been extended, or that the request has been completed.

Figure 33:
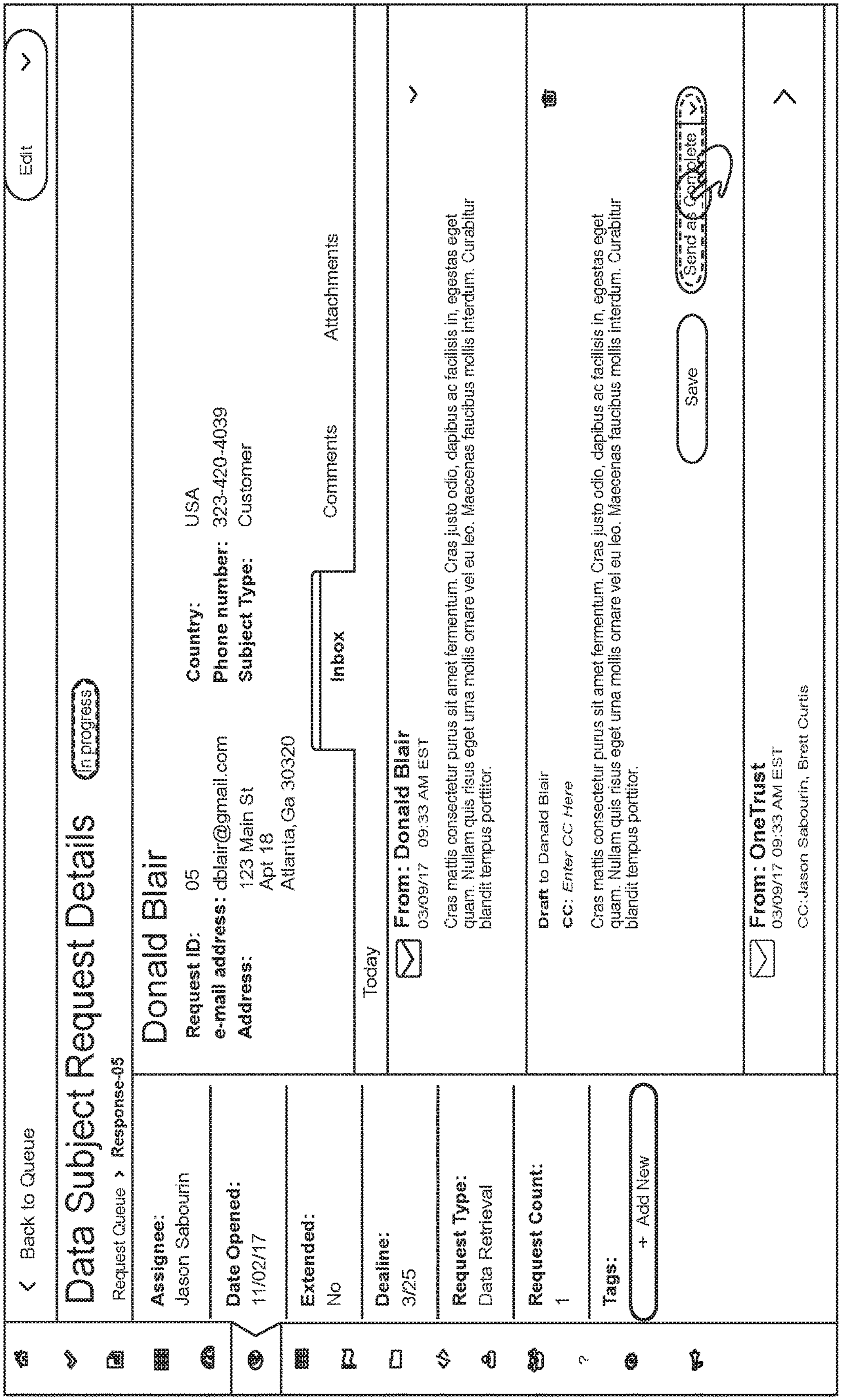
Figure 34:
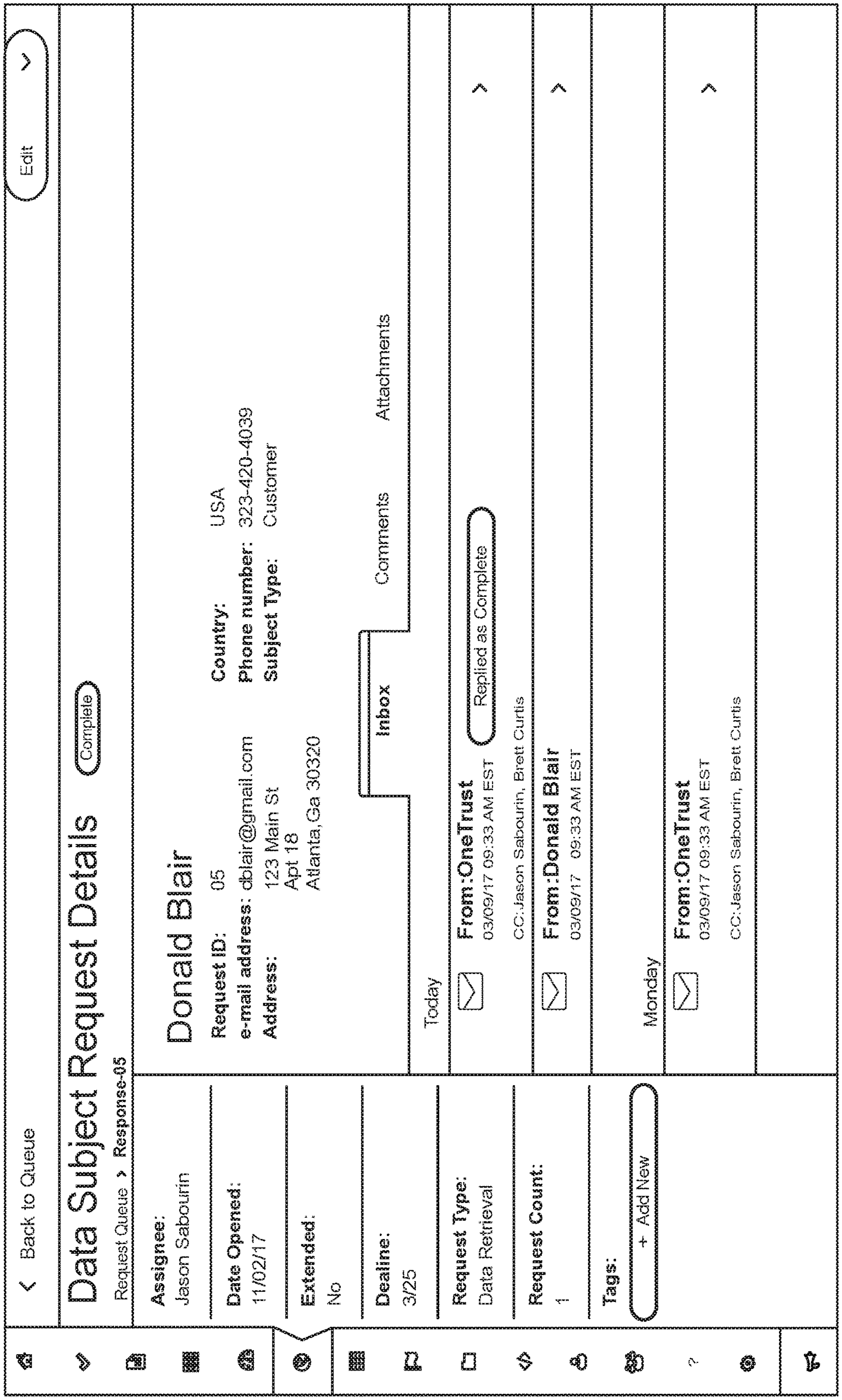

As shown in FIG. 33, in response to the respondent selecting "Reply as Completed", the system may generate a draft email to the requestor explaining that the request has been completed. The respondent may then edit this email and send the edited correspondence (e.g., via email) to the requestor by selecting a "Send as Complete" indicia. As shown in FIG. 34, the system may, in response, display an indicator adjacent the correspondence indicating that the correspondence included a reply indicating that the request was complete. This may be useful in allowing individuals to understand the contents of the correspondence without having to open it.

Figure 36:
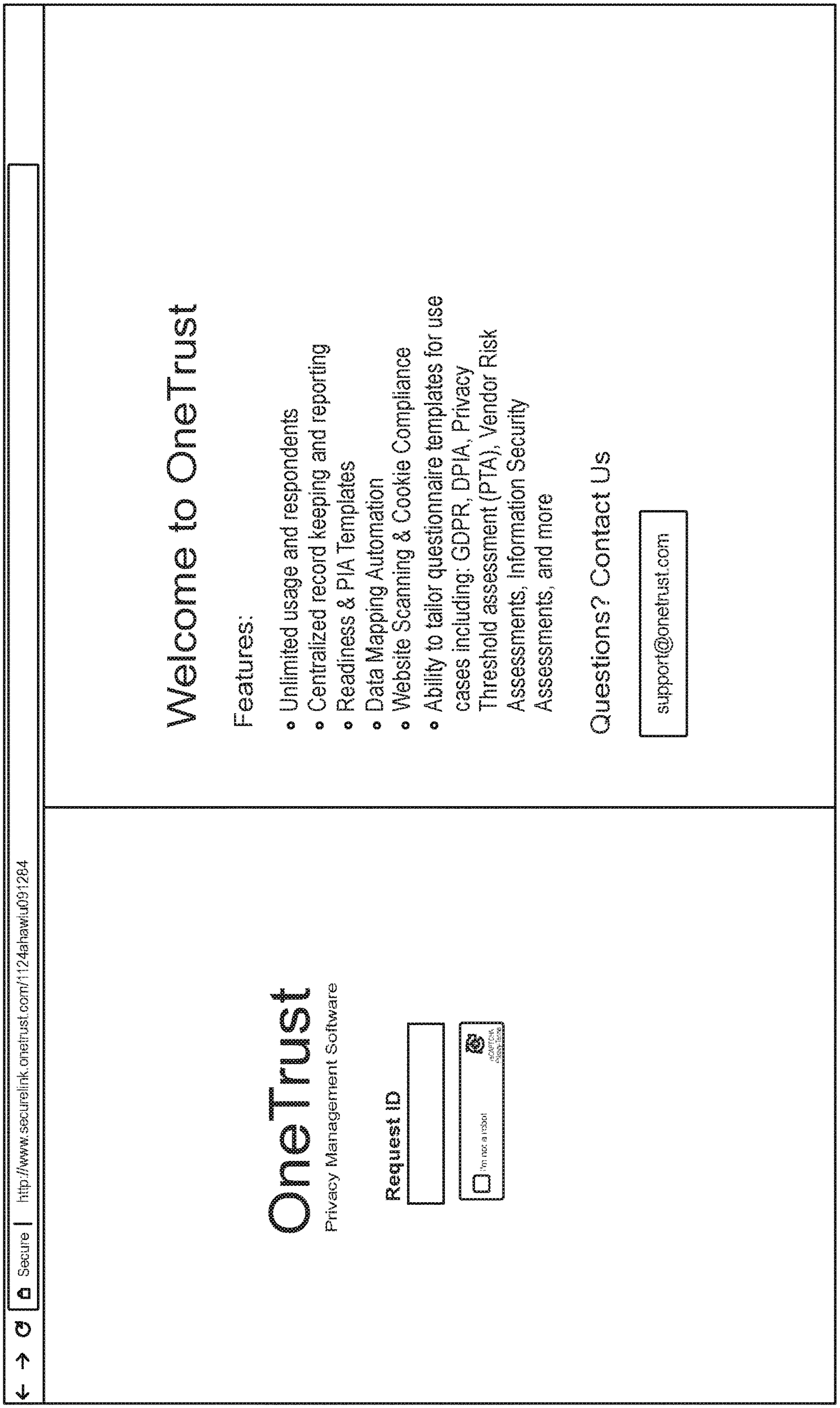
Figure 37:
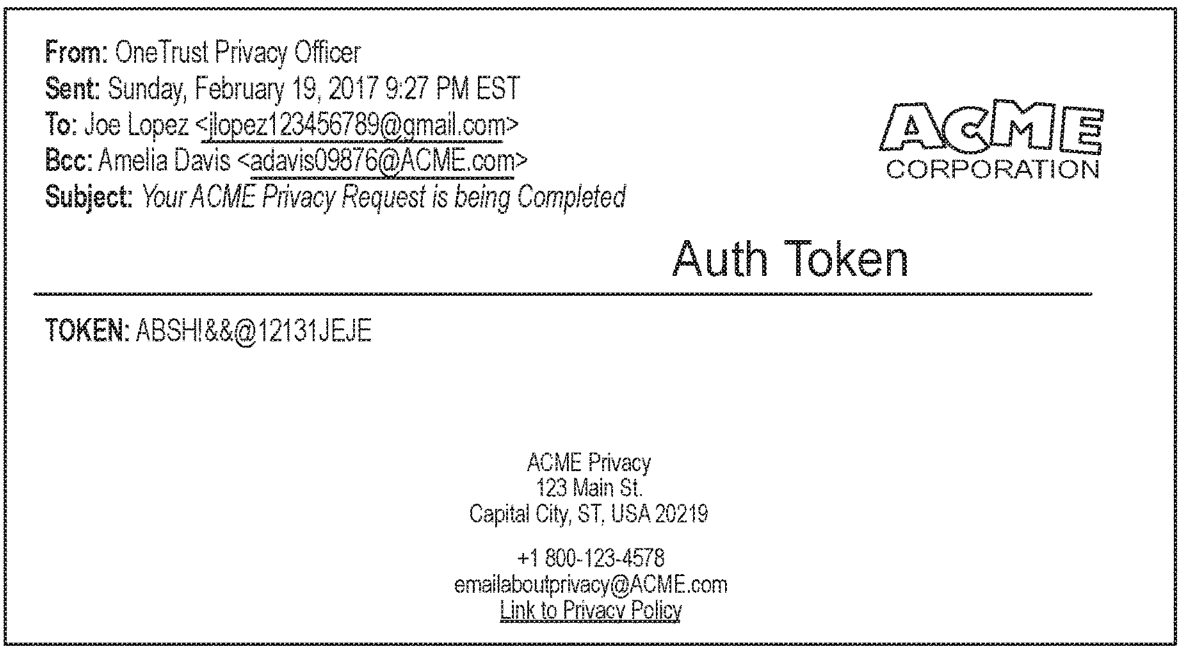
Figure 38:
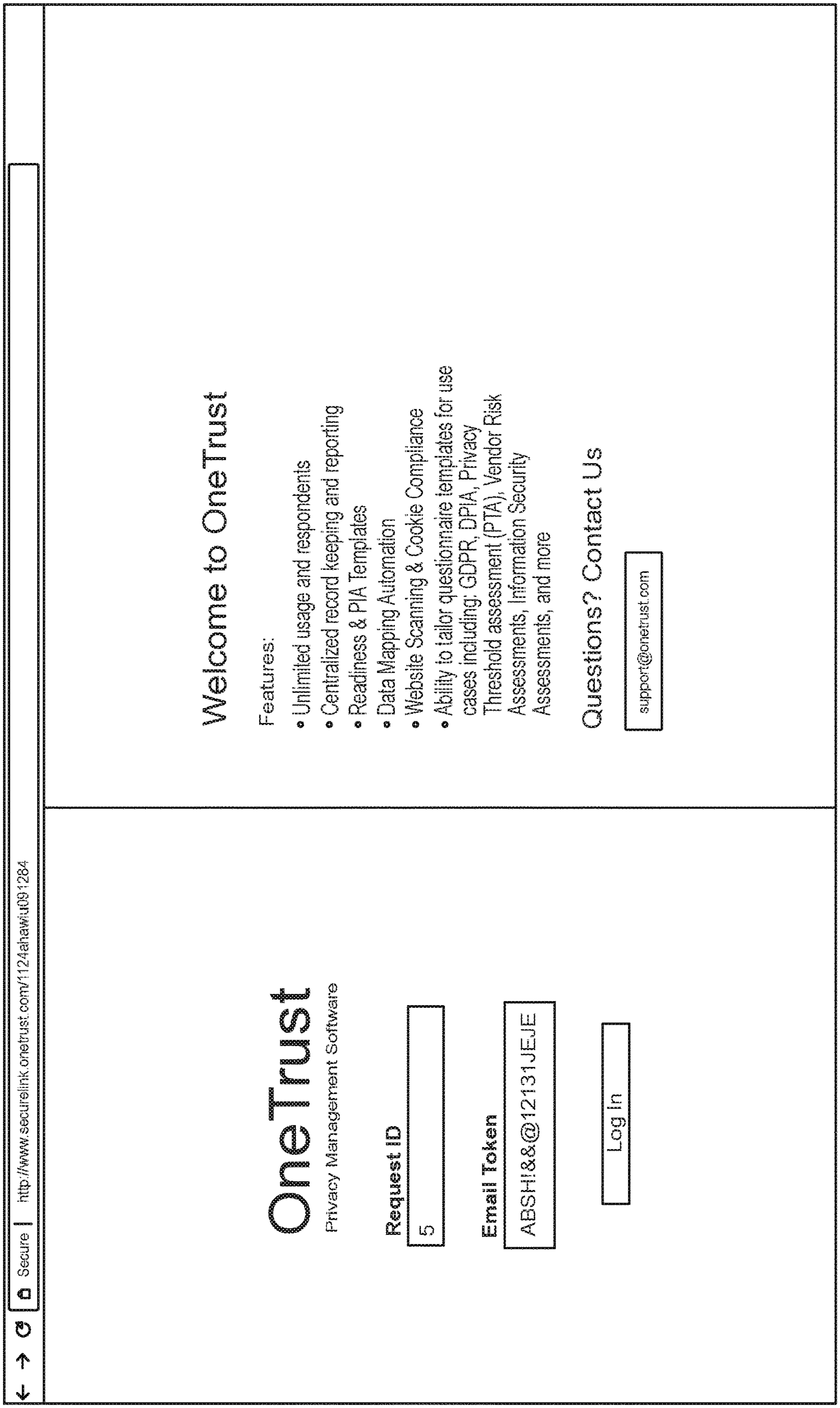
Figure 39:
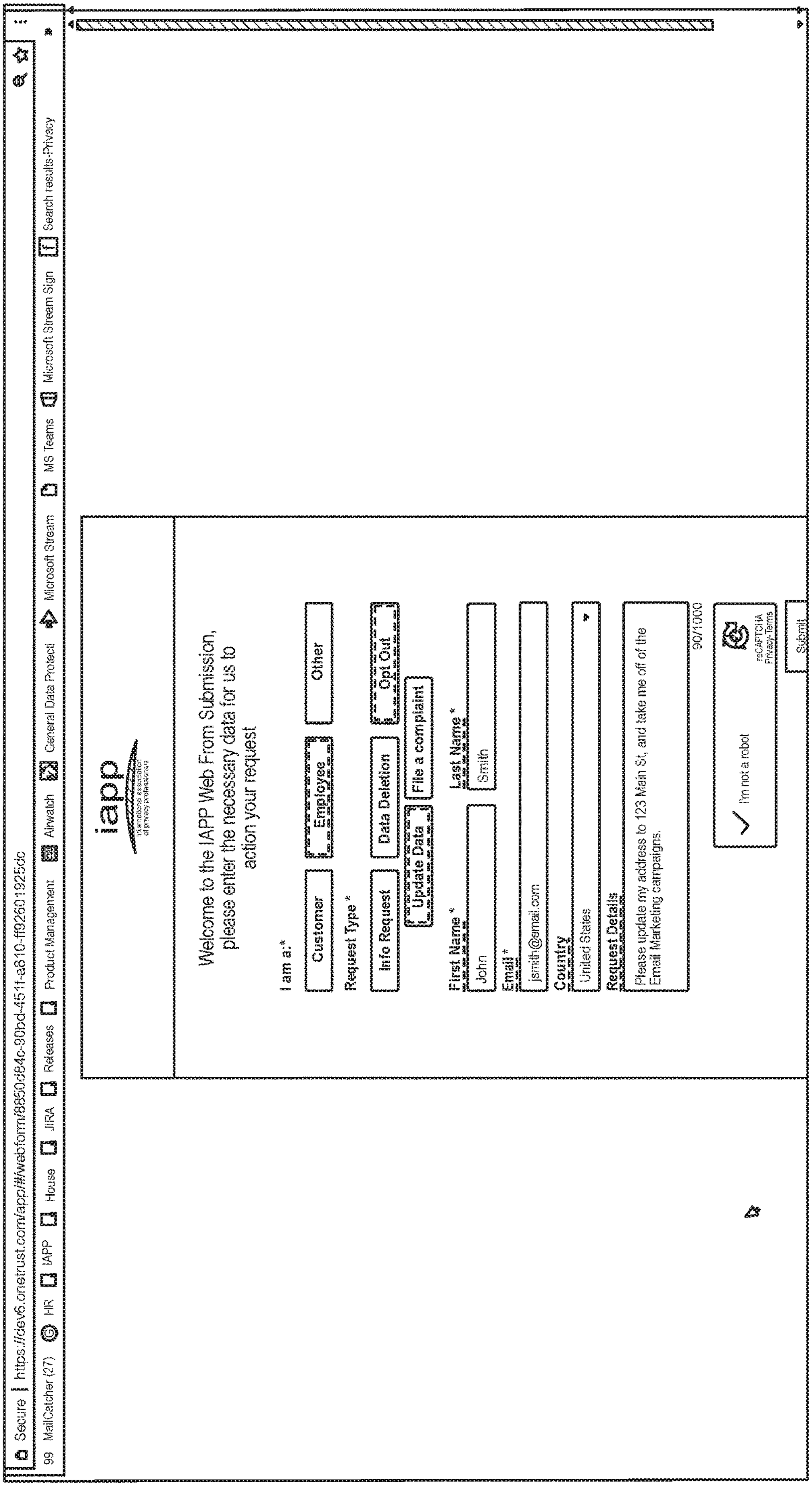
Figure 40:
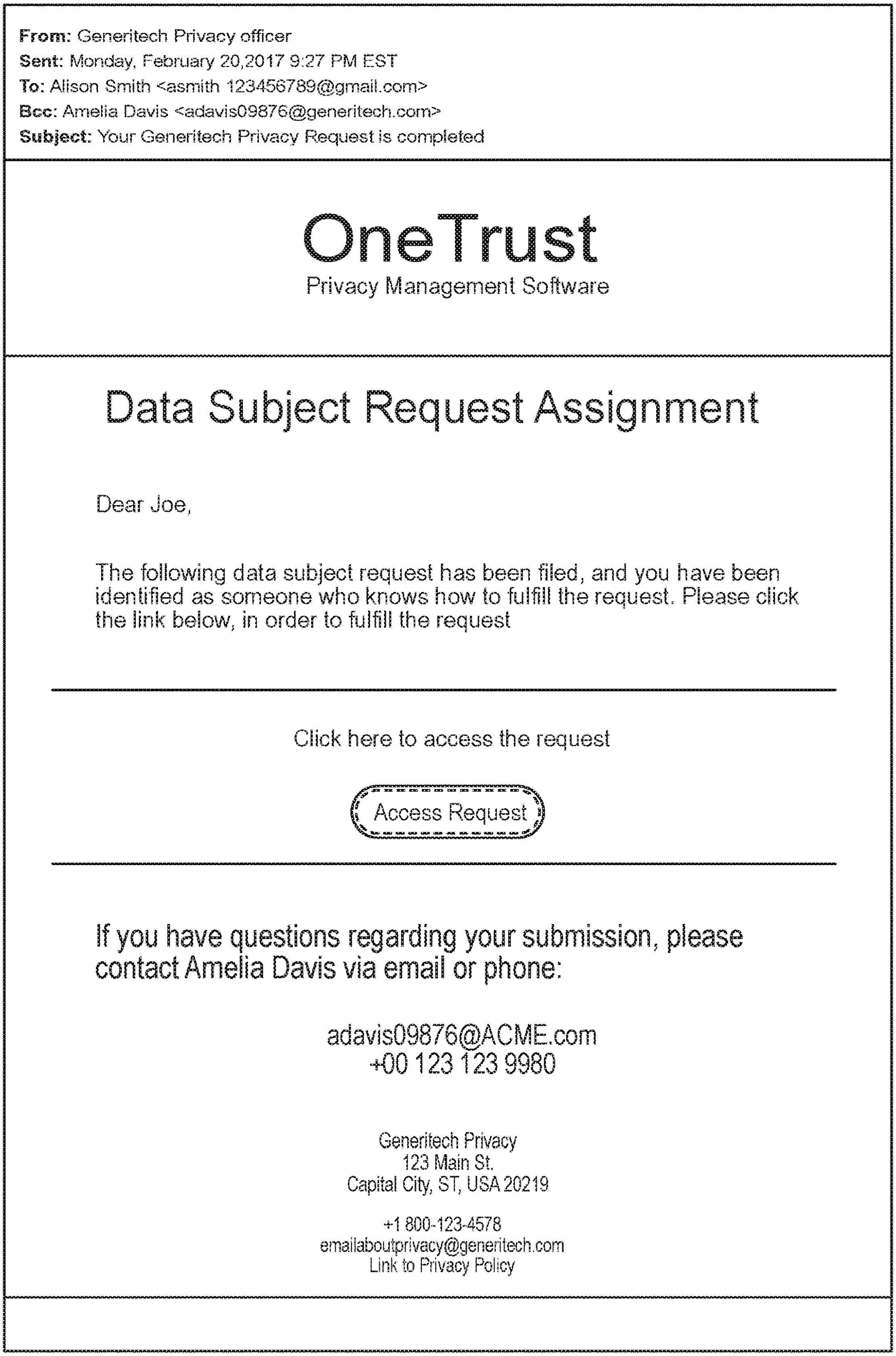
Figure 41:
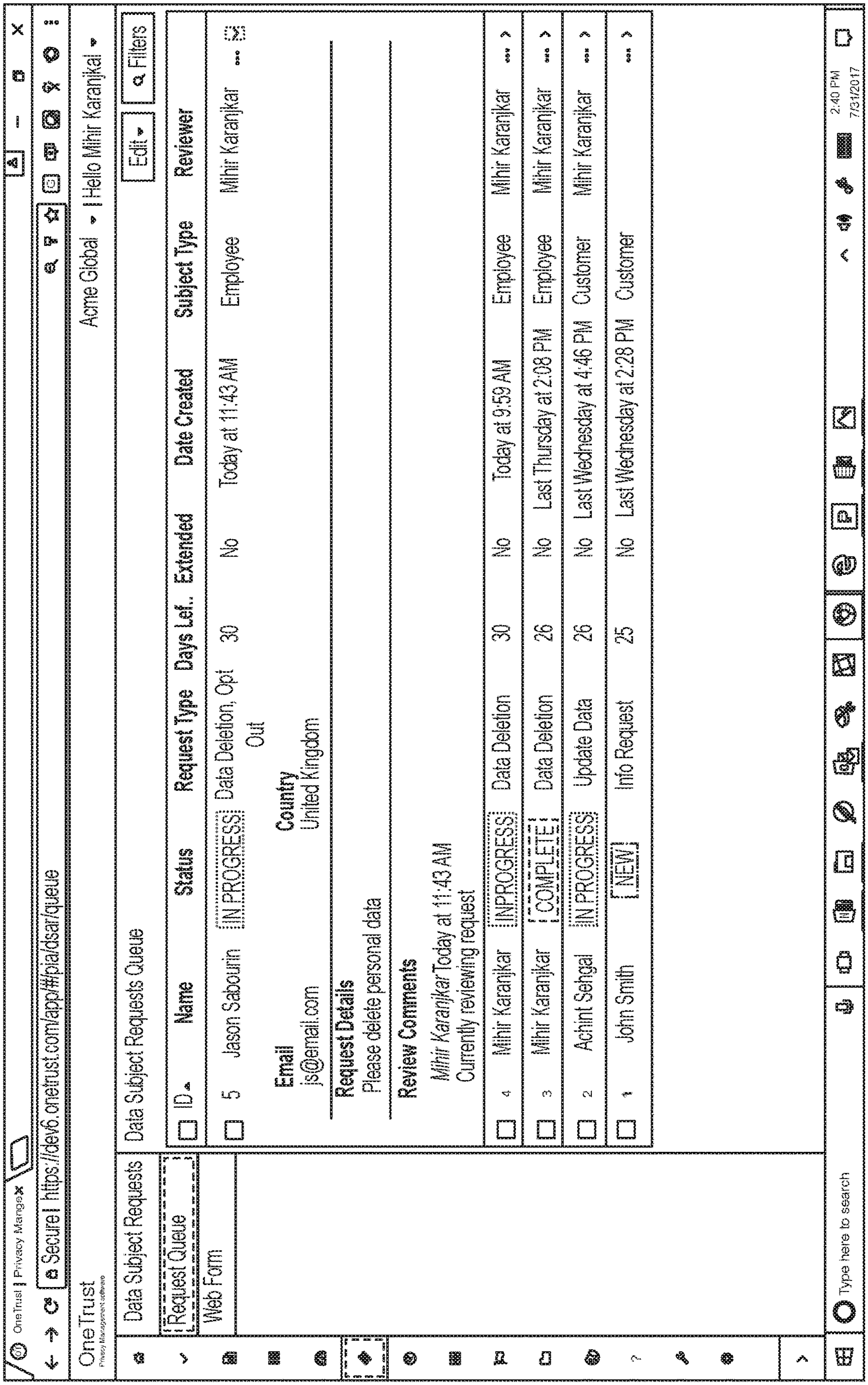
Figure 42:
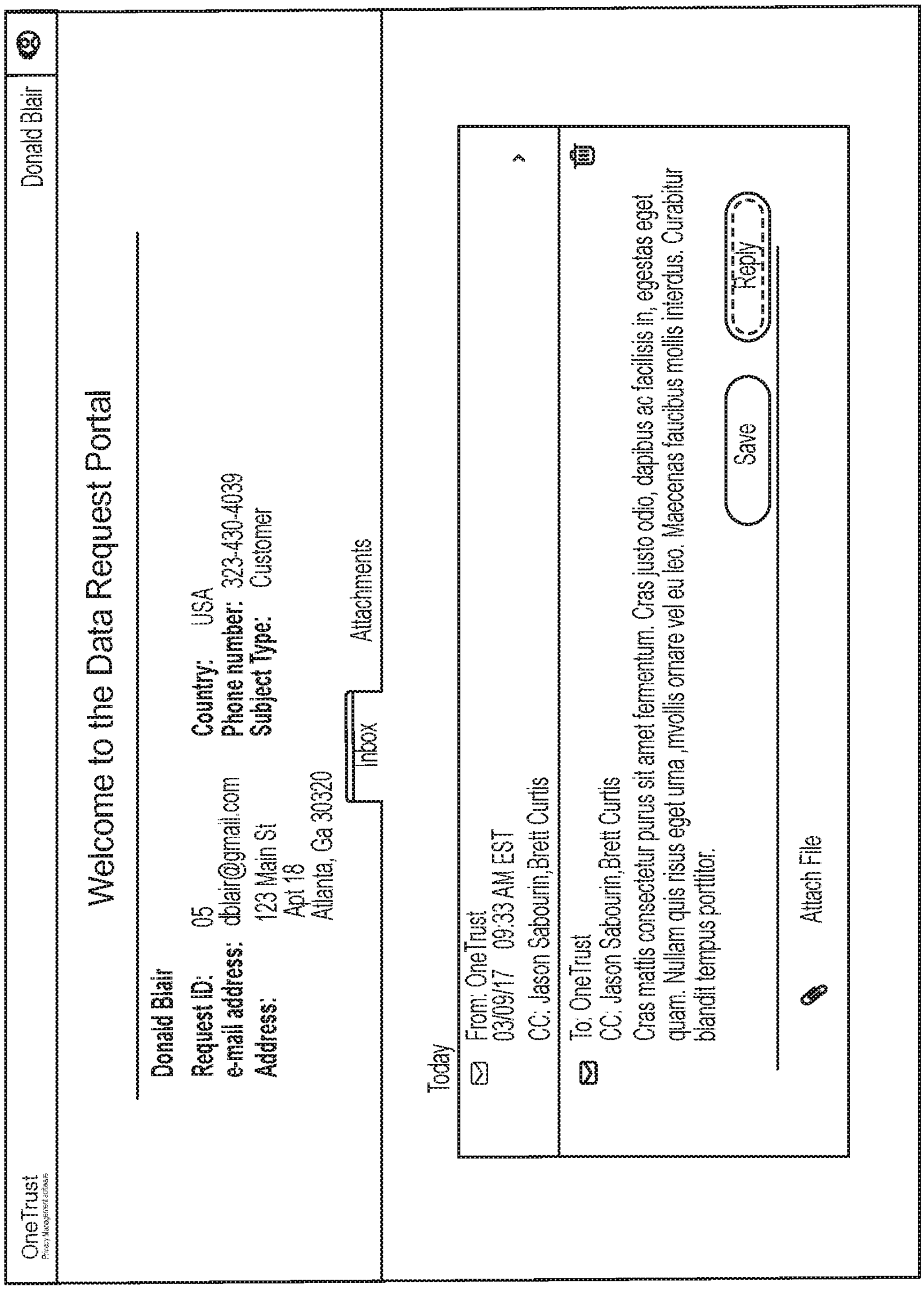
Figure 43:
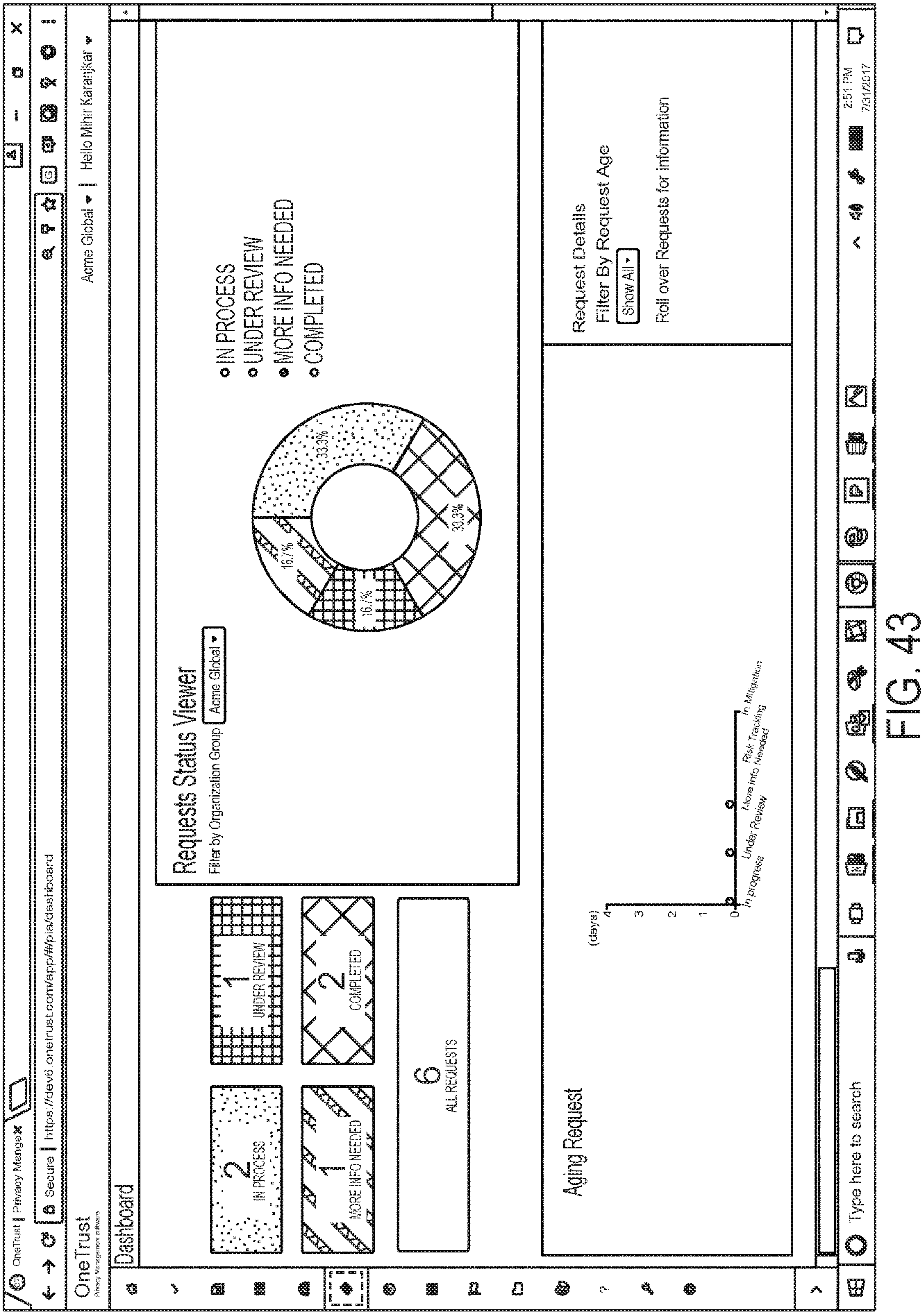
Figure 44:
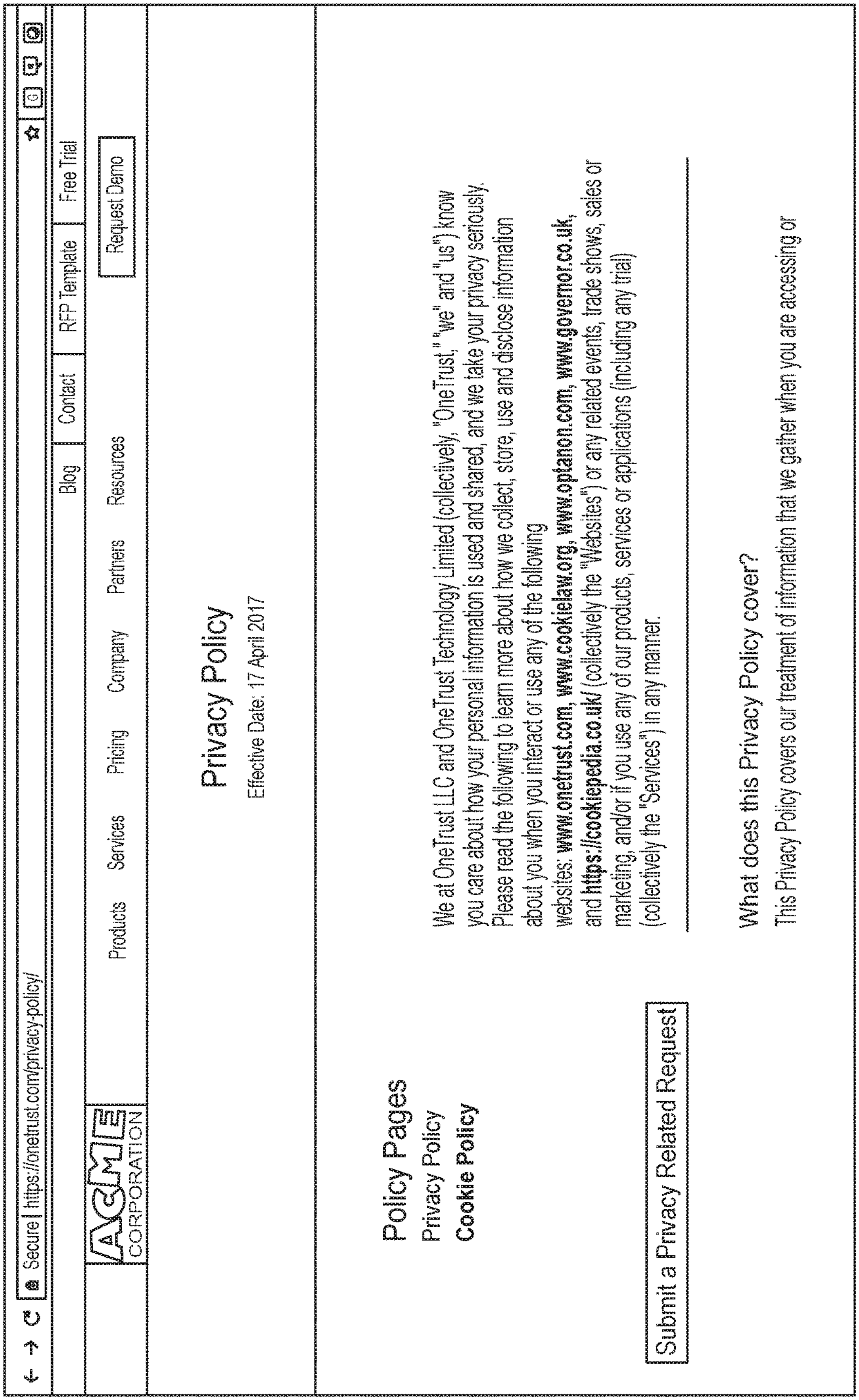
FIGS. 44-49 depict various exemplary screen displays and user interfaces that a user of various embodiments of the system may encounter (FIGS. 47 and 48 collectively show four different views of a Data Subject Request Queue).
Figure 45:
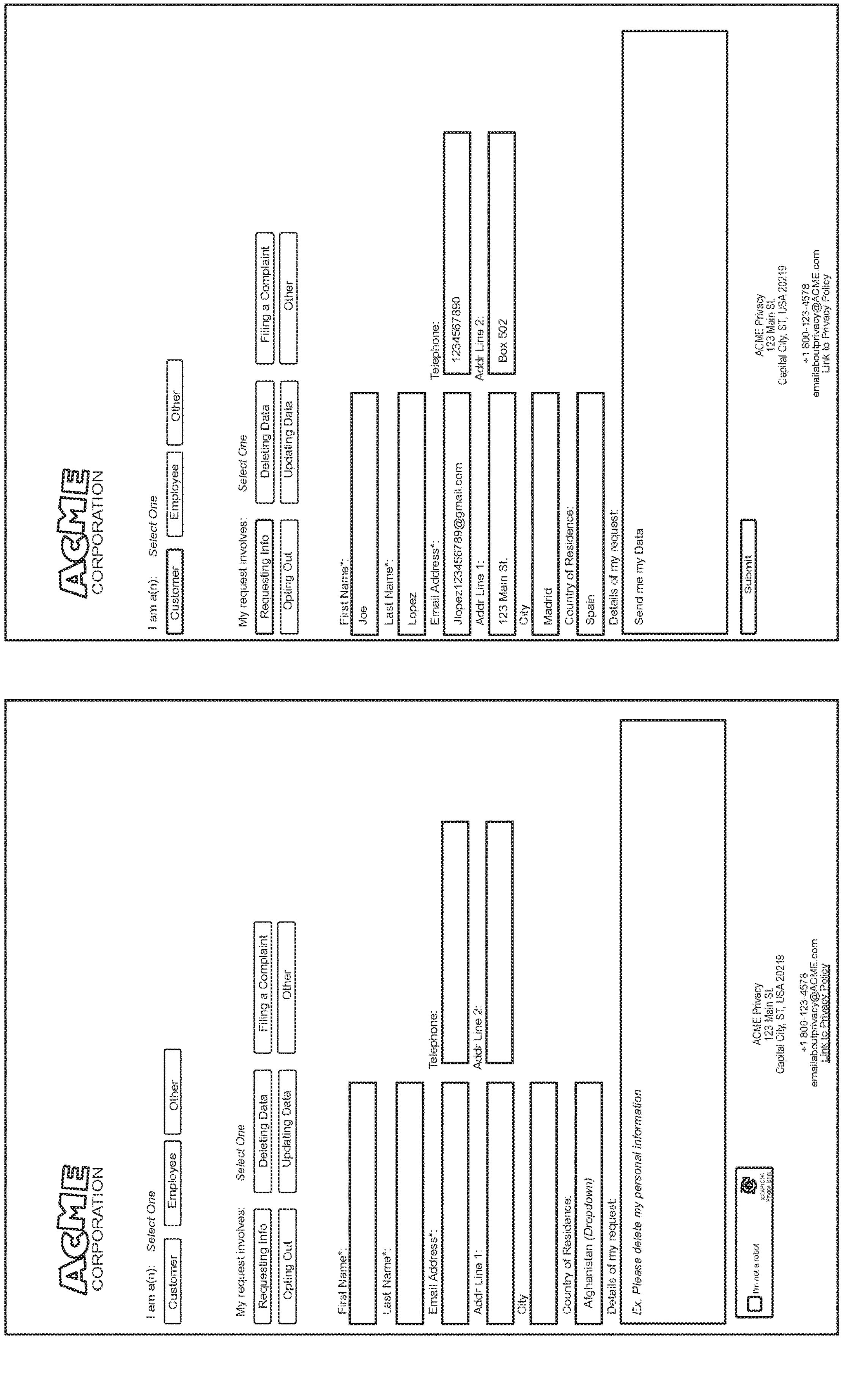

FIG. 35 shows an example email automatically generated by the system in response to the respondent selecting "Reply as Completed" on the screen shown in FIG. 32. As shown in FIG. 35, the correspondence may include a secure link that the requestor may select to access the data that was requested in the DSAR. In particular embodiments, the link is a link to a secure website, such as the website shown in FIG. 36, that provides access to the requested data (e.g., by allowing a user to download a .pdf file, or other suitable file, that includes the requested data). As shown in FIG. 36, the website may require multiple pieces of data to verify that the requestor is permitted to access the site. For example, in order to access the website, the requestor may be required to provide both the unique ID number of the request, and an authentication token, which the system may send to the user via email—See FIGS. 37 and 38.

FIGS. 39-43 are computer screen shots that depict additional user interfaces according to various embodiments.

Additional Concepts

Intelligent Prioritization of DSAR's

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request, (2) the location from which the request is being made, (3) current sensitivities to world events, (4) a status of the requestor (e.g., especially loyal customer), or (5) any other suitable metadata.

In various embodiments, in response to the system determining that the priority of a particular DSAR should be elevated, the system may automatically adjust the deadline for responding to the DSAR. For example, the system may update the deadline in the system's memory and/or modify the "Days Left to Respond" field (See FIG. 13) to include a fewer number of days left to respond to the request. Alternatively, or in addition, the system may use other techniques to convey to a respondent that the request should be expedited (e.g., change the color of the request, send a message to the respondent that they should process the request before non-prioritized requests, etc.)

In various embodiments, in response to the system determining that the priority of a particular DSAR should be lowered, the system may automatically adjust the deadline for responding to the DSAR by adding to the number of days left to respond to the request.

Automatic Deletion of Data Subject Records Based on Detected Systems

In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Automatic Determination of Business Processes that Increase Chance of Deletion Requests In various embodiments, the system is adapted to store, in memory, a log of DSAR actions. The system may also store, in memory, additional information regarding the data subjects of each of the requests. The system may use this information, for example, to determine which business processes are most commonly associated with a data subject submitting a request to have their personal information deleted from the organization's systems. The organization may then use this information to revise the identified business processes in an effort to reduce the number of deletion requests issued by data subjects associated with the business processes.

As a particular example, the system may analyze stored information to determine that a high number (e.g., 15%) of all participants in a company's loyalty program submit requests to have their personal information deleted from the company's systems. In response to making this determination, the system may issue an electronic alert to an appropriate individual (e.g., a privacy officer of the company), informing them of the high rate of members of the company's loyalty program issuing personal data delete requests. This alert may prompt the individual to research the issue and try to resolve it.

Automated Data Subject Verification

In various embodiments, before a data subject request can be processed, the data subject's identity may need to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Stated more particularly, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use various reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

Figure 46:
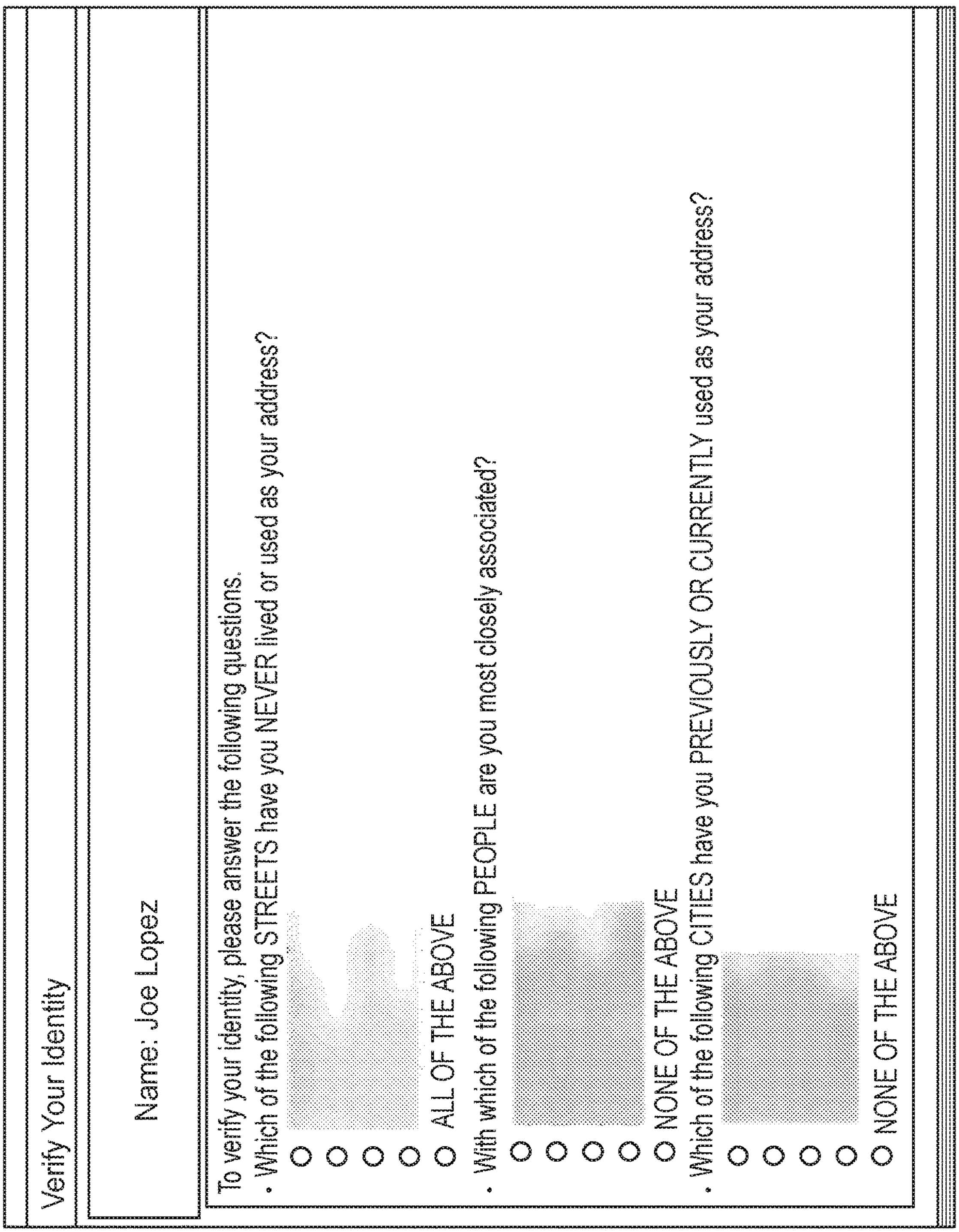

FIG. 46 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Blacklist

In various embodiments, a particular organization may not be required to respond to a data subject access request that originates (e.g., is received from) a malicious requestor. A malicious requestor may include, for example: (1) a requestor (e.g., an individual) that submits excessive or redundant data subject access requests; (2) a group of requestors such as researchers, professors, students, NGOs, etc. that submit a plurality of requests for reasons other than those reasons provided by policy, law, etc.; (3) a competitor of the company receiving the data subject access request that is submitting such requests to tie up the company's resources unnecessarily; (4) a terrorist or other organization that may spam requests to disrupt the company's operation and response to valid requests; and/or (5) any other request that may fall outside the scope of valid requests made for reasons proscribed by public policy, company policy, or law. In particular embodiments, the system is configured to maintain a blacklist of such malicious requestors.

In particular embodiments, the system is configured to track a source of each data subject access request and analyze each source to identify sources from which: (1) the company receives a large volume of requests; (2) the company receives a large number of repeat requests; (3) etc. These sources may include, for example: (1) one or more particular IP addresses; (2) one or more particular domains; (3) one or more particular countries; (4) one or more particular institutions; (5) one or more particular geographic regions; (6) etc. In various embodiments, in response to analyzing the sources of the requests, the system may identify one or more sources that may be malicious (e.g., are submitting excessive requests).

In various embodiments, the system is configured to maintain a database of the identified one or more sources (e.g., in computer memory). In particular embodiments, the database may store a listing of identities, data sources, etc. that have been blacklisted (e.g., by the system). In particular embodiments, the system is configured to, in response to receiving a new data subject access request, cross reference the request with the blacklist to determine if the requestor is on the blacklist or is making the request from a blacklisted source. The system may then, in response to determining that the requestor or source is blacklisted, substantially automatically reject the request. In particular embodiments, the blacklist cross-referencing step may be part of the requestor authentication (e.g., verification) discussed above. In various embodiments, the system may be configured to analyze request data on a company by company basis to generate a blacklist. In other embodiments, the system may analyze global data (e.g., all data collected for a plurality of companies that utilize the data subject access request fulfillment system) to generate the blacklist.

In particular embodiments, the system may be configured to fulfill data subject access requests for the purpose of providing a data subject with information regarding what data the company collects and for what purpose, for example, so the data subject can ensure that the company is collecting data for lawful reasons. As such, the system may be configured to identify requestors and other sources of data requests that are made for other reasons (e.g., one or more reasons that would not obligate the company to respond to the request). These reasons may include, for example, malicious or other reasons such as: (1) research by an academic institution by one or more students or professors; (2) anticompetitive requests by one or more competitors; (3) requests by disgruntled former employees for nefarious reasons; (4) etc.

In particular embodiments, the system may, for example, maintain a database (e.g., in computer memory) of former employees. In other embodiments, the system may, for example: (1) identify a plurality of IP addresses associated with a particular entity (e.g., academic organization, competitor, etc.); and (2) substantially automatically reject a data subject access request that originates from the plurality of IP addresses. In such embodiments, the system may be configured to automatically add such identified IP addresses and/or domains to the blacklist.

In still other embodiments, the system is configured to maintain a listing of blacklisted names of particular individuals. These may include, for example, one or more individuals identified (e.g., by an organization or other entity) as submitting malicious data subject access requests).

Figure 47:
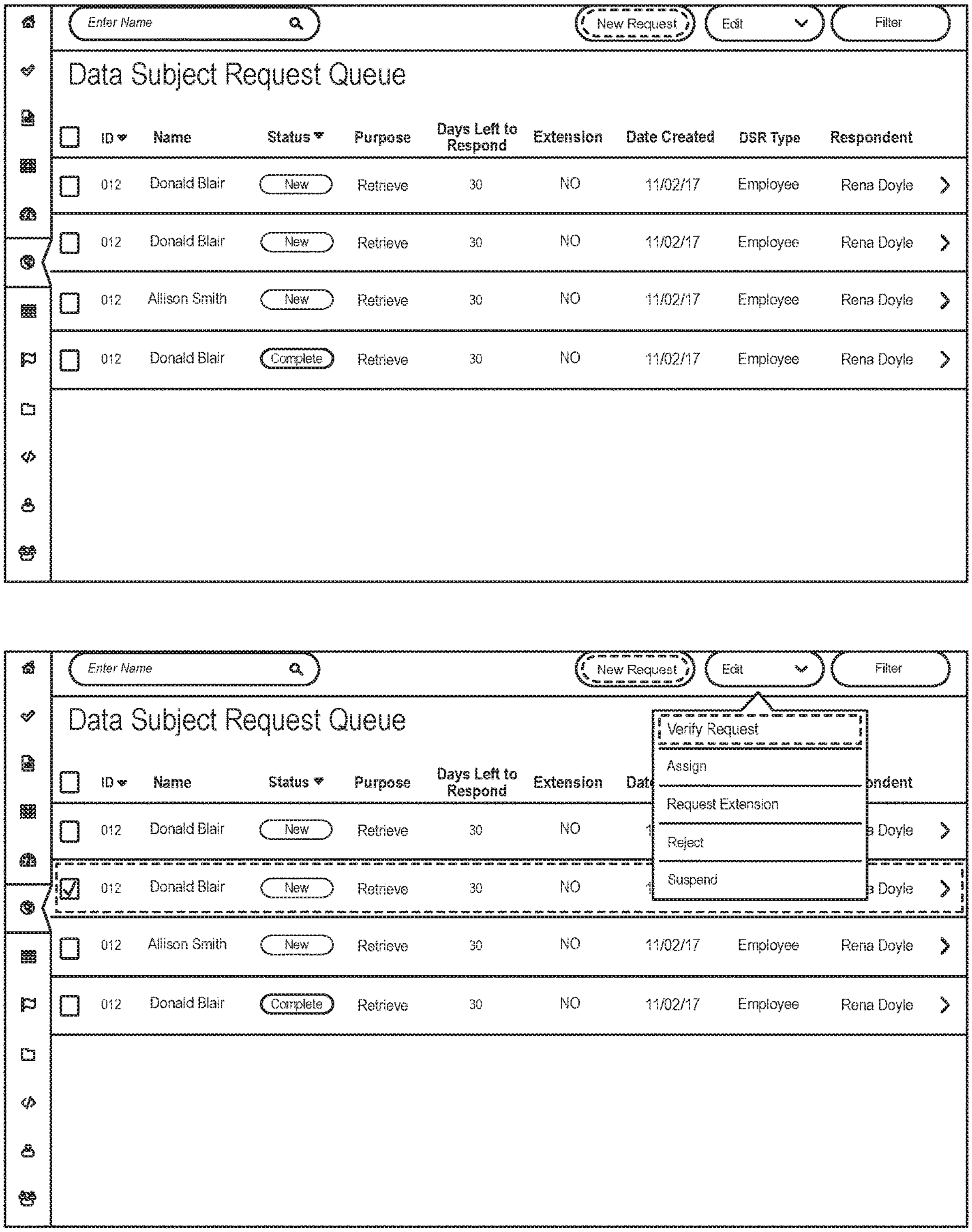
Figure 48:
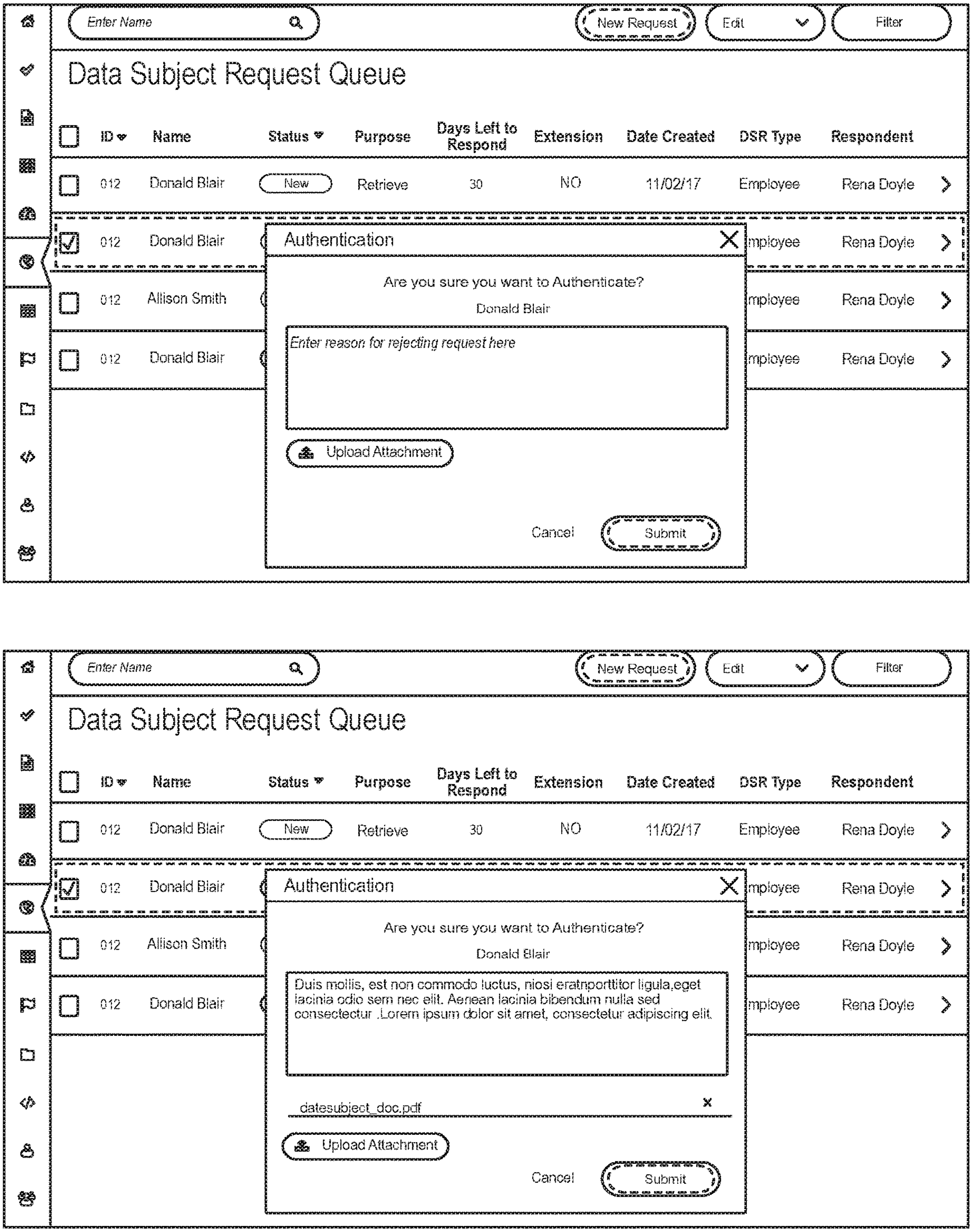

FIG. 47 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicium for verifying the request. The user may also optionally select to reject the request. FIG. 48 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store personal data related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty-day period, or any other suitable time period).

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

Figure 49:
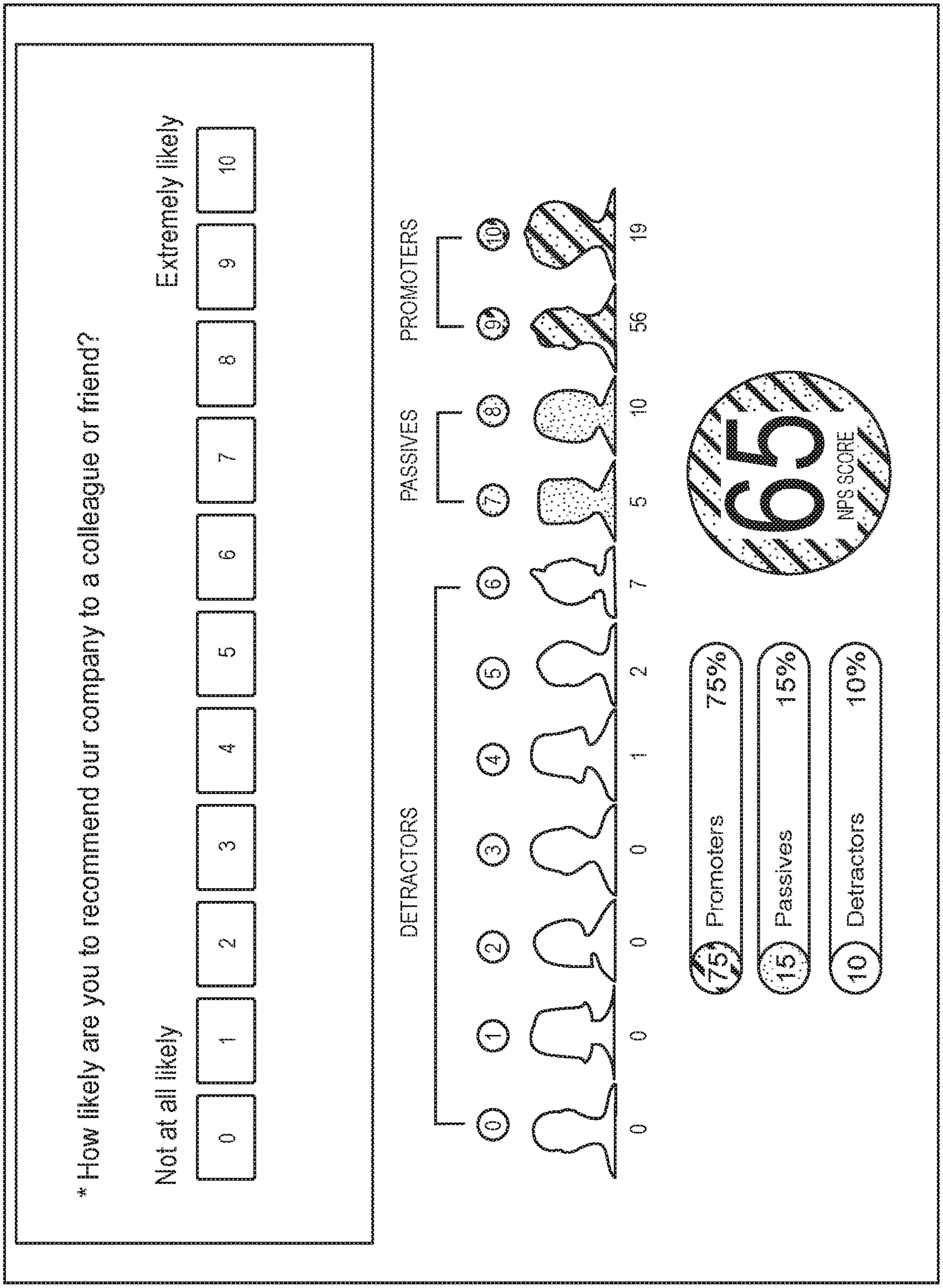

FIG. 49 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 49, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 49 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 49, the system may be configured to assign particular categories to particular ratings on the 10 point scale. The system may be configured to track and store responses provided by consumers and calculate an overall NPS score for the provider. The system may be further configured to generate a visual representation of the NPS score, including a total number of responses received for each particular score and category as shown in FIG. 49.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

Identifying and Deleting Orphaned Data

In particular embodiments, an Orphaned Data Action System is configured to analyze one or more data systems (e.g., data assets), identify one or more pieces of personal data that are one or more pieces of personal data that are not associated with one or more privacy campaigns of the particular organization, and notify one or more individuals of the particular organization of the one or more pieces of personal data that are one or more pieces of personal data that are not associated with one or more privacy campaigns of the particular organization. In various embodiments, one or more processes described herein with respect to the orphaned data action system may be performed by any suitable server, computer, and/or combination of servers and computers.

Figure 50:
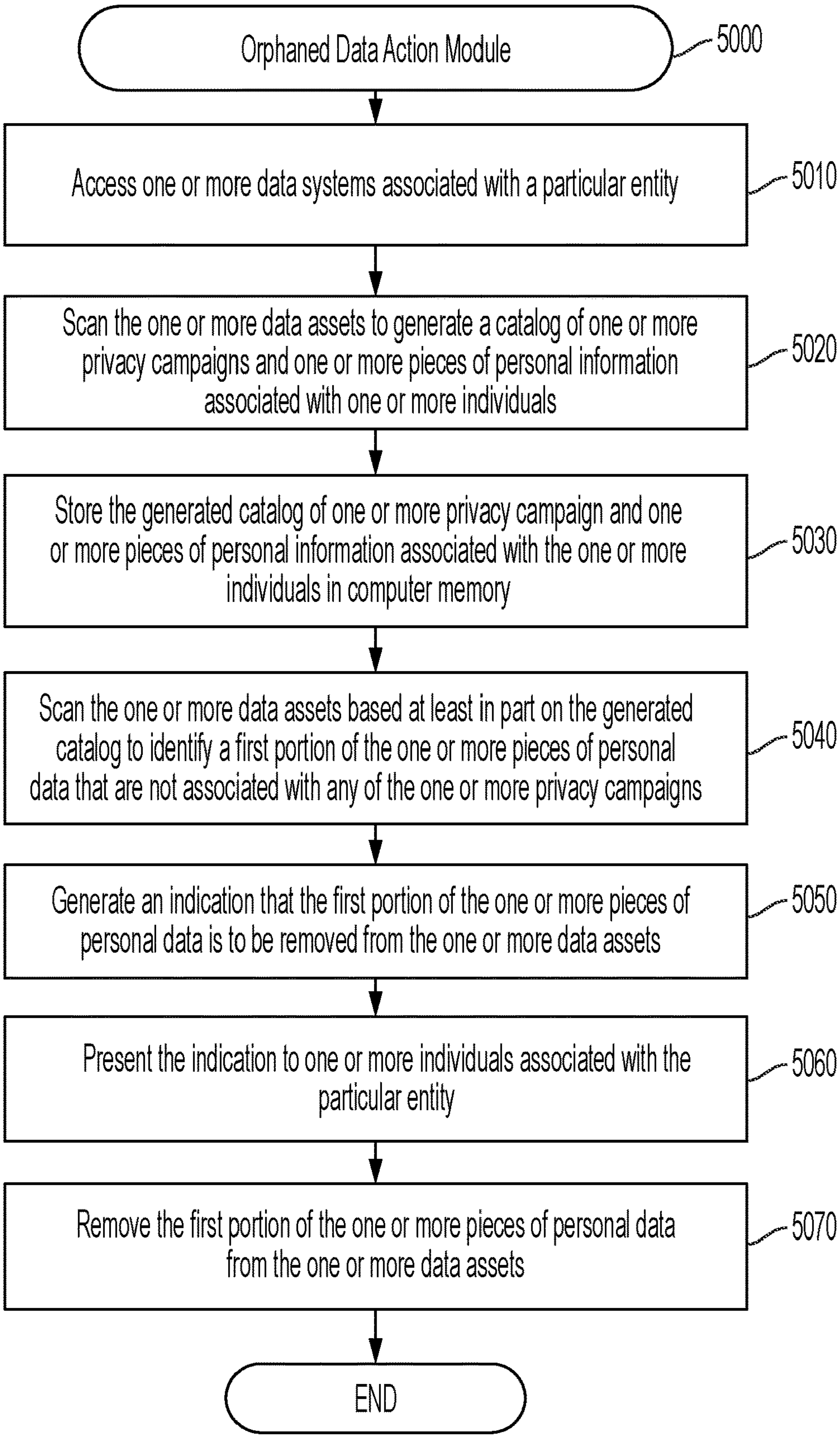
FIG. 50 is a flowchart showing an example of processes performed by an Orphaned Data Action Module 5000 according to various embodiments.

Various processes performed by the Orphaned Data Action System may be implemented by an Orphaned Data Action Module 5000. Referring to FIG. 50, in particular embodiments, the system, when executing the Orphaned Data Action Module 5000, is configured to: (1) access one or more data assets of a particular organization; (2) scan the one or more data assets to generate a catalog of one or more privacy campaigns and one or more pieces of personal information associated with one or more individuals; (3) store the generated catalog in computer memory; (4) scan one or more data assets based at least in part on the generated catalog to identify a first portion of the one or more pieces of personal data that are one or more pieces of personal data that are not associated with the one or more privacy campaigns; (5) generate an indication that the first portion of one or more pieces of personal data that are not associated with the one or more privacy campaigns of the particular organization is to be removed from the one or more data assets; (6) present the indication to one or more individuals associated with the particular organization; and (7) remove the first portion of the one or more pieces of personal data that are not associated with the one or more privacy campaigns of the particular organization from the one or more data assets.

When executing the Orphaned Data Action Module 5000, the system begins, at Step 5010, by accessing one or more data systems associated with the particular entity. The particular entity may include, for example, a particular organization, company, sub-organization, etc. In particular embodiments, the one or more data assets (e.g., data systems) may include, for example, any entity that collects, processes, contains, and/or transfers data (e.g., a software application, "internet of things" computerized device, database, website, datacenter, server, etc.). For example, a data asset may include any software or device utilized by a particular entity for data collection, processing, transfer, storage, etc.

In particular embodiments, the system is configured to identify and access the one or more data assets using one or more data modeling techniques. As discussed more fully above, a data model may store the following information: (1) the entity that owns and/or uses a particular data asset; (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify and access the one or more data assets associated with the particular entity.

Continuing to Step 5020, the system is configured to scan the one or more data assets to generate a catalog of one or more privacy campaigns and one or more pieces of personal information associated with one or more individuals. The catalog may include a table of the one or more privacy campaigns within the data assets of the particular entity and, for each privacy campaign, the one or more pieces of personal data stored within the data assets of the particular entity that are associated with the particular privacy campaign. In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may access, via one or more computer networks, one or more data models that map an association between one or more pieces of personal data stored within one or more data assets of the particular entity and one or more privacy campaigns of the particular entity. As further described herein, the data models may access the data assets of the particular entity and use one or more suitable data mapping techniques to link, or otherwise associate, the one or more pieces of personal data stored within one or more data assets of the particular entity and one or more privacy campaigns of the particular entity. In some implementations, the one or more data models may link, or otherwise associate, a particular individual and each piece of personal data of that particular individual that is stored on one or more data assets of the particular entity.

In some embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities. In some implementations, the system is configured to generate and populate a data model substantially on the fly (e.g., as the system receives new data associated with particular processing activities). For example, a particular processing activity (e.g., privacy campaign) may include transmission of a periodic advertising e-mail for a particular company (e.g., a hardware store). A data model may locate the collected and stored email addresses for customers that elected to receive (e.g., consented to receipt of) the promotional email within the data assets of the particular entity, and then map each of the stored email addresses to the particular processing activity (i.e., the transmission of a periodic advertising e-mail) within the data assets of the particular entity.

Next, at Step 5030, the system is configured to store the generated catalog of one or more privacy campaigns and one or more pieces of personal information associated with one or more individuals. In some implementations, the system may receive an indication that a new processing activity (e.g., privacy campaign) has been launched by the particular entity. In response to receiving the indication, the system may modify the one or more data models to map an association between (i) one or more pieces of personal data associated with one or more individuals obtained in connection with the new privacy campaign and (ii) the new privacy campaign initiated by the particular entity. As the system receives one or more pieces of personal data associated with one or more individuals (e.g., an email address signing up to receive information from the particular entity), then the data model associated with the particular processing activity may associate the received personal data with the privacy campaign. In some implementations, one or more data assets may already include the particular personal data (e.g., email address) because the particular individual, for example, previously provided their email address in relation to a different privacy campaign of the particular entity. In response, the system may access the particular personal data and associate that particular personal data with the new privacy campaign.

At Step 5040, the system is configured to scan one or more data assets based at least in part on the generated catalog to identify a first portion of the one or more pieces of personal data that are one or more pieces of personal data that are not associated with the one or more privacy campaigns. In various embodiments, the system may use the generated catalogue to scan the data assets of the particular entity to identify personal data that has been collected and stored using one or more computer systems operated and/or utilized by a particular organization where the personal data is not currently being used as part of any privacy campaigns, processing activities, etc. undertaken by the particular organization. The one or more pieces of personal data that are not associated with the one or more privacy campaigns may be a portion of the personal data that is stored by the particular entity. In some implementations, the system may analyze the data models to identify the one or more pieces of personal data that are not associated with the one or more privacy campaigns.

When the particular privacy campaign, processing activity, etc. is terminated or otherwise discontinued, the system may determine if any of the associated personal data that has been collected and stored by the particular organization is now orphaned data. In some implementations, in response to the termination of a particular privacy campaign and/or processing activity, (e.g., manually or automatically), the system may be configured to scan one or more data assets based at least in part on the generated catalog or analyze the data models to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.). In some implementations, the system may generate an indication that one or more pieces of personal data that are associated with the terminated one or more privacy campaigns are included in the portion of the one or more pieces of personal data (e.g., orphaned data).

In additional implementations, the system may determine that a particular privacy campaign, processing activity, etc. has not been utilized for a period of time (e.g., a day, a month, a year). In response, the system may be configured to terminate the particular processing activity, processing activity, etc. In some implementations, in response to the system determining that a particular processing activity has not been utilized for a period of time, the system may prompt one or more individuals associated with the particular entity to indicate whether the particular privacy campaign should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) the promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

Continuing to Step 5050, the system is configured to generate an indication that the portion of one or more pieces of personal data that are not associated with the one or more privacy campaigns of the particular entity is to be removed from the one or more data assets. At Step 5060, the system is configured to present the indication to one or more individuals associated with the particular entity. The indication may be an electronic notification to be provided to an individual (e.g., privacy officer) associated with the particular entity. The electronic notification may be, for example, (1) a notification within a software application (e.g., a data management system for the one or more data assets of the particular entity), (2) an email notification, (3) etc.

In some implementations, the indication may enable the individual (e.g., privacy officer of the particular entity) to select a set of the one or more pieces of personal data of the portion of the one or more pieces of personal data to retain based on one or more bases to retain the set of the one or more pieces of personal data.

In particular embodiments, the system may prompt the one or more individuals to provide one or more bases to retain the first set of the one or more pieces of personal data of the first portion of the one or more pieces of personal data that are not associated with the one or more privacy campaigns. In some implementations, in response to receiving the provided one or more valid bases to retain the first set of the one or more pieces of personal data from the one or more individuals associated with the particular entity, submitting the provided one or more valid bases to retain the first set of the one or more pieces of personal data to one or more second individuals associated with the particular entity for authorization. In response, the system may retain the first set of the one or more pieces of personal data of the first portion of the one or more pieces of personal data from the one or more individuals associated with the particular entity. Further, the system may remove a second set of the one or more pieces of personal data of the first portion of the one or more pieces of personal data that are not associated with the one or more privacy campaigns from the one or more data assets. In particular embodiments, the second set of the one or more pieces of personal data may be different from the first set of the one or more pieces of personal data.

Continuing to Step 5070, the system is configured to remove, by one or more processors, the first portion of the one or more pieces of personal data that are not associated with the one or more privacy campaigns of the particular entity from the one or more data assets.

Data Testing to Confirm Deletion under a Right to Erasure

In particular embodiments, a Personal Data Deletion System is configured to: (1) at least partially automatically identify and delete personal data that an entity is required to erase under one or more of the conditions discussed above; and (2) perform one or more data tests after the deletion to confirm that the system has, in fact, deleted any personal data associated with the data subject.

Figure 51:
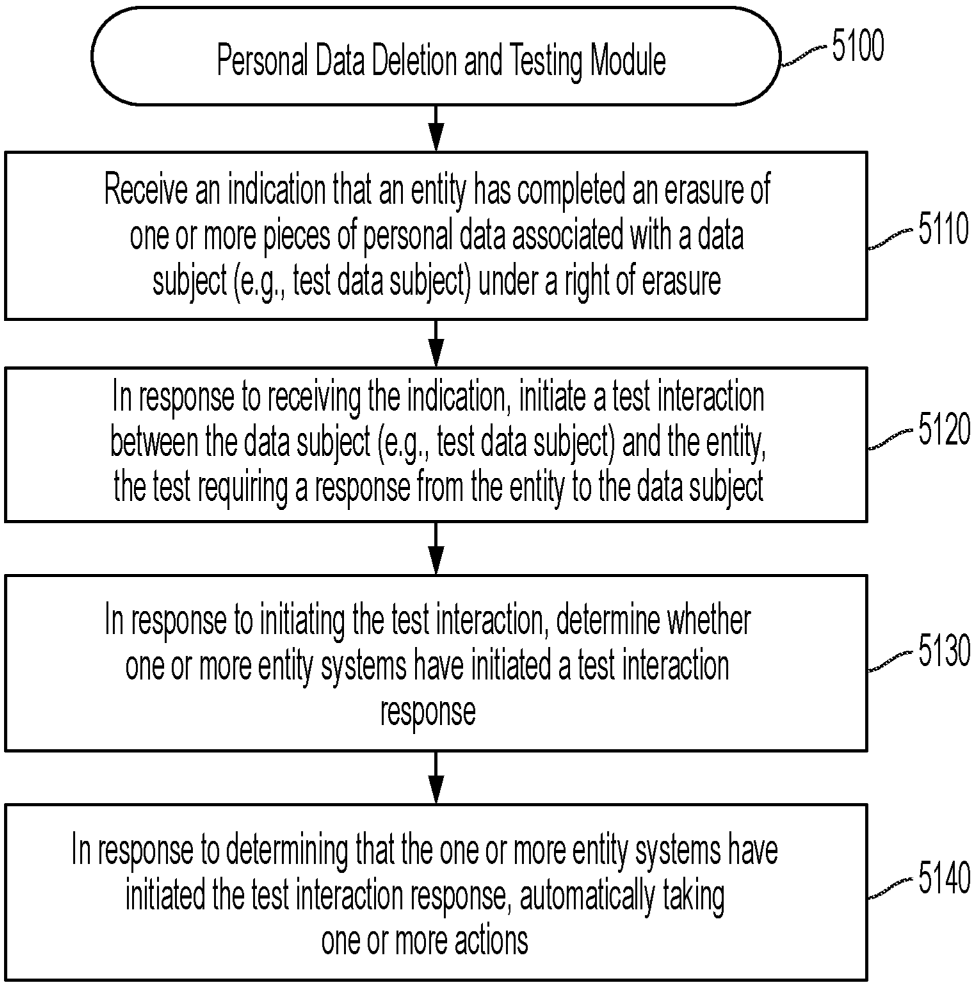
FIG. 51 is a flowchart showing an example of processes performed by a Personal Data Deletion and Testing Module 5100 according to various embodiments.

Various processes performed by the Personal Data Deletion System may be implemented by a Personal Data Deletion and Testing Module 5100. Referring to FIG. 51, in particular embodiments, the system, when executing the Personal Data Deletion and Testing Module 5100, is configured to: (1) receive an indication that the entity has completed an erasure of one or more pieces of personal data associated with the data subject under a right of erasure; (2) initiate a test interaction between the data subject and the entity, the test interaction requiring a response from the entity to the data subject; (3) determine whether one or more system associated with the entity have initiated a test interaction response to the data subject based at least in part on the test interaction; (4) in response to determining that the one or more systems associated with the entity have initiated the test interaction response, (a) determine that the entity has not completed the erasure of the one or more pieces of personal data associated with the data subject and (b) automatically take one or more actions with regard to the personal data associated with the data subject.

When executing the Personal Data Deletion and Testing Module 5100, the system begins, at Step 5110, by receiving an indication that the entity has completed an erasure of one or more pieces of personal data associated with the data subject under a right of erasure. The particular entity may include, for example, a particular organization, company, sub-organization, etc. In particular embodiments, the one or more computers systems may be configured to store (e.g., in memory) an indication that the data subject's request to delete any of their personal data stored by the one or more computers systems has been processed. Under various legal and industry policies/standards, the organization may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving an indication that the deletion request for the data subject's personal data has been processed or the certain period of time (described above) has passed, the system may be configured to perform a data test to confirm the deletion of the data subject's personal data.

Continuing to Step 5120, in response to receiving the indication that the entity has completed the erasure, the system is configured to initiate a test interaction between the data subject and the entity, the test interaction requiring a response from the entity to the data subject. In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not to provide any contact data. In response to submitting the interaction request (e.g., submitting the webform), the system may be configured to determine whether the one or more computers systems have generated and/or transmitted a response to the data subject. The system may be configured to determine whether the one or more computers systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computers systems (e.g., automatically). In some implementations, completing the contact-request form may include providing one or more pieces of identifying data associated with the data subject, the one or more pieces of identifying data comprising data other than contact data. In response to determining that the data subject has been contacted following submission of the form, the system may determine that the one or more computers systems have not fully deleted the data subject's personal data (e.g., because the one or more computers systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion of data of any personal data associated with a particular test data subject. In response to requesting the deletion of data for the particular test data subject, the system may then take one or more actions using the test profile data associated with the particular test data subjects in order to confirm that the one or more computers systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

Next, at Step 5130, in response to initiating the test interaction, the system is configured to determine whether one or more system associated with the entity have initiated a test interaction response to the data subject based at least in part on the test interaction. In response to determining that the entity has generated a response to the test interaction, the system may be configured to determine that the entity has not complied with the data subject's request (e.g., deletion of their personal data from the one or more computers systems). For example, if the test interaction requests for the entity to locate and provide any personal data the system has stored related to the data subject, then by the system providing a response that includes one or more pieces of personal data related to the data subject, the system may determine that the one or more computers systems have not complied with the request. As described above, the request may be an erasure of one or more pieces of personal data associated with the data subject under a right of erasure. In some implementations, the test interaction response may be any response that includes any one of the one or more pieces of personal data the system indicated was erased under the right of erasure. In some implementations, the test interaction response may not include response that indicates that the one or more pieces of personal data the system indicated was erased under the right of erasure was not found or accessed by the system.

At Step 5140, in response to determining that the one or more systems associated with the entity have initiated the test interaction response the system is configured to (a) determine that the one or more computers systems have not completed the erasure of the one or more pieces of personal data associated with the data subject, and (b) automatically take one or more actions with regard to the personal data associated with the data subject. In response to determining that the one or more computers systems have not fully deleted a data subject's (e.g., or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag the data subject, personal data, initial request to be forgotten, etc. for follow up.

In various embodiments, the one or more actions may include: (1) identifying the one or more pieces of personal data associated with the data subject that remain stored in the one or more computer systems of the entity; (2) flagging the one or more pieces of personal data associated with the data subject that remain stored in the one or more computer systems of the entity; and (3) providing the flagged one or more pieces of personal data associated with the data subject that remain stored in the one or more computer systems of the entity to an individual associated with the entity.

In various embodiments, the system may monitor compliance by a particular entity with a data subject's request to delete the data subject's personal data from the one or more computers systems associated with a particular entity. The system may, for example, be configured to test to ensure the data has been deleted by: (1) submitting a unique token of data through a webform to a system (e.g., mark to); (2) in response to passage of an expected data retention time, test the system by calling into the system after the passage of the data retention time to search for the unique token. In response to finding the unique token, the system may be configured to determine that the data has not been properly deleted.

The system may provide a communication to the entity that includes a unique identifier associated with the data subject, is performed without using a personal communication data platform, prompts the entity to provide a response by contacting the data subject via a personal communication data platform. In response to providing the communication to the entity, the system may determine whether the data subject has received a response via the personal communication data platform. The system may, in response to determining that the data subject has received the response via the personal communication data platform, determine that the one or more computers systems have not complied with the data subject's request for deletion of their personal data. In response, the system may generate an indication that the one or more computers systems have not complied with the data subject's request for deletion of their personal data by the entity, and digitally store the indication that the one or more computers systems have not complied with the data subject's request for deletion of their personal data in computer memory.

Automatic Preparation for Remediation

In particular embodiments, a Risk Remediation System is configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

Figure 52:
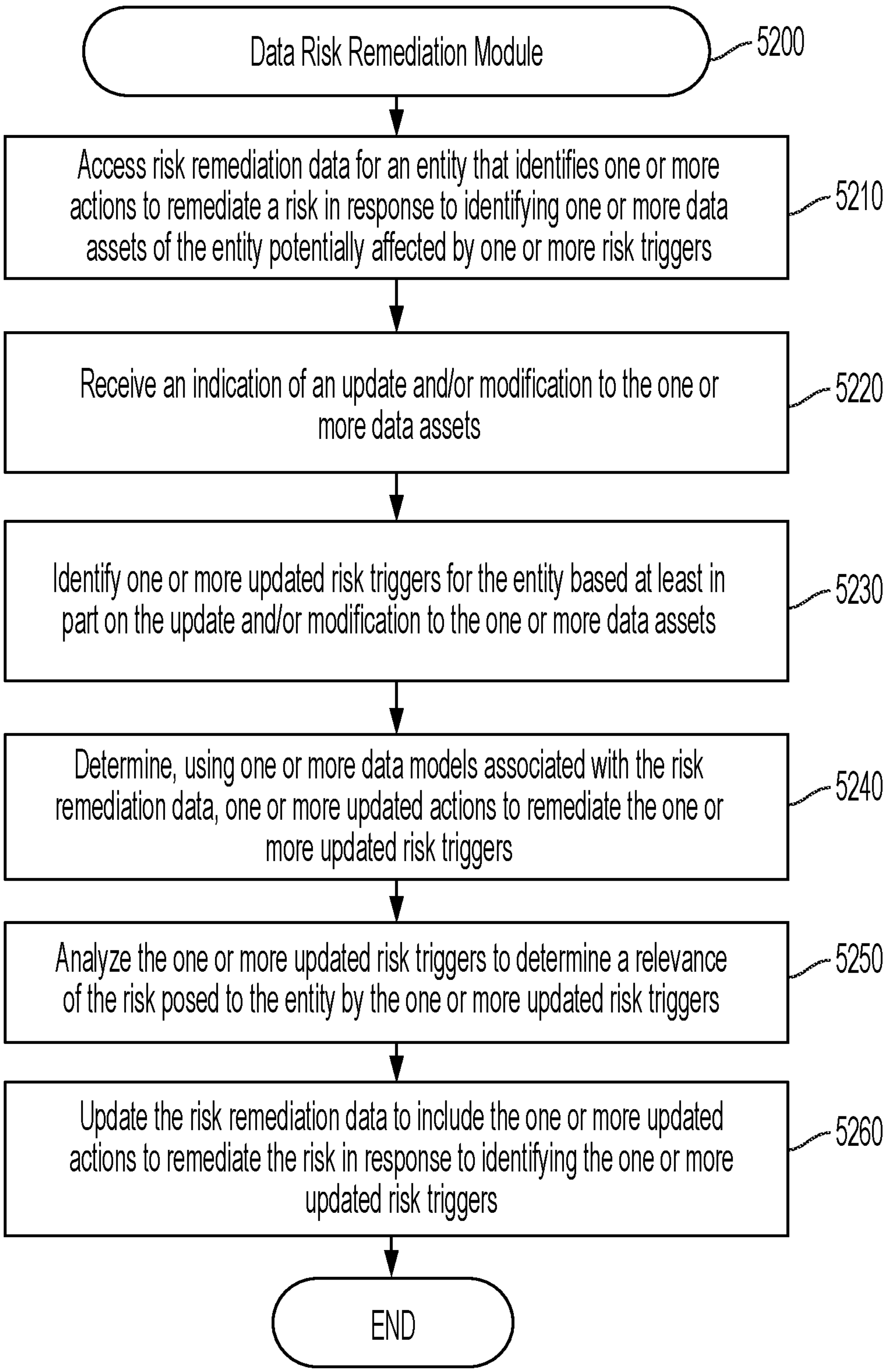
FIG. 52 is a flowchart showing an example of processes performed by a Data Risk Remediation Module 5200 according to various embodiments.

Various processes performed by the Risk Remediation System may be implemented by a Data Risk Remediation Module 5200. Referring to FIG. 52, in particular embodiments, the system, when executing the Data Risk Remediation Module 5200, is configured to access risk remediation data for an entity that identifies one or more actions to remediate a risk in response to identifying one or more data assets of the entity potentially affected by one or more risk triggers, receive an indication of an update to the one or more data assets, identify one or more updated risk triggers for an entity based at least in part on the update to the one or more data assets, determine, by using one or more data models associated with the risk remediation data, one or more updated actions to remediate the one or more updated risk triggers, analyze the one or more updated risk triggers to determine a relevance of the risk posed to the entity by the one or more updated risk triggers, and update the risk remediation data to include the one or more updated actions to remediate the risk in response to identifying the one or more updated risk triggers.

When executing the Data Risk Remediation Module 5200, the system begins, at Step 5210, by accessing risk remediation data for an entity that identifies one or more actions to remediate a risk in response to identifying one or more data assets of the entity potentially affected by one or more risk triggers. The particular entity may include, for example, a particular organization, company, sub-organization, etc. The one or more data assets may include personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may include risk remediation data associated with one or more data assets. The risk remediation data may be default or pre-configured risk remediation data that identifies one or more actions to remediate a risk in response to identifying one or more data assets of the entity potentially affected by one or more risk triggers. In some implementations, the system may have previously updated and/or continuously update the risk remediation data. The risk remediation data may be updated and/or based on aggregate risk remediation data for a plurality of identified risk triggers from one or more organizations, which may include the entity.

The system may analyze the aggregate risk remediation data to determine a remediation outcome for each of the plurality of identified risk triggers and an associated entity response to the particular identified risk trigger of the plurality of identified risk triggers. The remediation outcome is an indication of how well the entity response addressed the identified risk trigger. For example, the remediation outcome can be a numerical (e.g., 1 to 10), an indication of the risk trigger after the entity response was performed (e.g., "high," "medium," or "low"). In response to analyzing the aggregate risk remediation data to determine a remediation outcome for each of the plurality of identified risk triggers and an associated entity response to the particular identified risk trigger of the plurality of identified risk triggers, generating the data model of the one or more data models.

One or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers. Additionally, the risk remediation data for the entity may include the one or more risk remediation data models with an associated one or more data assets of the entity.

Continuing to Step 5220, the system is configured to receive an indication of an update to the one or more data assets. In particular embodiments, the system may indicate that a modification has been performed to the one or more data assets. In various embodiments, when a privacy campaign, processing activity, etc. of the particular organization is modified (e.g., add, remove, or update particular information), then the system may the risk remediation data for use in facilitating an automatic assessment of and/or response to future identified risk triggers. The modification may be an addition (e.g., additional data stored to the one or more data assets), a deletion (e.g., removing data stored to the one or more data assets), or a change (e.g., editing particular data or rearranging a configuration of the data associated with the one or more data assets. At Step 5230, the system is configured to identify one or more updated risk triggers for an entity based at least in part on the update to the one or more data assets. The updated risk triggers may be anything that exposes the one or more data assets of the entity to, for example, a data breach or a loss of data, among others. For example, an identified risk trigger may be that a data asset for an organization is hosted in only one particular location thereby increasing the scope of risk if the location were infiltrated (e.g., via cybercrime).

At Step 5240, the system is configured to determine, by using one or more data models associated with the risk remediation data, one or more updated actions to remediate the one or more updated risk triggers. As previously described above, the one or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers.

At Step 5250, the system is configured to analyze the one or more updated risk triggers to determine a relevance of the risk posed to the entity by the one or more updated risk triggers. In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger. In some embodiments, the system is configured to determine, based at least in part on the one or more data assets and the relevance of the risk, whether to take one or more updated actions in response to the one or more updated risk triggers, and take the one or more updated actions to remediate the risk in response to identifying the one or more updated risk triggers.

Additionally, in some implementations, the system may calculate a risk level based at least in part on the one or more updated risk triggers. The risk level may be compared to a threshold risk level for the entity. The threshold risk level may be pre-determined, or the entity may be able to adjust the threshold risk level (e.g., based on the type of data stored in the particular data asset, a number of data assets involved, etc.). In response to determining that the risk level is greater than or equal to the threshold risk level (i.e., a risk level that is defined as riskier than the threshold risk level or as risky as the threshold risk level), updating the risk remediation data to include the one or more updated actions to remediate the risk in response to identifying the one or more updated risk triggers. The risk level may be, for example, a numerical value (e.g., 1 to 10) or a described value (e.g., "low," "medium," or "high"), among others. In some implementations, calculating the risk level may be based at least in part on the one or more updated risk triggers further comprises comparing the one or more updated risk triggers to (i) one or more previously identified risk triggers, and (ii) one or more previously implemented actions to the one or more previously identified risk triggers.

At Step 5260, the system continues by updating the risk remediation data to include the one or more updated actions to remediate the risk in response to identifying the one or more updated risk triggers. In various embodiments, the system may automatically (e.g., substantially automatically) update the risk remediation data.

In various embodiments, the system may identify one or more risk triggers for an entity based at least in part on the update to the first data asset of the entity, and in turn, identify a second data asset of the entity potentially affected by the one or more risk triggers based at least in part on an association of a first data asset and the second data asset. The system may then determine, by using one or more data models, one or more first updated actions to remediate the one or more updated risk triggers for the first data asset, and determine, by using one or more data models, one or more second updated actions to remediate the one or more updated risk triggers for the second data asset. In some implementations, the one or more first updated actions to remediate the one or more updated risk triggers for the first data asset may be the same as or different from one or more second updated actions to remediate the one or more updated risk triggers for the second data asset. Further, the system may generate (or update) risk remediation data of the entity to include the one or more first updated actions and the one or more second updated actions to remediate the one or more potential risk triggers.

Central Consent Repository Maintenance and Data Inventory Linking

In particular embodiments, a Central Consent System is configured to provide a third-party data repository system to facilitate the receipt and centralized storage of personal data for each of a plurality of respective data subjects, as described herein. Additionally, the Central Consent System is configured to interface with a centralized consent receipt management system.

Figure 53:
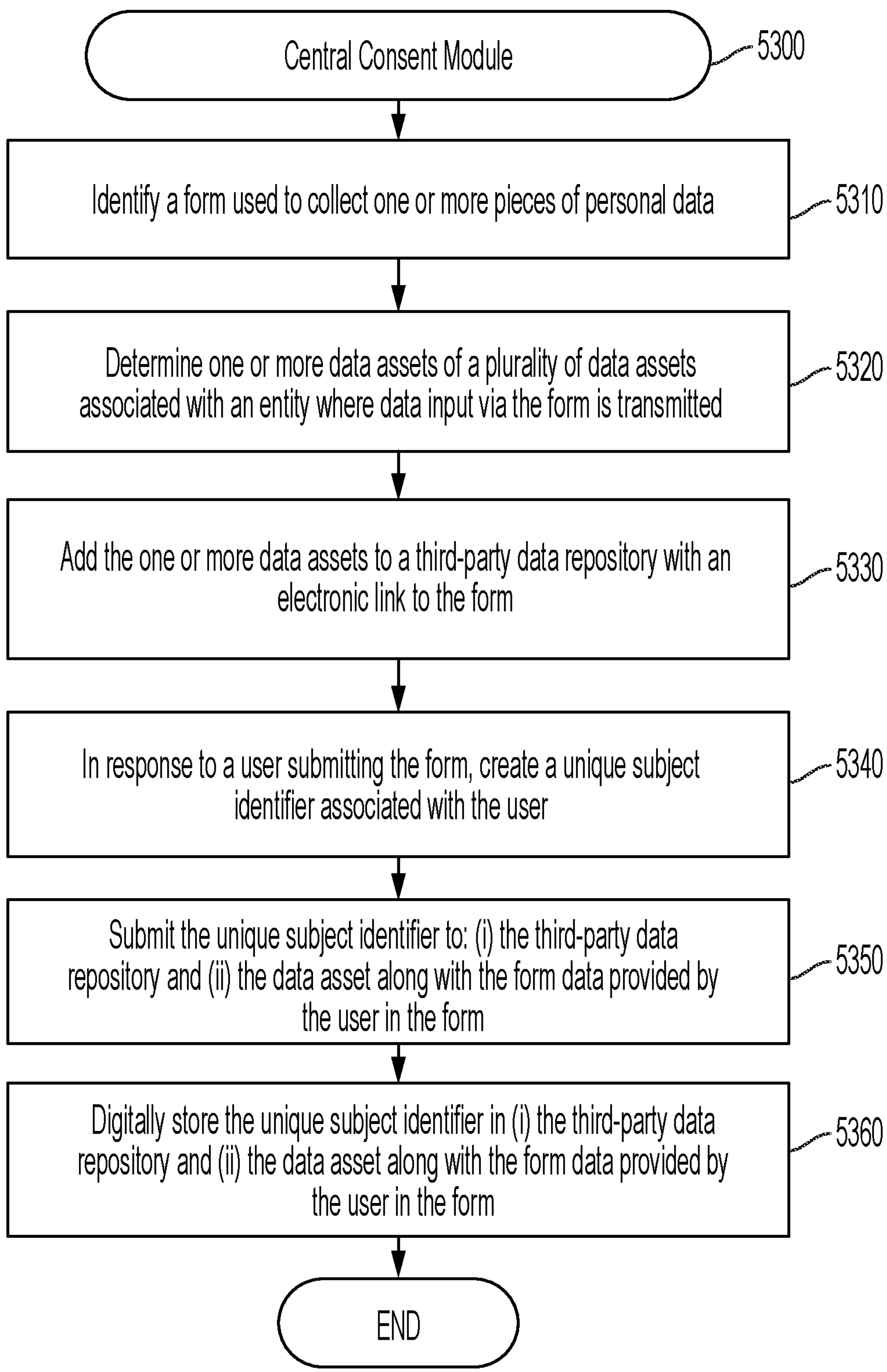
FIG. 53 is a flowchart showing an example of processes performed by a Central Consent Module 5300 according to various embodiments.

Various processes performed by the Central Consent System may be implemented by a Central Consent Module 5300. Referring to FIG. 53, in particular embodiments, the system, when executing the Central Consent Module 5300, is configured to: identify a form used to collect one or more pieces of personal data, determine a data asset of a plurality of data assets of the organization where input data of the form is transmitted, add the data asset to the third-party data repository with an electronic link to the form in response to a user submitting the form, create a unique subject identifier associated with the user, transmit the unique subject identifier (i) to the third-party data repository and (ii) along with the form data provided by the user in the form, to the data asset, and digitally store the unique subject identifier (i) in the third-party data repository and (ii) along with the form data provided by the user in the form, in the data asset.

When executing the Central Consent Module 5300, the system begins, at Step 5310, by identifying a form used to collect one or more pieces of personal data. The particular entity may include, for example, a particular organization, company, sub-organization, etc. In particular embodiments, the one or more data assets (e.g., data systems) may include, for example, any processor or database that collects, processes, contains, and/or transfers data (e.g., such as a software application, "internet of things" computerized device, database, website, datacenter, server, etc.). The one or more forms may ask for personal data, and the one or more data assets may store personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In particular embodiments, the system is configured to identify a form via one or more method that may include one or more website scanning tools (e.g., web crawling). The system may also receive an indication that a user is completing a form (e.g., a webform via a website) associated with the particular organization (e.g., a form to complete for a particular privacy campaign).

The form may include, for example, one or more fields that include the user's e-mail address, billing address, shipping address, and payment information for the purposes of collected payment data to complete a checkout process on an e-commerce website. The system may, for example, be configured to track data on behalf of an entity that collects and/or processes personal data related to: (1) who consented to the processing or collection of personal data (e.g., the data subject themselves or a person legally entitled to consent on their behalf such as a parent, guardian, etc.); (2) when the consent was given (e.g., a date and time); (3) what information was provided to the consenter at the time of consent (e.g., a privacy policy, what personal data would be collected following the provision of the consent, for what purpose that personal data would be collected, etc.); (4) how consent was received (e.g., one or more copies of a data capture form, webform, etc. via which consent was provided by the consenter); (5) when consent was withdrawn (e.g., a date and time of consent withdrawal if the consenter withdraws consent); and/or (6) any other suitable data related to receipt or withdrawal of consent.

Continuing to Step 5320, the system is configured to determine one or more data assets of a plurality of data assets of the organization where input data of the form is transmitted. In particular embodiments, the system may determine one or more data assets of the organization that receive the form data provided by the user in the form (e.g., webform). In particular embodiments, the system is configured to identify the one or more data assets using one or more data modeling techniques. As discussed more fully above, a data model may store the following information: (1) the entity that owns and/or uses a particular data asset (e.g., a primary data asset); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) to identify the one or more data assets associated with the particular entity that receive and/or store particular form data.

At Step 5330, the system is configured to add the one or more data assets to the third-party data repository with an electronic link to the form. In particular embodiments, a third-party data repository system may electronically link the form to the one or more data assets that processor or store the form data of the form. Next, at Step 5340, in response to a user submitting the form, the system is configured to create a unique subject identifier associated with the user. The system is configured to generate, for each data subject that completes the form (e.g., a webform), a unique identifier. The system may, for example: (1) receive an indication that the form has been completed with the form including a piece of personal data; (2) identify a data subject associated with the piece of personal data; (3) determine whether the central repository system is currently storing data associated with the data subject; and (4) in response to determining that one or more data assets of the plurality of data assets is not currently storing data associated with the data subject (e.g., because the data subject is a new data subject), generate the unique identifier.

In particular embodiments, the unique identifier may include any unique identifier such as, for example: (1) any of the one or more pieces of personal data collected, stored, and/or processed by the system (e.g., name, first name, last name, full name, address, phone number, e-mail address, etc.); (2) a unique string or hash comprising any suitable number of numerals, letters, or combination thereof, and/or (3) any other identifier that is sufficiently unique to distinguish between a first and second data subject for the purpose of subsequent data retrieval. In particular embodiments, the system is configured to assign a permanent identifier to each particular data subject. In other embodiments, the system is configured to assign one or more temporary unique identifiers to the same data subject.

In particular embodiments, the system is configured to: (1) receive an indication of completion of a form associated with the organization by a data subject; (2) determine, based at least in part on searching a unique subject identifier database (e.g., a third-party data repository), whether a unique subject identifier has been generated for the data subject; (3) in response to determining that a unique subject identifier has been generated for the data subject, accessing the unique subject identifier database; (4) identify the unique subject identifier of the data subject based at least in part on form data provided by the data subject in the completion of the form associated with the organization; and (5) update the unique subject identifier database to include an electronic link between the unique subject identifier of the data subject with each of (i) the form (e.g., including the form data) submitted by the data subject of each respective unique subject identifier, and (ii) one or more data assets that utilize the form data of the form received from the data subject. In this way, as an entity collects additional data for a particular unique data subject (e.g., having a unique subject identifier, hash, etc.), the third-party data repository system is configured to maintain a centralized database of data collected, stored, and or processed for each unique data subject (e.g., indexed by unique subject identifier). The system may then, in response to receiving a data subject access request from a particular data subject, fulfill the request substantially automatically (e.g., by providing a copy of the personal data, deleting the personal data, indicating to the entity what personal data needs to be deleted from their system and where it is located, etc.). The system may, for example, automatically fulfill the request by: (1) identifying the unique subject identifier associated with the unique data subject making the request; and (2) retrieving any information associated with the unique data subject based on the unique subject identifier.

Continuing to Step 5350, the system is configured to transmit the unique subject identifier (i) to the third-party data repository and (ii) along with the form data provided by the user in the form, to the data asset. At Step 5360, the system is configured to digitally store the unique subject identifier (i) in the third-party data repository and (ii) along with the form data provided by the user in the form, in the data asset. As may understood in light of this disclosure, the system may then be configured to facilitate the receipt and centralized storage of personal data for each of a plurality of respective data subjects and the associated one or more data assets that process or store the form data provided by the data subject.

In particular embodiments, the system may be further configured for receiving a data subject access request from the user, accessing the third-party data repository to identify the unique subject identifier of the user, determining which one or more data assets of the plurality of data assets of the organization include the unique subject identifier, and accessing personal data (e.g., form data) of the user stored in each of the one or more data assets of the plurality of data assets of the organization that include the unique subject identifier. In particular embodiments, the data subject access request may be a subject's rights request where the data subject may be inquiring for the organization to provide all data that the particular organization has obtained on the data subject or a data subject deletion request where the data subject is requesting for the particular organization to delete all data that the particular organization has obtained on the data subject.

In particular embodiments, when the data subject access request is a data subject deletion request, in response to accessing the personal data of the user stored in each of the one or more data assets of the plurality of data assets of the organization that include the unique subject identifier, the system deletes the personal data of the user stored in each of the one or more data assets of the plurality of data assets of the organization that include the unique subject identifier. In some embodiments, when the data subject access request is a data subject deletion request, the system may be configured to: (1) in response to accessing the personal data of the user stored in each of the one or more data assets of the plurality of data assets, automatically determine that a first portion of personal data of the user stored in the one or more data assets has one or more legal bases for continued storage; (2) in response to determining that the first portion of personal data of the user stored in the one or more data assets has one or more legal bases for continued storage, automatically maintain storage of the first portion of personal data of the user stored in the one or more data assets; (3) in response to determining that the first portion of personal data of the user stored in the one or more data assets has one or more legal bases for continued storage, automatically maintaining storage of the first portion of personal data of the user stored in the one or more data assets; and (4) automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets.

Data Transfer Risk Identification and Analysis

In particular embodiments, a Data Transfer Risk Identification System is configured to analyze one or more data systems (e.g., data assets), identify data transfers between/among those systems, apply data transfer rules to each data transfer record, perform a data transfer assessment on each data transfer record based on the data transfer rules to be applied to each data transfer record, and calculate a risk score for the data transfer based at least in part on the one or more data transfer risks associated with the data transfer record.

Figure 54:
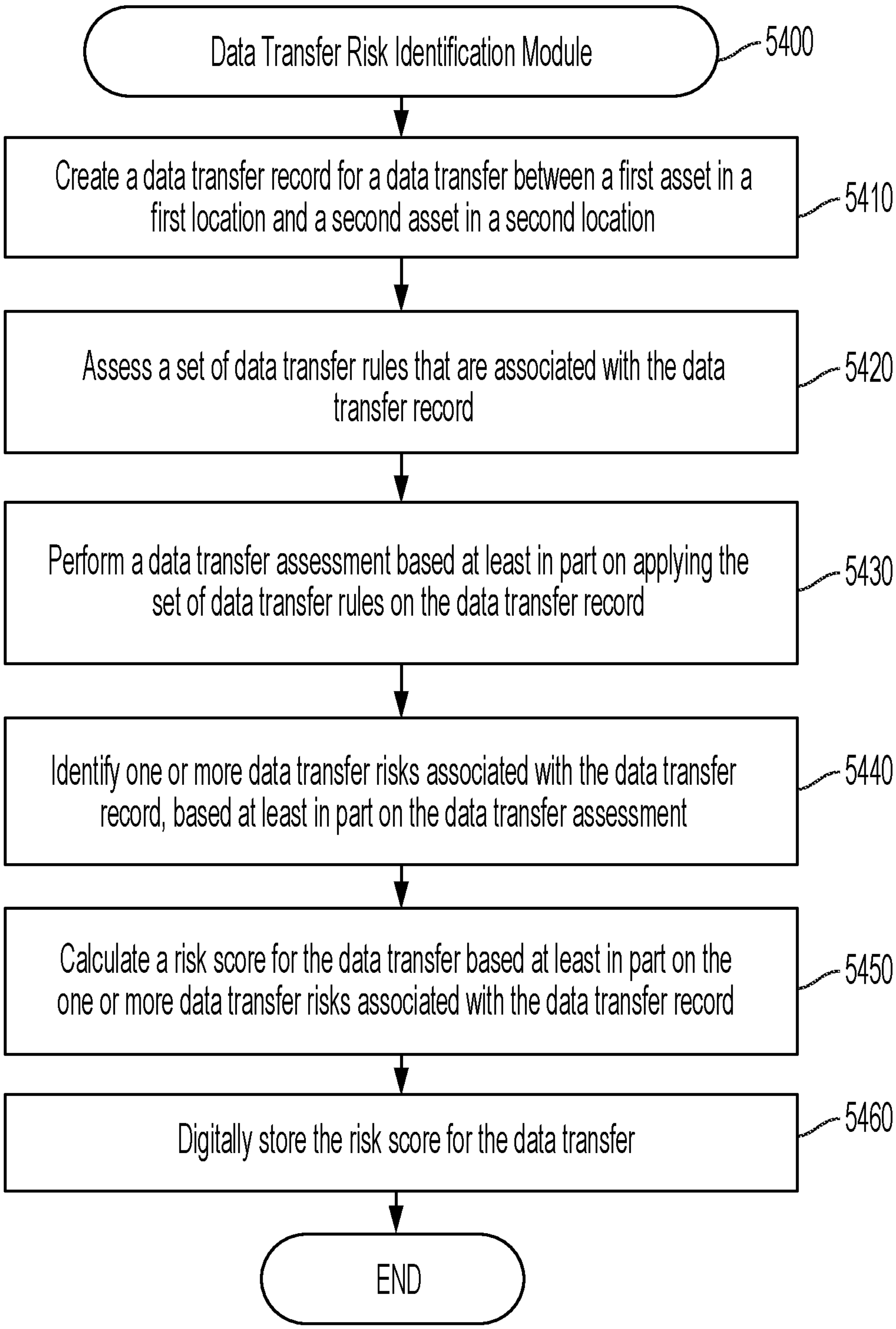
FIG. 54 is a flowchart showing an example of processes performed by a Data Transfer Risk Identification Module 5400 according to various embodiments.

Various processes performed by the Data Transfer Risk Identification System may be implemented by Data Transfer Risk Identification Module 5400. Referring to FIG. 54, in particular embodiments, the system, when executing the Data Transfer Risk Identification Module 5400, is configured for: (1) creating a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

When executing the Data Transfer Risk Identification Module 5400, the system begins, at Step 5410, by creating a data transfer record for a data transfer between a first asset in a first location and a second asset in a second location. The data transfer record may be created for each transfer of data between a first asset in a first location and a second asset in a second location where the transfer record may also include information regarding the type of data being transferred, a time of the data transfer, an amount of data being transferred, etc. In some embodiments, the system may access a data transfer record that may have already been created by the system.

In various embodiments, the system may be configured to determine in which of the one or more defined plurality of physical locations each particular data system is physically located. In particular embodiments, the system is configured to determine the physical location based at least in part on one or more data attributes of a particular data asset (e.g., data system) using one or more data modeling techniques (e.g., using one or more suitable data modeling techniques described herein). In some embodiments, the system may be configured to determine the physical location of each data asset based at least in part on an existing data model that includes the data asset. In still other embodiments, the system may be configured to determine the physical location based at least in part on an IP address and/or domain of the data asset (e.g., in the case of a computer server or other computing device) or any other identifying feature of a particular data asset.

In particular embodiments, the system is configured to identify one or more data elements stored by the one or more data systems that are subject to transfer (e.g., transfer to the one or more data systems such as from a source asset, transfer from the one or more data systems to a destination asset, etc.). In particular embodiments, the system is configured to identify a particular data element that is subject to such transfer (e.g., such as a particular piece of personal data or other data). In some embodiments, the system may be configured to identify any suitable data element that is subject to transfer and includes personal data.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some embodiments, with regard to the location of the one or more data assets, the system may define a geographic location of the one or more data assets. For example, define each of the plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations.

Continuing to Step 5420, the system is configured for accessing a set of data transfer rules that are associated with the data transfer record. The system may apply data transfer rules to each data transfer record. The data transfer rules may be configurable to support different privacy frameworks (e.g., a particular data subject type is being transferred from a first asset in the European Union to a second asset outside of the European Union) and organizational frameworks (e.g., to support the different locations and types of data assets within an organization). The applied data transfer rules may be automatically configured by the system (e.g., when an update is applied to privacy rules in a country or region) or manually adjusted by the particular organization (e.g., by a privacy officer of the organization). The data transfer rules to be applied may vary based on the data being transferred.

As may be understood from this disclosure, the transfer of personal data may trigger one or more regulations that govern such transfer. In particular embodiments, personal data may include any data which relate to a living individual who can be identified: (1) from the data; or (2) from the data in combination with other information which is in the possession of, or is likely to come into the possession of a particular entity. In particular embodiments, a particular entity may collect, store, process, and/or transfer personal data for one or more customers, one or more employees, etc.

In various embodiments, the system is configured to use one or more data models of the one or more data assets (e.g., data systems) to analyze one or more data elements associated with those assets to determine whether the one or more data elements include one or more data elements that include personal data and are subject to transfer. In particular embodiments, the transfer may include, for example: (1) an internal transfer (e.g., a transfer from a first data asset associated with the entity to a second data asset associated with the entity); (2) an external transfer (e.g., a transfer from a data asset associated with the entity to a second data asset associated with a second entity); and/or (3) a collective transfer (e.g., a transfer to a data asset associated with the entity from an external data asset associated with a second entity).

The particular entity may include, for example, a particular organization, company, sub-organization, etc. In particular embodiments, the one or more data assets (e.g., data systems) may include, for example, any entity that collects, processes, contains, and/or transfers data (e.g., such as a software application, "internet of things" computerized device, database, website, datacenter, server, etc.). For example, a first data asset may include any software or device utilized by a particular entity for such data collection, processing, transfer, storage, etc. In various embodiments, the first data asset may be at least partially stored on and/or physically located in a particular location. For example, a server may be located in a particular country, jurisdiction, etc. A piece of software may be stored on one or more servers in a particular location, etc.

In particular embodiments, the system is configured to identify the one or more data systems using one or more data modeling techniques. As discussed more fully above, a data model may store the following information: (1) the entity that owns and/or uses a particular data asset (e.g., a primary data asset); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify the one or more data systems associated with the particular entity.

Next, at Step 5430, the system is configured for performing a data transfer assessment based at least in part on applying the set of data transfer rules on the data transfer record. The data transfer assessment performed by the system may identify risks associated with the data transfer record. At Step 5440, the system is configured for identifying one or more data transfer risks associated with the data transfer record, based at least in part on the data transfer assessment. The one or more data transfer risks may include, for example, a source location of the first location of the one or more first data asset of the data transfer, a destination location of the second location of the one or more second data asset of the data transfer, one or more type of data being transferred as part of the data transfer (e.g., personal data or sensitive data), a time of the data transfer (e.g., date, day of the week, time, month, etc.), an amount of data being transferred as part of the data transfer.

Continuing to Step 5450, the system is configured for calculating a risk score for the data transfer based at least in part on the one or more data transfer risks associated with the data transfer record. The risk score may be calculated in a multitude of ways, and may include one or more data transfer risks such as a source location of the data transfer, a destination location of the data transfer, the type of data being transferred, a time of the data transfer, an amount of data being transferred, etc. Additionally, the system may apply weighting factors (e.g., manually or automatically determined) to the risk factors. Further, in some implementations, the system may include a threshold risk score where a data transfer may be terminated if the data transfer risk score indicates a higher risk than the threshold risk score (e.g., the data transfer risk score being higher than the threshold risk score).

In some embodiments, the system may compare the risk score for the data transfer to a threshold risk score, determine that the risk score for the data transfer is a greater risk than the threshold risk score, and in response to determining that the risk score for the data transfer is a greater risk than the threshold risk score, taking one or more action. The one or more action may include, for example, provide the data transfer record to one or more individuals (e.g., a privacy officer) for review of the data transfer record where the one or more individuals may make a decision to approve the data transfer or terminate the data transfer. In some implementations, the system may automatically terminate the data transfer.

In some implementations, the system may generate a secure link between one or more processors associated with the first asset in the first location and one or more processors associated with the second asset in the second location, and the system may further provide the data transfer via the secure link between the one or more processors associated with the first asset in the first location and the one or more processors associated with the second asset in the second location.

In various embodiments, the system may determine a weighting factor for each of the one or more data transfer risks, determine a risk rating for each of the one or more data transfer risks, and calculate the risk level for the data transfer based upon, for each respective one of the one or more data transfer risks, the risk rating for the respective data transfer risk and the weighting factor for the respective data transfer risk.

At Step 5460, the system continues by digitally storing the risk score for the data transfer. In various embodiments, the system may continue by transferring the data between the first asset in the first location and the second asset in the second location. In some embodiments, the system may be configured to substantially automatically flag a particular transfer of data as problematic (e.g., because the transfer does not comply with an applicable regulation). For example, a particular regulation may require data transfers from a first asset to a second asset to be encrypted.

Automated Classification of Personal Information from Documents

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Figure 55:
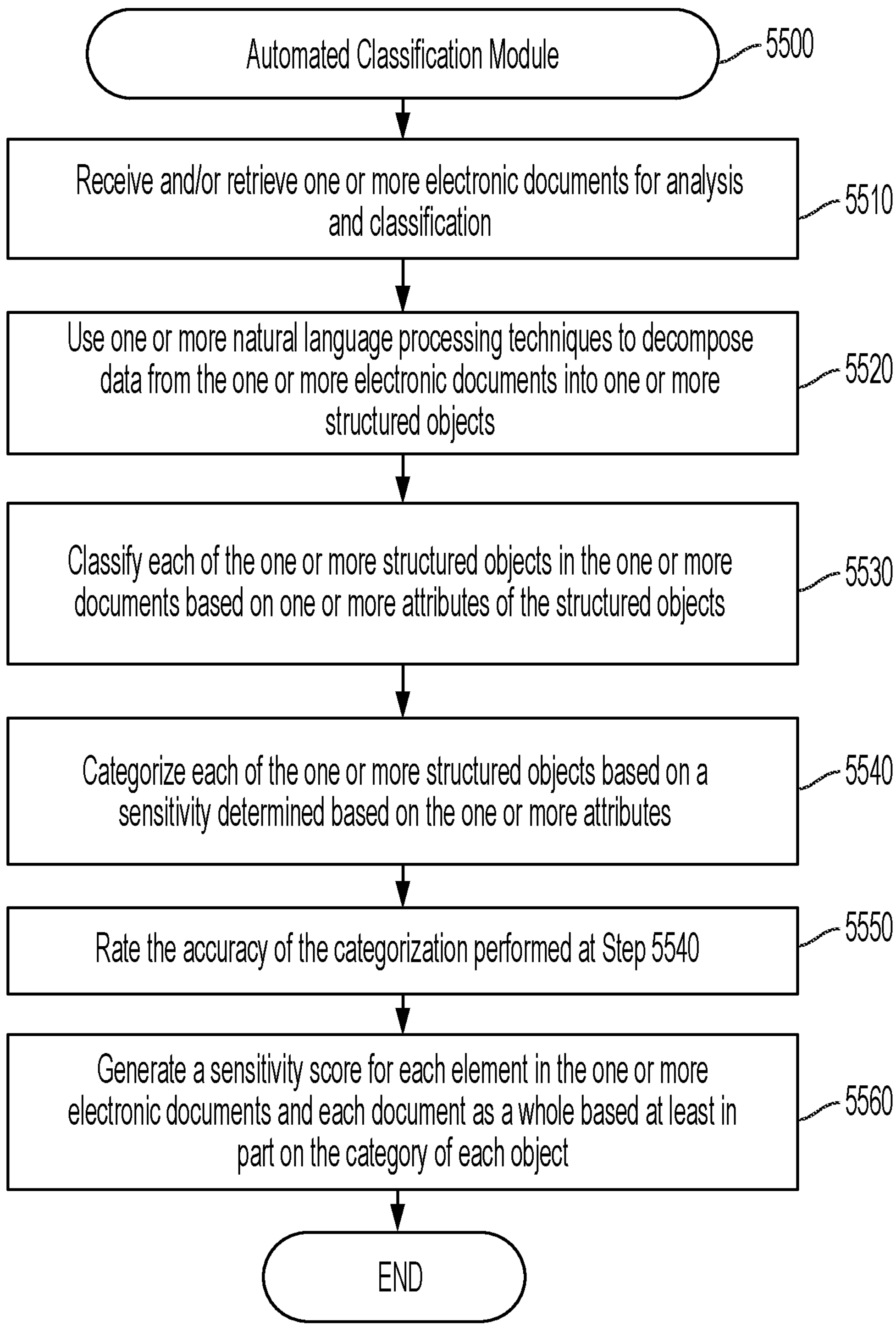
FIG. 55 is a is a flowchart showing an example of a process performed by an Automated Classification Module 5500 according to particular embodiments.

FIG. 55 is a flowchart of process steps that the system may perform in the automatic classification of personal information in an electronic document. When executing the Automated Classification Module 5500, the system begins, at Step 5510, by receiving and/or retrieving one or more electronic documents for analysis and classification. The system may, for example, receive a particular document from a user for analysis. In other embodiments, the system may be configured to automatically scan electronic documents stored on a system (e.g., on one or more servers, in one or more databases, or in any other suitable location) to classify any personal information that may be stored therein. In various embodiments, the one or more electronic documents may include, for example: (1) one or more PDFs; (2) one or more spreadsheets; (3) one or more text-based documents; (4) one or more audio files; (5) one or more video files; (6) one or more webpages; and/or (7) any other suitable type of document.

FIG. 56 depicts an exemplary electronic document that the system may receive and/or retrieve for analysis. As may be understood from FIG. 56 (e.g., a PDF or other text-based document), the electronic document contains employee information such as: (1) first name; (2) last name; (3) social security number; (3) address; (4) marital status; (5) phone number; (6) employer information; (7) etc.

Continuing to Step 5520, the system is configured to use one or more natural language processing techniques to determine data from the one or more electronic documents into one or more structured objects. The system may, for example, use one or more optical character recognition (OCR) techniques to identify particular text in the electronic documents. In some embodiments, the system may be configured to use one or more audio processing techniques to identify one or more words in an audio recording, etc.

The system, in particular embodiments, may be configured to: (1) parse the document to identify context for particular identified text (e.g., identify context based at least in part on proximity to other identified text, etc.); (2) parse out labels from the document; and (3) parse out values for the various labels. The system may, for example, identify particular categories of information contained in document. As may be understood from FIGS. 57-60, the system may be configured to identify particular labels such as, for example: (1) first name; (2) last name; (3) city; and (4) so on. The system may be further configured to identify values associated with each label such as: (1) DOE for last name; (2) JOHN for first name; (3) etc. The system may be configured to determine these values based on, for example: (1) a proximity of the values to the labels; (2) a position of the values relative to the labels; (3) one or more natural language processing techniques (e.g., the system may be configured to identify John as a name, and then associate John with the identified label for name, etc.). The system may then be further configured to electronically associate the identified values with their respective labels (e.g., in computer memory).

Figure 57:
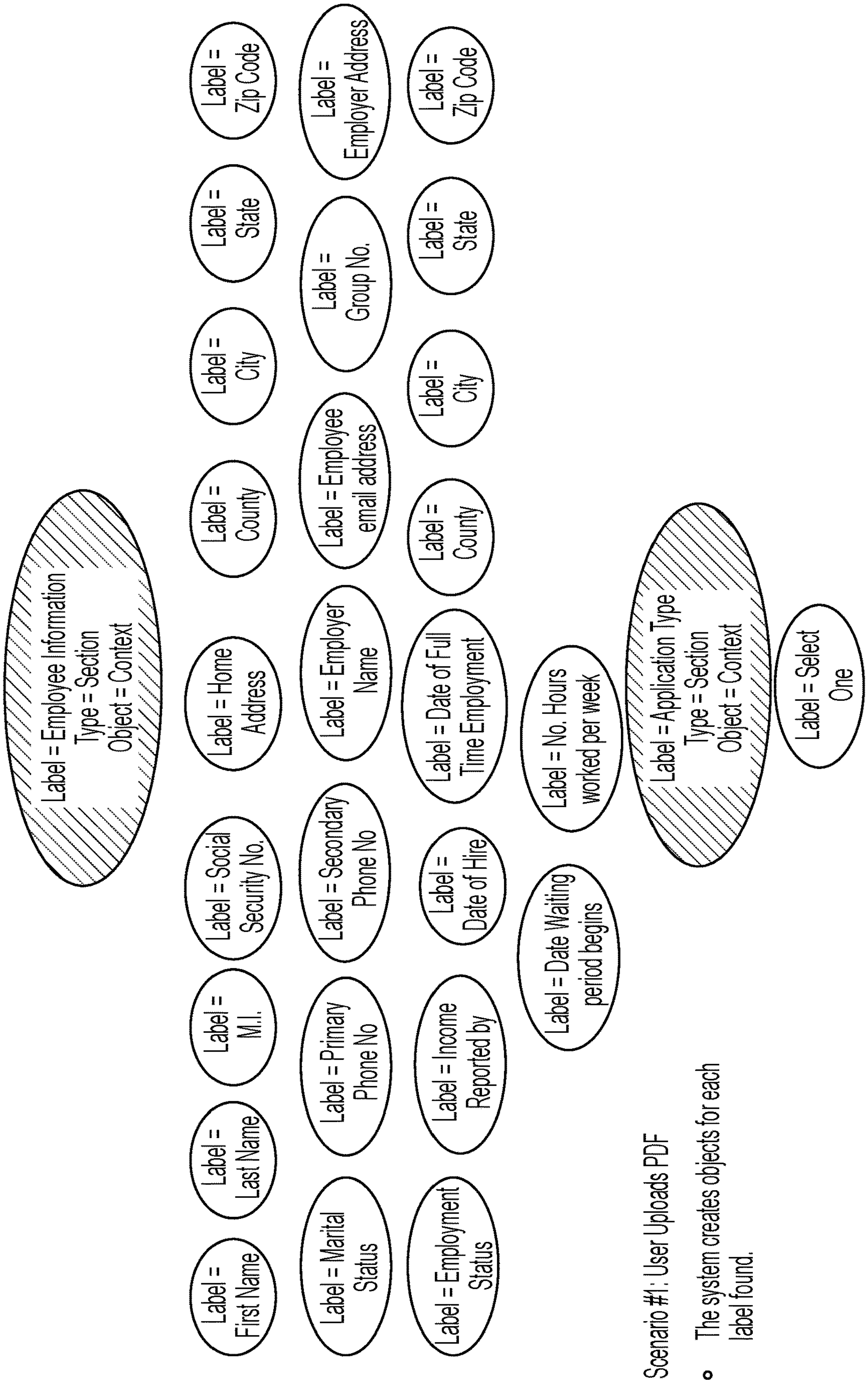
FIG. 57 depicts a visual representation of a plurality of objects that the system may create for each particular label identified in a document.

In any embodiment described herein, the system may then generate a classification of one or more structured objects identified using the natural language processing techniques described above. For example, the system may be configured to generate a catalog of labels identified in the electronic document. FIG. 57 depicts an illustration of one or more object that the system has generated based on the document shown in FIG. 56 as a result of the scanning described above.

Figure 58:
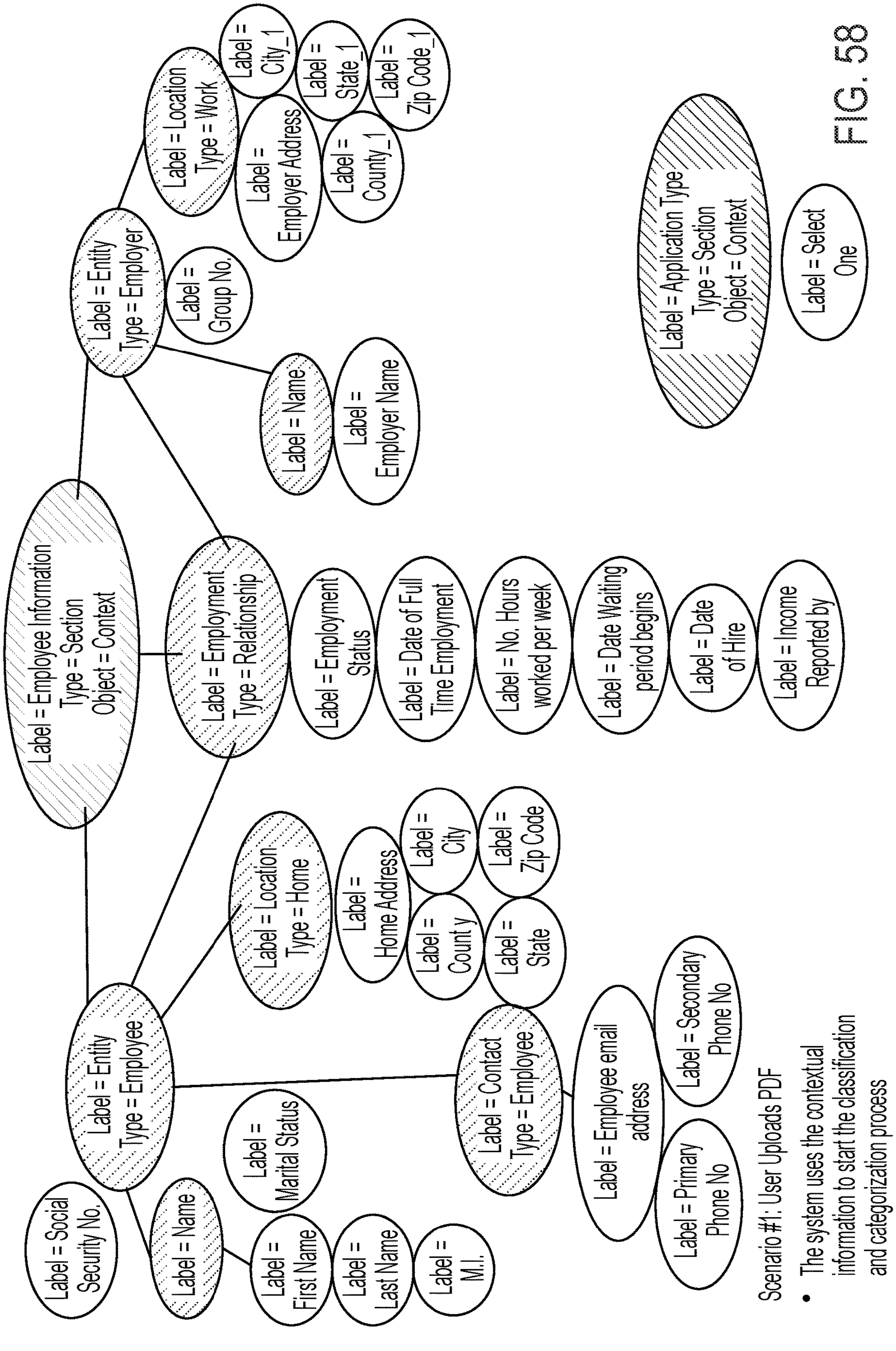
FIGS. 58-60 depict a visual representation of the system creating a classification and categorization of objects using contextual information from the document.

Continuing to Step 5530, the system is configured to classify each of the one or more structured objects based on one or more attributes of the structured objects. For example, the system may be configured to use contextual information, sentiment, and/or syntax to classify each of the structured objects. FIG. 58 depicts an exemplary classification of the structured objects cataloged from FIG. 57. As may be understood from this figure, the system may be configured to group objects based in part on a type of information. For example, the various objects related to an individual's name (e.g., first name, last name, etc.) may be grouped into a single classification. The system may, for example, be configured to automatically classify the one or more objects based on: (1) the object's proximity in the particular document; (2) one or more headings identified in the document; and/or (3) any other suitable factor. For example, in various embodiments, the system is configured to use one or more machine learning and/or natural language techniques to identify a relation between objects.

Figure 59:
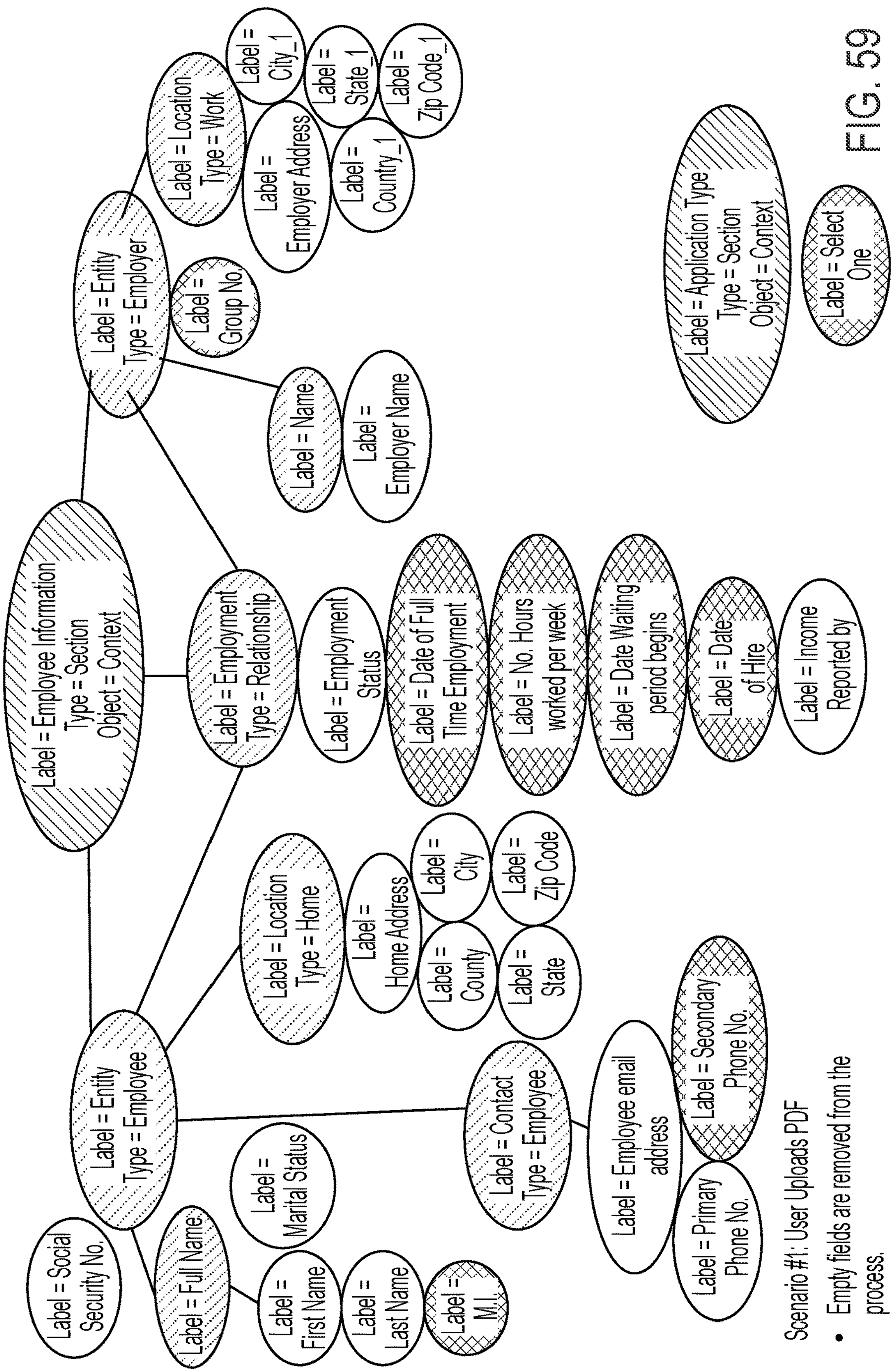
Figure 60:
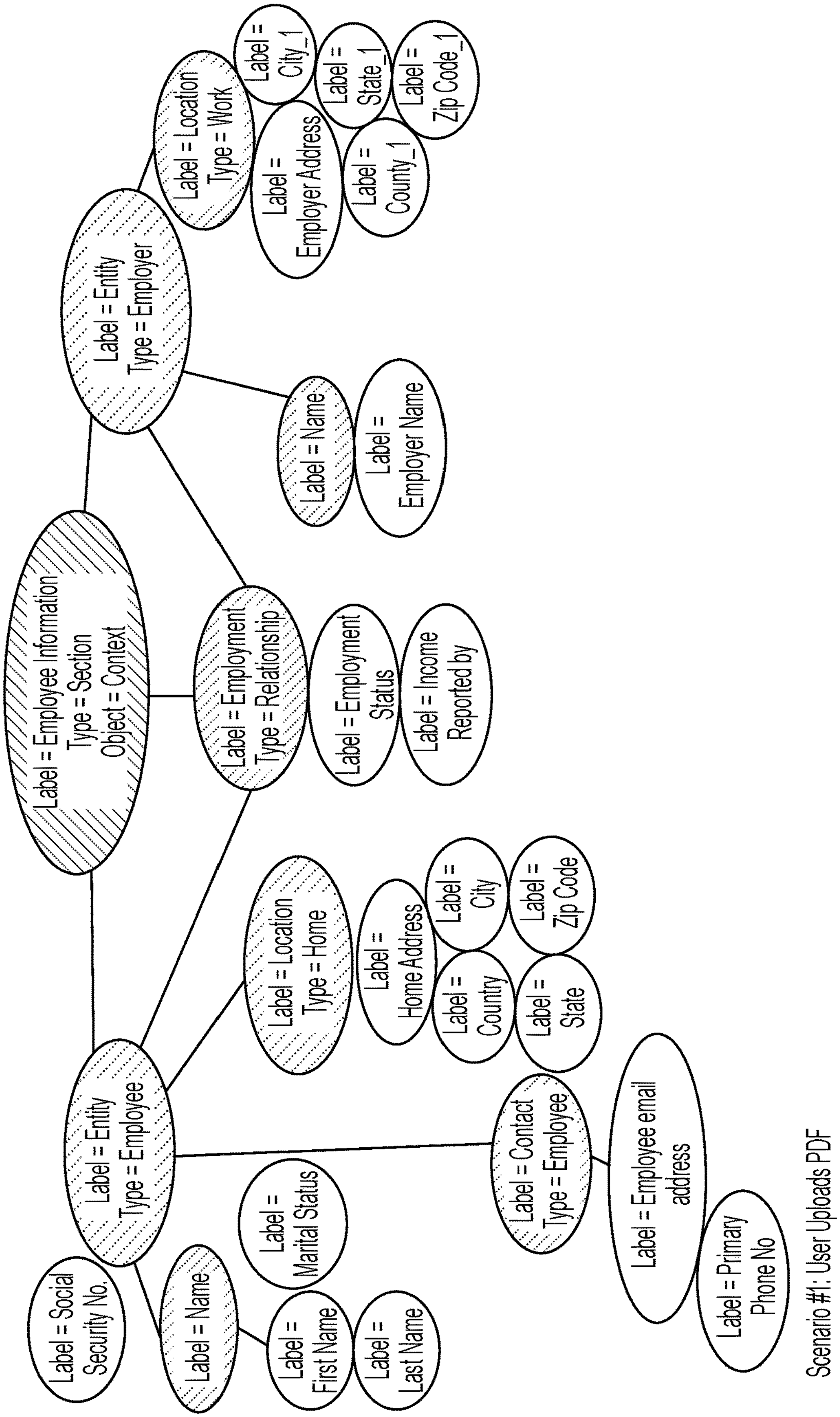
Figure 63:
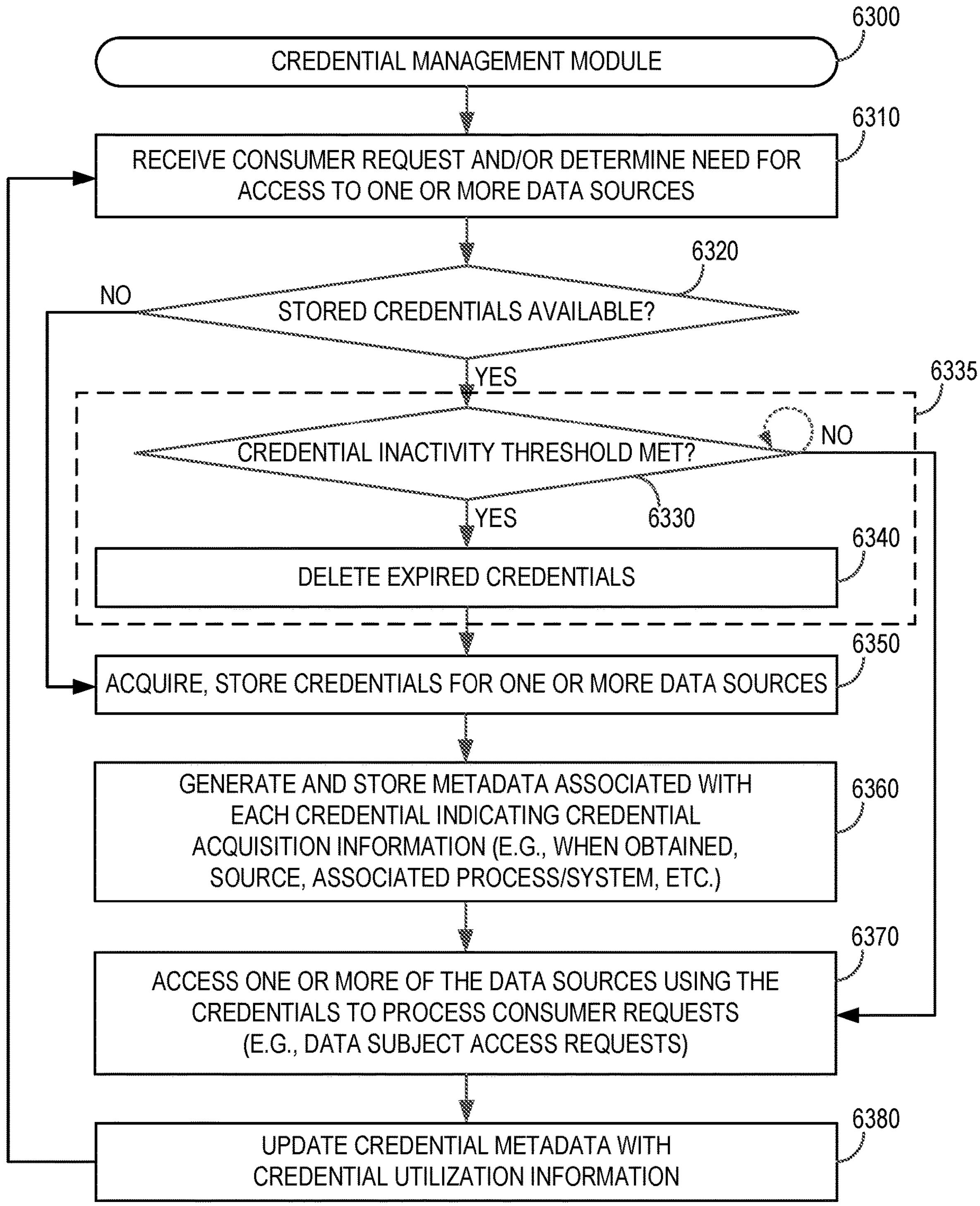
FIG. 63 is a is a flowchart showing an example of a process performed by a Credential Management Module 6300 according to particular embodiments.
Figure 64:
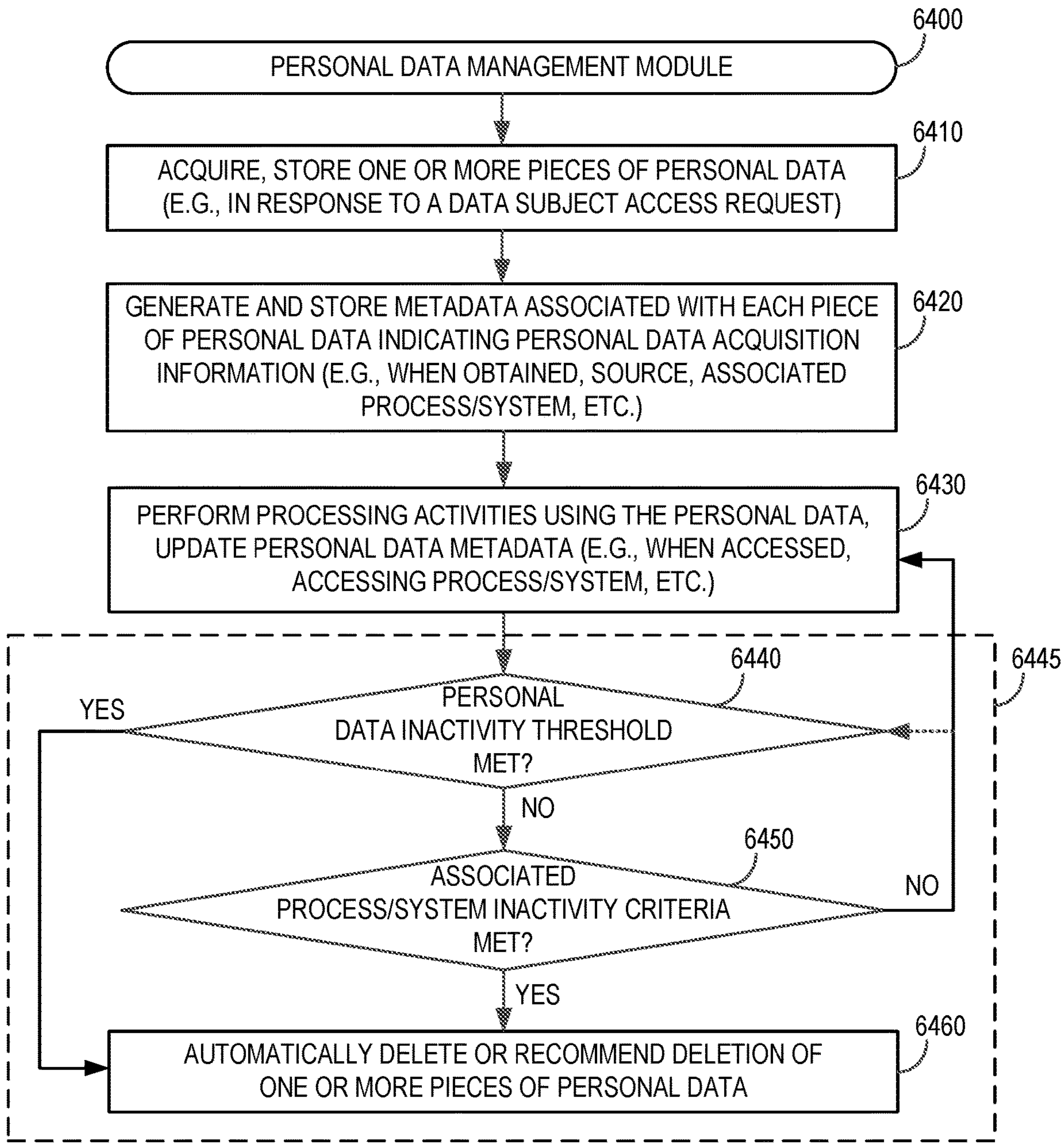
FIG. 64 is a is a flowchart showing an example of a process performed by a Personal Data Management Module 6400 according to particular embodiments.
Figure 65:
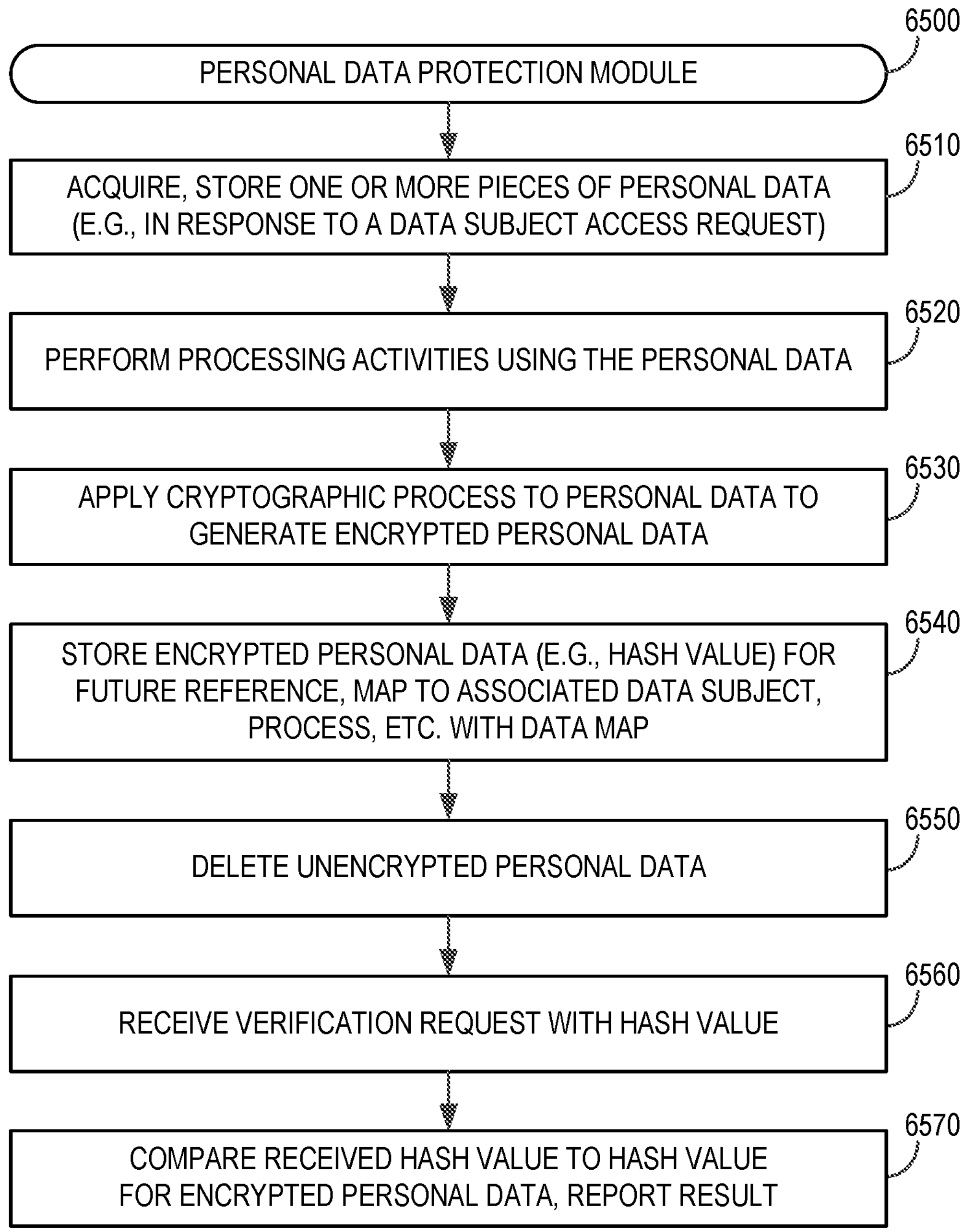
FIG. 65 is a is a flowchart showing an example of a process performed by a Personal Data Protection Module 6500 according to particular embodiments.

The system may then be configured to identify one or more objects without associated values and remove those objects from the classification. FIGS. 59-60 depict a visual representation of objects without associated values from the PDF shown in FIG. 56 being blacked out and removed from the classification. The system may, for example, be configured to generate an initial classification based on the document, and then modify the classification based on one or more identified values in the specific document.

Continuing to Step 5540, the system is configured to categorize each of the one or more structured objects based at least in part on a sensitivity of information determined based on the one or more attributes of the objects. The system may be configured to determine the categorization based on sensitivity based on, for example: (1) one or more predefined sensitivities for particular categories of information; (2) one or more user-defined sensitivities; (3) one or more sensitivities determined automatically based on one or more prevailing industry or government regulations directed toward the type of information associated with the objects; (4) etc.

FIG. 62 depicts an exemplary mapping of values and structured objects based on a sensitivity of the structured objects. As may be understood from this figure, the system is configured to cross-reference the categorization of structured objects with a database of personal data classification, which may, for example, identify a sensitivity of particular categories of structured objects (e.g., personally identifiable information, sensitive personal data, partial PII, personal data, not personal data, etc.). The system may then be configured to map the results as shown in FIG. 62.

Next, at Step 5550, the system is configured to rate the accuracy of the categorization performed at Step 5540. The system may, for example, be configured to rate the categorization by comparing the categorization determined for a similar electronic document (e.g., a second electronic document that includes the same form filled out by another individual than John Doe). In other embodiments, the system may be configured to rate the accuracy of the categorization based on one or more attributes (e.g., one or more values) of the structured objects. The system may, for example, analyze the value for a particular object to determine an accuracy of the categorization of the object. For example, an object for first name may be categorized as "employee information," and the system may be configured to analyze a value associated with the object to determine whether the categorization is accurate (e.g., analyze the value to determine whether the value is, in fact, a name). The system may, for example, determine that the accuracy of the categorization is relatively low in response to determining that a value for the "first name" object contains a number string or a word that is not traditionally a name (e.g., such as 'attorney' or another job title, a phone number, etc.). The system may determine a character type (e.g., set of numbers, letters, a combination of numbers and letters, etc.) for each object and a character type for each value of the object to determine the accuracy of the categorization. The character type for each object and each value of the object may be compared to determine the accuracy of the categorization by the system.

Continuing to Step 5560, the system is configured to generate a sensitivity score for each element in the one or more electronic documents and each document as a whole based at least in part on the category and sensitivity of each object. The system may, for example, assign a relative sensitivity to the document based on each relative sensitivity score assigned to each object identified in the document. The system may, in various embodiments, calculate a sensitivity score for each object based at least in part on a confidence in the accuracy of the categorization of the object and the sensitivity assigned to the particular categorization.

Systems and Methods for Credential Security Management

In various embodiments, the system may implement methods for automatically obtaining data that may be used in a processing activity. For example, the system may automatically obtain personal data associated with a particular data subject in the process of fulfilling a DSAR or other type of consumer rights request associated with the particular data subject. The processes used to automate the acquisition of particular types of data may be referred to as Targeted Data Discovery (TDD). In various embodiments, the system may obtain particular data needed to execute one or more processing activities and/or perform one or more other functions (e.g., fulfill a DSAR) from one or more back end computer systems. These back end systems may be any type of data asset as described herein. These back end systems may or may not be operated by the same entity performing the functions that necessitate access to the back end systems. Depending on the processing activity being performed, the system may connect and/or communicate with various and multiple different back end systems to complete the activity.

In particular embodiments, the system may communicate and/or connect with one or more back end systems to fulfill a DSAR submitted by or on behalf of a particular data subject. For example, the data subject may have submitted a DSAR to delete, access, and/or modify one or more pieces of personal data associated with the data subject. In fulfilling the DSAR, the system may determine the particular back end systems from which the system will acquire the needed personal data to fulfill the DSAR based on one or more criteria. For example, the system may determine one or more types of data subject (e.g., employee, customer, etc.), one or more types of products, and/or one or more types of personal data associated with the DSAR. Based on these criteria, the system may determine the particular one or more back end systems with which the system will need to communicate to fulfill the DSAR. For example, the system may determine that it will need to connect to a first system to access the data subject's personal information, to a second system to update the data subject's phone number, and to a third system to delete the data subject's email address. Each such systems may be a data asset, data repository, third party system, internal system, external system, and/or any other type of system or combination thereof. The system may use a data map and/or a data model, for example as described herein, to identify data needed to process a DSAR or perform any other type of processing activity, to identify one or more data assets or repositories from which such data can be acquired, and/or to identify personal data, one or more processing activities, and/or one or more other characteristics associated with a data subject.

In particular embodiments, the system may employ one or more credentials (e.g., one or more username and password combinations, one or more public/private key systems, multi-factor authentication, etc.) to access one or more systems (e.g., back end systems, data assets, etc.) while processing a DSAR and/or executing one or more processing activities. The system may include a credential management system that may determine, generate, or otherwise obtain (e.g., from a user) such credentials and may then store the credentials (e.g., in system memory, in a data repository, etc.) for ongoing use. However, continued storage of such credentials may present a security risk. To minimize the risk of exposure of such credentials to unauthorized users and/or systems (e.g., via a security breach) and to prevent unauthorized access to such remote systems, the system may automatically delete credentials used to connect to one or more such systems after a period of non-use of the credentials (e.g., in response to a predetermined period of time passing without use of the credentials to fulfill a data subject access request).

For example, the system may obtain and store credentials for accessing a plurality of back end systems and may begin automatically processing consumer requests using those credentials to access the required data. If the system doesn't use the credentials for one of those systems for access to that system for a predetermined period of time (e.g., one month, three months, a year, etc.), the system may then automatically delete those credentials.

In order to facilitate this process, the system may store the credentials with credential utilization information and/or other metadata that the system may use to track usage of such credentials and/or perform credential retention determinations for such credentials. In particular embodiments, the system may, upon the initial acquisition of a particular credential or set of credentials, store metadata associated with the credentials indicating a date and time of acquisition of the credentials (e.g., a date and time at which the credentials were generated, received, and/or obtained). The system may then update the metadata associated with the credentials with a current date and time each time the credentials are used to access the system associated therewith. In particular embodiments, the system may store and/or access credentials and associated dates and times of generation and/or last use, for example, in one or more suitable data structures. The system may use a suitable data map to track the information stored in the data structure(s). For example, the system may configure a back end system as a data asset and store data associated with the backend system (e.g., credentials, date of generation of credentials, date of last use of credentials, etc.) as data asset data, accessible using a data map and/or a data model.

In particular embodiment, the metadata associated with a set of credentials may include both an acquisition date and time and a date and time of last use. Alternatively, the metadata associated with a set of credentials may include a time and a date and time of last use that is initially set at the date and time of credential acquisition, and then later updated to a current date and time at any subsequent usage of the credentials. The metadata associated with a set of credentials may also, or instead, include other information that the system may use, such as the particular system that the credentials may be used to access; the processing activity that initiated or caused the need for access to the particular system associated with the credentials; the data and/or type(s) of data stored by and/or acquired from the particular system associated with the credentials; the user and/or system that authorized, acquired, or otherwise associated with the credentials; etc.

The system may periodically and/or continually evaluate credentials and their associated dates and/or times of generation and/or of last use to determine whether a predetermined amount of time has passed since the credentials were initially obtained or last used. If a threshold amount of time of credential non-use (e.g., inactivity) is met, the system may responsively automatically delete the credentials and any associated metadata. In particular embodiments, the system may instead retain some or all of the metadata associated with a particular set of credentials for future reference while still deleting the particular set of credentials, for example to use in determining the last time the system had that particular set of credentials stored and/or the last time the system had credentials associated with a particular system stored. The next time the system processes a request that requires access to a system for which the credentials have "timed out" (e.g., expired) and been deleted, in response to detecting that there are no credentials stored for that system, the system may automatically initiate a process of acquiring a new set of credentials for that system (e.g., generate, request, obtain new credentials for that system). For example, to obtain a new set of credentials, the system may alert a user as to the system's lack of stored credentials for that particular system and may request that the user provide the credentials. Alternatively, the system may obtain and/or generate new credentials automatically and/or using any other suitable means.

Various processes performed by a credential management system may be implemented by a Credential Management Module 6300. When executing the Credential Management Module 6300, the system begins, at Step 6310, by receiving a request (e.g., consumer request, DSAR) that will require, for successful fulfillment, access to a particular data source that uses credentials. Alternatively, or in addition, at Step 6310 the system may determine that access to a credentialed data source is required to perform some function, such as executing a particular processing activity. For example, at Step 6310, the system may receive a DSAR and determine, based on the DSAR, that the system will need access to a particular back end system to obtain data needed to fulfill the DSAR.

At Step 6320, the system may determine whether it already has access to credentials for a particular data source. For example, the system may determine the particular data source and then use a data map to whether credential data for the particular data source is currently stored on a data asset. If there are no stored credentials for the particular data source, the system may move to Step 6350, described in more detail below.

At Step 6330, the system may determine whether stored credentials for the particular data source are current. For example, the system may use a data map to access a data asset storing credential information to determine whether the credential data associated with the particular data source represents currently valid credentials for the particular data source. Alternatively, or in addition, a data map associated with the particular data source may include an indication of whether currently valid credentials are available for the particular data source. In particular embodiments, the system may compare the date and time of last use stored in metadata associated with the particular data source to the current date and time to determine whether a (e.g., predefined) credential inactivity threshold amount of time (e.g., one day, one month, three months, etc.) has been met. If the credential inactivity threshold amount of time has been met, the system may determine that the credentials are expired and will not use them. If the system determines, e.g., at Step 6330, that the credentials have expired, the system may delete them at Step 6340.

If, at Step 6320, the system determines that current credentials are available for the particular data source and, at Step 6330, the system determines that the credentials are valid, the process may move to Step 6370 as described in more detail below. However, if, at Step 6320, the system determines that current credentials are not available for the particular data source, or, at Step 6330, the system determines that the current credentials were expired and/or the system deletes the credentials, at Step 6350 the system may acquire and store credentials for the particular data source as part of executing a particular processing activity. For example, the system may involve a user by notifying the user that credentials for the particular data source are needed (e.g., because they never existed or because they have expired) and receiving such credentials from the user when the user makes them available to the system. Alternatively, the system may automatically responsively acquire (e.g., automatically obtain, automatically generate, etc.) credentials for the particular data source at Step 6350.

At Step 6360, the system may generate and store initial metadata associated with the credentials acquired for the particular data source. In particular embodiments, the system may generate and store such metadata using a data map, for example, mapping the credential-related metadata to the particular data source represented as a data asset using a data map. The metadata generated by the system for the credential may include one or more of: (1) a date and time of credential acquisition (may also function as credential last-use date and time); (2) a date and time of last use of the credential; (3) the particular data source with which the credential is associated; (4) a processing activity (e.g., consumer request, DSAR, etc.) associated with the acquisition of the credential (e.g., the request that caused the system to acquire the credential, the activity that resulted in the need for access to the data source associated with the credential, etc.); (5) a data subject associated with the data source associated with the credential (e.g., the requestor associated with a request that resulting in acquiring the credential); and (6) one or more types of data stored at the data source associated with the credential.

At Step 6370, the system may perform the one or more activities that involve the particular data source (e.g., process a DSAR or other consumer request, execute a processing activity, etc.) using the stored credentials (e.g., as generated and/or acquired at Step 6350). At Step 6380, the system may update the metadata associated with the credentials with the recent utilization information. For example, the system may update the "last used" field in the metadata with the current date and time. Alternatively, or in addition, the system may update any other portion of the metadata (e.g., associated data subject, type of data retrieved from data source, etc.). After updating the credential metadata, the system may return to Step 6310 to perform any subsequent activities that may involve the use of one or more credentialed data sources.

Note that sub-process 6335 may be performed separately and independent of whether a request is being processed or other processing activity is being performed. In particular embodiments, the sub-process 6335 may be performed automatically and substantially continuously (e.g., repeatedly in time) and/or periodically (e.g., every second, minute, hour, day, etc.) so that credentials are deleted as soon as a threshold amount of time since last use passes regardless of whether a processing activity is executed that may be associated with such credentials. For example, the system may perform Step 6330 for each stored credential periodically (e.g., daily) and if the inactivity threshold of a predetermined number of days (e.g., 90 days) has been met for a particular credential, the system may perform Step 6340 of deleting the particular credential, regardless of whether the system has received a request or instruction to perform an activity associated with that particular credential. When a request or other activity involving deleted credentials is processed, the system may obtain new credentials, for example, as described in regard to Steps 6350-6360 and elsewhere herein.

Systems and Methods for Automatically Deleting Personal Data

In various embodiments, the system may automatically delete, or make a recommendation to delete, data associated with a data subject (e.g., personal data) in response to determining that the data is no longer in use. In particular embodiments, the system may automatically delete, or make a recommendation to delete, data associated with a data subject (e.g., personal data) after a period of time during which such data has not been accessed or otherwise used. Alternatively, or in addition, the system may automatically delete, or make a recommendation to delete, data associated with a data subject (e.g., personal data) in response to determining that the process or system that initiated the acquisition of such data is no longer in use. The system may determine that a process or system is no longer in use based on the process or system having not been used or detected as executing for a predetermined period of time and/or in response to affirmatively determining that the process or system is no longer in use (e.g., based on received instructions or data).

In particular embodiments, the system may obtain such data (e.g., personal data) after obtaining consent from a data subject associated with such data. The system may store and/or access such data, for example, using a data map. The system may include a personal data management system that may generate, store, track, and/or reference metadata associated with such data for personal data management purposes as described herein.

In various embodiments, the system may use a data map (or any other suitable means) to record (e.g., as metadata) a time and date of the initial acquisition and/or storage of data associated with a particular data subject. In addition, or instead, the system may use a data map (or any other suitable means) to record (e.g., as metadata) a time and date the most recent use (e.g., access) of such data. In particular embodiments, the system may store both such pieces of data metadata, while in other embodiments the system may store only the most recent. For example, instead of storing, separately, both the date and time of acquisition of the data and the "last used" date and time for the data, the system may initially store the date and time of acquisition as the "last used" date and time when the data is acquired and then update the "last used" date and time with the current date and time with each subsequent access of the data. In various embodiments, the system may also, or instead, store (e.g., as metadata) an indication of the process or system that used the data or otherwise caused the data to be initially acquired. The system may store any other metadata associated with any data associated with the particular data subject and may access and/or reference any such data and/or metadata using a data map and/or data model as described herein.

In various embodiments, the system may automatically delete and/or make a recommendation to delete data associated with a data subject (e.g., personal data) after a period of time during which such data has not been used by the system. In particular embodiments, the system may delete such data after a period of time during which the process or system that initiated the collection of such data has not accessed the data. Alternatively, or in addition, the system may delete such data after a period of time during which such data has not been accessed generally.

In particular embodiments, the system may obtain consent from a data subject and may collect data associated with that data subject (e.g., personal data). The system may store and/or access such data, for example, using a data map. Also using such a data map (or any other suitable means), the system may record (e.g., as metadata associated with the data) one or more of: (1) a time and date of the initial storage of the data; (2) a time and date of the last use of the data; (3) an indication of the associated process or system that initiated collection of the data; (4) an indication of the associated process or system that last accessed the data (may or may not be the same process or system that initiated collection of the data); (5) a time and date of last use or detection of the associated process or system that initiated collection of the data; (6) a time and date of last use or detection of the associated process or system that last accessed the data (may or may not be the same process or system that initiated collection of the data); and/or (7) any other information associated with the data.

In response to the expiration of a time period (e.g., a predetermined or preconfigured time period, such as one month, three months, one year, etc.) following the most recent access or use of such data, the system may automatically delete the data. Alternatively, or in addition, in response to the expiration of an inactivity threshold amount of time following the most recent access or use of such data, the system may automatically recommend that the data be deleted and/or request user consent to delete the data (e.g., by transmitting an appropriate electronic message to the user, a privacy officer, or other appropriate individual).

In addition, or instead, in response to the expiration of a time period (e.g., a predetermined or preconfigured time period, such as one month, three months, one year, etc.) following the most recent use of the associated process or system that initiated the collection of such data, the system may automatically delete the data. Alternatively, or in addition, in response to the expiration of an inactivity threshold amount of time following the most recent use of the associated process or system that initiated the collection of such data, the system may automatically recommend (e.g., to a user, administrator, etc.) that the data be deleted and/or request user consent to delete the data.

In addition, or instead, in response to the expiration of a time period (e.g., a predetermined or preconfigured time period, such as one month, three months, one year, etc.) following the most recent use of the associated process or system that most recently accessed such data, the system may automatically delete the data. Alternatively, or in addition, in response to the expiration of an inactivity threshold amount of time following the most recent use of the associated process or system that most recently accessed such data, the system may automatically recommend (e.g., to a user, administrator, etc.) that the data be deleted and/or request user consent to delete the data.

In addition, or instead, in response to receiving affirmative data or instruction that the associated process or system that initiated the collection of such data is no longer in use, the system may automatically delete the data. Alternatively, or in addition, in response to receiving affirmative data or instruction that the associated process or system that initiated the collection of such data is no longer in use, the system may automatically recommend (e.g., to a user, administrator, etc.) that the data be deleted and/or request user consent to delete the data.

In addition, or instead, in response to receiving affirmative data or instruction that the associated process or system that most recently accessed such data is no longer in use, the system may automatically delete the data. Alternatively, or in addition, in response to receiving affirmative data or instruction that the associated process or system that most recently accessed such data is no longer in use, the system may automatically recommend (e.g., to a user, administrator, etc.) that the data be deleted and/or request user consent to delete the data.

In various embodiments, the system may substantially continuously (e.g., repeatedly in time) and/or periodically (e.g., every second, minute, hour, day, etc.) evaluate data associated with a particular data subject to determine whether such data should be deleted (or recommended for deletion). For example, the system may automatically evaluate metadata associated with one or more pieces of personal data collected from one or more respective data subjects to determine whether the data and/or any associated processes or systems have expired (e.g., an inactivity threshold amount of time has passed since last use or detection). In response, the system may automatically delete, or recommended for deletion, such data. Alternatively, or in addition, the system may automatically evaluate data associated with one or more processes or systems to determine whether such processes or systems remain active, in use, and/or authorized for use in the system. In response to detection and/or determination of affirmative data that one or more such processes or systems are not in use, authorized, etc., the system may automatically delete, or recommended for deletion, any data that is associated with (e.g., collected by and/or accessed by) such inactive processes or systems.

Various processes performed by a personal data management system may be implemented by a Personal Data Management Module 6400. When executing the Personal Data Management Module 6400, the system begins, at Step 6410, by acquiring one or more pieces of data, such as personal data associated with a particular data subject. For example, the system may, in response to a request (e.g., consumer request, DSAR) solicit and receive consent from a particular data subject to collect one or more pieces of personal data. In response to receiving such consent, the system may acquire (e.g., collect from the data subject, request and receive from one or more data sources, obtain using any suitable means, etc.) the personal data. In particular embodiments, a request for consent may include an indication of a period of time for which the requesting entity will store the requested (e.g., personal) data. Alternatively, the responsive consent (provided response to a request for consent) may include an indication of a period of time for which the data subject consents to the requesting entity storing the requested (e.g., personal) data. Further at Step 6410, the system may store the collected data and, in particular embodiments, track such storage for future access using a data map and/or data model.

At Step 6420, the system may generate and store metadata associated with each of the one or more pieces of data acquired at Step 6410. In particular embodiments, the system may generate and store such metadata using a data map, for example, mapping acquisition-related metadata to a particular piece of data represented or referenced in a data map. The metadata generated by the system for each such piece of data may include one or more of: (1) a date and time of acquisition (e.g., collection, receipt, retrieval, storage, etc.) of the piece of data (may also function as a last-use date and time for the piece of data); (2) a date and time of the last use (e.g., access) of the piece of data; (3) a particular data subject with which the piece of data is associated; (4) a processing activity (e.g., consumer request, DSAR, etc.) associated with the acquisition of the piece of data (e.g., the request that caused the system to acquire the piece of data, the activity that resulted in the need for access to the data source associated with the piece of data, etc.); (5) a period of time of authorized retention of the piece of data after the most recent use of the piece of data; (6) a type of the piece of data; (7) a process and/or system associated with the piece of data and/or the acquisition of the piece of data (e.g., the process or system that used the piece of data or otherwise initiated the acquisition of the piece of data); (8) a date and time of consent associated with the piece of data (e.g., the date and time at which consent was received (e.g., from the data subject) for the acquisition and/or use of the piece of data); (9) a date and time of the expiration of consent associated with the piece of data; and (10) a consent duration time period (e.g., the amount of time that received consent remains valid, after which the consent is revoked or expired).

At Step 6430, the system may perform the one or more activities that involve the data acquired at Step 6410 (e.g., process a DSAR or other consumer request, execute a processing activity, etc.). Further at Step 6430, the system may update the metadata associated with the piece of data with the recent utilization information. For example, the system may update the "last used" field in the metadata with the current date and time. Alternatively, or in addition, the system may update any other portion of the metadata (e.g., associated data subject, system or process using the piece of data, processing activity involving the piece of data, etc.).

At Step 6440, for example at some point after acquiring and using the particular piece of data in response to a request or other processing activity, the system may determine whether an inactivity threshold amount of time has passed since the system last used or accessed the particular piece of data. For example, the system may compare the current date and time to a last used date and time in metadata for the particular piece of data and determine whether the elapsed time since the last use of the particular piece of data meets or exceeds a predetermined or preconfigured inactivity threshold amount of time. If such a threshold among of time has been met, the system may move to Step 6460 and automatically delete the particular piece of data.

In various embodiments, the system may also, or instead, determine, at Step 6450, whether the process or system associated with the particular piece of data is still in use. For example, if the process or system associated with a piece of data (e.g., as indicated in metadata associated with the piece of data) is no longer in use by the system, the system may move to Step 6460 and automatically delete the particular piece of data. The determination of whether any particular system or process is still in use may be made periodically, such as at periodic assessments or audits, or may be determined based on affirmative data or instructions that the system may receive indicating that a particular system or process is no longer in use or authorized for use by the system. For example, the system may detect or otherwise be instructed that a particular process or system is no longer in use. In response, the system may search metadata associated with stored data to identify one or more pieces of such data that are associated with the particular process or system that is no longer in use. In response to identifying one or more pieces of data associated with the particular process or system that is no longer in use, the system may then purge (e.g., delete) all such pieces of data. In particular embodiments, the system may also purge any metadata associated with such pieces of data.

In various embodiments, the determination of whether any particular system or process is still in use may be made using the metadata associated with data (e.g., personal data) acquired based on that particular system or process. For example, the system may determine, using metadata for a particular piece of personal data, that the particular piece of personal data has not been accessed for at least a threshold period of time. In response to determining that the particular piece of personal data has not been accessed for at least a threshold period of time, the system may determine that the associated system or process is no longer in use by the system. In response to determining that the associated system or process is no longer in use by the system, the system may then purge (e.g., delete) one or more pieces of data associated with that system or process. In particular embodiments, the system may also purge any metadata associated with such pieces of data.

If the particular piece of data is still valid (e.g., as determined at Step 6440) and/or is associated with a process of system that is still in use (e.g., as determined at Step 6450), the system may use the piece of data again, for example, at Step 6430. When the particular piece of data is expired or has been unused for too long (e.g., as determined at Step 6440) and/or is associated with a process of system that is no longer in use (e.g., as determined at Step 6450), the system may delete the piece of data, for example, at Step 6430. In deleting the piece of data, the system may also delete any associated metadata. Alternatively, the system may retain some or all of such metadata for future reference and/or use. For example, the system may retain some or all such metadata, while deleting any associated actual data, to use in audits to determine how the system collects, uses, and/or stores such data while removing the potential for exposure of the actual data.

Note that sub-process 6445 may be performed separately and independent of whether a request is being processed or other processing activity is being performed. In particular embodiments, the sub-process 6445 may be performed automatically and substantially continuously (e.g., repeatedly in time) and/or periodically (e.g., every second, minute, hour, day, etc.) so that data is deleted as soon as a threshold amount of time since last use passes regardless of whether a processing activity is executed that may be associated with such data. For example, the system may perform Step 6440 for each stored piece of data periodically (e.g., daily) and if the inactivity threshold of a predetermined number of days (e.g., 90 days) has been met for a particular piece of data, the system may perform Step 6460 of deleting the particular piece of data, regardless of whether the system has received a request or instruction to perform an activity associated with that particular piece of data. Similarly, the system may also, or instead, perform Step 6450 for each stored piece of data periodically (e.g., daily) and if the process or system associated with the particular piece of data is determined to be no longer in use, the system may perform Step 6460 of deleting the particular piece of data, regardless of whether the system has received a request or instruction to perform an activity associated with that particular piece of data. When a request or other activity involving deleted data is processed, the system may obtain the data again using normal processes, for example, as described in regard to Steps 6410-6430 and elsewhere herein.

Systems and Methods for Automatically Protecting Personal Data

In various embodiments, to appropriately process a request such as a DSAR, the system may collect personal data from a data subject. This personal data may include sensitive information such as a social security number, full name, address, email address, phone number, credit card number, etc. The system may then, as part of fulfilling such a request, verify the data subject using one or more pieces of the collected data. Once this verification is complete, the system may need to maintain a record of the verification. However, for security reasons, the operator of the system may not wish to have the system retain the actual personal data used to verify the data subject. For example, the system may need to show that the data subject was properly verified in the future, such as during a dispute or litigation involving the data subject and/or the data subject's personal data. To demonstrate that the data subject was properly verified, the system may use information about the verification that is available for retrieval, such as an indication of the particular one or more pieces of personal data that were used to verify the data subject (e.g., what type of personal data was used for verification), without storing the actual personal data used for the verification.

In various embodiments, after collecting personal data associated with a particular data subject and then using that personal data to verify the data subject, the system may apply a cryptographic hash function (e.g., a one-way hash) to each piece of the personal data, to one or more particular portions (e.g., sensitive portions) of the personal data, and/or to the personal data as a whole (e.g., the one or more pieces of personal data concatenated and then hashed), and store the resulting hashed value(s) as a record of the verification (e.g., in a data model, data map, and/or using one or more other data structures that may be associated with the data subject, processing activity, system, process, etc.). The system may overwrite the original one or more pieces of personal data with the resulting respective one or more hash values. Alternatively, the system may delete the original one or more pieces of personal data while storing the resulting respective one or more hash values. In the future, the resulting respective one or more hash values may be retrieved (e.g., using the associated data map and/or data model) and used to confirm that the system did, indeed, properly verify the identity of the data subject, while not storing the actual personal data used in the verification process, thereby reducing the risk of exposure of such personal data.

In various embodiments, to determine whether the system has properly verified a data subject, the system may generate and store a hash value for one or more pieces of personal data (e.g., social security number, credit card number, etc.) initially received from the data subject. At a later time, the system may receive a request to confirm that the data subject was properly verified. This request may include (or the system may subsequently receive) a hash value associated with a piece of personal data associated with the subject. The system may compare the received hash value to the stored has value corresponding to the same piece of personal data. If the hash values match, the system can confirm that they were both generated based on an identical piece of personal data, therefore confirming that the system properly verified the data subject using that piece of personal data.

Various processes performed by a personal data protection system may be implemented by a Personal Data Protection Module 6500. When executing the Personal Data Protection Module 6500, the system may begin, at Step 6510, by acquiring one or more pieces of data, such as personal data associated with a particular data subject. For example, the system may, in response to a request (e.g., consumer request, DSAR, etc.) or the initiation of a processing activity, solicit, receive, request, access, or otherwise obtain one or more pieces of personal data associated with a particular data subject. At Step 6520, the system may perform one or more actions using the one or more pieces of personal data as part of performing the processing activity, fulfilling the request, etc. In particular embodiments, these actions may include verifying a data subject by comparing a piece of data received from the data subject with a piece of data that is stored by or otherwise accessible to (e.g., via a third-party system) the system.

At Step 6530, the system may apply a cryptographic process to one or more of the one or more pieces of personal data used to perform the activities of Step 6520. In particular embodiments, the system may apply a one-way hash function to each piece of data to be encrypted to generate a corresponding hash value. Alternatively, the system may apply a one-way hash function to some combination of multiple pieces of data to be encrypted (e.g., to a concatenation of two or more pieces of such data) to generate a corresponding hash value. The system may also, or instead, use one or more other methods of encryption on any combination of one or more such pieces of data.

At Step 6540, the system may store the encrypted versions of the one or more pieces of personal data (e.g., the hash values corresponding to each of the one or more pieces of data). The system may also store an indication of the type of personal data to which each piece of data corresponds; one or more processes, systems, and/or processing activities with which the acquisition of each piece of data is associated; and/or a particular data subject with which each piece of data is associated. The system may also, or instead, store any other data associated with each such piece of data. In particular embodiments, the system may use a data map to store and associate one or more encrypted values for each piece of data and any associated information.

At Step 6550, the system may delete the unencrypted piece of data (e.g., the personal data as received from the data subject). In particular embodiments, the system may accomplish this by overwriting the original unencrypted piece of data with the encrypted data (e.g., its corresponding hash value). Alternatively, or in addition, the system may store the encrypted data separately and then delete the original unencrypted piece of data.

At Step 6560, the system may receive a request to confirm the verification of the data subject. This request may include, or may be accompanied by, an encrypted value for a particular piece of data associated with the data subject and may indicate the type of the particular piece of data. For example, the verification request may include a hash value and in indication that the hash value corresponds to a social security number for a particular data subject.

The system may, at Step 6570, compare the received encrypted value to the encrypted value stored by the system for that particular piece of data to determine whether they match. The system may then respond with a confirmation or denial that the encrypted values match (thereby confirming or denying that verification was performed properly using that particular piece of data). For example, the system may compare the hash value received for the social security number of the particular data subject to the hash value stored for the social security number of the particular data subject (generated during the early interaction, such as at Step 6510-6540). The system may then determine that, if the hash values match, the same social security number was used to generate them both, thereby confirming that the system initially used the same social security number in the earlier interaction with the data subject. If the hash values do not match, then the system did not use the same social security number in the earlier interaction with the data subject, and the initial verification or the current interaction may not be with the same data subject.

The system may perform this data verification process with any one or more pieces of data associated with a data subject and may be performed for multiple pieces of such data, to ensure that data provided in one or more subsequent interactions matches data provided in an initial interaction without requiring any storage of the actual data, which may be sensitive information.

CONCLUSION

Although embodiments above are described in reference to various credential management and personal data management and protection systems, it should be understood that various aspects of the system described above may be applicable to other privacy-related systems, or to other types of systems, in general.

While this specification contains many specific embodiment details, these should not be construed as limitations on the scope of any invention or of what may be conceived, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially conceived as such, one or more features from a conceived combination may in some cases be excised from the combination, and the conceived combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the disclosed embodiments. Although specific terms are employed herein, they are used in a generic and descriptive sense only and not for the purposes of limitation.

What is claimed is:

1. A method comprising:

receiving, by computing hardware associated with an entity, a data subject access request associated with a data subject;

responsive to receiving the data subject access request, determining, by the computing hardware and based on the data subject access request, a data source from which data associated with the data subject is to be acquired, wherein the data source is not operated by the entity;

retrieving, by the computing hardware using metadata, a credential used for accessing the data source from data storage associated with the entity, wherein the metadata maps the credential to the data source;

acquiring, by the computing hardware using the credential, the data associated with the data subject from the data storage;

processing, by the computing hardware, the data subject access request using the data associated with the data subject from the data storage; and subsequent to processing the data subject access request:

identifying, by the computing hardware, that the credential is invalid; and responsive to determining that the credential is invalid, deleting, by the computing hardware, the credential from the data storage and the metadata mapping the credential to the data source to prevent the computing hardware from acquiring further data from the data source.

2. The method of claim 1 further comprising, after deleting the credential and the metadata:

submitting, by the computing hardware, a notification requesting a second credential to access the data source;

receiving, by the computing hardware and based on the notification, the second credential; and responsive to receiving the second credential:

generating, by the computing hardware, second metadata mapping the second credential to the data source; and storing the second credential in the data storage so that the computing hardware can use the second credential to acquire the further data from the data source.

3. The method of claim 1 further comprising determining, by the computing hardware and based on a data map, an availability of the credential, wherein the data map defines the availability of the credential for the data source.

4. The method of claim 1 further comprising determining, by the computing hardware, that the credential is valid prior to acquiring the data associated with the data subject from the data storage.

5. The method of claim 1, wherein determining the data source from which the data associated with the data subject is to be acquired is based on criteria associated with the data subject access request that identifies at least one of a type for the data subject, a type for the data subject access request, or a type for the data.

6. The method of claim 1, wherein the credential employs at least one of a username and password combination, a public/private key system, or multi-factor authentication in accessing the data source.

7. The method of claim 1, wherein the data comprises personal data of the data subject.

8. A system comprising:

a non-transitory computer-readable medium storing instructions; and a processing device communicatively coupled to the non-transitory computer-readable medium, wherein the system is associated with an entity, and the processing device is configured to execute the instructions and thereby perform operations comprising:

receiving a data subject access request associated with a data subject;

responsive to receiving the data subject access request, determining, based on the data subject access request, a data source from which data associated with the data subject is to be acquired, wherein the data source is not operated by the entity;

retrieving, using metadata, a credential used for accessing the data source from data storage associated with the entity, wherein the metadata maps the credential to the data source;

acquiring, using the credential, the data associated with the data subject from the data storage;

processing the data subject access request using the data associated with the data subject from the data storage; and subsequent to processing the data subject access request:

identifying that the credential is invalid; and responsive to determining that the credential is invalid, preventing further use of the credential to acquire further data from the data source.

9. The system of claim 8, wherein preventing further use of the credential comprises deleting the credential from the data storage and the metadata mapping the credential to the data source.

10. The system of claim 8, wherein preventing further use of the credential comprises modifying a validity status of the credential to indicate the credential is invalid.

11. The system of claim 8, wherein the operations further comprise, after preventing further use of the credential:

submitting a notification requesting a second credential to access the data source;

receiving, based on the notification, the second credential; and responsive to receiving the second credential:

generating second metadata mapping the second credential to the data source; and storing the second credential in the data storage so that the system can use the second credential to acquire the further data from the data source.

12. The system of claim 8, wherein the operations further comprise determining, based on a data map, an availability of the credential, the data map defining the availability of the credential for the data source.

13. The system of claim 8, wherein the operations further comprise determining that the credential is valid prior to acquiring the data associated with the data subject from the data storage.

14. The system of claim 8, wherein determining the data source from which the data associated with the data subject is to be acquired is based on criteria associated with the data subject access request that identifies at least one of a type for the data subject, a type for the data subject access request, or a type for the data.

15. A non-transitory computer-readable medium having program code that is stored thereon, the program code executable by one or more processing devices for performing operations comprising:

determining, based on a processing activity to be performed by an entity, a data source from which data associated with the processing activity is to be acquired, wherein the data source is not operated by the entity;

retrieving, using metadata, a credential used for accessing the data source from data storage associated with the entity, wherein the metadata maps the credential to the data source;

acquiring, using the credential, the data from the data storage;

performing the processing activity using the data from the data storage; and subsequent to performing the processing activity:

identifying that the credential is invalid; and responsive to determining that the credential is invalid, preventing further use of the credential to acquire further data from the data source.

16. The non-transitory computer-readable medium of claim 15, wherein preventing further use of the credential comprises deleting the credential from the data storage and the metadata mapping the credential to the data source.

17. The non-transitory computer-readable medium of claim 15, wherein preventing further use of the credential comprises modifying a validity status of the credential to indicate the credential is invalid.

18. The non-transitory computer-readable medium of claim 15, wherein the operations further comprise, after preventing further use of the credential:

submitting a notification requesting a second credential to access the data source;

receiving, based on the notification, the second credential; and responsive to receiving the second credential:

generating second metadata mapping the second credential to the data source; and storing the second credential in the data storage so that the second credential can be used to acquire the further data from the data source.

19. The non-transitory computer-readable medium of claim 15, wherein the operations further comprise determining, based on a data map, an availability of the credential, the data map defining the availability of the credential for the data source.

20. The non-transitory computer-readable medium of claim 15, wherein the operations further comprise determining that the credential is valid prior to acquiring the data from the data storage.

* * * * *